(12) United States Patent
Rao et al.

(10) Patent No.: US 12,246,591 B2
(45) Date of Patent: Mar. 11, 2025

(54) OFF-ROAD VEHICLE

(71) Applicant: Zhejiang CFMOTO Power Co., Ltd., Zhejiang (CN)

(72) Inventors: Lihua Rao, Hangzhou (CN); Yibin Yang, Hangzhou (CN); Zhaoyang Cheng, Hangzhou (CN); Hangyu Liu, Hangzhou (CN); Mei Zhong, Hangzhou (CN)

(73) Assignee: Zhejiang CFMoto Power Co. Ltd., Zhejiang (CN)

( * ) Notice: Subject to any disclaimer, the term of this patent is extended or adjusted under 35 U.S.C. 154(b) by 112 days.

(21) Appl. No.: 18/113,527

(22) Filed: Feb. 23, 2023

(65) Prior Publication Data
US 2023/0191901 A1    Jun. 22, 2023

Related U.S. Application Data

(63) Continuation of application No. PCT/CN2021/121820, filed on Sep. 29, 2021.

(51) Int. Cl.
*B60K 13/02* (2006.01)
*B60K 11/08* (2006.01)
*F02M 35/10* (2006.01)

(52) U.S. Cl.
CPC .............. *B60K 13/02* (2013.01); *B60K 11/08* (2013.01); *B60Y 2200/20* (2013.01); *F02M 35/10262* (2013.01)

(58) Field of Classification Search
CPC ........ B60K 13/02; B60K 11/08; B60K 11/06; B60Y 2200/20; B62D 25/24; B62D 23/005; F02M 35/10262
See application file for complete search history.

(56) References Cited

U.S. PATENT DOCUMENTS

| | | |
|---|---|---|
| 3,743,045 A | 7/1973 | Hansen |
| 8,998,253 B2 | 4/2015 | Novotny et al. |
| 10,384,724 B1 * | 8/2019 | Stockmeier ............ B60K 11/08 |
| 10,442,264 B2 | 10/2019 | Mailhot et al. |

(Continued)

FOREIGN PATENT DOCUMENTS

| | | |
|---|---|---|
| CN | 103387012 A | 11/2013 |
| CN | 103807077 A | 5/2014 |

(Continued)

OTHER PUBLICATIONS

Chinese Patent Office, Search Report in PCT/CN2021/121820, May 25, 2022.

*Primary Examiner* — Syed O Hasan
(74) *Attorney, Agent, or Firm* — Shewchuk IP Services, LLC; Jeffrey D. Shewchuk

(57) ABSTRACT

An off-road vehicle includes a frame, a vehicle cover, a prime mover assembly, an intake manifold, and an electrical control unit. An intake seat for the intake manifold is positioned above one of the rear side plates of the vehicle cover. An air filter for the intake manifold is positioned behind a rear baffle of the vehicle cover, which in turn is positioned behind the seat(s). The rear baffle defines an air filter access port, allowing the filter element in the air filter to be accessed and changed from within the cabin. Covers of the air filter access port and the air filter allow changing of the filter element without requiring any tools.

17 Claims, 100 Drawing Sheets

(56) References Cited

U.S. PATENT DOCUMENTS

| | | | |
|---|---|---|---|
| 2010/0236852 A1* | 9/2010 | Shiratori | B60K 13/02 |
| | | | 180/68.3 |
| 2015/0061275 A1 | 3/2015 | Deckard et al. | |
| 2016/0236737 A1 | 8/2016 | Spindler et al. | |
| 2018/0170134 A1 | 6/2018 | Schlangen | |
| 2019/0055907 A1* | 2/2019 | Tsuruta | F02M 35/088 |
| 2019/0248405 A1 | 8/2019 | Bennett | |
| 2019/0300064 A1 | 10/2019 | Hisamura et al. | |
| 2021/0031580 A1 | 2/2021 | Booth | |
| 2021/0094627 A1* | 4/2021 | Clark | B60K 13/04 |

FOREIGN PATENT DOCUMENTS

| | | |
|---|---|---|
| CN | 104703865 A | 6/2015 |
| CN | 105508597 A | 4/2016 |
| CN | 207018117 U | 2/2018 |
| CN | 208816254 U | 5/2019 |
| CN | 112758185 A | 5/2021 |

* cited by examiner

OFF-ROAD VEHICLE

RELATED APPLICATION INFORMATION

The present application is a continuation of PCT/CN2021/121820 filed Sep. 29, 2021. The entire contents of the above-referenced application are incorporated herein by reference.

FIELD OF THE DISCLOSURE

The disclosure relates to the technical field of off-road vehicles.

BACKGROUND OF THE DISCLOSURE

The term "off-road vehicle" refers to a vehicle that is designed for use on various types of terrain. Off-road vehicles can be used for off-road, sports and freight transportation. Off-road vehicles typically include a frame, a vehicle cover and some other assemblies used to ensure the normal operation of the vehicle, such as an air filter, an electrical control unit and other components. These assemblies are substantially mounted on the frame and covered and protected by the vehicle cover. Generally, components such as the air filter, electronic control unit and other components are routine maintenance components, which need regular overhaul and maintenance to ensure the normal operation. However, existing off-road vehicles have layouts of these components which, when overhauling and maintaining such components, require removal of a portion of the vehicle cover using tools, leading to a complex and difficult maintenance procedure.

SUMMARY OF THE DISCLOSURE

There is a need of providing an off-road vehicle with convenient maintenance.

In order to solve the above problems, this disclosure provides the following technical solutions.

An off-road vehicle includes a frame, a vehicle cover, a prime mover assembly, an intake manifold, an air filter, and an electrical control unit. The frame includes a front frame portion, a rear frame portion, and a middle frame portion between the front frame portion and the rear frame portion. The vehicle cover includes a front baffle, a bottom plate, a dashboard panel, a rear baffle, and rear side plates. The front baffle is arranged between the front frame portion and the middle frame portion. The bottom plate in arranged on the middle frame portion. The dashboard panel is arranged at a top of the front baffle. The rear baffle is arranged between the middle frame portion and the rear frame portion. The front baffle, the bottom plate, the dashboard panel and the rear baffle collectively define a cabin. The prime mover assembly having at least one air inlet is mounted on the rear frame portion. The intake manifold is in fluid communication between an intake seat and the air inlet of the prime mover assembly. The intake seat is located behind the cabin and above one of the rear side plates. The air filter includes a filter element to filter air that enters into the prime mover assembly through the intake manifold. The rear baffle defines an air filter access port, allowing access to the filter element from within the cabin.

In another aspect, the off-road vehicle includes a gear selection mechanism having a gear shift lever which extends into the cabin for the driver to operate to control a shift cable running to the prime mover assembly. The shift cable has a shift cable adjuster. The bottom plate of the vehicle cover defines a shift cable adjuster access port with the shift cable adjuster being accessible through the shift cable adjuster access port. An adjuster cover plate covers the shift cable adjuster access port. The adjuster cover plate is secured to the bottom plate and is removable from within the cabin without tools.

In another aspect, the off-road vehicle includes at least one side bumper. Ends of the side bumper penetrate into the vehicle cover from outside to inside of the off-road vehicle. The ends of the side bumper are mounted on corresponding connection plates arranged on the middle frame portion. The bottom plate of the vehicle cover defines a bumper access port therein, with the connection between the end of the side bumper and the connection plate being accessible through the bumper access port.

In another aspect, the off-road vehicle further includes an intake snorkel in fluid communication with the intake manifold. The intake snorkel extends upwardly from the intake seat. The intake seat supports an intake cavity cover. The intake cavity cover has a wall breaking area of reduced strength. The intake snorkel is installed by breaking and removal of the wall breaking area, and the positioning the intake snorkel so it extends through the intake cavity cover. The intake snorkel comprises a top pipe section defining a top pipe section central axis. An angle defined between the top pipe section central axis and vertical is in the range between 40° and 140°. In another aspect, the top pipe section defines an intake hole exposed along an underside of the top pipe section. The intake snorkel further comprises a filter at the intake hole to filter air entering into the top pipe section. The angle defined between the top pipe section central axis and vertical exceeds 90° such that water captured by the filter can drip out of the intake hole.

In another aspect, the off-road vehicle includes a mode switch to select between a two-wheeled drive gear, a four-wheeled drive gear and a front-wheeled drive lock gear. The four-wheeled gear is located between the two-wheeled drive gear and the front-wheeled drive lock gear. The mode switch includes a pressing plate pivotally connected to a housing, which swings a lever within a cavity. A surface within the cavity has different profile sections to engineer the resistance and travel of the mode switch when switching drive gears.

In another aspect, the middle frame portion of the off-road vehicle includes sloping beams which define a peak. The sloping beams are and an angle in the range from 5° to 15° relative to horizontal.

In another aspect, the electrical system of the off-road vehicle includes a terminal block mounted remotely from the battery pack and connected to the battery pack by a harness. The terminal block includes three terminals, two corresponding to positive and negative terminals of the battery, and a third terminal controlled by a power relay such that the third terminal is only powered when a key/switch of the off-road vehicle is on.

The disclosure has at least the following advantages. The positions for the electrical control unit and the air filter are arranged suitably, and the rear baffle defines a filter element access port. When overhauling the air filter and/or replacing the air filter element, access is from within the cabin and through the air filter access port, which is convenient for overhaul and simple for operation, which can avoid secondary pollution of the components and reduce the possibility of dust or sediment entering the air filter during maintenance.

BRIEF DESCRIPTION OF THE DRAWINGS

FIG. 120 is a front top perspective view of the driver's side headlight of FIGS. 109 and 119 with the lens and high and low beam bulbs removed.

FIG. 121 is a front perspective view of the housing and circuit board of the driver's side headlight of FIGS. 109 and 119.

FIG. 122 is a rear perspective view of the housing of FIG. 121.

FIG. 123 is a perspective view of the improved mode switch of FIG. 109.

FIG. 124 is a cross-sectional view of the mode switch of FIG. 123.

FIG. 125 is a schematic side view of the plunger ball slots of the mode switch of FIGS. 123 and 124.

FIG. 126 is a schematic side view calling out the angular relationships of FIG. 125.

FIG. 127 is a cross-sectional view of the connection between the mode switch and the butt connection socket.

FIG. 128 is an enlarged view of part N in FIG. 127.

FIG. 129 is a partially side, partially schematic view of the preferred electrical terminal assembly as connected into the electrical system of FIG. 109.

FIG. 130 is a side view of the electrical terminal assembly of FIG. 129 with the cover on.

FIG. 131 is an exploded perspective view of the electrical terminal assembly of FIGS. 129 and 130.

Figure 132:
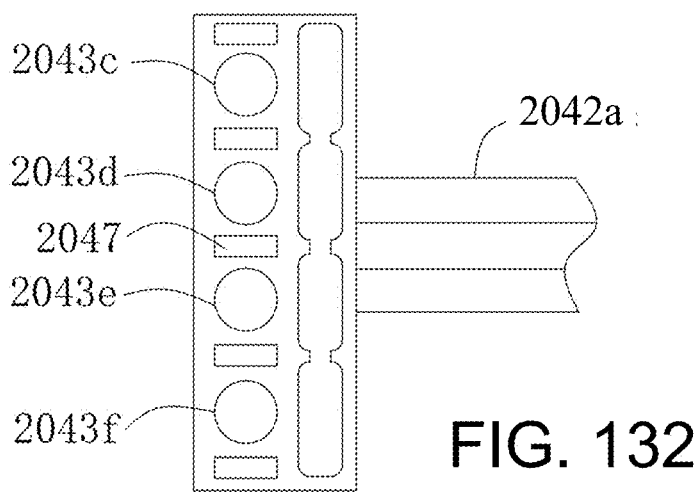

FIG. 132 is a schematic side view of an electrical terminal assembly according to another embodiment.

DETAILED DESCRIPTION

For better understanding of the above objects, features and advantages of the present disclosure, the embodiments of the present disclosure will be described in detail below with reference to the accompanying drawings. In the following description, numerous details are set forth in order to for better understanding of the present disclosure. However, the present disclosure may be implemented in many other ways different from those described herein, and those skilled in the art can make similar improvements and modifications without departing from the teachings of the present disclosure. Therefore, the present invention is not limited by specifics of the embodiments disclosed below.

Figure 1:
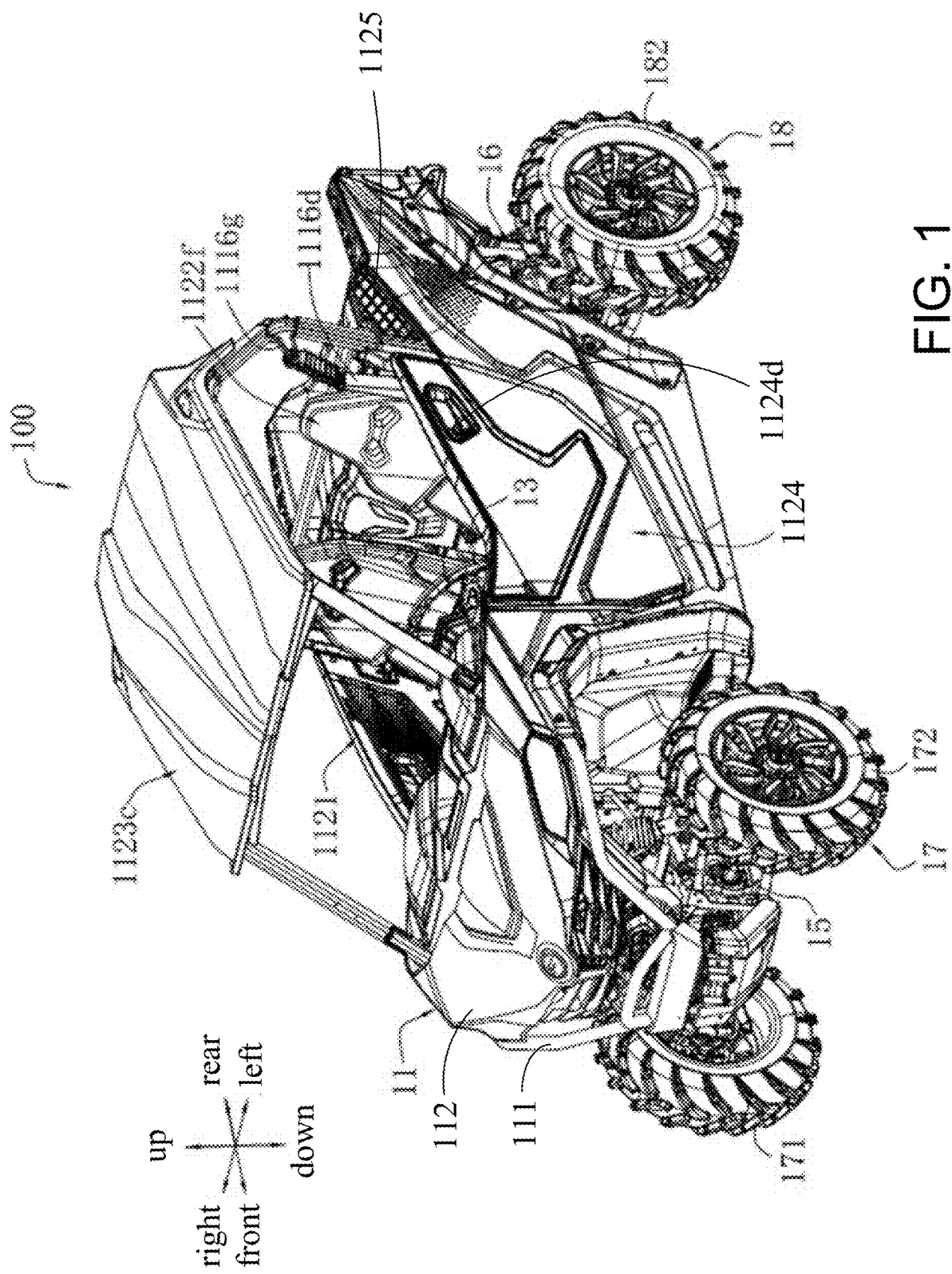
FIG. 1 is a front left perspective view of an off-road vehicle according to a preferred embodiment of the disclosure.

FIG. 1 shows a preferred off-road vehicle 100, which may be used for travel on a wide variety of unpaved surfaces including beaches, hillsides and deserts. The general orientations of front, rear, up (upper), down (lower), left and right for the off-road vehicle 100 are defined in FIG. 1.

Figure 104:
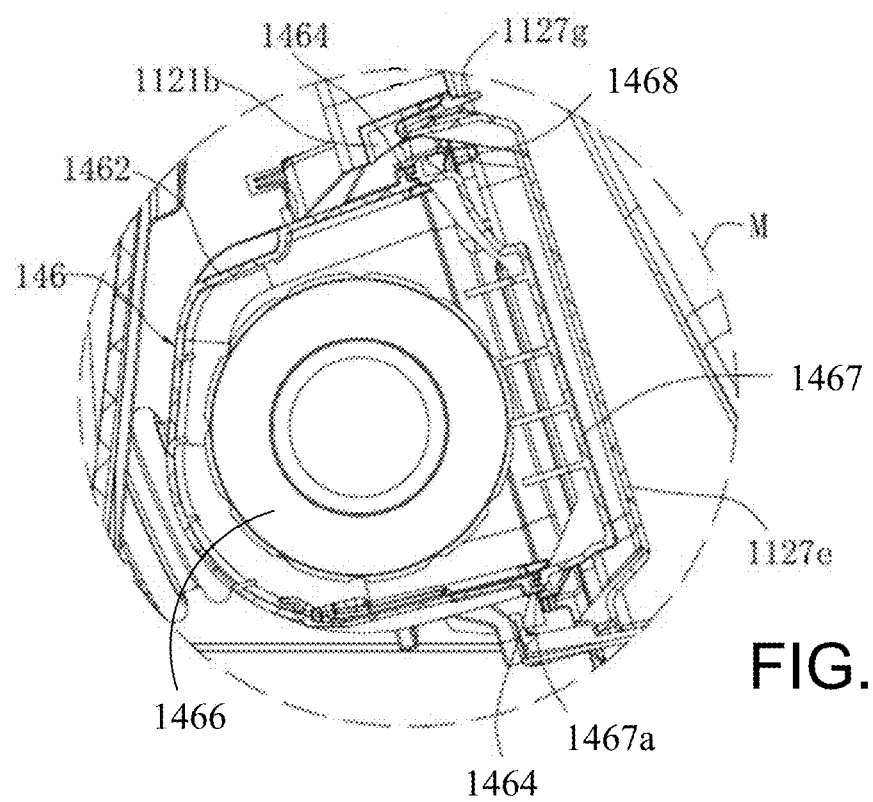
FIG. 104 is an enlarged view of part M in FIG. 103.
Figure 105:
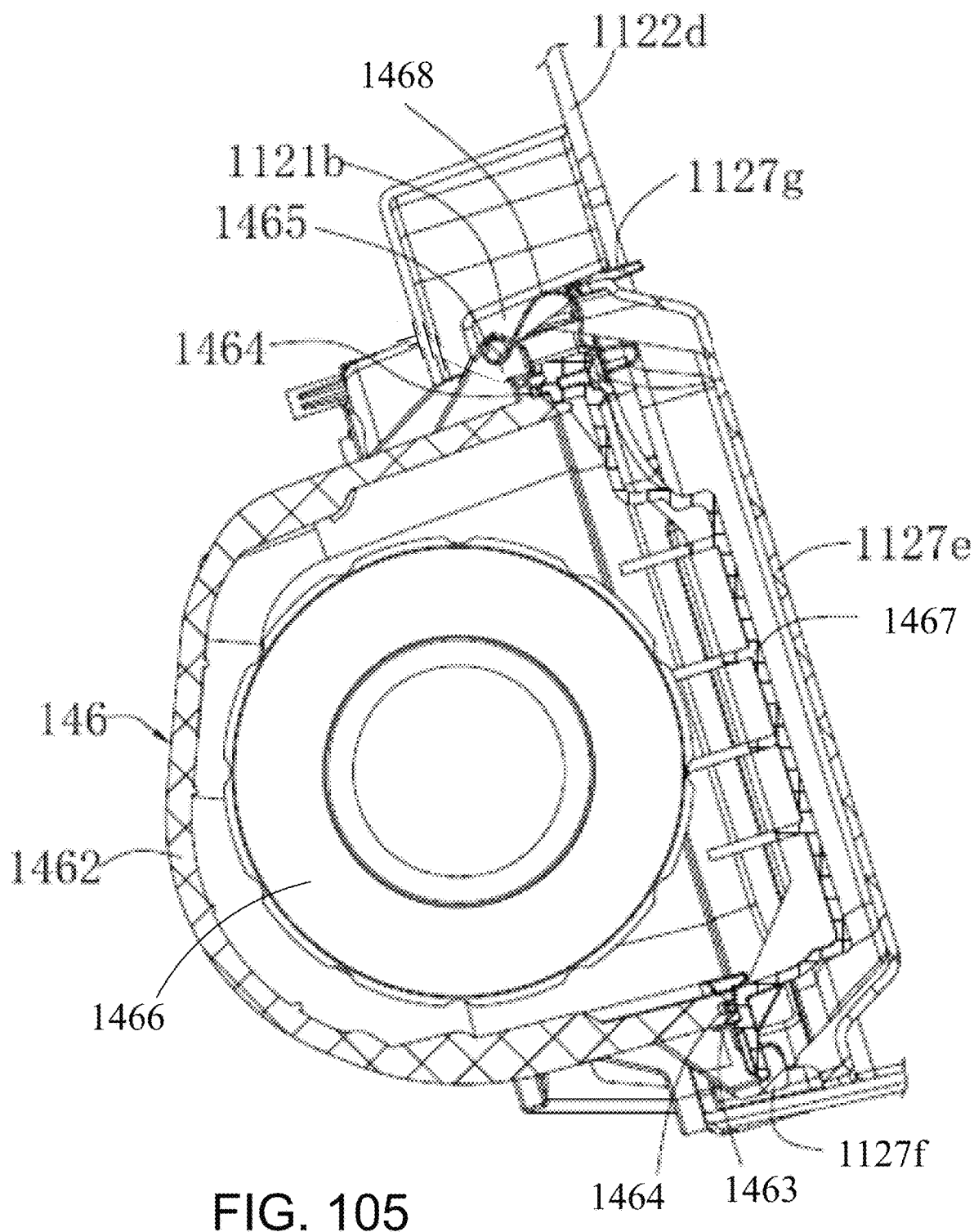
FIG. 105 is a cross-sectional view similar to FIG. 104, but taken at the cut-line 105-105 from FIG. 101.
Figure 109:
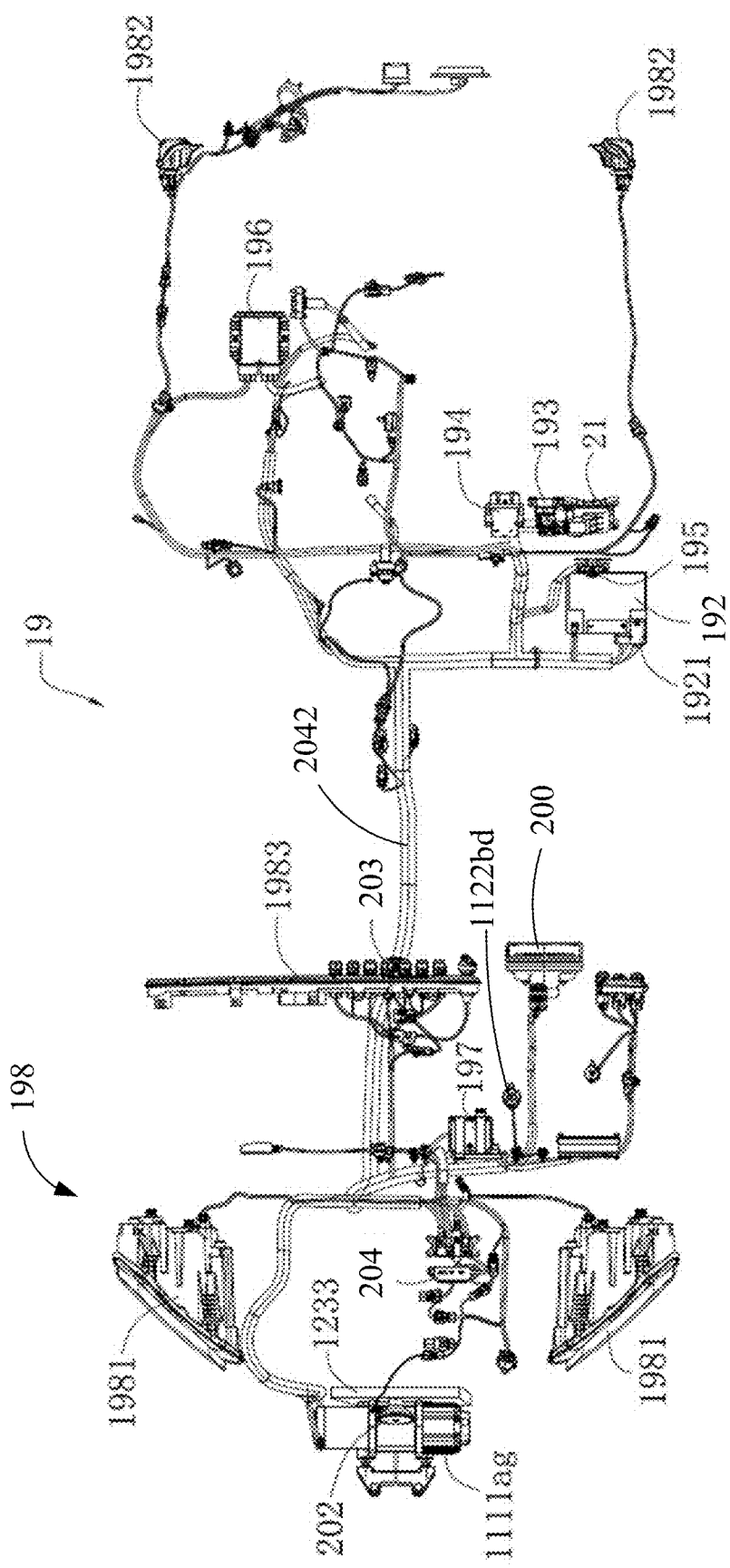
FIG. 109 is a top plan view showing an overall arrangement of the preferred electrical system used in the vehicle of FIG. 1.

The off-road vehicle 100 includes a frame assembly 11, a prime mover assembly 12 (preferably mounted in the rear position shown in FIGS. 45, 46 and 48), a vehicle manipulation system 13 (parts described relative to FIGS. 63-80), an intake and exhaust system 14 (shown relative to the prime mover assembly 12 in FIG. 81), a front suspension assembly 15, a rear suspension assembly 16, front wheels 17, rear wheels 18, an electrical system 19 (preferably laid out as shown in FIG. 109) and an electronic control unit (ECU) 21 (preferably positioned as shown in FIG. 104). The frame assembly 11 is used for carrying and connecting various components on the off-road vehicle 100 and bearing various loads from inside and outside the vehicle. The vehicle manipulation system 13 is mounted on the frame assembly 11 and is used for manipulating the steering, braking and driving speed of the off-road vehicle 10. The front suspension assembly 15 is disposed toward the front of the off-road vehicle 100 and is mounted on the frame assembly 11. The front suspension assembly 15 is connected to the front wheels 17 so as to deliver forces from the front wheels 17 to the frame assembly 11. The front suspension assembly 15 is capable of buffering impact forces from uneven surfaces over which the vehicle 100 travels to the frame assembly 11 and other components, so as to reduce vibration, thereby ensuring that the off-road vehicle 100 is able to run smoothly and stably. The rear suspension assembly 16 is disposed toward the rear of the off-road vehicle 100, and is mounted on the frame assembly 11. The rear suspension assembly 16 is connected to the rear wheels 18 so as to deliver forces from the rear wheels 18 to the frame assembly 11. The rear suspension assembly 16 is capable of buffering impact forces from uneven surfaces over which the vehicle 100 travels to the frame assembly 11 and other components, so as to reduce vibration, thereby ensuring that the off-road vehicle 100 is able to run smoothly and stably. The various electrical components 19 may be directly or indirectly mounted on the frame assembly 11, and are at least partially connected (electrically/signally) to the electrical control unit 21 to enable control over the basic electrical functions of the off-road vehicle 100. The electrical control unit (referred to as ECU hereinafter) 21 is also referred to as a "travelling computer", which is supported by the frame assembly 11 and is used to monitor various input data (such as braking data, gear shifting data, etc.) and various states of vehicle operation (such as acceleration, skidding, fuel consumption, etc.); calculate the information transmitted by various sensors according to a pre-designed program; send various parameters (after processing) to various relevant actuators, such as electrical components 19; and perform various predetermined control functions.

Figure 2:
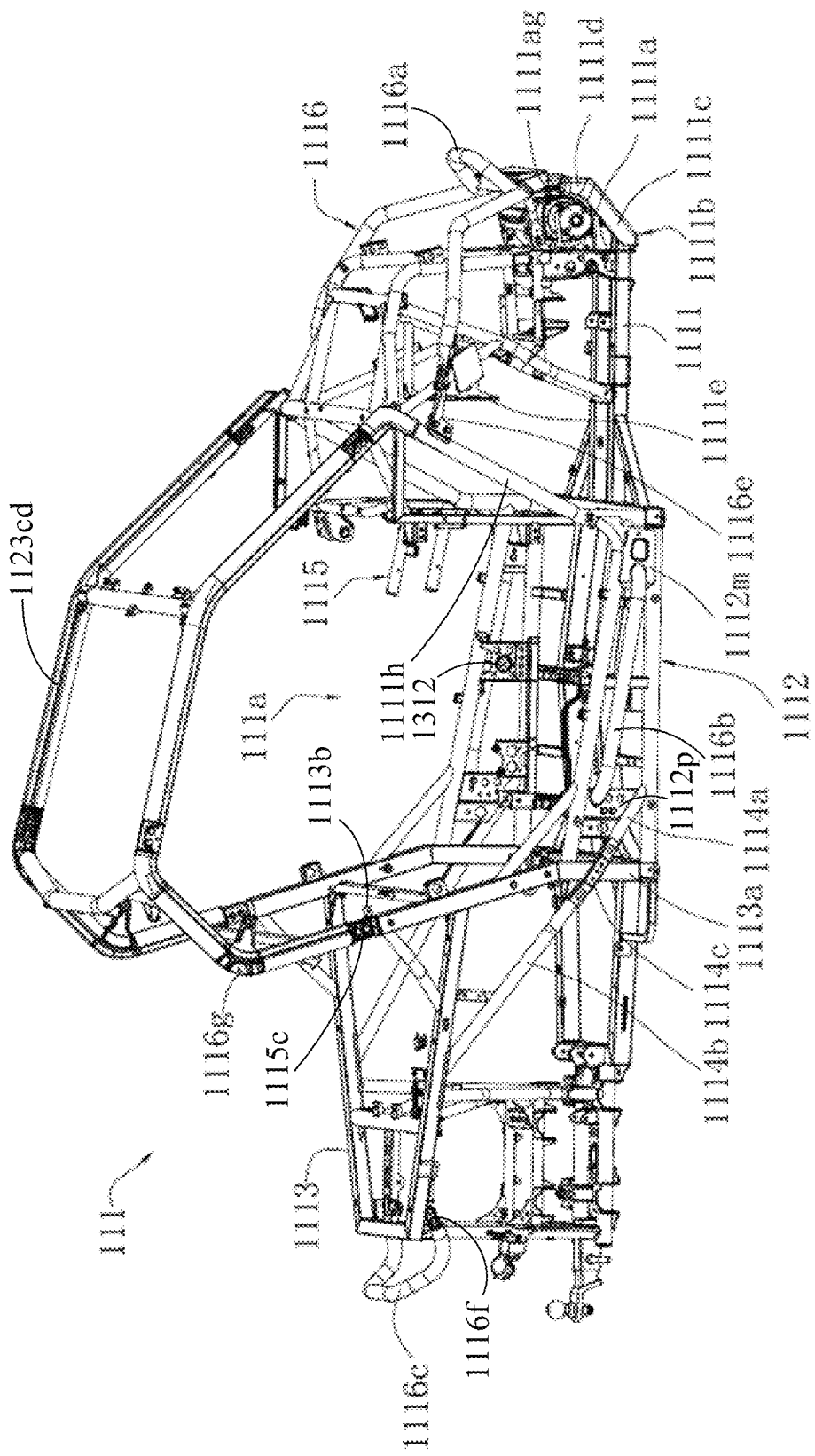
FIG. 2 is a side perspective view of the frame structure of the vehicle of FIG. 1.
Figure 3:
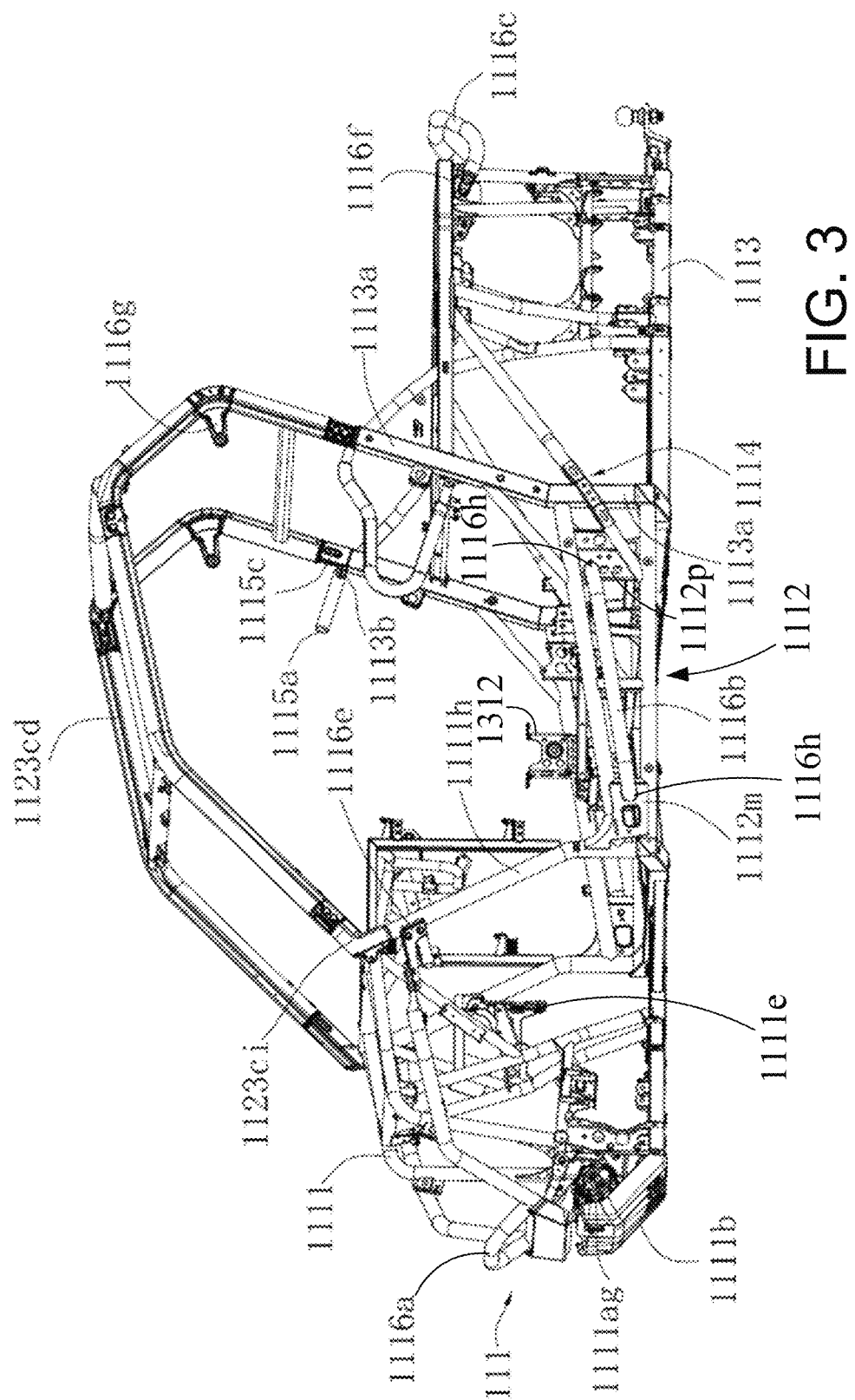
FIG. 3 is an opposing side perspective view of the frame structure of FIG. 2.

The frame assembly 11 includes a frame 111 shown in FIGS. 2 and 3 to carry various loads inside and outside the off-road vehicle 100. The front suspension assembly 15 and the rear suspension assembly 16 are respectively mounted on the front and rear ends of the frame 111. It should be noted that the layout of the front suspension assembly 15 and the rear suspension assembly 16 on the frame 111 may be correspondingly arranged as required. The frame assembly 11 also includes a vehicle cover 112 mounted on the frame 111 which covers at least part of the frame 111, so as to protect various parts and components on the vehicle 100 and improve the aesthetics of the vehicle 100. The vehicle cover 112 defines a driving place for the driver and a place for accommodating a passenger, as well as a place to carry cargo.

As shown in FIG. 2, the frame 111 includes a front frame portion 1111, a middle frame portion 1112, a rear frame portion 1113, an armrest assembly 1115, and a protection system 1116. The front frame portion 1111 carries components such as the front suspension assembly 15, headlights, water tanks, and the like. The rear frame portion 1113 carries components such as the rear suspension assembly 16, taillights and other components. The middle frame portion 1112 is connected between the front frame portion 1111 and the rear frame portion 1113, and is also used for carrying loads. The front frame portion 1111, the middle frame portion 1112 and the rear frame portion 1113 jointly form an accommodating space 111a. The vehicle cover 112 covers the vehicle frame 111 and defines a cabin 1121. The cabin 1121 serves as a cockpit for drivers and/or passenger compartment for passengers. The cabin 1121 is at least partially within the accommodating space 111a, so that the cabin 1121 can be sufficiently large without overly increasing the height of the off-road vehicle 100. The armrest assembly 1115 is located in the cabin 1121 and mounted on the frame 111 or the vehicle cover 112 for the driver and passengers to hold on. The protection system 1116 is part of the frame assembly 11 and distributed around the vehicle cover 112 to protect the vehicle cover 112, driver as well as any passenger.

Figure 9:
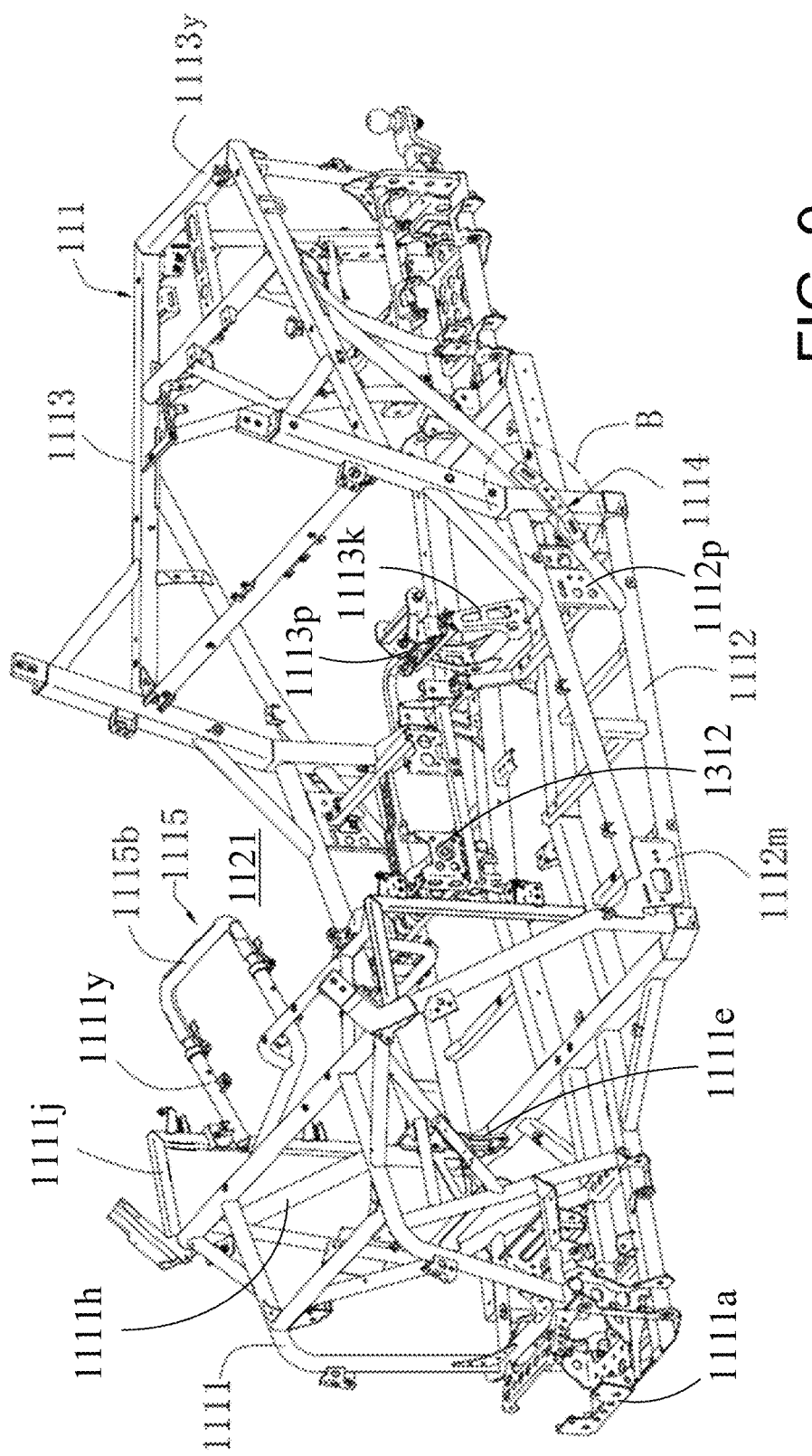
FIG. 9 is a perspective view of a selected portion of the frame of FIG. 6 from a front left point of view.
Figure 10:
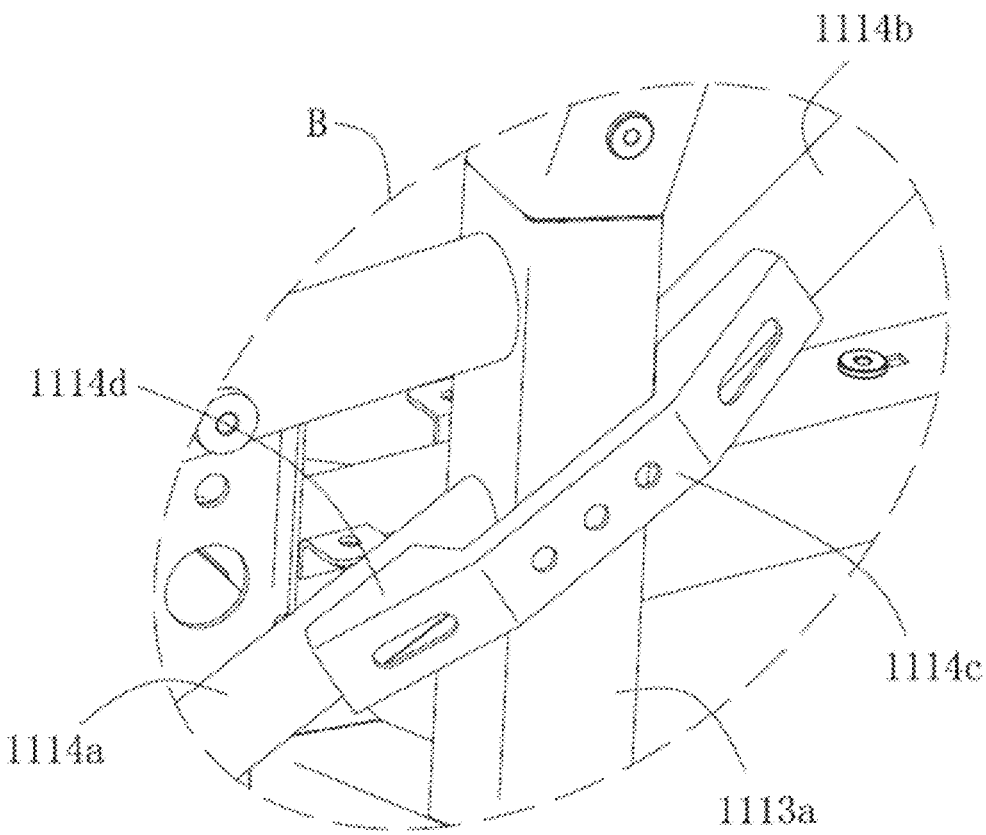
FIG. 10 is an enlarged view of area B in FIG. 9.

As shown in FIGS. 2, 3 and 9, the front frame 1111 is equipped with a winch mounting seat 1111a, a winch guard 1111b and a pedal mounting seat 1111e. The winch mounting seat 1111a is used to mount a winch 1111ag, which is cable device used for creating pull forces to or from the off-road vehicle 100. One side of the winch mounting seat 1111a is mounted on the front frame 1111 by bolts, welding, or the like. A bottom end of the winch guard 1111b is mounted at the bottom of the front frame 1111, with the top end extending upwardly and being blocked in front of the winch 1111ag. The winch guard 1111b provides a plate structure angled to protect the bottom front of the winch 1111ag. In this way, a shelter is formed in front of the winch 1111ag to avoid the impact of gravel, branches, etc. on the winch 1111ag. At the same time, the top end of the winch guard 1111b is connected back to the winch mounting seat 1111a. In this way, the winch mounting seat 1111a is effectively supported by the winch guard plate 1111b, so that when the winch mounting seat 1111a is under stress, the force is distributed by the winch guard 1111b and transmitted to the front frame portion 1111, so as to effectively improve the structural strength of the winch mounting seat 1111a. The winch guard 1111b may be a metal plate, a plastic plate or a plate made of other materials.

In one embodiment, the winch guard 1111b is a steel plate, and the winch guard 1111b is processed by such as by stamping and bending to improve the overall strength of the winch guard 1111b and reduce the processing cost. The winch guard 1111b is preferably connected to the front frame portion 1111 by bolts. The winch guard 1111b and the winch mounting seat 1111a may be connected to each other by bolts, for easy disassembly and replacement of the winch 1111ag. The preferred winch guard plate 1111b includes a sloping guard plate 1111c and a horizontal guard plate 1111d. The bottom end of the sloping guard plate 1111c is connected to the front frame portion 1111, with the sloping guard plate 1111c extending upwardly and inclining forwardly. The horizontal guard plate 1111d is arranged at the top end of the sloping guard plate 1111c. The sloping guard plate 1111c and the horizontal guard plate 1111d define a protection space, with the winch 1111ag being at least partially arranged in the protection space.

Figure 4:
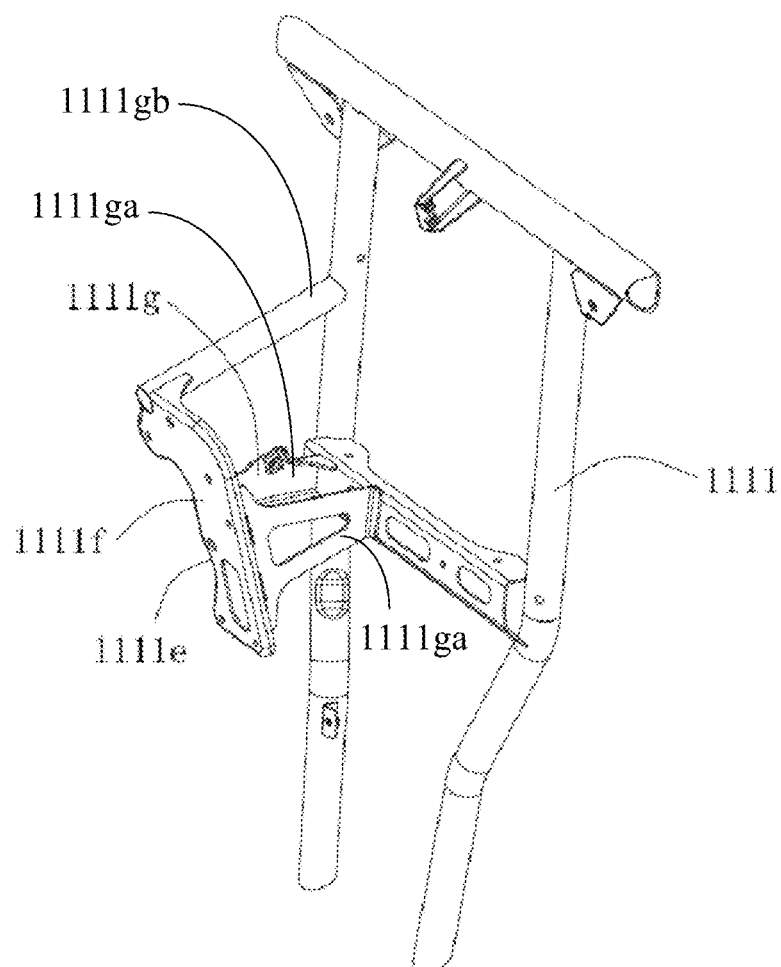
FIG. 4 is a mostly side perspective view of the connection between a pedal mounting seat and part of the front frame portion of the frame structure of FIGS. 2 and 3.
Figure 5:
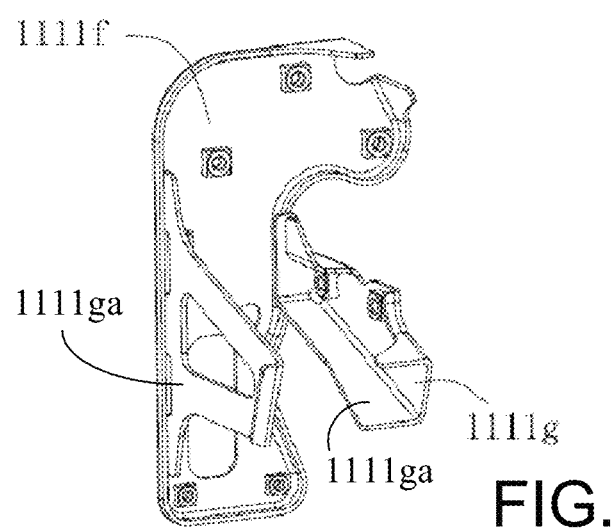
FIG. 5 is a mostly front perspective view of the pedal mounting seat of FIG. 4.

FIGS. 4 and 5 better show the pedal mounting seat 1111e of the preferred frame 111. The pedal mounting seat 1111e is positioned at the side of the front frame portion 1111 adjacent to the cabin 1121. The pedal mounting seat 1111e includes a support plate 1111f and a mounting bracket 1111g. The mounting bracket 1111g is mounted on the front frame portion 1111, with the support plate 1111f extending toward the interior of the cabin 1121 or extending rearwardly. The support plate 1111f is joined to the mounting bracket 1111g and is used to carry the accelerator pedal (not shown), a brake pedal 1321 (shown in FIGS. 70 and 71) and other components. The preferred mounting bracket 1111g includes a plurality of separate arms 1111ga (such as two separate arms 1111ga shown), which facilitates the connection between the pedal mounting seat 1111e and the front frame portion 1111, improves structural strength, facilitates processing and improves utilization rate of materials.

In the preferred embodiment, both the support plate 1111f and the mounting bracket 1111g are formed by stamping. The lengths of the support plate 1111f and the various parts of the mounting bracket 1111g are relatively short, which reduces the die cost and stamping times compared with stamping of large parts, which is conducive to the control of the overall cost. At the same time, the two support arms 1111ga are spaced on the front frame portion 1111, to improve the reliability and strength of the connection. The support plate 1111f and the mounting bracket 1111g can be connected by welding, bolts, etc. The support plate 1111f can further be directly connected to a tubular element 1111gb of the front frame portion 1111 such as by welding, bolts, etc.

Figure 6:
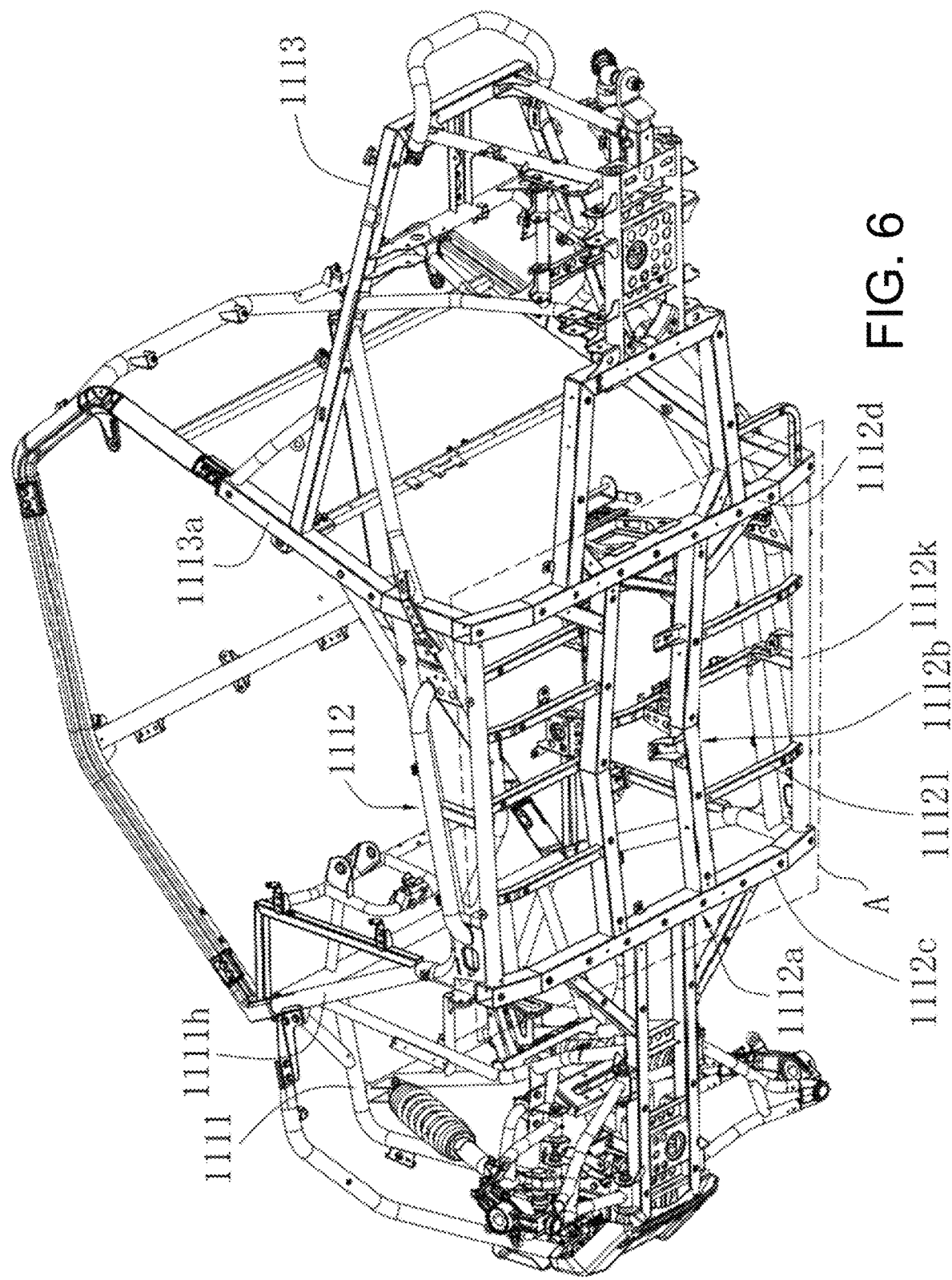
FIG. 6 is a perspective view from below of the frame structure of FIGS. 2 and 3.
Figure 7:
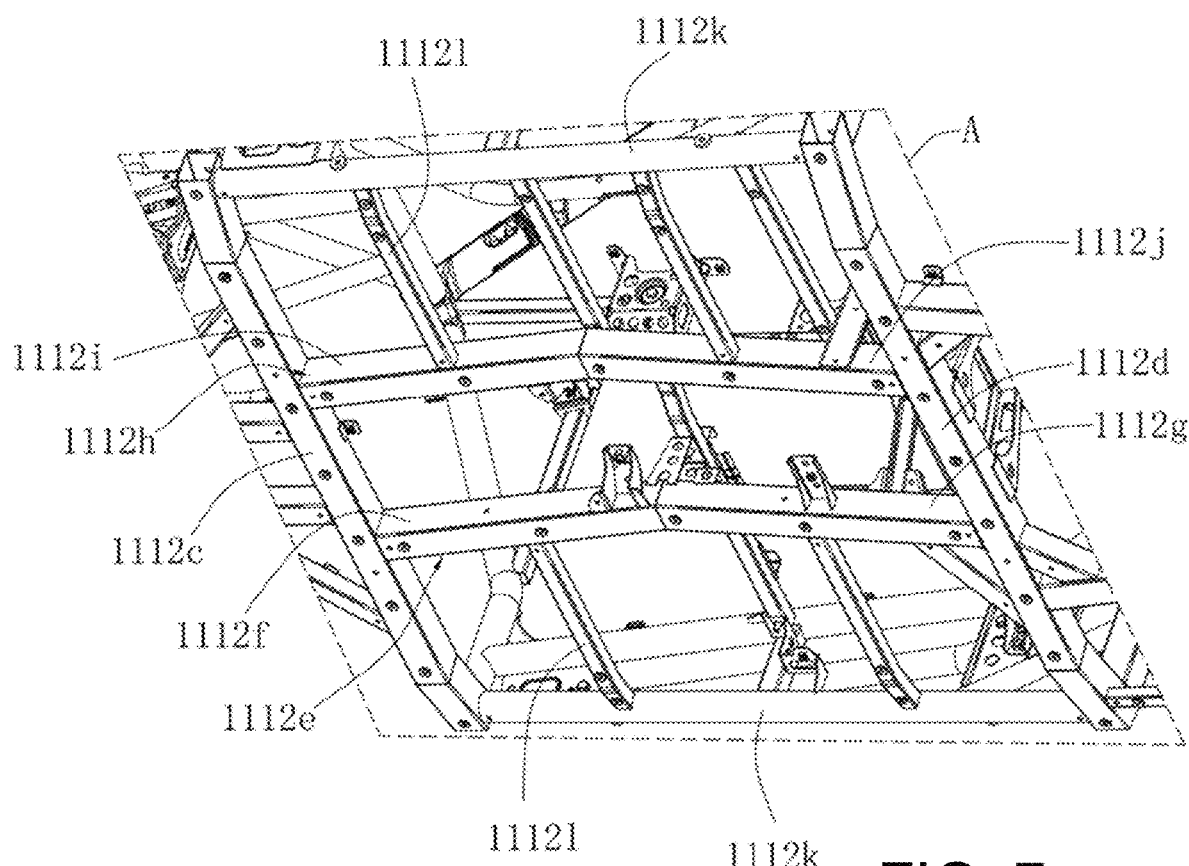
FIG. 7 is an enlarged view of area A in FIG. 6.
Figure 8:
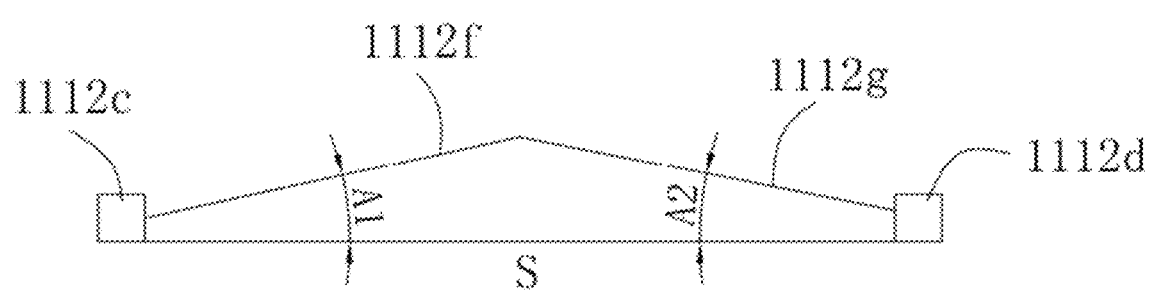
FIG. 8 is a side schematic view of the preferred middle frame portion.

As further shown in FIGS. 6 to 8, the middle frame portion 1112 includes horizontal beams 1112a and sloping beams 1112b. The horizontal beams 1112a and the sloping beams 1112b are interconnected to substantially form a load bearing structure. In one embodiment, the number of horizontal beams 1112a may be greater than one, and a plurality of the horizontal beams 1112a may be spaced apart and substantially located on the same plane. The number of sloping beams 1112b may also be greater than one, and a plurality of the sloping beams 1112b may be arranged between the plurality of the horizontal beams 1112a at intervals. It should be noted that the number of the horizontal beams 1112a may be two, three, four, or the like. Similarly, the number of the sloping beams 1112b may be two, three, four, or the like, i.e., the numbers of horizontal beams 1112a and sloping beams 1112b may be selected to correspond to the particular design objectives.

In this embodiment, the horizontal beams 1112a include a front cross beam 1112c and a rear cross beam 1112d, and the front cross beam 1112c and the rear cross beam 1112d are substantially located at the same elevation in the same plane S. The sloping beams 1112b include a right longitudinal beam 1112e and a left longitudinal beam 1112h. The right longitudinal beam 1112e is preferably provided to the right and the left longitudinal beam 1112h is preferably provided to the left of the longitudinal center line of the off-road vehicle 100. The right longitudinal beam 1112e preferably includes a leading rod 1112f and a trailing rod 1112g. The left longitudinal beam 1112h preferably includes a leading rod 1112i and a trailing rod 1112j. One end of each leading rod 1112f, 1112i is connected to the front cross beam 1112c, and the other end of each leading rod 1112f, 1112i extends toward the rear cross beam 1112d. An angle between each leading rod 1112f, 1112i and the plane S is defined in FIG. 8 as A1, and A1 is preferably in the range from 5° to 15°. One end of each trailing rod 1112g, 1112j is connected to the rear cross beam 1112d, and the other end of each trailing rod 1112g, 1112j extends toward the front cross beam 1112c and is connected to the corresponding leading rod 1112f, 1112i. An angle between the trailing rod 1112g and the plane S is defined in FIG. 8 as A2, and A2 is preferably in the range from 5° to 15°, so that the bottom of the middle frame portion 1112 is raised upwardly away from the horizontal plane and defines a peak. The distance of the off-road vehicle 100 from the underlying ground is increased under a central portion of the frame 111, so that the ability of the off-road vehicle 100 to traverse over obstacles is effectively improved.

In one embodiment, the angle A1 is larger than the angle A2, locating the peak forward of the midpoint between the front cross beam 1112c and the rear cross beam 1112d. The horizontal beams 1112a and the sloping beams 1112b are preferably made of steel pipes, which are readily commercially available and are easily processed. The leading rods 1112f, 1112i may be welded or otherwise attached to the front cross beam 1112c, and the trailing rods 1112g, 1112j may be welded or otherwise attached to the rear cross beam 1112d. The leading rods 1112f, 1112i may be welded or otherwise attached to the trailing rods 1112g, 1112j. Alternatively, other connection methods may be used. The leading rods 1112f, 1112i of the sloping beams 1112b are preferably parallel to each other, and the trailing rods 1112g, 1112j of the sloping beams 1112b are preferably arranged parallel to each other.

As also called out in FIGS. 6 and 7, the middle frame portion 1112 preferably includes at least two longitudinal reinforcement pipes 1112k and a plurality of cross reinforcement pipes 1112l. In the most preferred embodiment shown, the middle frame portion 1112 includes two longitudinal reinforcement pipes 1112k spaced apart with the sloping beams 1112b between the two longitudinal reinforcement pipes 1112k. The front end of each longitudinal reinforcement pipe 1112k is fixed on the front cross beam 1112c, and the rear end is fixed on the rear cross beam 1112d. Each cross reinforcement pipe 1112l is connected between one of the sloping beams 1112b and the corresponding longitudinal reinforcement pipe 1112k. Thus, the longitudinal reinforcement pipes 1112k, the cross reinforcement pipes 1112l, the horizontal beams 1112a and the sloping beams 1112b together form a mesh-like structure, which effectively improves the structural strength and bearing capacity of the entire middle frame portion 1112.

Referring back to FIGS. 2, 3 and 6, the front frame portion 1111 preferably further includes two first pillar base legs 1111h which are part of what is commonly called A-pillars, and the rear frame portion 1113 preferably further includes two second pillar base legs 1113a which are part of what is commonly called B-pillars. The A-pillar base legs 1111h and the B-pillar base legs 1113a are used for bearing, supporting the vehicle, and protecting drivers and passengers. A bottom end of each A-pillar base leg 1111h preferably connects to the front cross beam 1112c, with the A-pillar base leg 1111h extending upwardly therefrom. A bottom end of each B-pillar base leg 1113a preferably connects to the rear cross beam 1112d, with the B-pillar base leg 1113a extending upwardly therefrom.

As called out in FIGS. 2, 3, 9 and 10, the preferred embodiment includes two reinforcement structures 1114 arranged between the rear frame portion 1113 and the middle frame portion 1112 to improve the connection strength between the rear frame portion 1113 and the middle frame portion 1112. Each reinforcement structure 1114 preferably includes a first reinforcement rod 1114a, a second reinforcement rod 1114b and a reinforcement plate 1114c. Each first reinforcement rod 1114a is connected between one of the longitudinal reinforcement pipes 1112k and one of the B-pillar base legs 1113a. Each second reinforcement rod 1114b is connected between one of the B-pillar base legs 1113a and a support bracket 1113y (called out in FIG. 9). Each reinforcement plate 1114c is connected to both the first reinforcement rod 1114a and the second reinforcement rod 1114b, extending outside its B-pillar base leg 1113a. Forces applied to the B-pillar base legs 1113a by the first reinforcement rod 1114a and the second reinforcement rod 1114b are distributed by the reinforcement plate 1114c, avoiding processes such as drilling holes in the two B-pillar base legs 1113a, thereby reducing the possibility of local deformation of the B-pillar base legs 1113a. Other structures may alternatively or additionally be used to connect the A- and B-pillars, cross beams and/or longitudinal beams.

Connections for the reinforcement structure 1114 may be by welding. The reinforcement plate 1114c may be integrally formed by stamping. Ends of the reinforcement plate 1114c preferably include reinforcement pieces 1114d abutting against and increasing the contact area between the reinforcement plate 1114c and the first reinforcement rod 1114a and the second reinforcement rod 1114b, thereby improving the connection strength between the reinforcement plate 1114c and the first reinforcement rod 1114a and the second reinforcement rod 1114b.

The armrest assembly 1115 preferably includes a rear armrest 1115a located inside the cabin 1121 adjacent to the rear frame portion 1113 as shown in FIG. 3, and a front grab bar 1115b located inside the cabin 1121 adjacent to the front frame portion 1111 as shown in FIG. 9. The B-pillar base leg 1113a is provided with a forwardly extending tab 1113b as called out in FIGS. 2 and 3. A rear end of the rear armrest 1115a is connected on the tab 1113b, and is locked such as by bolts, screws or pin shafts, etc. The front end of the rear armrest 1115a is suspended in the cabin 1121 for passengers to hold. In this way, the installation space is reduced, the structure is simple, and the installation is convenient; which avoids punching or grooving the B-pillar base leg 1113a. In the preferred embodiment, the B-pillar base leg 1113a connects to the roll over protection system at a ROPS seat 1115c, and the tab 1113b is preferably located immediately below the ROPS seat 1115c. Alternatively, the tab 1113b can be part of the ROPS seat 1115c.

The front grab bar 1115b shown in FIG. 9 is mounted extending rearwardly off the front frame portion 1111 of the off-road vehicle 100 and into the cabin 1121. As further shown in FIGS. 11 and 12, the front frame portion 1111 further includes an L-tube 1111j extending rearwardly off the passenger-side A-pillar base leg 1111h, a coupling seat 1111i mounted on the L-tube 1111j supporting a right grab bar mounting tube 1111y, and a left grab bar mounting tube 1111k welded or otherwise rigidly secured as part of the front frame portion 1111. The right and left grab bar mounting tubes 1111y, 1111k extend parallel to one another.

Figure 11:
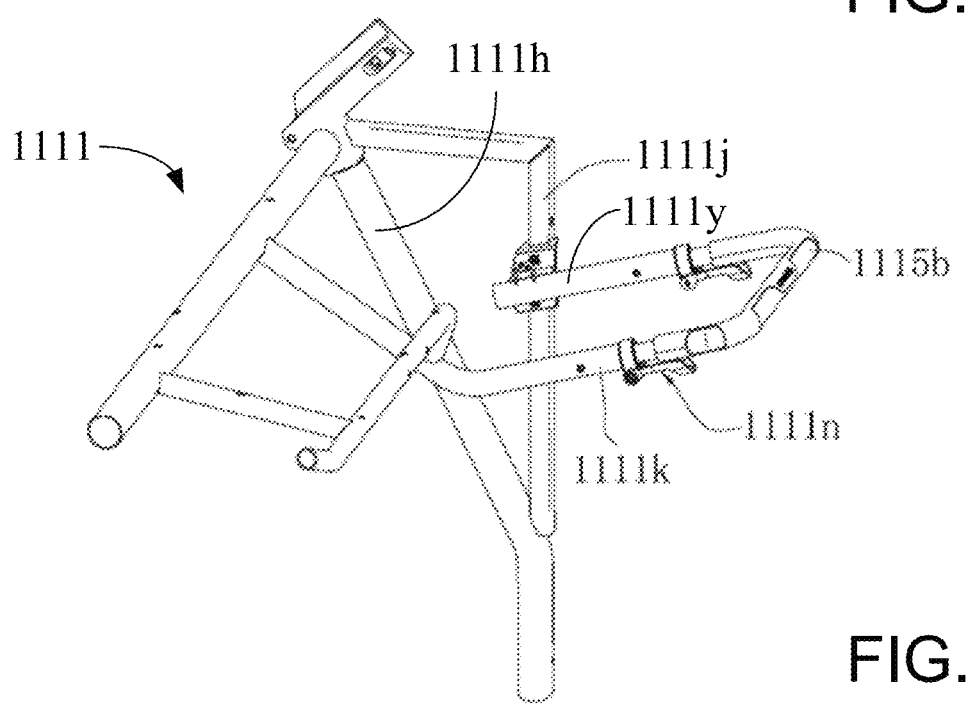
FIG. 11 is a perspective view of a passenger grab bar in the frame portion of FIG. 9.
Figure 12:
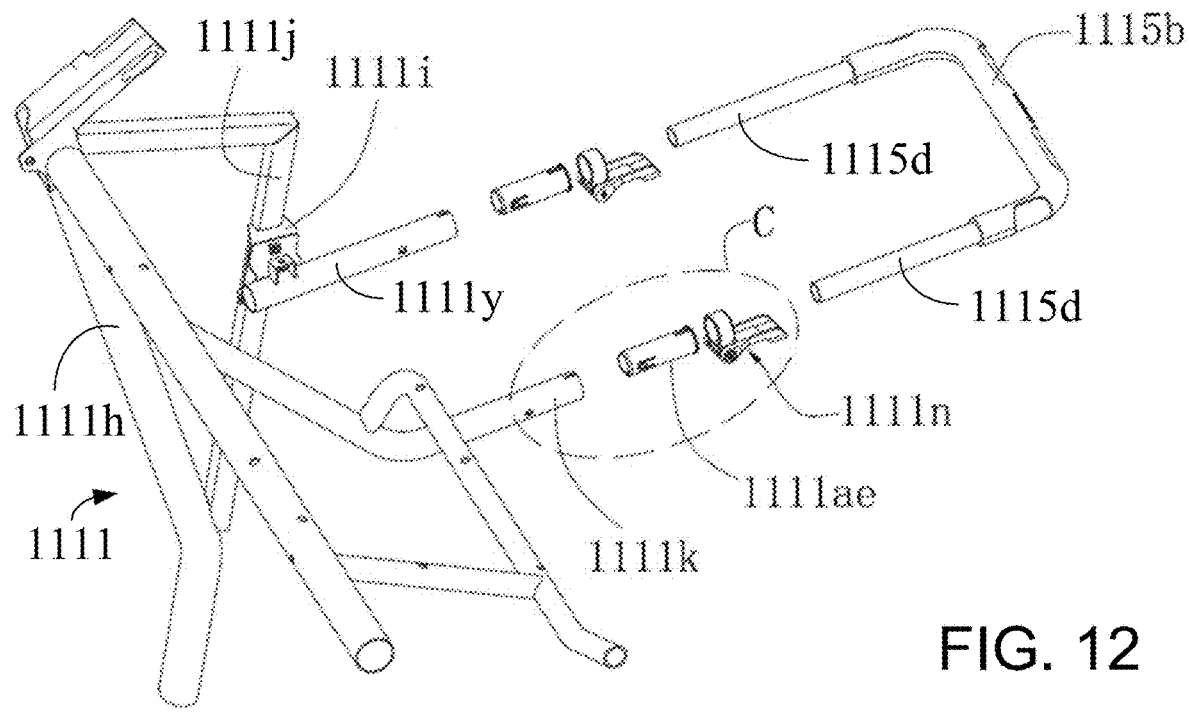
FIG. 12 is an exploded view of the grab bar of FIG. 11.
Figure 13:
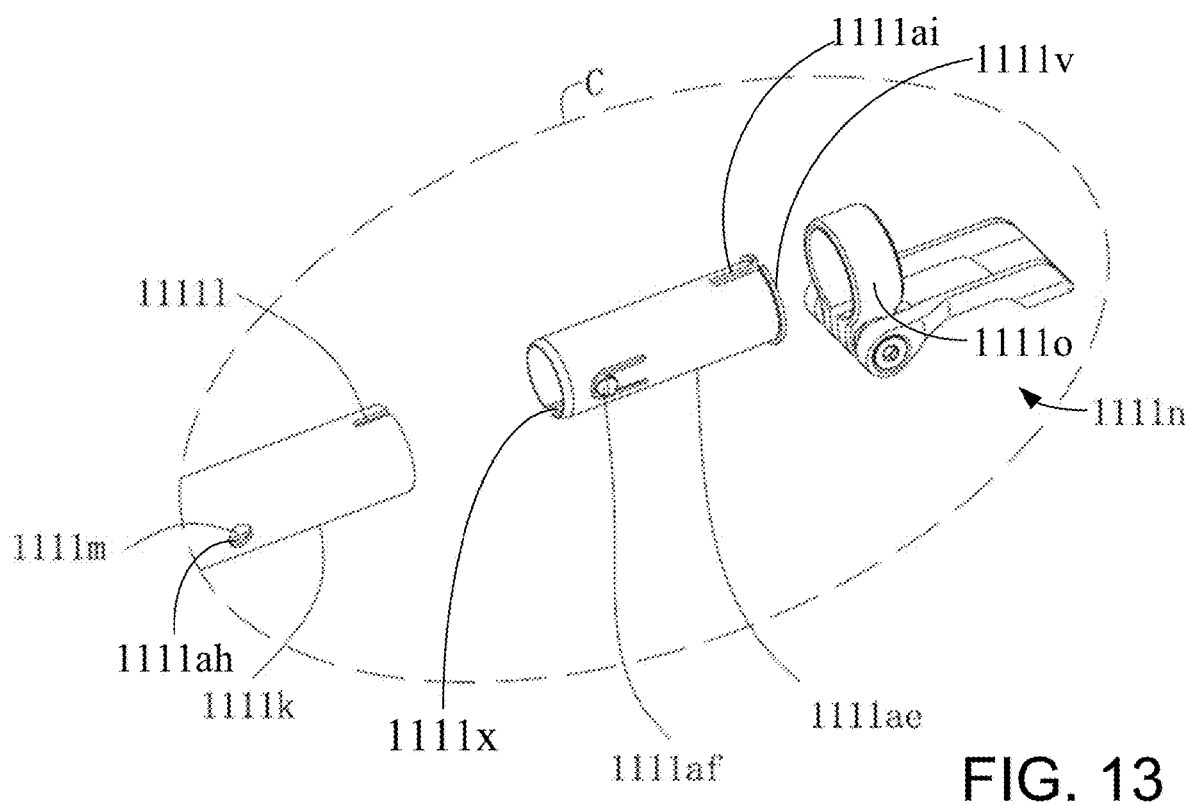
FIG. 13 is an enlarged view of area C in FIG. 12.
Figure 14:
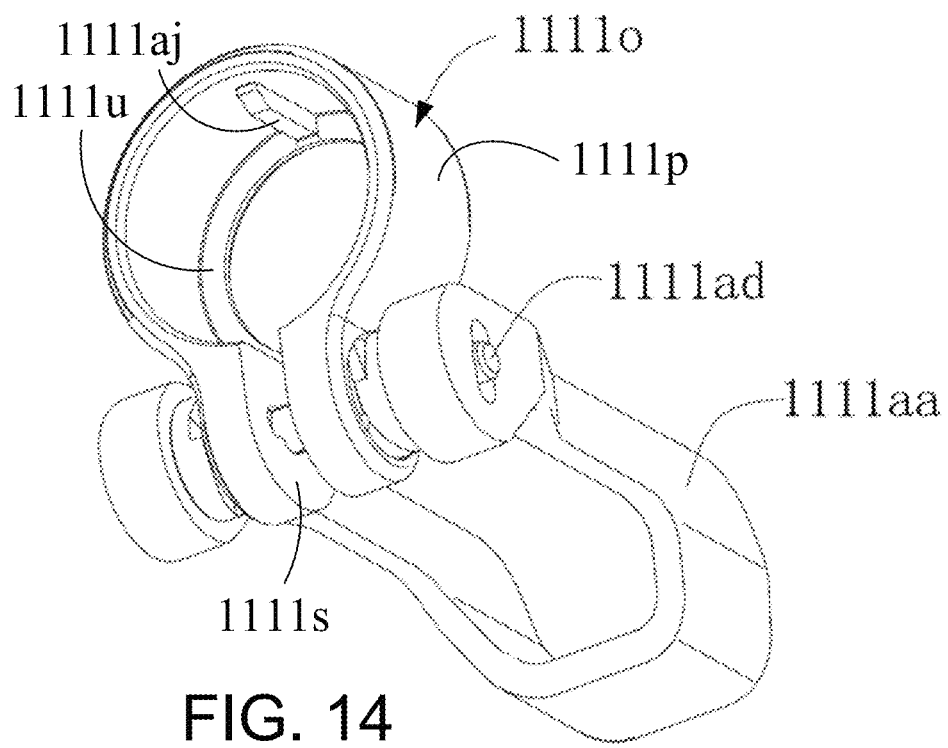
FIG. 14 is perspective view of a locking member of FIGS. 11-13.

The front grab bar 1115b is preferably telescopingly mounted on the right and left grab bar mounting tubes 1111y, 1111k as shown in FIGS. 9 and 11 with the structures better shown in FIGS. 12-17. The preferred telescoping mounting arrangement allows the passenger to quickly adjust the position of the front grab bar 1115b in a front-rear direction, so that the position of the front grab bar 1115b can be adapted to different persons. Two locking members 1111n are used, one on the right grab bar mounting tube 1111y and one on the left grab bar mounting tube 1111k. The locking members 1111n are capable of locking the ends 1115d of the front grab bar 1115b against telescoping movement, or releasing the locking of the front grab bar 1115b, so that the passenger can reposition the front grab bar 1115b to another selected telescoping position.

As shown in FIGS. 14 to 17, the preferred locking member 1111n includes a locking sleeve 1111o, four locking ramp wheels 1111t, an operating lever 1111aa and a tension pin 1111ad. The two locking sleeves 1111o are positioned around ends of the left and right grab bar mounting tubes 1111k, 1111y and each held in position with a connector/liner 1111ae. The locking sleeve 1111o includes a circumferential sleeve 1111p terminating with an inwardly extending shoulder 1111u. The circumferential sleeve 1111p has an inner diameter which fits around the outer diameter of the left and right grab bar mounting tubes 1111k, 1111y, with the inner diameter of the shoulder 1111u being smaller than the outer diameter of the left and right grab bar mounting tubes 1111k, 1111y and therefore maintaining the longitudinal position of the locking sleeve 1111o relative to its grab bar mounting tube 1111k, 1111y. The connector/liner 1111ae has an outer diameter which fits within the inner diameter of the left and right grab bar mounting tubes 1111k, 1111y except for a snap clip 1111af and an outwardly extending shoulder 1111v. After the locking sleeve 1111o is positioned on its grab bar mounting tube 1111k, 1111y, the connector/liner 1111ae is slid into its grab bar mounting tube 1111k, 1111y until the snap clip 1111af clicks outwardly into a snap clip hole 1111m. At this longitudinal position, the outwardly extending shoulder 1111v of the connector/liner 1111ae abuts the inwardly extending shoulder 1111u of the locking sleeve 1111o to secure the locking sleeve 1111o to the end its grab bar mounting tube 1111k, 1111y. Alternatively, the connector/liner 1111ae could be formed integrally with the locking sleeve 1111o.

Each locking sleeve 1111o has two ears 1111q at ends of the circumferential sleeve 1111p that define a gap 1111s. The connector/liner 1111ae has a longitudinal slit 1111x extending throughout its length, and each grab bar mounting tube 1111k, 1111y has a longitudinal slit 1111ah (seen only through the snap clip hole 1111m in FIG. 13) of corresponding length. Each locking sleeve 1111o includes a positioning tab 1111aj which extends both into a positioning recess 1111l on the end of the grab bar mounting tube 1111k, 1111y and into a positioning recess 1111ai on the connector/liner 1111ae. The positioning tab 1111aj ensures that the gap 1111s, the longitudinal slit 1111ah on the grab bar mounting tube 1111k, 1111y, and the longitudinal slit 1111x on the connector/liner 1111ae are all in alignment.

The tension pin 1111ad extends through an end 1111ak of the operating lever 1111aa, then through two of the ramp wheels 1111t, then through the two ears 1111q, then through the other two ramp wheels 1111t, and then is threadingly received in the other, threaded end 1111a1 of the operating lever 1111aa. Each ramp wheel 1111t includes at least one, and more preferably three ramps 1111w, with the pairs of ramp wheels 1111t positioned so the ramps 1111w on adjacent ramp wheels 1111w oppose each other. Each ramp wheel 1111t also includes two rotation tabs 1111z. On the outer two ramp wheels 1111t, the rotation tabs 1111z extend into elongated portions of the hole 1111ab for the tension pin 1111ad in the ends 1111ak, 1111a1 of the operating lever 1111aa, so the outer two ramp wheels 1111t rotate about the axis defined by the tension pin 1111ad with the operating lever 1111aa. On the inner two ramp wheels 1111t, the rotation tabs 1111z extend into elongated portions of the hole 1111r for the tension pin 1111ad in the ears 1111q, so the inner ramp wheels 1111t remain stationary with the locking sleeve 1111o. When the operating lever 1111aa is in the loosened position, the ramps 1111w are adjacent to each other and fit together. When the operating lever 1111aa is rotated from a loosened position to a tightened position, the ramps 1111w bear against each other to create a space between abutting ramp wheels 1111t, taking space out of the gap 1111s and reducing the effective diameter of the circumferential sleeve 1111p. This in turn takes space out of the slits 1111ah and 1111x, reducing the effective diameter of the ends of the grab bar mounting tubes 1111k, 1111y and the effective diameter on the connector/liner 1111ae.

The ends 1115d of the grab bar 1115b extend into the connector/liner 1111ae, with the outer diameter of the ends 1115d being just smaller than the uncompressed inner diameter of the connector/liner 1111ae and well smaller than the uncompressed inner diameter of the grab bar mounting tubes 1111k, 1111y. When the operating lever 1111aa is in the loosened position, the connector/liner 1111ae enables the ends 1115d of the grab bar 1115b to slide in or out of the grab bar mounting tubes 1111k, 1111y without significant frictional contact with the grab bar mounting tubes 1111k, 1111y. In this way, the connector/liner 1111ae prevents rigid contact between the grab bar 1115b and the grab bar mounting tubes 1111k, 1111y, thereby reducing wear and noise, and improving the smoothness of adjustment. When the operating lever 1111aa is moved by hand to the tightened position, the locking sleeve 1111o tightens and compresses the connector/liner 1111ae tightly on to the ends 1115d, frictionally preventing the grab bar 1115b from moving. In this way, the grab bar 1115b is clamped and mounted by the grab bar mounting tubes 1111k, 1111y.

It should be noted that two ramp wheels 1111t could alternatively be used instead of four, in which case one of the ears 1111q is fixedly arranged. It should also be noted that the outer two ramps wheels 1111t could be integrally formed with the operating lever 1111aa, and/or that the inner two ramp wheels 1111t could be integrally formed with the ears 1111q. However, forming the ramp wheels 1111t separately from the ears 1111q and separately from the operating lever 1111aa allows the ramp wheels 1111t to be formed with a different material, such as a hard material more suitable to bearing/sliding. For instance, the ramp wheels 1111t can be formed of bronze, while the operating lever 1111aa is molded of a strong rigid plastic and the sleeve 1111p molded of a more flexible plastic. The connector/liner 1111ae can be molded of a more lubricious plastic, while the tension pin 1111ad can be formed of stainless steel.

Figure 15:
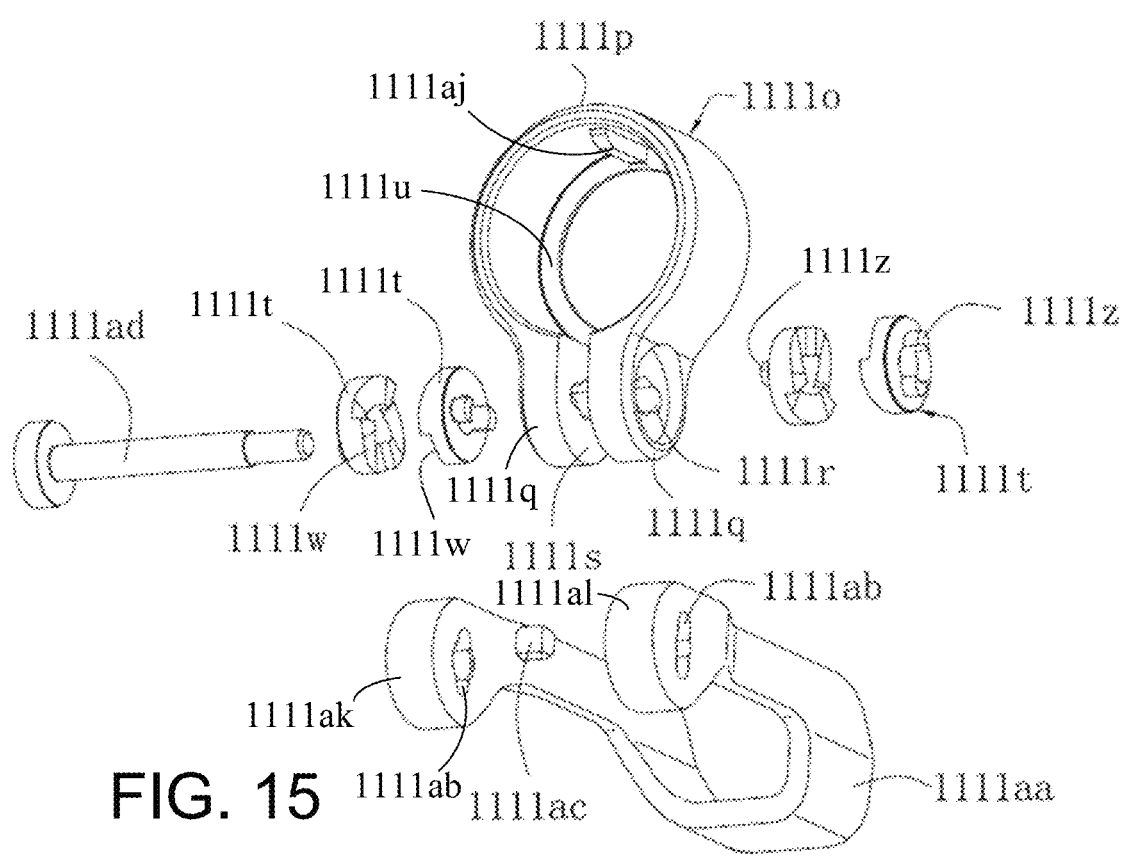
FIG. 15 is an exploded view of the locking member of FIG. 14.
Figure 16:
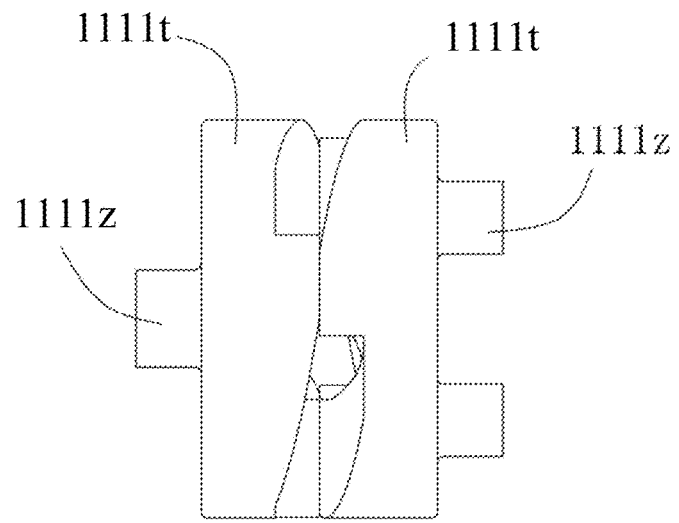
FIG. 16 is a side view of two locking ramp wheels of the locking member of FIGS. 14 and 15 in a tightened or locked state.
Figure 17:
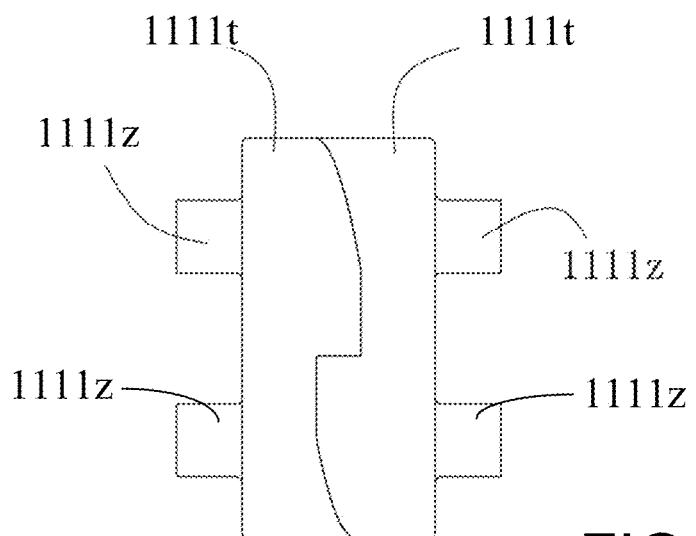
FIG. 17 is a side view of the two locking ramp wheels of FIG. 16 in a loosened or unlocked state.
Figure 18:
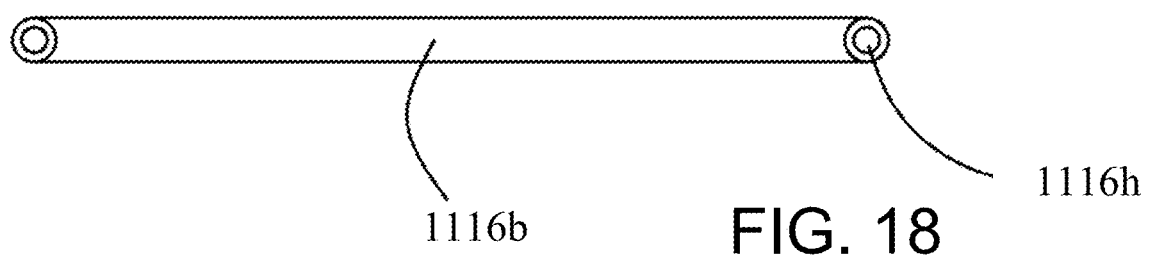
FIG. 18 is a side view of a side bumper used in the vehicle of FIG. 1.

As shown in FIG. 15, the operating lever 1111aa is also provided with a stop bump 1111ac. The stop bump 1111ac is positioned on the inner side of the operating lever 1111aa and is capable of pressing against the sleeve 1111p at a predetermined position to avoid excessive rotation of the operating lever 1111aa relative to the locking sleeve 1111o.

As shown in FIGS. 2 and 3, the protection system 1116 preferably includes a front bumper 1116a, two side bumpers 1116b, a rear bumper 1116c and a safety belt 1116d (shown in FIG. 1), and a safety belt connector 1116g. The front bumper 1116a is positioned at the front end of the off-road vehicle 100 and is circumferentially distributed around the front frame 1111. The front bumper 1116a is connected to the A-pillar base leg 1111h by a front bumper connecting bracket 1116e. Use of the front bumper connecting bracket 1116e allows installation of the front bumper 1116a in multiple positions and angles, and the connection is more flexible and convenient. The front bumper connecting bracket 1116e may be connected to the front bumper 1116a and the front frame 1111 by welding or bolts.

The side bumpers 1116b extend longitudinally along the sides of the off-road vehicle 100 such as just under each of the doors 1124. The preferred side bumpers 1116b are tubes with ends 1116h which are curved to extend inwardly. The ends 1116h pass through the vehicle cover 112 and attach to a front connection plate 1112m and a rear connection plate 1112p on each side of the vehicle 100. Each side bumper 1116b is preferably fixed on the front connection plate 1112m and on the rear connection plate 1112p by screws/bolts. The front and rear connection plates 1112m, 1112p are sheet metal parts formed by stamping to improve their overall structural strength while allowing deformation so the side bumper 1116b can absorb energy and protect the driver and passenger in event of a side impact.

The rear bumper 1116c is located at the rear end of off-road vehicle 100 and surrounds the rear frame 1113. The rear bumper 1116c is connected to the rear frame 1113 by a rear bumper connecting bracket 1116f. Should the off-road vehicle 100 sustain impact on the rear bumper 1116c, the rear bumper connecting bracket 1116f will deform and absorb energy to protect the rear frame 1113. The rear bumper connecting bracket 1116f may be connected to the rear bumper 1116c and the rear frame 1113 by welding or bolts.

The safety belts 1116d are located inside the cabin 1121 to protect persons seated in the off-road vehicle 100. Each safety belt 1116d is mounted on a safety belt connector 1116g positioned relatively high, such as on the main longitudinally-extending ROPS tube 1123cd above the B-pillar base leg 1113a, to improve the positioning of a shoulder strap of the safety belt 1116g as it extends across the driver or passenger.

The vehicle cover 112 includes an interior trim package 1122, an exterior trim package 1123 and a vehicle door 1124. The interior trim package 1122 is arranged on the frame 111, and the cabin 1121 is defined by the frame 111 and the interior trim package 1122. That is to say, the interior trim package 1122 is disposed around the cabin 1121. Drivers and passengers may enter and exit the cabin 1121 through a door opening 1121a called out in FIG. 20. The exterior trim package 1123 is located at the front end, the rear end, and the side edges of the frame 111 to shield and protect the front suspension assembly 15, the rear suspension assembly 16, various electrical devices, and the like. The door 1124 covers the door opening 1121a and is pivotably connected to the frame 111 or the vehicle cover 112. In some embodiments, the door 1124 is an aftermarket accessory which can be optionally mounted according to the user's needs, that is to say, the door 1124 may be omitted, particularly depending upon the configuration of the armrest assembly 1115 to ensure the safety of drivers and passengers.

Figure 20:
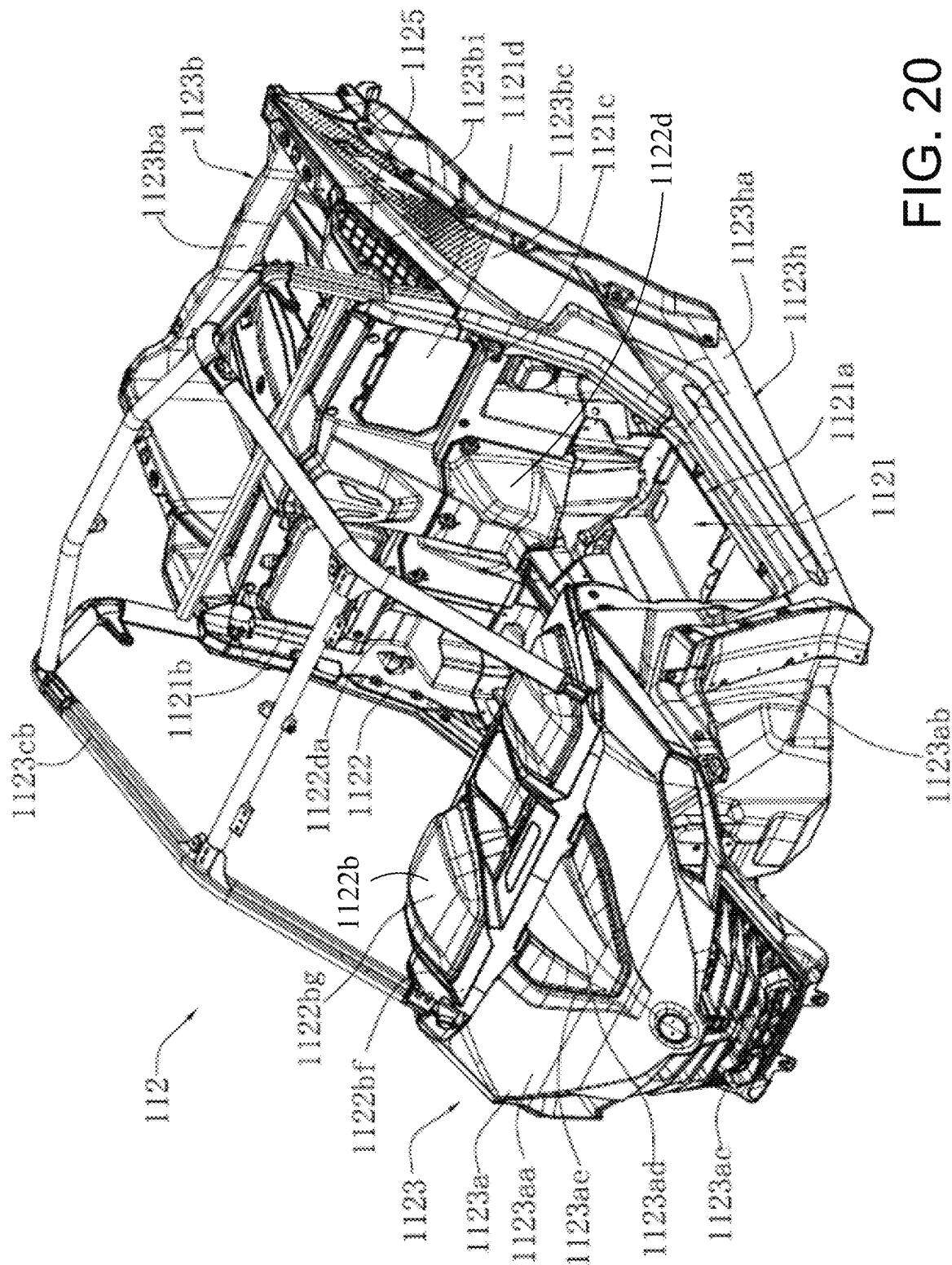
FIG. 20 is a front left perspective view of vehicle body of FIG. 19 without showing the ceiling.
Figure 21:
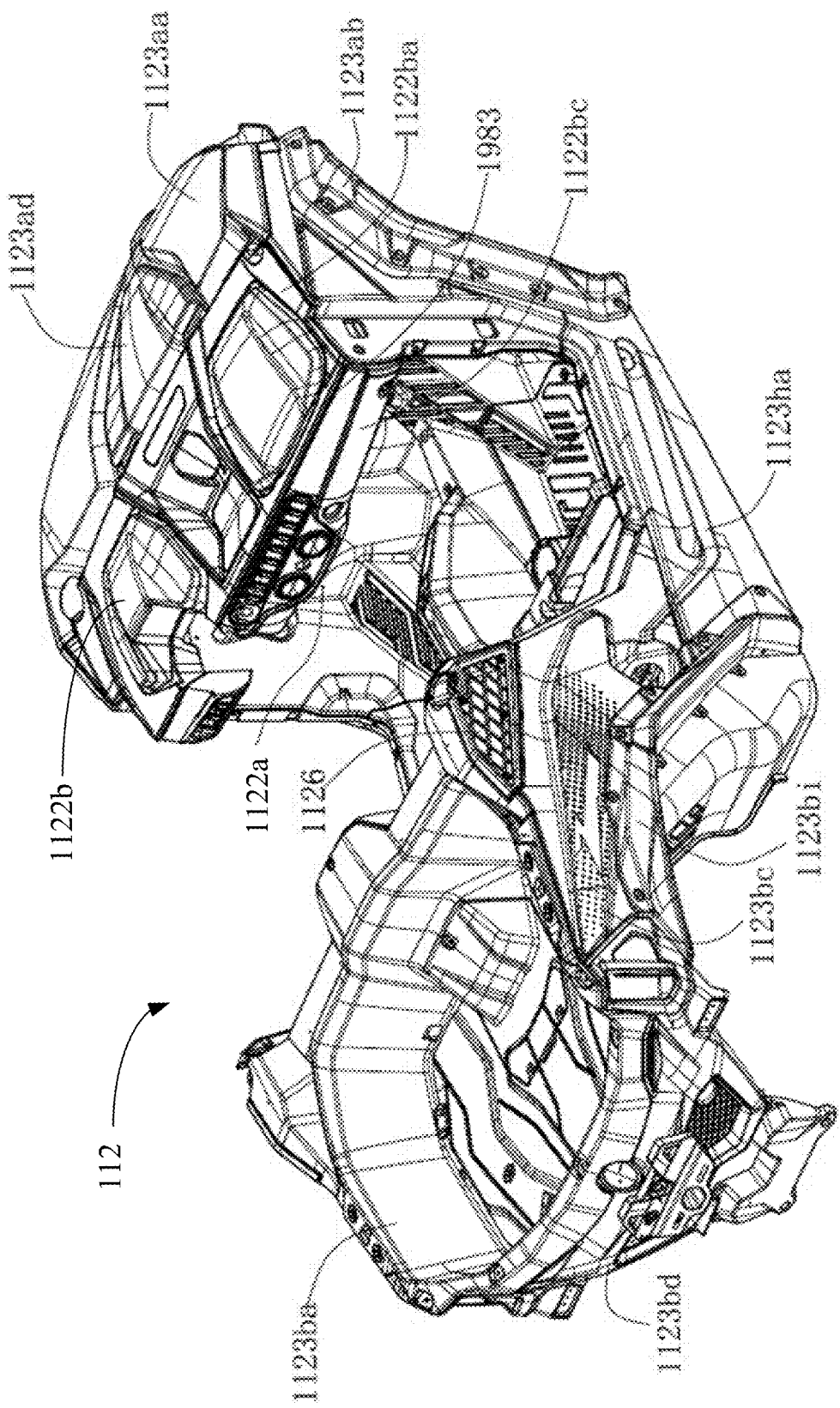
FIG. 21 is a rear right perspective view of the vehicle cover of FIGS. 19 and 20.
Figure 26:
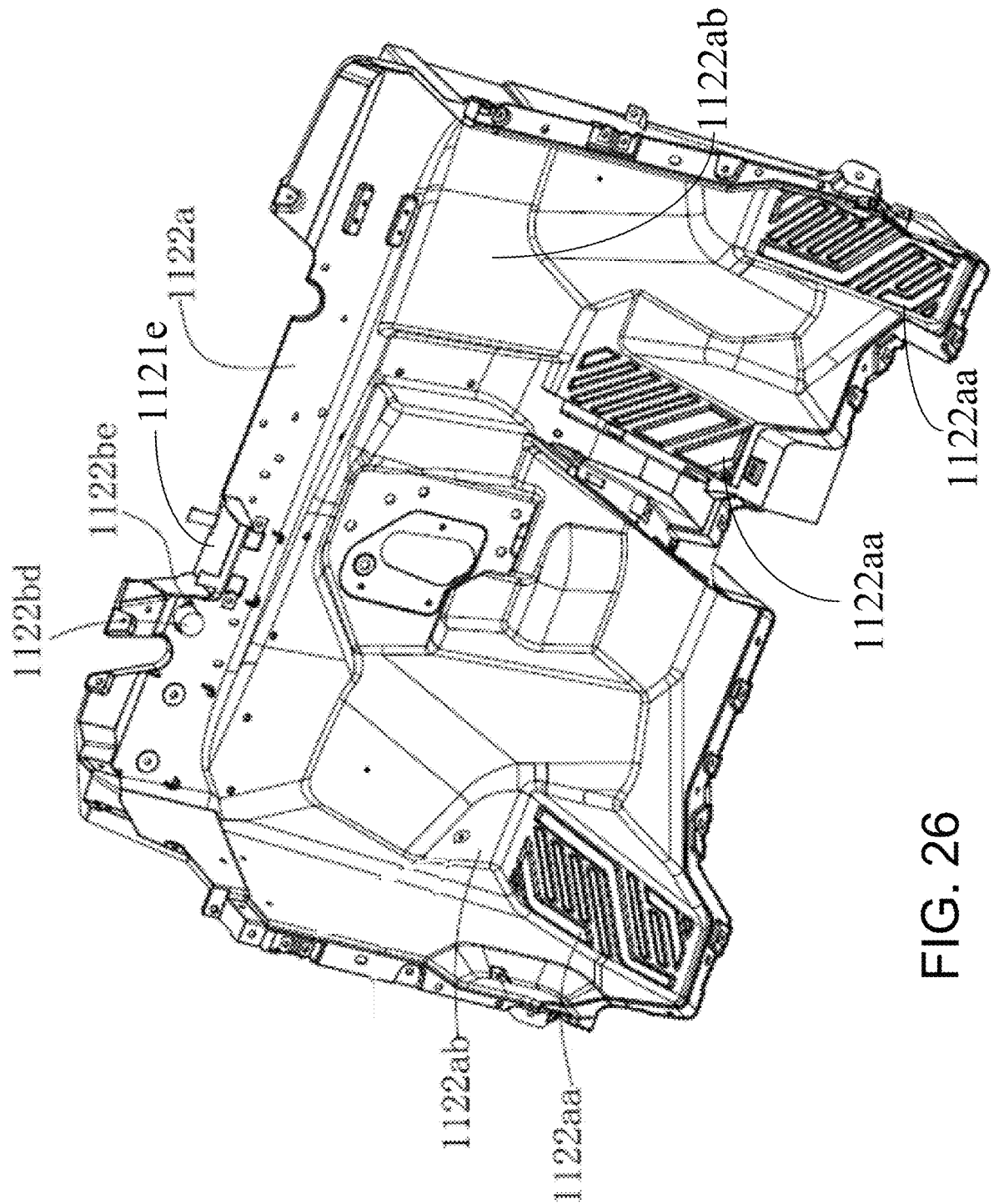
FIG. 26 is a rear left perspective view of a front baffle of the vehicle of FIG. 1.
Figure 102:
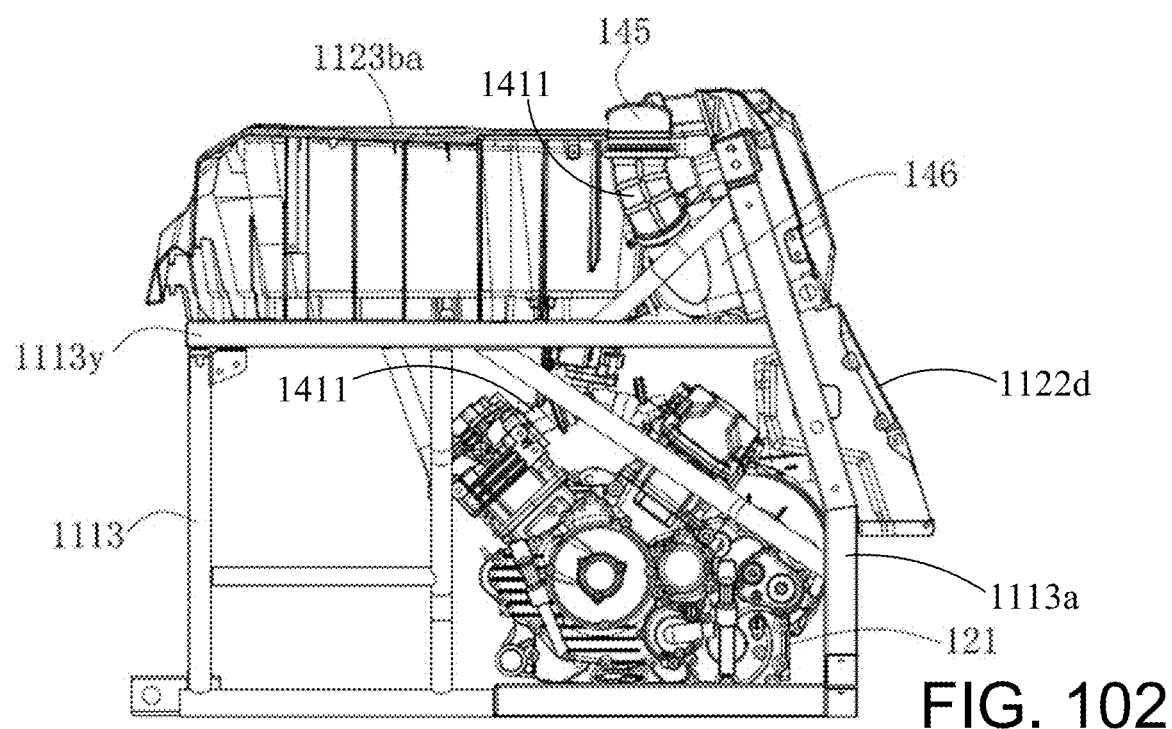
FIG. 102 is right side view of the engine, combustion air intake manifold and air filter of FIG. 81 relative to the rear frame portion of FIGS. 2 and 3 and rear trunk of FIGS. 20, 21 and 30.
Figure 103:
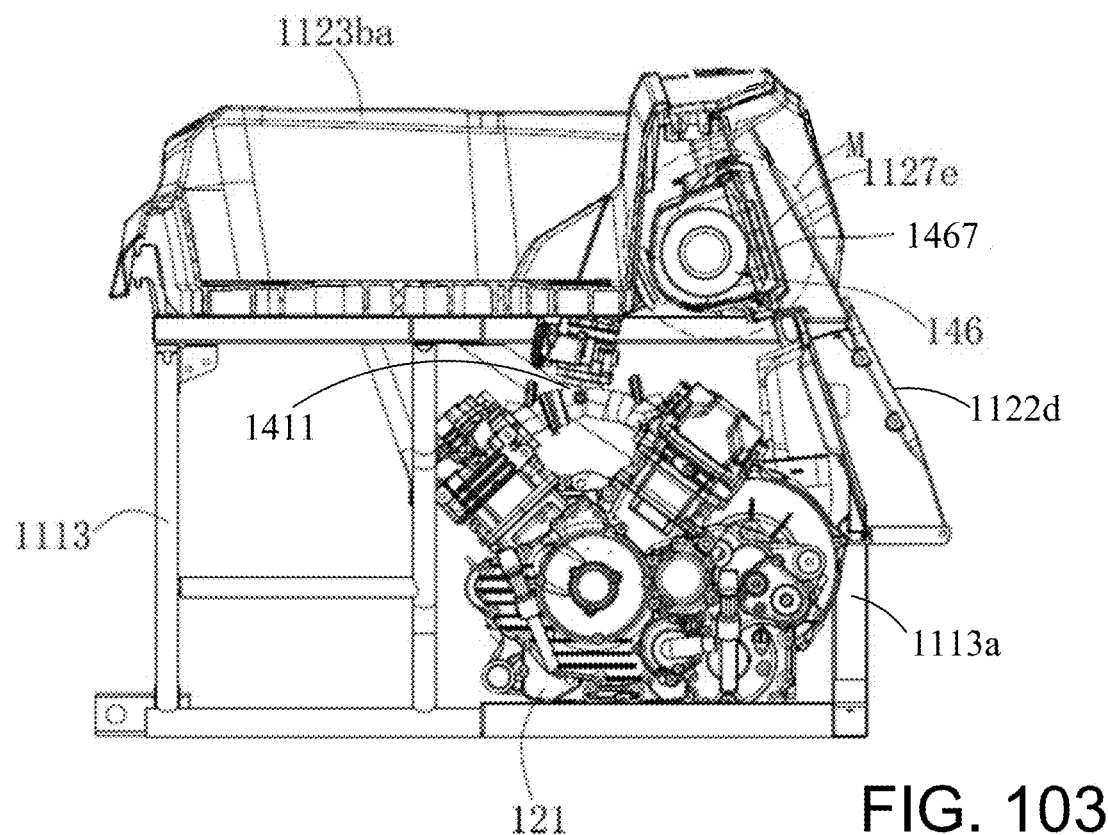
FIG. 103 is the right side view of FIG. 102, but showing the combustion air intake manifold and air filter in cross-section at the cut-line 103-103 from FIG. 101.

The preferred interior trim package 1122 includes a front baffle 1122a shown in FIGS. 21 and 26, a dashboard panel 1122b shown in FIGS. 20-23, a bottom plate 1122c shown in FIGS. 27-29 and 66-69, a rear baffle 1122d shown in FIGS. 20 and 102, and one or a plurality of seats 1122f shown in FIGS. 1, 55-57 and 110-112. The front baffle 1122a is disposed adjacent to the front end of the off-road vehicle 100 to separate the various components at the front end of the off-road vehicle 100 from the cabin 1121, and to block stones, sediment, and water. The dashboard or instrument panel 1122b is mounted on the upper end of the front baffle 1122a, and is used to carry various instrument devices, such as a display screen/instrumentation array 200 and the like on the vehicle 100. The bottom plate 1122c is mounted at the bottom of the accommodating space 111a, and may be used as a plate to carry various components such as seats 1122f, and as a position where drivers or passengers may place their feet. The rear baffle 1122d is disposed adjacent to the rear end of the off-road vehicle 100 and separates the various components at the rear end of the off-road vehicle 100 from the cabin 1121. The rear baffle 1122d and the front baffle 1122a are spaced apart, with the bottom plate 1122c located between the front baffle 1122a and the rear baffle 1122d. Therefore, the cabin 1121 is generally defined by the front baffle 1122a, the bottom plate 1122c and the rear baffle 1122d.

Figure 106:
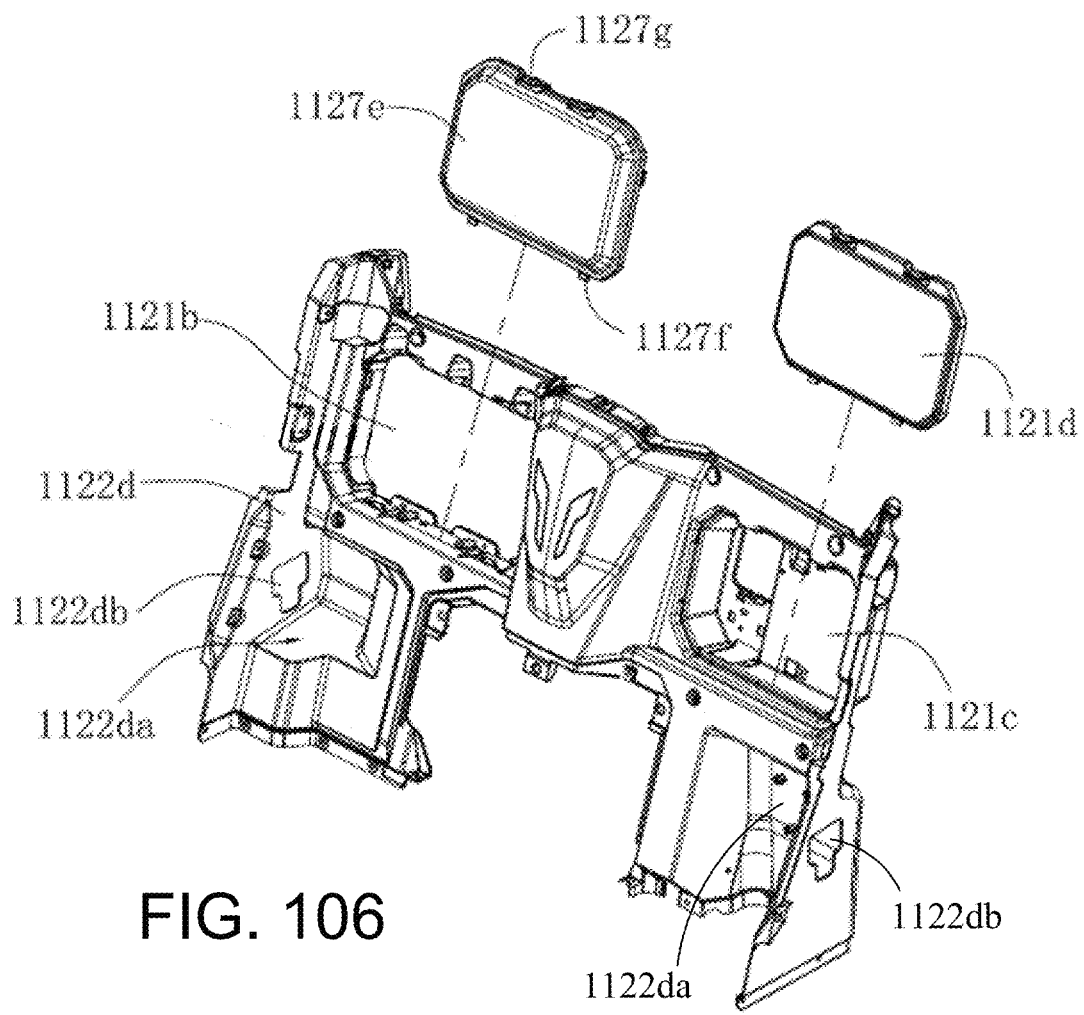
FIG. 106 is an exploded perspective view of the rear baffle of FIGS. 19, 20, 101 and 102.

As shown in FIG. 20 and better shown in FIG. 106, the preferred rear baffle 1122d defines a yielding recess 1122da, and the side wall adjacent the yielding recess 1122da defines a seat belt retractor mounting hole 1122db. The retractor (not separately shown) for rolling the safety belt 1116d is mounted in the seat belt retractor mounting hole 1122db. The yielding recess 1122da provides space for the retractor and seat belt 1116d. The seat belt retractor mounting hole 1122db is generally post-processed after the molding and shaping of the rear baffle 1122d is completed. The yielding recess 1122da also defines an operating space for external equipment to process the seat belt retractor mounting hole 1122db and to dismantle other components. The seats 1122f for passengers or drivers are removably mounted on the bottom plate 1122c, allowing better access to the seat belt retractor mounting hole 1122db. In the preferred embodiment, the off-road vehicle 100 includes two seats 1122f arranged side by side, with one for a driver and the other for a passenger, with a yielding recess 1122da and a seat belt retractor mounting hole 1122db behind the outside of each seat 1122f.

As shown in FIG. 21, the dashboard panel 1122b includes an upper dashboard panel 1122ba arranged horizontally and a lower dashboard panel 1122bc arranged vertically, which are connected to each other. That is to say, the dashboard panel 1122b is a split structure, so the space occupied by the overall processing of the dashboard panel 1122b can be reduced, and the molding cost can be reduced.

Figure 22:
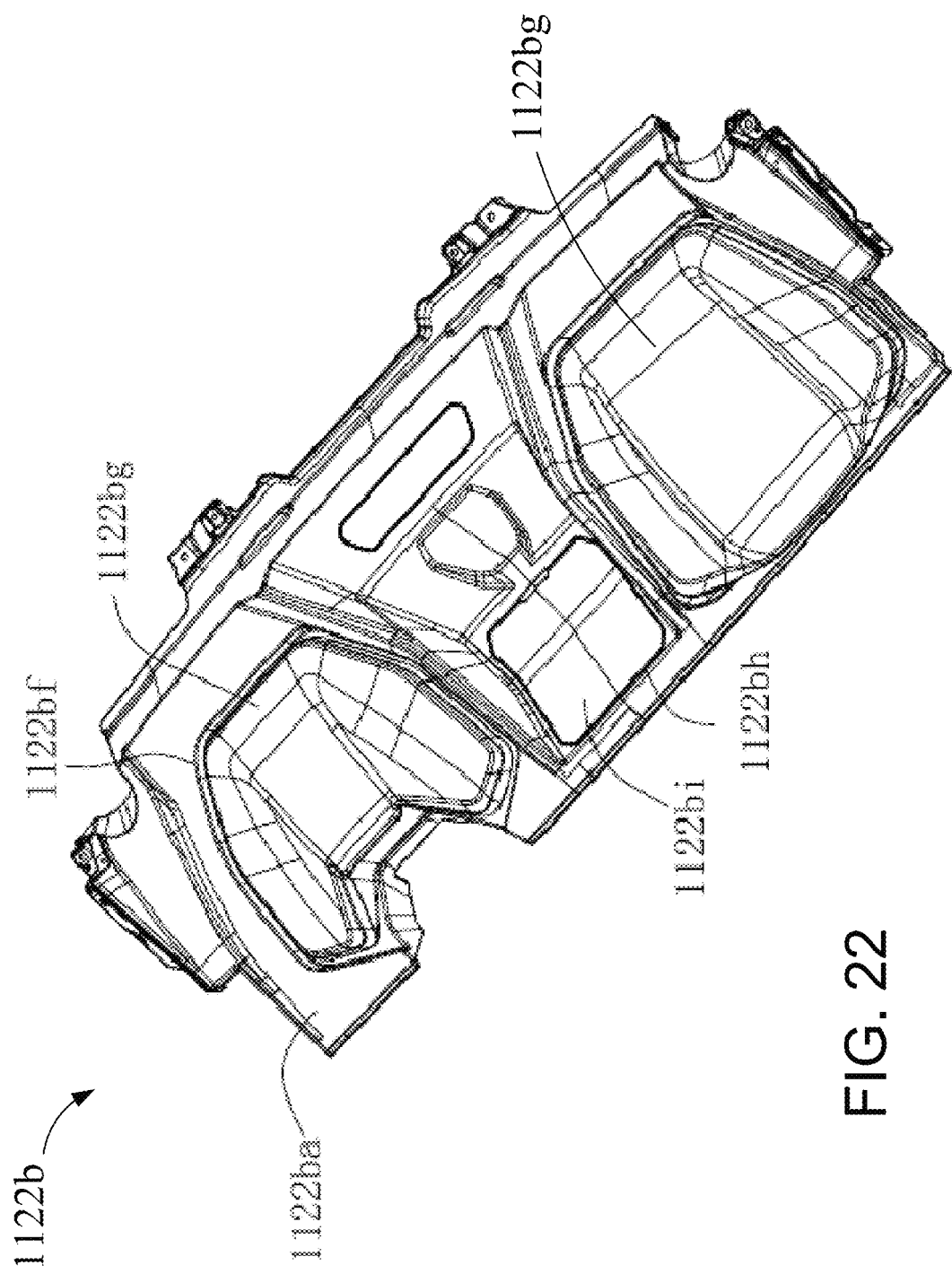
FIG. 22 is a perspective view, mostly from above, of the dashboard panel of FIGS. 19-21.
Figure 23:
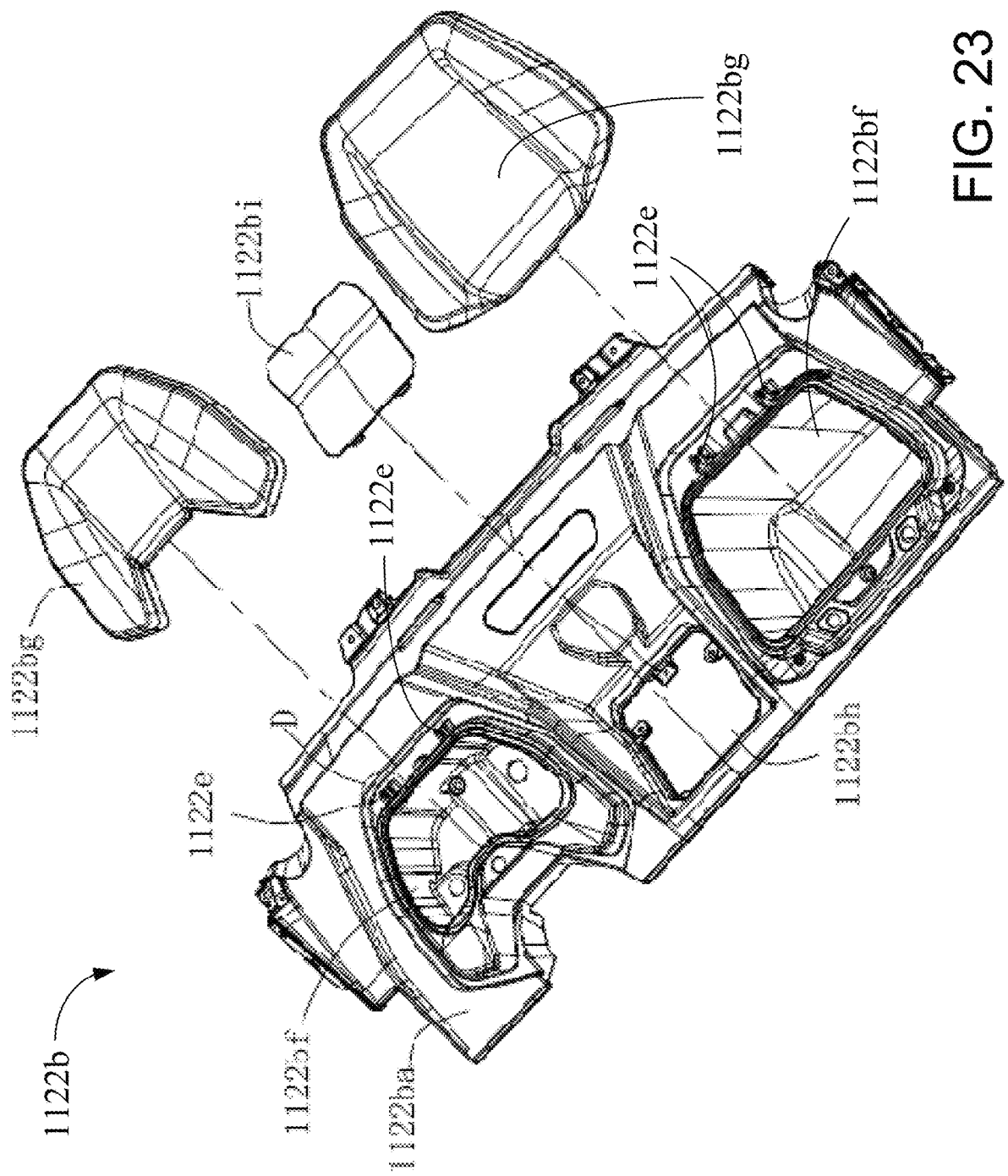
FIG. 23 is an exploded view of the dashboard panel of FIG. 22.

As shown in FIG. 22 and FIG. 23, the surface of the upper dashboard panel 1122ba preferably defines at least one and more preferably two concave dashboard compartments 1122bf. The dashboard compartment(s) 1122bf may be used to house one or more operating elements (not shown), such as electrical connectors, winch controllers and/or other devices. Placement within the dashboard compartment(s) 1122bf in the upper dashboard panel 1122ba allows positioning of the electrical connector base, winch controller, etc. in the cabin 1121 for easy access and use, closer to the driver or passenger than prior art locations. The upper dashboard panel 1122ba preferably supports a dashboard compartment cover plate 1122bg for each dashboard compartment 1122bf, which covers and seals the dashboard compartment 1122bf. Thus, the dashboard compartment(s) 1122bf are relatively closed space(s), protecting the electric connector, winch controller, other devices, etc., stored therein from water and dirt.

Figure 24:
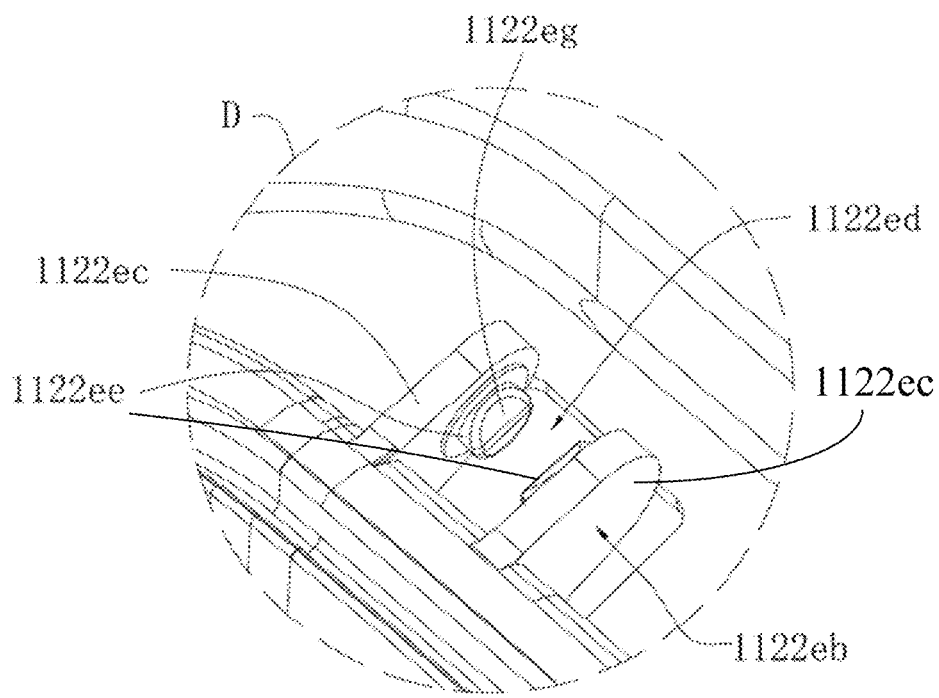
FIG. 24 is an enlarged view of area D in FIG. 22.
Figure 25:
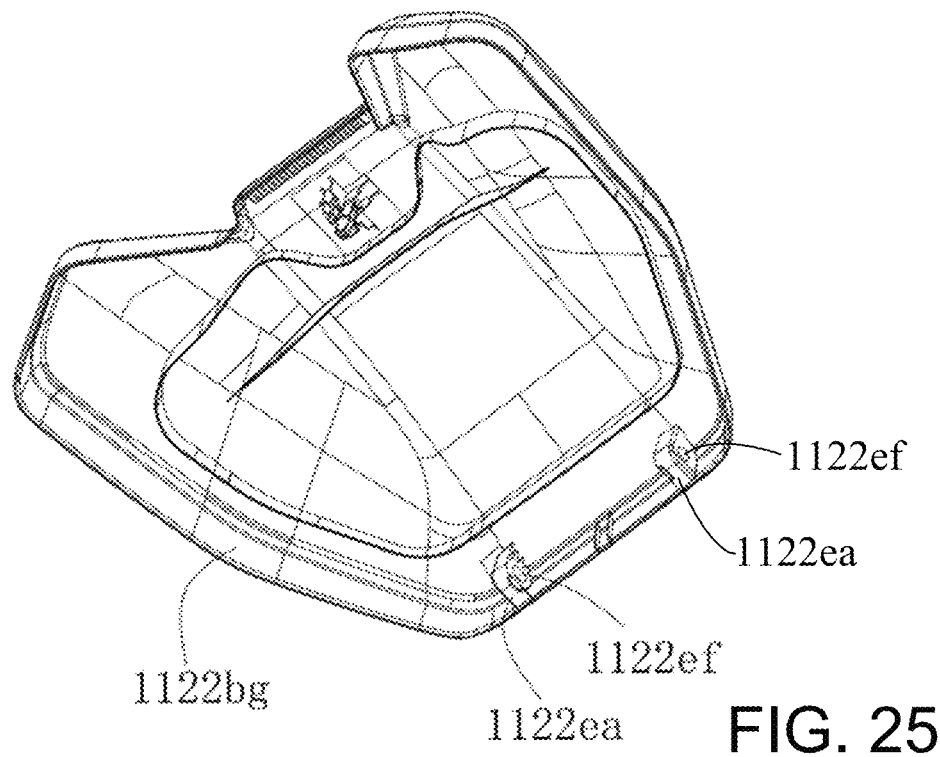
FIG. 25 is a perspective view from below of a dashboard compartment cover of FIGS. 22 and 23.

Each dashboard compartment cover plate 1122bg is preferably connected to the upper dashboard panel 1122ba by using two coaxially aligned quick assembly hinges 1122e best explained with reference to FIGS. 23-25. Using two quick assembly hinges 1122e, each dashboard compartment cover plate 1122bg is capable of pivoting relative to the upper dashboard panel 1122ba. The quick assembly hinges 1122e are preferably positioned under the dashboard compartment cover plate 1122bg, on the top front edge of the dashboard compartment 1122bf away from the passenger and driver, making the dashboard compartment 1122bf more easily accessed from within the cabin 1121. The quick assembly hinge 1122e includes an insertion knuckle 1122ea received in a hinge receiver 1122eb. Each hinge receiver 1122eb includes two knuckles 1122ec defining a slot 1122ed between the two knuckles 1122ec for the insertion knuckle 1122ea to be inserted in. Each knuckle 1122ec is provided with a pin portion 1122ee on its inward side. The insertion knuckle 1122ea has a coupling recess 1122ef. When the insertion knuckle 1122ea is inserted into the slot 1122ed, the two knuckles 1122ec are capable of deforming under force from the insertion knuckle 1122ea, until the pin portions 1122ee can snap back so as to be clamped into the coupling recess 1122ef, realizing the rapid installation between the dashboard compartment cover plate 1122bg and the upper dashboard panel 1122ba, as well as the pivotal connection between them. When two quick assembly hinges 1122e are used, assembly can be quickly performed one hinge 1122e at a time. Alternative embodiments may use only a single hinge 1122e or more than two hinges 1122e per dashboard compartment cover plate 1122bg.

In the preferred embodiment, the hinge receiver 1122eb is integrally molded with the upper dashboard panel 1122ba, and the insertion knuckle 1122ea is integrally molded with the dashboard compartment cover plate 1122bg, so as to facilitate the overall processing of the upper dashboard panel 1122ba. At the same time, the integral molding improves the structural strength of the two knuckles 1122ec and the insertion knuckle 1122ea. The position of the hinge receiver 1122eb and the position of the insertion knuckle 1122ea could alternatively be interchanged, without affecting the quick connection between the dashboard compartment cover plate 1122bg and the upper dashboard panel 1122ba. Disconnection can also be accomplished quickly, but requires insertion of a tool between the insertion knuckle 1122ea and the pin portions 1122ee to pry the pin portions 1122ee out of the coupling recess 1122ef.

Along the insertion direction of the insertion knuckle 1122ea, the pin portions 1122ee are provided with a sloped guiding surface 1122eg for guiding the movement of the insertion knuckle 1122ea, so that the insertion knuckle 1122ea can be quickly and accurately inserted into the slot 1122ed. In this embodiment, the sloped guiding surfaces 1122eg on the two opposite pin portions 1122ee form a bell mouth shape, and the insertion knuckle 1122ea is inserted into the slot 1122ed under the guidance of the bell mouth.

It should be noted that the above only describes use of the quick assembly hinges 1122e in the upper dashboard panel 1122ba, but quick assembly hinges 1122e can also be applied to other locations of the vehicle cover 112, which will not be detailed here.

In modern off-road vehicles, a variety of electrical components (some shown with reference to FIGS. 109, 118 and 123-128) are generally mounted at the dashboard panel 1122b, which electrical components need to be maintained, repaired or overhauled from time to time. When performing such work on many prior art off-road vehicles, it may be necessary to remove the entire front baffle 1122a and/or dashboard panel 1122b to see and gain access to the electrical components and carry out corresponding maintenance. The removal of front baffle 1122a and/or dashboard panel 1122b as a whole is not only cumbersome and inconvenient, but also inconvenient and time-consuming for subsequent reinstallation. To address this problem, the dashboard panel 1122b and/or the front baffle 1122a defines a dashboard access port 1122bh such as shown in FIG. 23. The electrical components (not shown in FIG. 23) are located at the dashboard access port 1122bh, that is, the electrical components can be observed or repaired through the dashboard access port 1122bh. The dashboard access port 1122bh can be covered with a dashboard access cover 1122bi. The dashboard access cover 1122bi is removably connected to the dashboard panel 1122b or the front baffle 1122a. Here, the removable connection between the dashboard access cover 1122bi and the dashboard panel 1122b or front baffle 1122a may be realized by a threaded connection, a clamping connection, or the like, and most preferably by a snap in connection with tabs. When it is necessary to repair the electrical components, the dashboard access cover 1122bi can be removed to repair the electrical components through the dashboard access port 1122bh, which is not only convenient but also simple. At the same time, in order to be intuitive and visual, the dashboard access cover 1122bi may also be equipped with a transparent or translucent window through which the state of electrical components at the dashboard access port 1122bh can be observed at any time.

While the majority of the front baffle 1122a extends vertically, the preferred front baffle 1122a includes a plurality of slanted foot support surfaces 1122aa as shown in FIG. 26. The foot support surfaces 1122aa can include treads, which both visually indicate to the driver or passenger that this is a suitable location for placement of feet, and also help in draining mud, snow, etc. off of the driver's or passenger's shoes or boots. The front baffle 1122a includes a number of vertically extending surfaces 1122ab, which can optionally be used for mounting of other components, such as for speakers in a vehicle music sound system.

The preferred embodiment includes a buzzer 1122bd mounted on the front baffle 1122a or dashboard panel 1122b as shown in FIG. 26. The buzzer 1122bd is used to remind the driver and/or passenger of vehicle information, such as an unlatched safety belt, insufficient oil pressure, other warnings, etc. Specifically, the front baffle 1122a or the dashboard panel 1122b is provided with a mounting pillar 1122be; and the buzzer 1122bd is mounted on the mounting pillar 1122be. The buzzer 1122bd generates sound by vibration, and it should be noted that under the condition of shaking which is often present in off-road vehicles, it is easy for the buzzer 1122bd to fail to sound normally. The preferred embodiment improves the reliability and stability of the installation of the buzzer 1122bd by adding a mounting pillar 1122be and installing the buzzer 1122bd on the mounting pillar 1122be, so as to effectively ensure the normal operation of the buzzer 1122bd. It should be noted that the buzzer 1122bd is only an example, and it may be any device that emits sound by vibration and has an alarm function.

Figure 27:
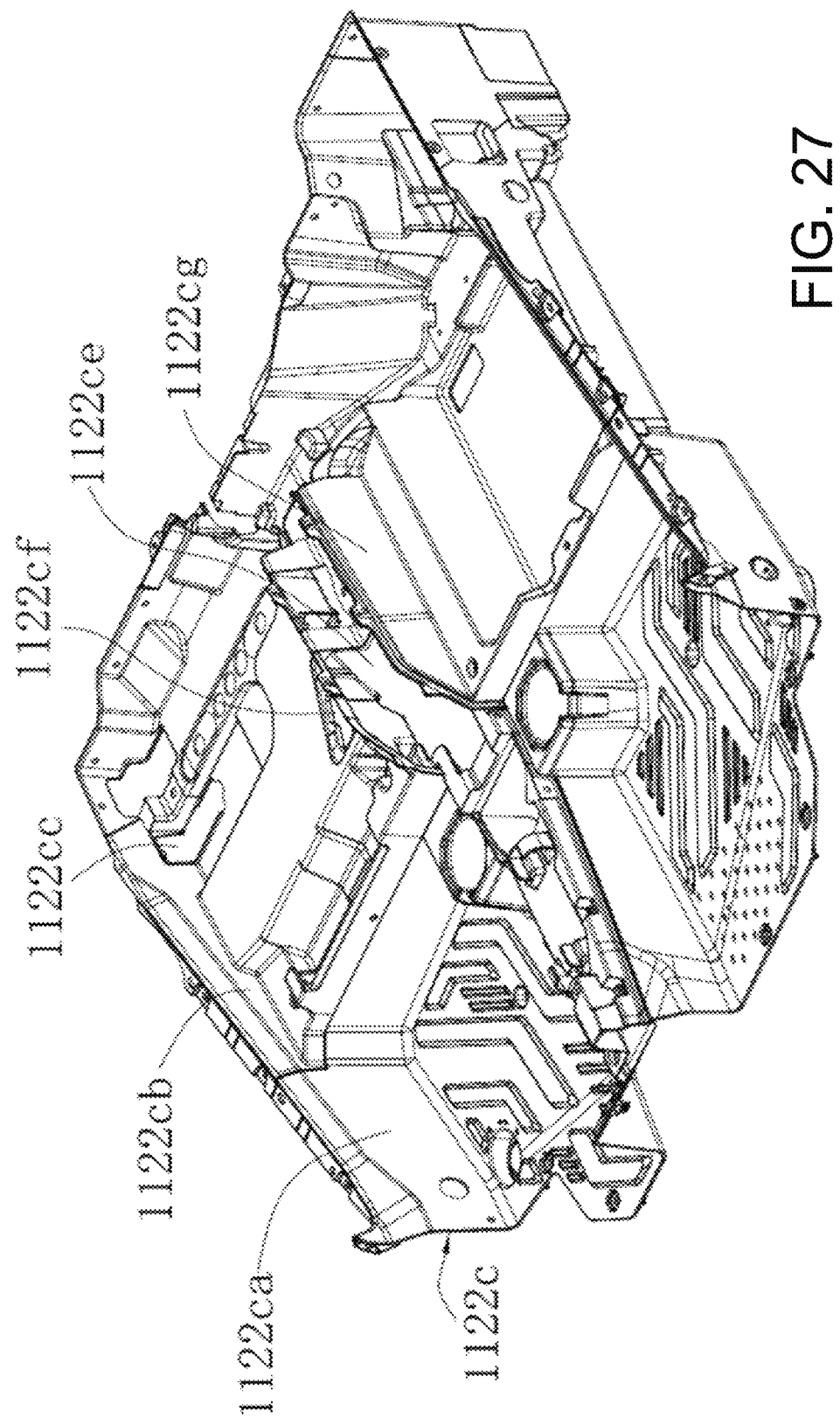
FIG. 27 is a top left perspective view of a bottom plate of the vehicle of FIG. 1.

In many prior art off-road vehicles, the existing bottom plate for arranging one or more rows of seats is a large, independent and integrally manufactured member which requires separate and specialized mold processing. The mold is not only large but also high in cost. In the preferred embodiment in accordance with one aspect of the present invention and as shown in FIG. 27, the bottom plate 1122c is a split-type, with multiple bottom plate segments spliced with each other. The multiple bottom plate segments are individually much smaller than the large bottom plate of the prior art, thereby reducing mold volume. In addition, multiple bottom plate segments can be freely combined to meet the requirements of off-road vehicles with multiple rows of seats, thereby realizing cost savings.

Figure 28:
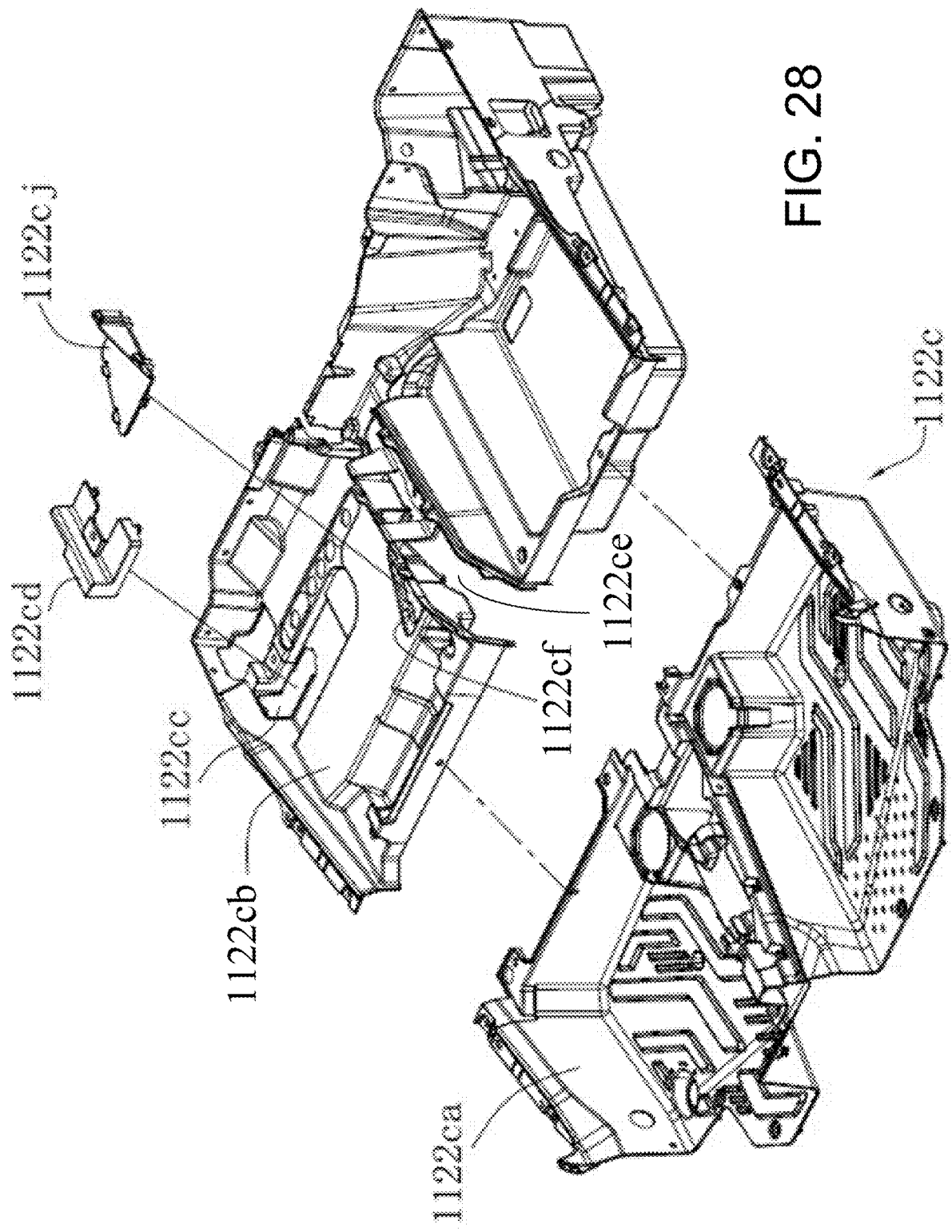
FIG. 28 is an exploded view of the bottom plate of FIG. 27.

As shown in FIG. 28, the bottom plate 1122c includes at least two segments such as a footrest portion 1122ca and an underseat portion 1122cb. The footrest portion 1122ca and the underseat portion 1122cb are mounted on the frame 111 along a front-rear direction of the off-road vehicle 100. In alternative embodiments when the off-road vehicle is equipped with multiple rows of seats, the footrest portion 1122ca and the underseat portion 1122cb may be fitted at front and rear ends of the cabin, with a separately molded extension segment (not shown) used for the small area between the footrest portion 1122ca and the underseat portion 1122cb. In this way, a bottom plate mold that is suitable for the multiple rows of seats is not needed, which effectively saves costs of production and processing, and improves the universality of the bottom plate 1122c.

The preferred bottom plate 1122c defines a bumper access port 1122cc. The position of the bumper access port 1122cc is aligned with the connection position of the side bumper 1116b and the rear connection plate 1112p. In other words, the installation and removal of side bumper 1116b can be carried out at least in part through bumper access port 1122cc. In this way, the connection between the side bumper 1116b and the frame 111 can be hidden, and the maintenance and/or replacement of the side bumper 1116b no longer requires the removal of the entire bottom plate 1122c and other components, which makes maintenance easier and replacement more convenient.

The bumper access port 1122*cc* is covered with a bumper access port cover 1122*cd* removably connected to the bottom plate 1122*c* as shown in FIG. 28. The bumper access port cover 1122*cd* may be connected to the bottom plate 1122*c* by screws, clips, or the like. In this way, it is convenient to open/close the bumper access port 1122*cc*, and improve the replacement and/or maintenance convenience of the side bumper 1116*b*. In one embodiment, the bottom plate 1122*c* includes side surfaces and a bottom surface, and the bumper access port 1122*cc* extends from the bottom surface to the side surface. In this way, the usable area of the bumper access port 1122*cc* can be increased to provide enough operating space for maintenance personnel.

Further aspects of the preferred underseat portion 1122*cb* of the bottom plate 1122*c* are described below with reference to FIGS. 65-69.

Figure 19:
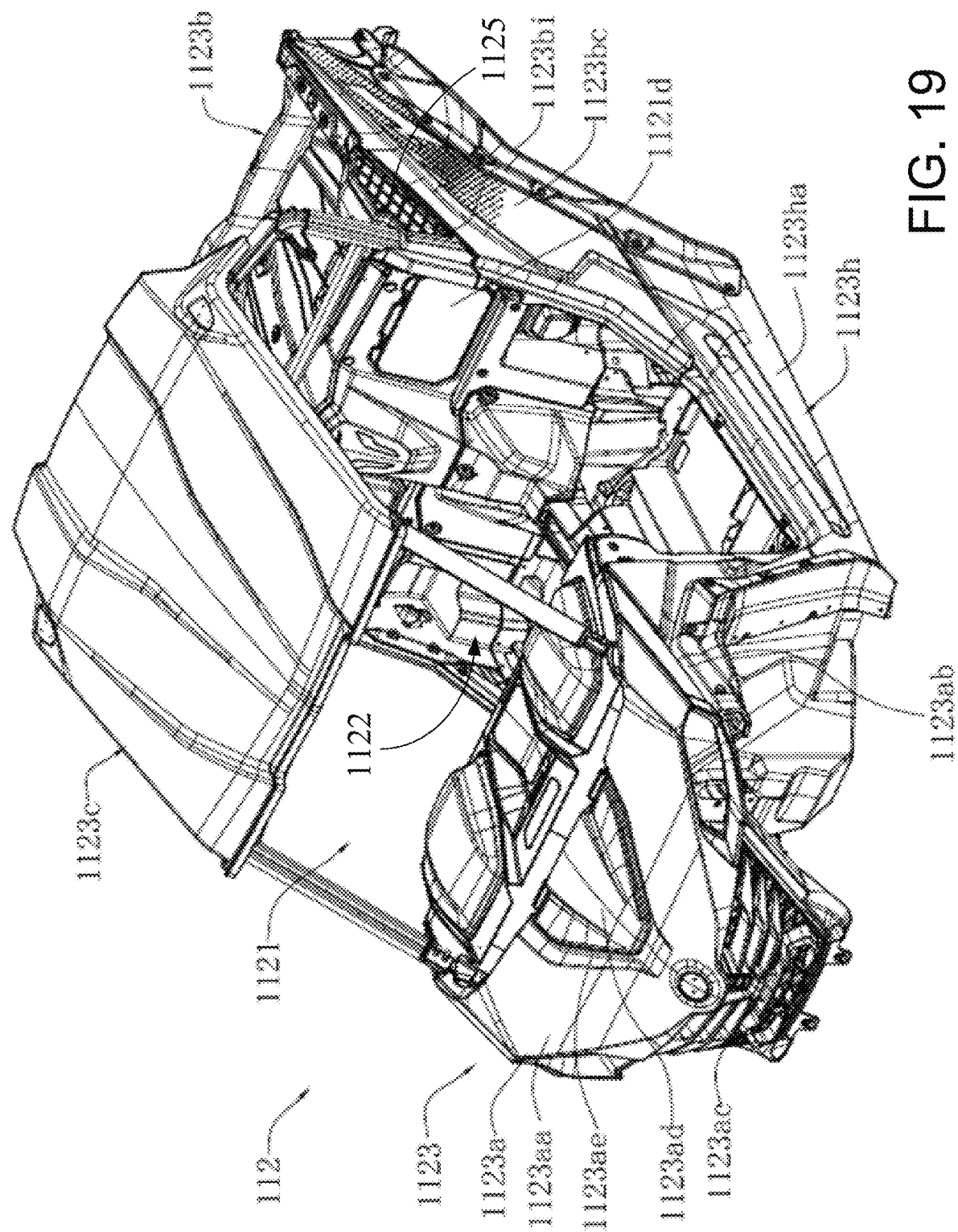
FIG. 19 is a front left perspective view of the vehicle body used in the vehicle of FIG. 1.

As shown in FIGS. 19 to 21, the exterior trim package 1123 includes front trim 1123*a*, rear trim 1123*b*, ceiling/ROPS trim 1123*c*, and middle trim 1123*h*. The front trim 1123*a* covers the outer surface of the front frame portion 1111, the middle trim 1123*h* covers the outer surface of the middle frame portion 1112, the ceiling/ROPS trim 1123*c* covers the cabin 1121, and the rear trim 1123*b* covers the outer surface of the rear frame portion 1113. In this way, the aesthetics and safety of off-road vehicle 100 can be improved.

The front trim 1123*a* includes at least a front panel 1123*aa*, two front fenders 1123*ab* and an intake grille 1123*ac*. The front panel 1123*aa* covers the upper surface of the front frame portion 1111, also covering many of the components mounted on the front frame portion 1111. The front panel 1123*aa* is removably connected to the front frame portion 1111, so as to facilitate the disassembly of the front panel 1123*aa*, which is convenient to repair the components at the front frame portion 1111. In this embodiment, the front trim 1123*a* includes two front fenders 1123*ab*, corresponding to the two front wheels 17 shown in FIG. 1. One front fender 1123*ab* is located on each side of front frame portion 1111 to cover the side of front frame portion 1111 and the corresponding front wheel 17. The middle trim 1123*h* includes middle side plates 1123*ha* covering the sides of the middle frame portion 1112, and two ends 1116*h* of the side bumper 1116*b* penetrate the corresponding middle side plate 1123*ha* to connect to the corresponding front and rear connection plates 1112*m*, 1112*p*.

Figure 29:
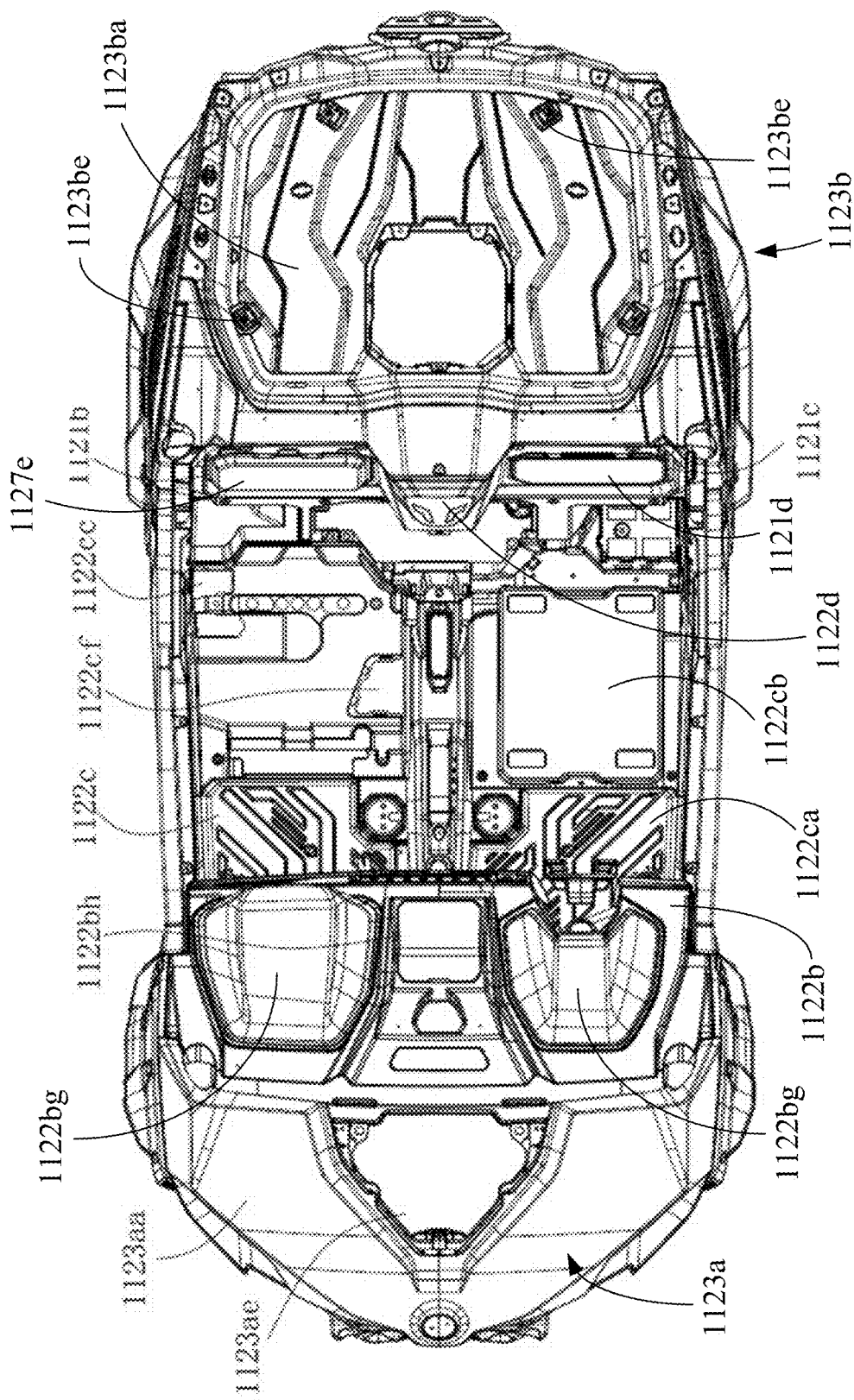
FIG. 29 is a top plan view of the vehicle cover of FIGS. 19-21.

As shown in FIGS. 20 and 29, the front panel 1123*aa* defines a front access port 1123*ae* for inspecting and repairing the components mounted on the front frame portion 1111, such as a radiator 1233 (shown in FIGS. 52 and 54) and other components. A front cover 1123*ad* is mounted on the front panel 1123*aa* to cover the front access port 1123*ae*, so that the front access port 1123*ae* can be blocked when maintenance is not required. The front cover 1123*ad* and the front panel 1123*aa* may be connected by snap connection, threaded connection and other removable methods, which is convenient to open/close the front access port 1123*ae*. The connection method between the front cover 1123*ad* and the front panel 1123*aa* may be selected according to the actual needs, as long as the front cover 1123*ad* can be easily disassembled for maintenance.

The intake grille 1123*ac* covers the front end of the front frame portion 1111 for protection of the front end of off-road vehicle 100, while still having a plurality of openings providing a large area for air to flow therethrough. The intake grille 1123*ac* is removably connected to the front panel 1123*aa* and/or the front frame portion 1111. Along a left-right direction (width direction) of the off-road vehicle 100, the ratio of the width of the intake grille 1123*ac* to the width of the off-road vehicle 100 is in the range between 0.4 and 0.8. In this way, the intake grille 1123*ac* has a large intake area, which is convenient for full heat exchange of the radiator 1233. Moreover, after the intake grille 1123*ac* is disassembled from the vehicle 100, maintenance or overhaul of any/all components at the front end of off-road vehicle 100 can be realized through the large intake area, making such maintenance more convenient.

Figure 30:
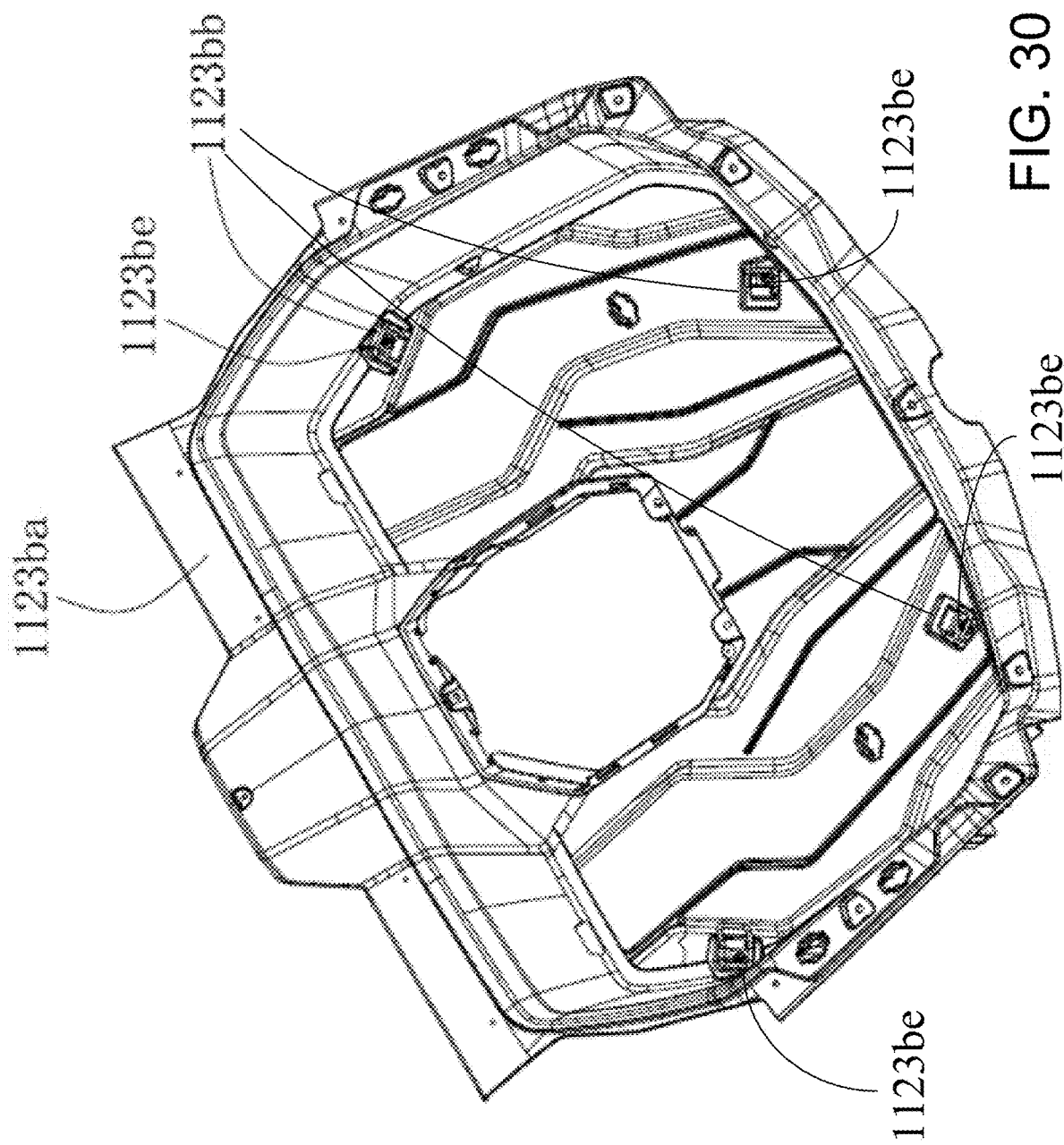
FIG. 30 is a top perspective view of a rear trunk according to a preferred embodiment of the disclosure.

As shown in FIGS. 21 and 30, the preferred rear trim 1123*b* includes a rear trunk 1123*ba* defined between two rear side plates 1123*bc* and a tail-lamp panel 1123*bd*. The rear trunk 1123*ba* is used to carry goods or other articles and is mounted above the rear frame portion 1113. The two rear side plates 1123*bc* are respectively arranged on both sides of the rear trunk 1123*ba* and may be used as rear fenders to help prevent water, mud and sand splashed by the rear wheels 18 (shown in FIG. 1) from reaching the cabin 1121 and the rear trunk 1123*ba*. The rear trim 1123*b* optionally includes rear fender extensions 1123*bi* covering the rear wheels 18 vertically to further restrict water, mud, sand splashed by the rear wheels 18. The rear side plate 1123*bc* is removably connected to the rear frame portion 1113. Thus, components at the rear frame portion 1113 can be repaired by removing one or both of the rear side plate 1123*bc*, to improve the convenience of maintenance. The tail-lamp panel 1123*bd* is positioned at the rear of the rear trunk 1123*ba* for mounting tail-lamps of the off-road vehicle 100.

Figure 31:
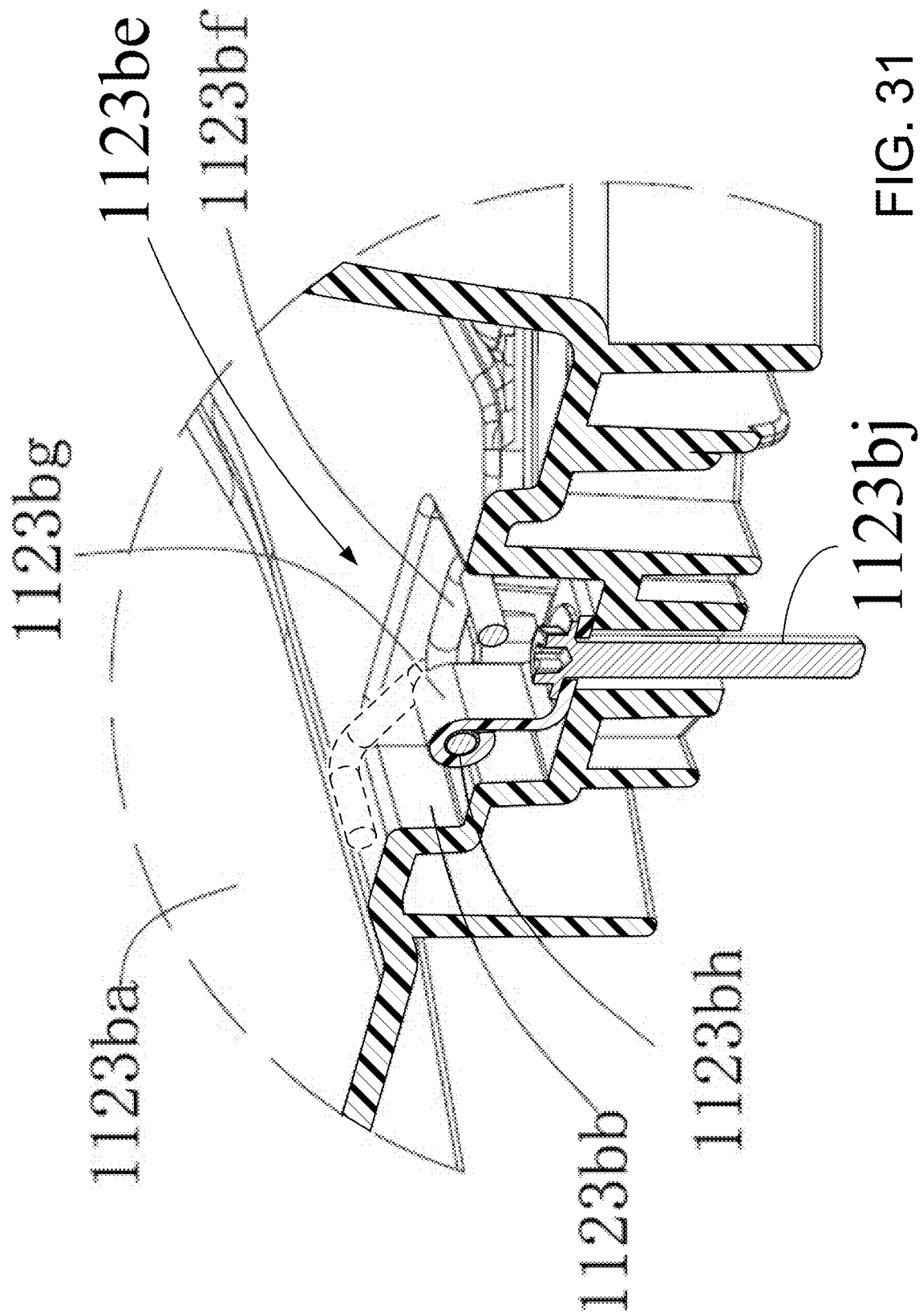
FIG. 31 is a cross-sectional perspective view of a preferred D-ring anchor used in the rear trunk of FIG. 30, showing a different position of the D-ring in dashed lines.

As shown in FIG. 30, the preferred embodiment includes four D-ring anchors 1123*be* provided in the rear trunk 1123*ba*. Other embodiments use a different number of D-ring anchors, or no D-ring anchors at all. The D-ring anchors 1123*be* are used to cooperate with external ropes, straps, hooks and/or similar components to achieve the fixation of goods in the rear trunk 1123*ba*. In the preferred embodiment, the inner wall of the rear trunk 1123*ba* defines four receiving compartments 1123*bb*, and each D-ring anchor 1123*be* is housed in one of the receiving compartments 1123*bb*. Each D-ring anchor 1123 includes a D-ring 1123*bf* pivotally secured to an anchor seat 1123*bg* such that the D-ring is capable of moving relative to the rear trunk 1123*ba*, such as from the solid line position to the dashed line position shown in FIG. 31. To use the D-ring anchor 1123, the user pivots the D-ring 1123*bf* so it extends upwardly providing access to the D-ring 1123*bf* for hooking or tying purposes. When the D-ring anchor 1123*be* is not needed, the D-ring 1123*bf* can pivot down (to the solid line position shown in FIG. 31) so as to be completely contained in the receiving compartment 1123*bb*, and thereby avoid interference between the D-ring anchor and cargo placed into the rear trunk 1123*ba*.

In the most preferred embodiment, the D-ring 1123*bf* is formed of metal, whereas the anchor seat 1123*bg* may be molded of plastic. The anchor seat 1123*bg* is fixed on the rear frame portion 1113 such as by a metal threaded fastener 1123*bj* or alternatively by riveting. The anchor seat 1123*bg* has a shaft hole 1123*bh* defining a D-ring pivot axis, and the D-ring 1123*bf* is pivotally mounted in the shaft hole 1123*bh*. The use of plastic for the anchor seat 1123*bg* can reduce the impact sound between the D-ring 1123*bf* and the anchor seat 1123*bg*, and effectively eliminating rattling, while still allowing the D-ring 1123*bf* to be formed of metal for increased strength.

Figure 32:
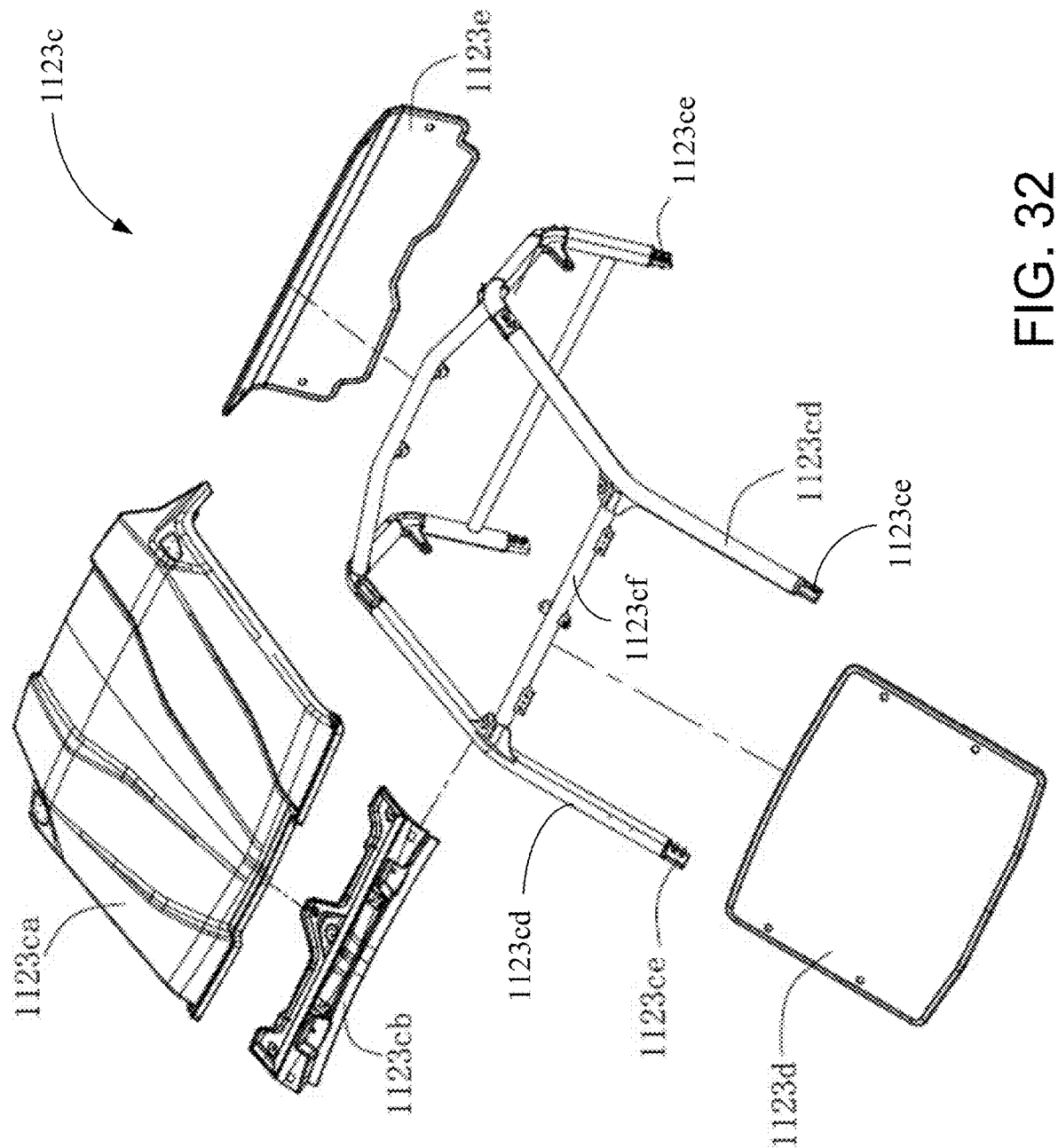
FIG. 32 is an exploded view of the ceiling and roll-over protection system ("ROPS") trim of the vehicle of FIG. 1.

As shown in FIG. 19 and FIG. 32, the exterior trim package 1123 further includes a roll over protection system or ROPS assembly 1123*c*, which may optionally include a front windshield 1123*d* and a rear windshield 1123*e*, each of which are transparent or translucent. The ROPS assembly 1123c covers the middle frame portion 1112 above the cabin 1121. The space between a ceiling 1123ca of the ROPS assembly 1123c and the middle frame portion 1112 establishes the height of the cabin 1121 in a vertical direction. The ROPS assembly 1123c is mounted on the A-pillar base leg 1111h and the B-pillar base leg 1113a. The front windshield 1123d is clamped between the front frame portion 1111 and the ceiling 1123ca, and the rear windshield 1123e is clamped between the ceiling 1123ca and the rear frame portion 1113. Thus, when present, the front windshield 1123d and the rear windshield 1123e together with the ceiling 1123ca cover and protect a closed cabin 1121.

In the preferred embodiment shown in FIG. 32, the ROPS assembly 1123c includes two main longitudinally-extending ROPS tubes 1123cd. A front end of each of the main ROPS tubes 1123cd include an attachment segment 1123ce for attachment relative to the A-pillar base leg 1111h, and a front segment of each of the main ROPS tubes 1123cd can be considered part of the A-pillar. The two main ROPS tubes 1123cd are connected together by a front cross tube 1123cf, positioned essentially at the junction between the front windshield 1123d and the ceiling 1123ca, where the two main ROPS tubes 1123cd are bent to define the overall top shape of the cabin 1121. A front of the ceiling 1123ca is connected to the front cross tube 1123cf by a front ceiling connection plate 1123cb which extends transversely over the entire length of the front cross tube 1123cf from one main ROPS tube 1123cd to the other main ROPS tube 1123cd. A front edge of the preferred front ceiling connection plate 1123cb extends forwardly of the front cross tube 1123cf, sealing the junction between the ceiling 1123ca and the top of the front windshield 1123d against precipitation ingress. In the depicted embodiment, the front ceiling connection plate 1123cb is formed (molded) separately from the ceiling 1123ca. Alternatively in other embodiments, the front ceiling connection plate can be integrally molded with the ceiling.

Figure 33:
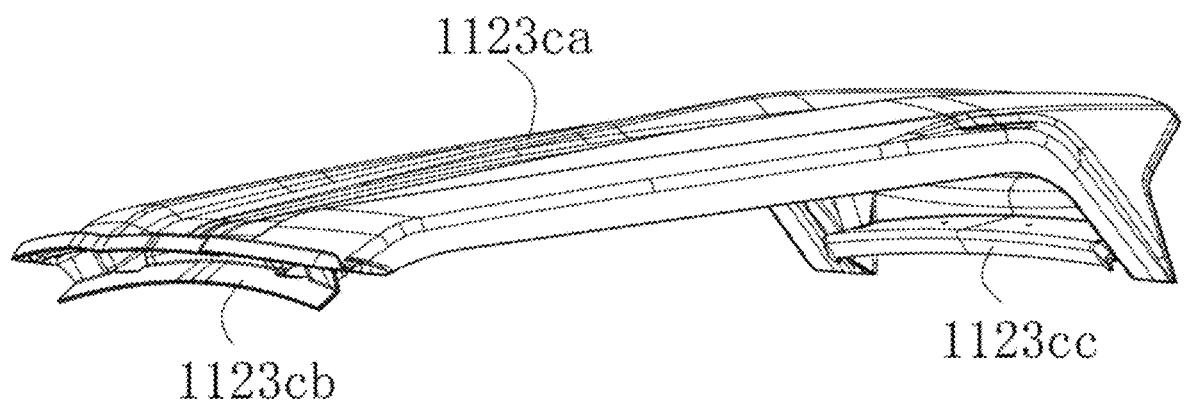
FIG. 33 is a front right side perspective view of the ceiling of FIG. 32.
Figure 34:
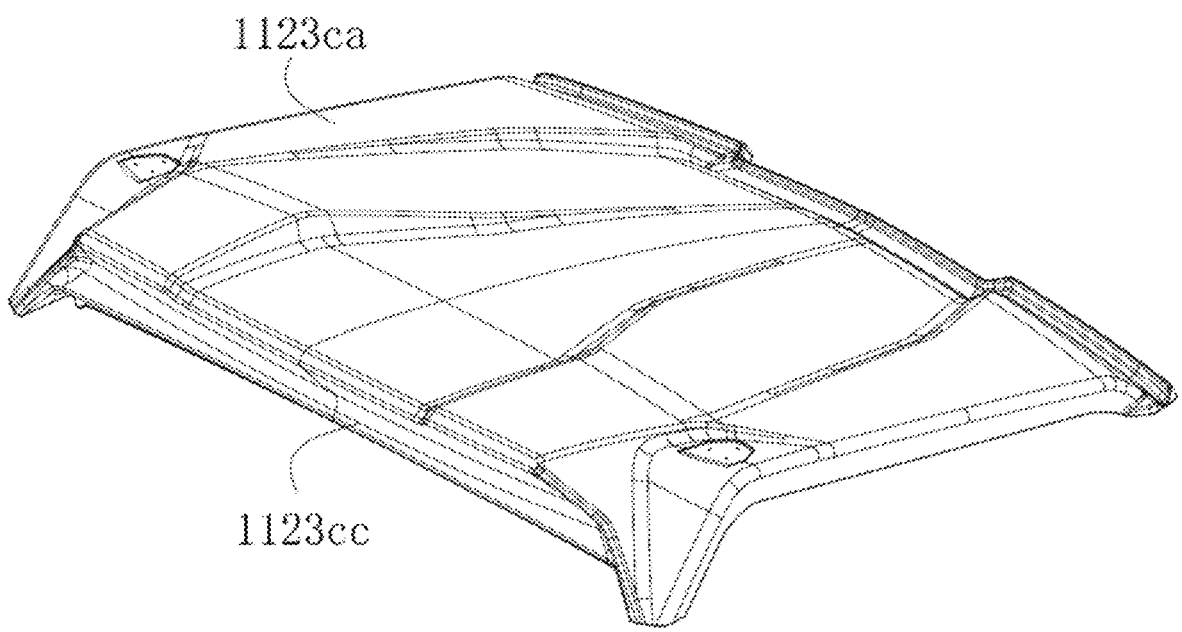
FIG. 34 is a rear right top perspective view of the ceiling of FIGS. 32 and 33.

A rear edge 1123cc of the preferred ceiling 1123ca, better shown in FIGS. 33 and 34, seals directly against the top of the rear windshield 1123e, preventing precipitation ingress. In alternative embodiments, a rear ceiling connection plate can be provided as a separately formed component to the ceiling, for sealing the junction between the ceiling and the top of the rear windshield 1123e.

In the preferred embodiment, the front ceiling connection plate 1123cb and the rear edge 1123cc are both arc shaped in side view over their corresponding crosstube. The preferred front and rear windshields 1123d, 1123e are both planar toward their tops. The front windshield 1123d has a single planar segment, while the rear windshield 1123e includes two planar segments. Forming the front and rear windshields to be planar improves the sealing performance between the ceiling 1123ca and both the front windshield 1123d and the rear windshield 1123e respectively, increases the rigidity of the windward surface, and eliminates warping and slapping noise which might otherwise occur through coordination of curved junctions of different materials.

Figure 35:
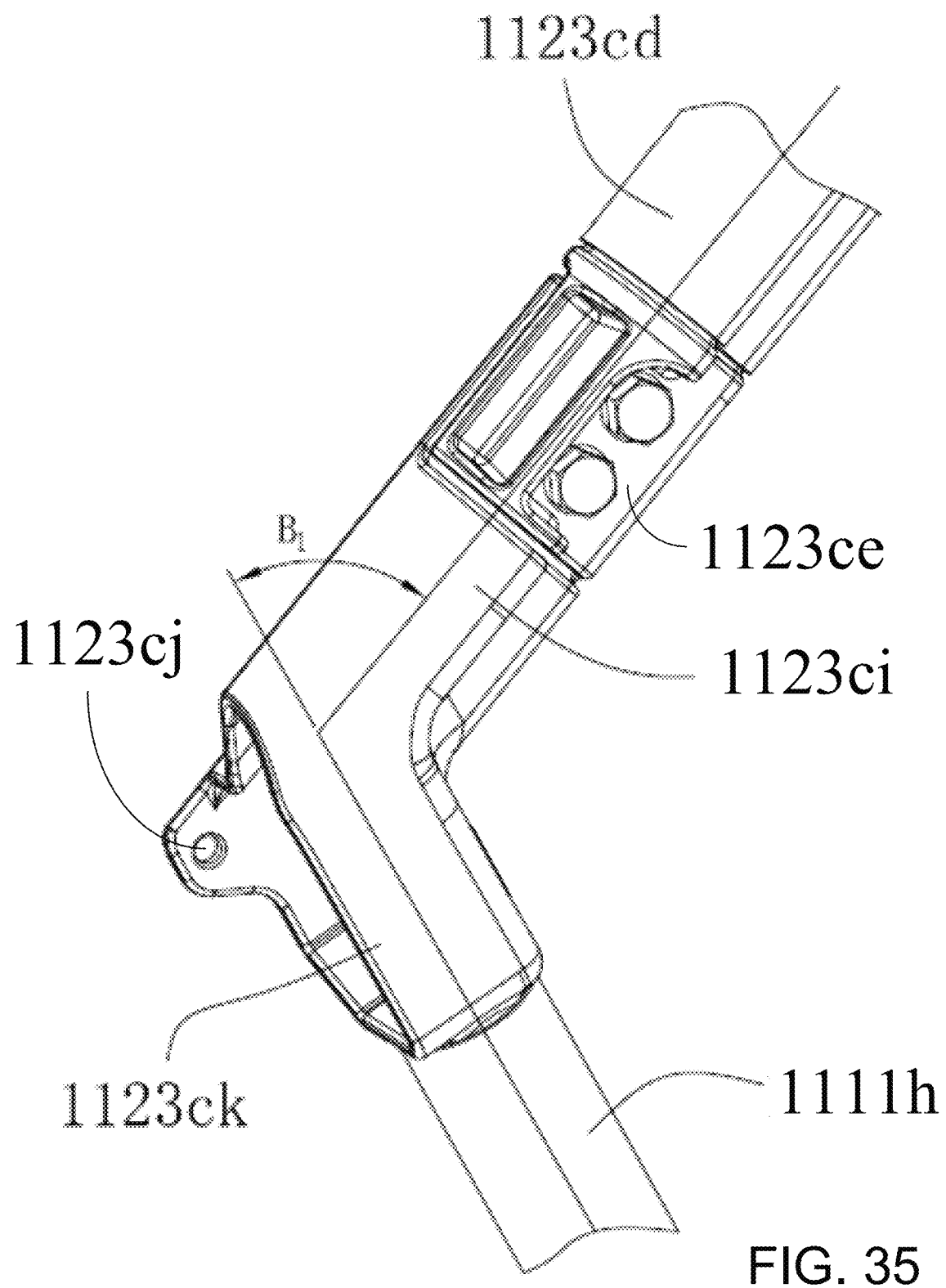
FIG. 35 is a side perspective view of the preferred connection member between the A-pillar base leg and the main ROPS tube.

The preferred connection member 1123ci used to attach each main ROPS tubes 1123cd to the A-pillar base leg 1111h and to the rest of the front frame portion 1111 is best shown in FIG. 35. The connection member 1123ci attaches the attachment segment 1123ce of the main ROPS tube 1123cd to the top of the A-pillar base leg 1111h. For instance, the connection member 1123ci can be tubular, with a top of the A-pillar base leg 1111h inserted into the connection member 1123ci and a bottom end of the attachment segment 1123ce welded or more preferably bolted to the connection member 1123ci. The connection member 1123ci preferably also attaches the rear end of a horizontally extending portion of the front frame portion 1111 in a three way junction, such as by including a forwardly disposed bolt hole 1123cj. The connection member 1123ci defines an angled bend B1 between the longitudinal axis of the A-pillar base leg 1111h and the longitudinal axis of the attachment segment 1123ce, and the preferred value for the angled bend B1 is in the range between 60° and 80°. The connection member 1123ci is preferably a hollow casting to provide sufficient structural strength and stability at the angled bend B1. In this way, the connection member 1111ci is connected to the A-pillar base leg 1111h without occupying much space, which leaves enough space for the installation of other components (such as headlights) and for easy installation, adjustment and maintenance of the front frame portion 1111.

Figure 36:
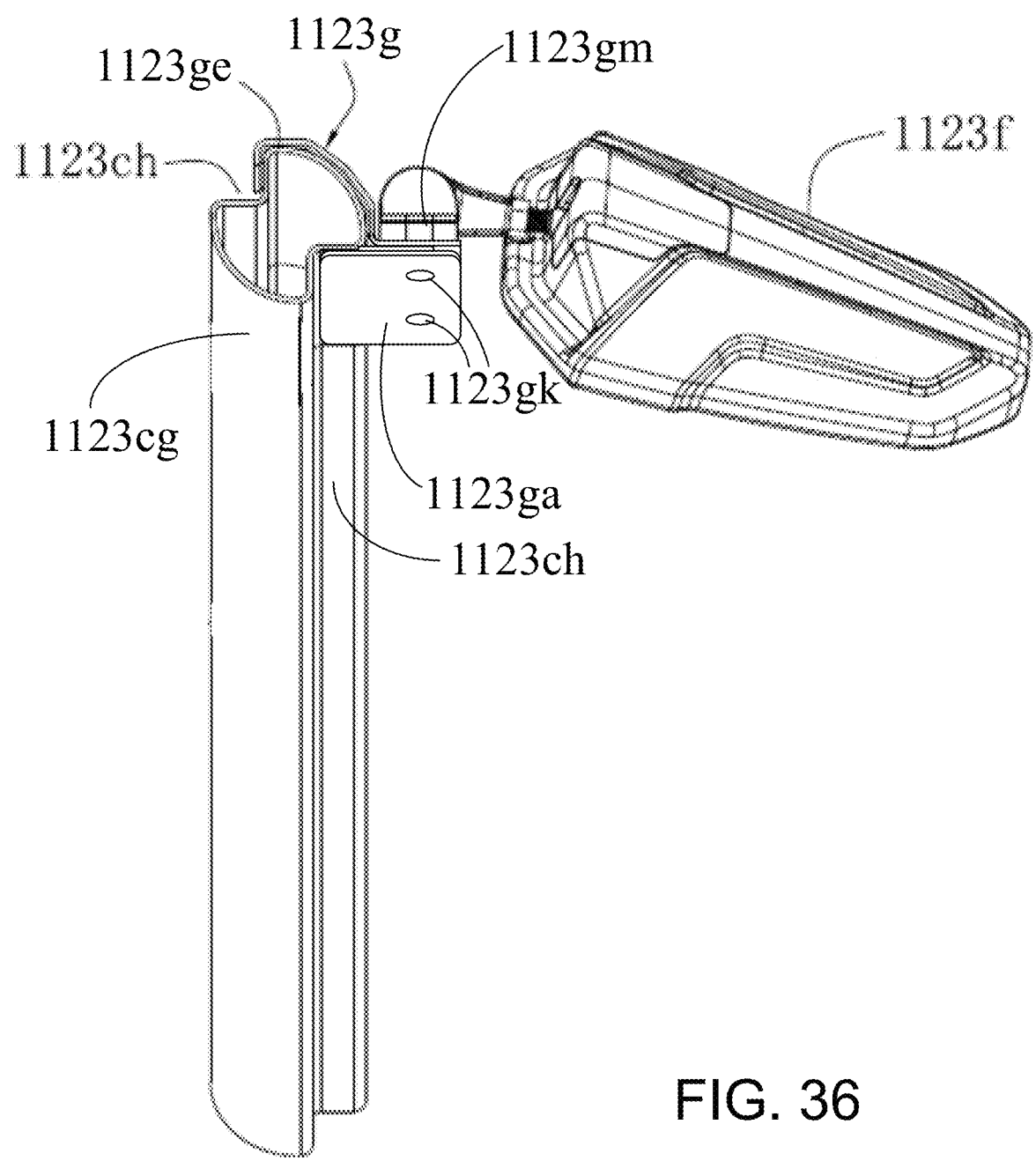
FIG. 36 is a perspective view of a rear-view mirror connected to a connection portion of the A-pillar base leg or main ROPS tube.
Figure 37:
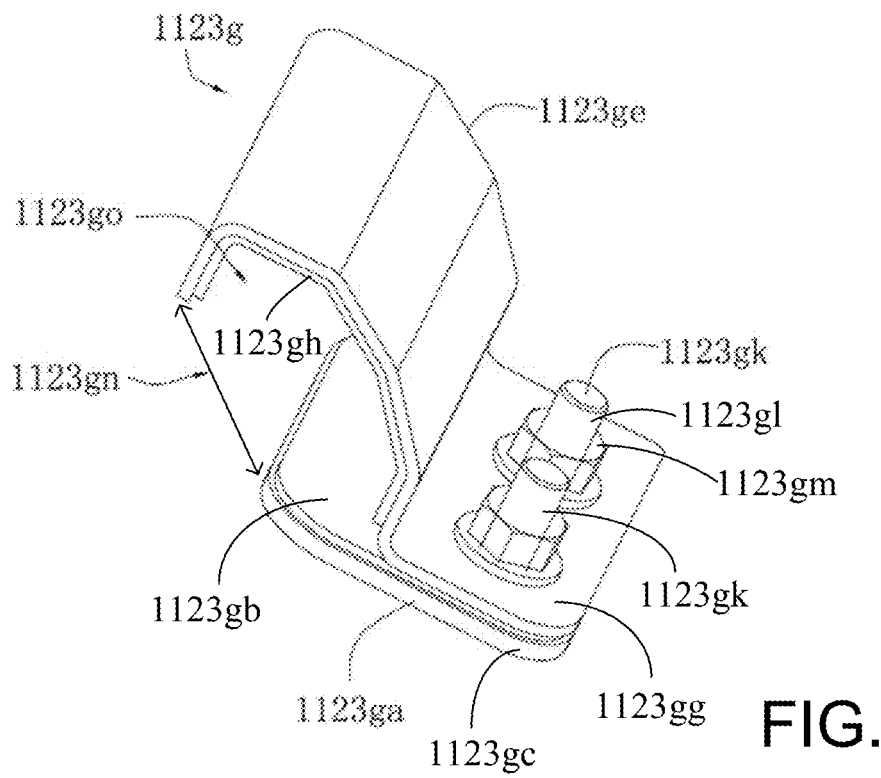
FIG. 37 is a perspective view of the rear-view mirror support of FIG. 36.
Figure 38:
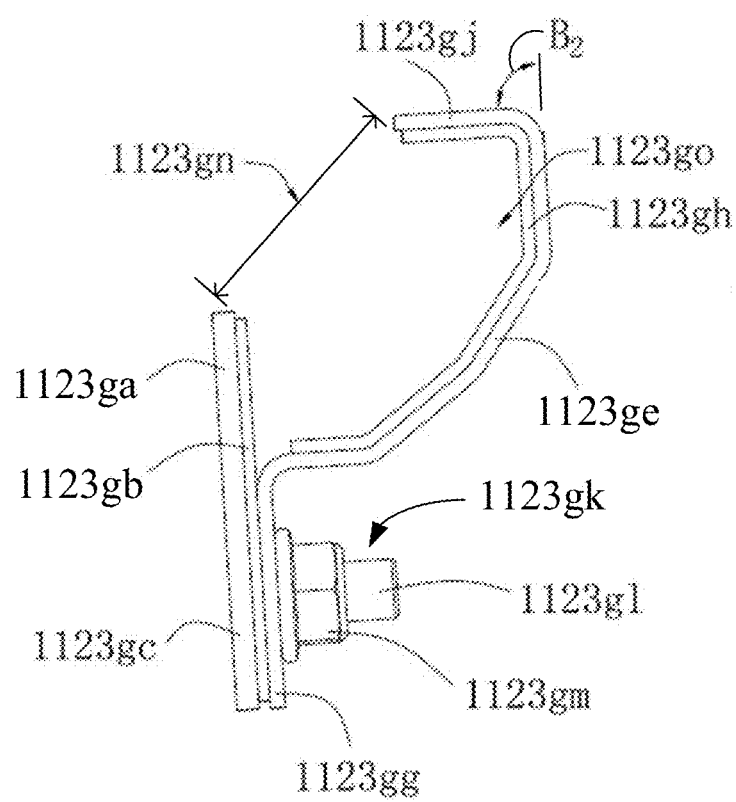
FIG. 38 is an end view of the rear-view mirror support of FIGS. 36 and 37.
Figure 39:
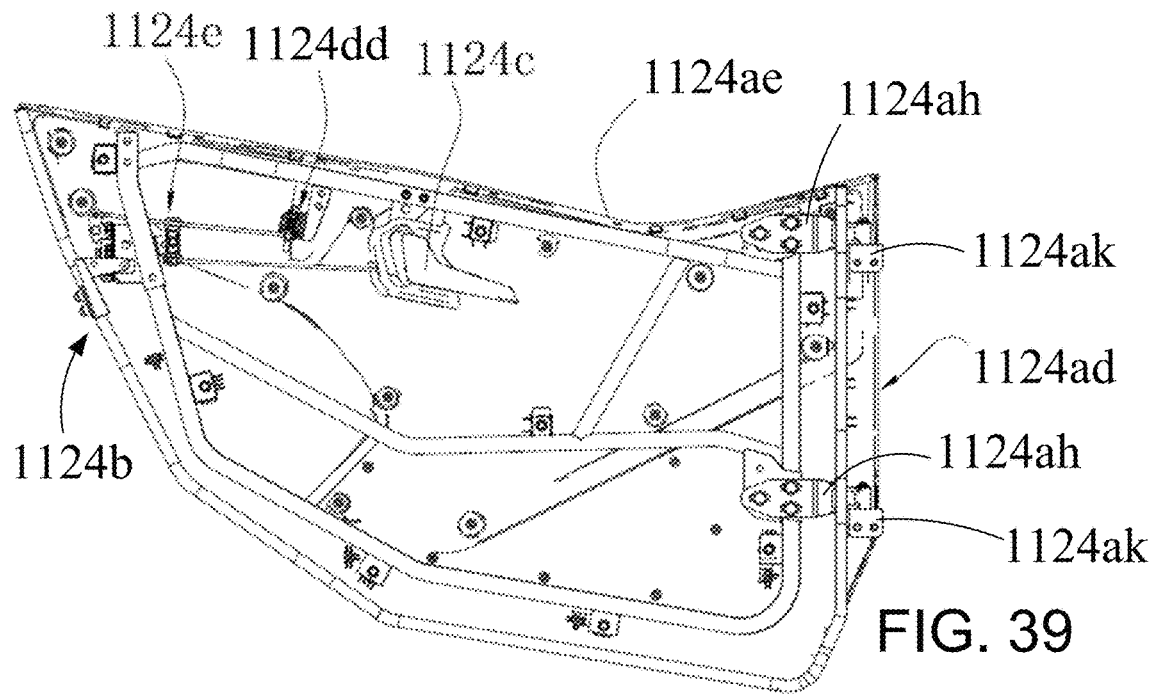
FIG. 39 is a side view of an exterior door panel and door skeleton, of the driver side door used in the vehicle of FIG. 1, looking outwardly from the inside of the vehicle.

A rear-view mirror 1123f is mounted on the A-pillar base leg 1111h or the ROPS assembly 1123c (such as on the main ROPS tube 1123cd) for the driver to observe the situation behind the off-road vehicle 100. More particularly as shown in FIGS. 36 to 38, the preferred embodiment includes a rear-view mirror support 1123g which can be mounted on either on the A-pillar base leg 1111h or the ROPS assembly 1123c, and the rear-view mirror 1123f is mounted on the rear-view mirror support 1123g. Mounting of the rear-view mirror 1123f using the rear-view mirror support 1123g avoids opening an assembly hole on the main ROPS tube 1123cd or on the A-pillar base leg 1111h, which avoids damaging the integrity of the main ROPS tube 1123cd or the A-pillar base leg 1111h.

The preferred rear-view mirror support 1123g includes a flat inner connection plate 1123ga and a profiled outer connection plate 1123ge, joined together with one or more fasteners 1123gk. The main ROPS tube 1123cd or the A-pillar base leg 1111h is provided with a mounting portion 1123cg, preferably with the hourglass cross-sectional shape shown in FIG. 36 which defines opposing clamping grooves 1123ch including an angle $B_2$ preferably in the range between 30° and 90°. The profiled outer connection plate 1123ge is shaped to mate around at least part of the hourglass shape including matching the angle $B_2$, thereby defining a clamping space 1123go with a clamping gap 1123gn. The flat inner connection plate 1123ga preferably includes an adhesive layer 1123gb, and the profiled outer connection plate 1123ge preferably includes an adhesive layer 1123gh, to assist in placement prior to tightening of the fastener(s) 1123gk. With the profiled outer connection plate 1123ge in place around the hourglass shape and the flat inner connection plate 1123ga extending into one of the clamping grooves 1123ch, fastening and tightening of the fastener(s) 1123gk clamps the rear-view mirror support 1123g to the mounting portion 1123cg. The width of the clamping gap 1123gn is smaller than the width of at least that part of the mounting portion 1123cg residing within the clamping space 1123go, preventing the rear-view mirror support 1123g from pulling off of the mounting portion 1123cg. After tightening of the fastener(s) 1123gk, the adhesive layers 1123gb, 1123gh serve a frictional anti-slide function, so the rear-view mirror support 1123g will reliably avoid longitudinal slipping on the mounting portion 1123cg. While they could be formed by casting or other processes, the flat inner connection plate 1123ga and the profiled outer connection plate 1123ge are preferably formed by stamping (and for the profiled outer connection plate 1123ge by bending) of sheet steel material. The rear-view mirror 1123f is mounted on the distal end of the rear-view mirror support 1123g. In this way, the rear-view mirror support 1123g not only avoids weakening of the frame 111, but also simplifies manufacture of the rear-view mirror support 1123g and installation of the rear-view mirror 1123f.

In the preferred embodiment, two fasteners 1123gk are used, each including a threaded shoulder bolt or stud 1123gl and a correspondingly threaded locking nut 1123gm. In other embodiments, a different number of fasteners can be used, or the fastener(s) may alternatively a buckle, a riveting member or the like.

Figure 41:
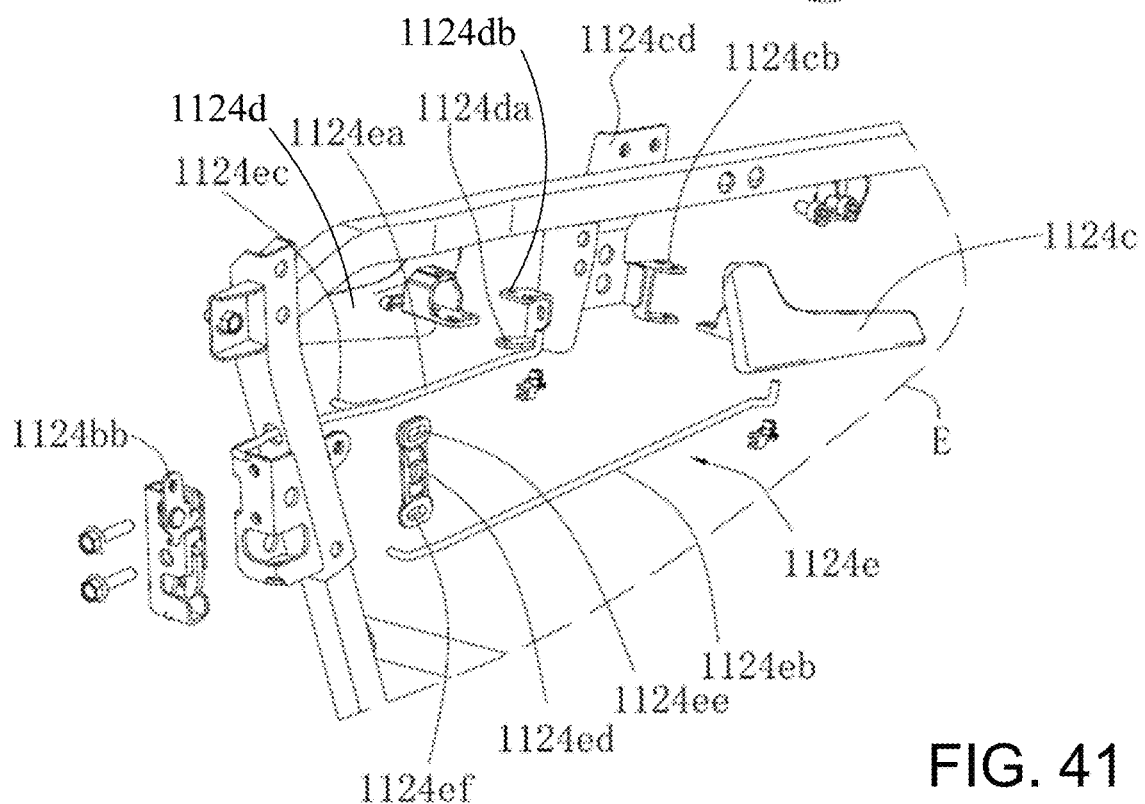
FIG. 41 is an enlarged view of part E in FIG. 40.
Figure 42:
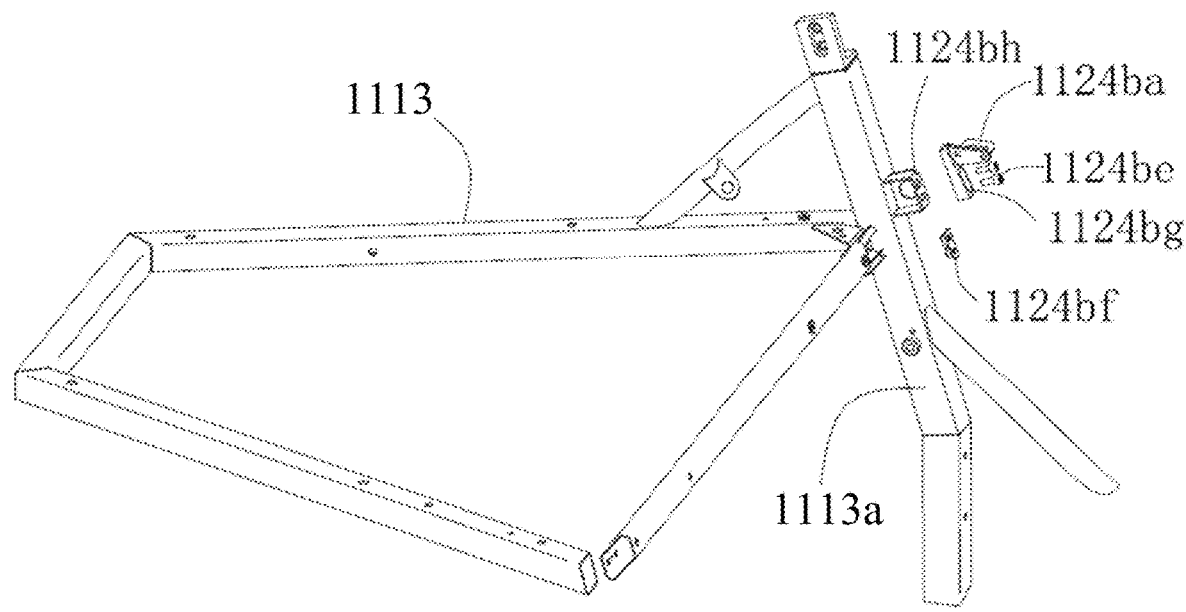
FIG. 42 is an exploded perspective view of catch pieces installed on the rear frame portion for latching the rear end of the driver's door of FIG. 40 closed on the vehicle as shown in FIG. 1.

FIGS. 39 to 44 detail a preferred driver side door 1124 for the vehicle 100. The passenger side door is preferably a mirror image structure of the driver side door. Each door 1124 includes a door skeleton 1124ae sandwiched between an exterior door panel 1124ad and an interior door trim panel 1124af. An inner handle 1124c extends through the interior door trim panel 1124af to allow the driver to unlatch the door 1124 from inside the cabin 1121. An outer handle 1124d (shown in FIGS. 1 and 44) extends through the exterior door panel 1124ad to allow the driver to open the door 1124 from outside the vehicle 100. A linkage 1124e inside the door 1124 operates a door latch device 1124b based on movement of either the inner handle 1124c or outer handle 1124d. In this embodiment, the front side of the door 1124 is pivotally connected to the frame 111, such as at the L-tube 1111j or otherwise immediately behind the A-pillar base leg 1111h. When closed, the door 1124 blocks or seals the door opening 1121a. With a front hinging door 1124, the door latch device 1124b is at the rear end of the door 1124. The door latch device 1124b includes a catch 1124ba and a latch hook 1124bb. The catch 1124ba is mounted on the frame 111 as best shown in FIG. 42, such as on the B-pillar base leg 1113a or otherwise forwardly facing on the front of the rear frame portion 1113. The latch hook 1124bb is pivotally mounted on the door 1124 as best shown in FIG. 41, and cooperates with the catch 1124ba to realize latching (and locking) between the door 1124 and the frame 111 while the door 1124 blocks the door opening 1121a. The linkage 1124e connects the latch hook 1124bb to the inner handle 1124c and the outer handle 1124d. When opening the door 1124 from outside, the driver pulls the outer handle 1124d by hand, and the outer handle 1124d drives linkage 1124e to move the latch hook 1124bb out of the catch 1124ba and open the door 1124. When opening the door 1124 from inside the cabin 1121, the driver pulls the inner handle 1124c by hand, and the inner handle 1124c drives the linkage 1124e to move the latch hook 1124bb out of the catch 1124ba and open the door 1124. When closing the door 1124, the latch hook 1124bb operates by spring force to snap over and into the catch 1124ba.

Figure 40:
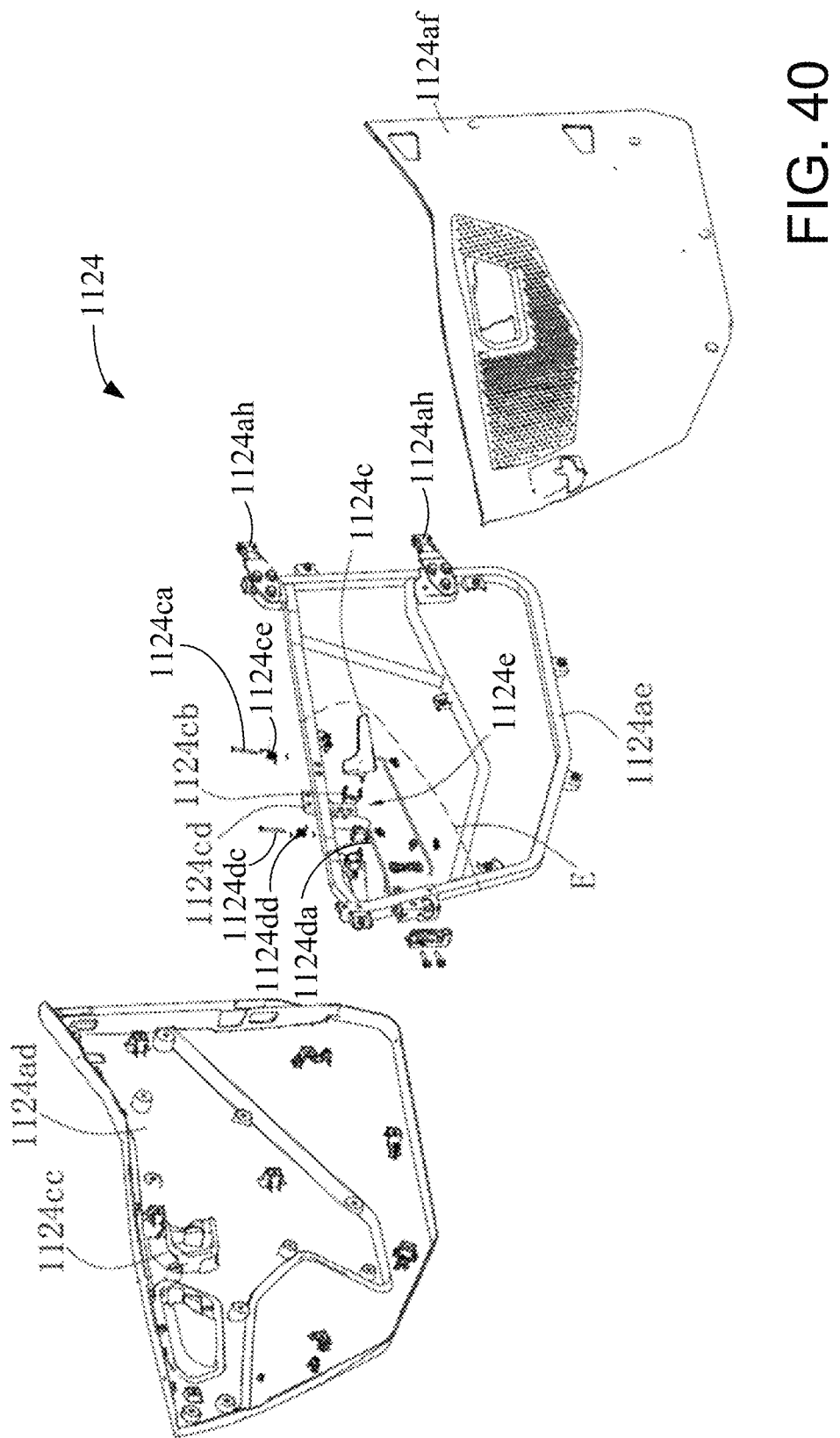
FIG. 40 is an exploded view of the full driver side door used in the vehicle of FIG. 1, including the exterior door panel, the door skeleton and the interior door trim panel.

The preferred linkage 1124e is best shown in FIGS. 40 and 41. The linkage 1124e includes a primary link 1124ea connecting the outer handle 1124d to the latch hook 1124bb. The linkage 1124e also includes an inner handle link 1124eb connecting the inner handle 1124c to the latch hook 1124bb through a linkage pivot piece 1124ed and the primary link 1124ea. The linkage pivot piece 1124ed is pivotally mounted on the door skeleton 1124ae, and the two ends of the linkage pivot piece 1124ed are provided with an upper linkage hole 1124ee and a lower linkage hole 1124ef, with each linkage hole 1124ee, 1124ef being oblong extending along a front-rear direction. The primary link 1124ea includes an intermediate stub link 1124ec extending into the upper linkage hole 1124ee. The rear end of the inner handle link 1124eb extends into the lower linkage hole 1124ef. When the outer handle 1124d is pulled, the outer handle 1124d pushes the latch hook 1124bb to move by the primary link 1124ea to unlock the latch hook 1124bb. At this time, the intermediate stub link 1124ec runs in the upper linkage hole 1124ee without moving the linkage pivot piece 1124ed, such that the pull of the outer handle 1124d will not move the inner handle 1124c. When pulling the inner handle 1124c, the inner handle 1124c pushes the linkage pivot piece 1124ed through the inner handle link 1124eb, and the linkage pivot piece 1124ed pivots relative to the door skeleton 1124ae and drives the intermediate stub link 1124ec to move, so that the primary link 1124ea drives the latch hook 1124bb to unlatch.

The outer handle 1124d is provided with an outer handle linkage hole 1124da which is oblong with a front-rear extension direction. The front end of the primary link 1124ea is received in the outer handle linkage hole 1124da. When the inner handle 1124d is pulled, the front end of the primary link 1124ea runs lengthwise in the outer handle linkage hole 1124da without moving the outer handle 1124d. In other words, in this embodiment, the inner handle 1124c and the outer handle 1124d both move independently to unlatch the door 1124 without affecting each other.

The inner handle 1124c is pivotally mounted relative to the door skeleton 1124ae with a coupling bracket 1124cd which defines two holes 1124cb for an inner handle pivot pin 1124ca. An inner handle torsion spring 1124ce is sleeved on the inner handle pivot pin 1124ca, biasing between the inner handle 1124c and its coupling bracket 1124cd. After the inner handle 1124c has been pulled, it returns to its original position under the action of the inner handle torsion spring 1124ce. The outer handle 1124d is likewise pivotally mounted relative to the door skeleton 1124ae with a coupling bracket 1124db for an outer handle pivot pin 1124dc. An outer handle torsion spring 1124dd is sleeved on the outer handle pivot pin 1124dc, biasing between the outer handle 1124d and its coupling bracket 1124db. After the outer handle 1124d has been pulled, it returns to its original position under the action of the outer handle torsion spring 1124dd. The exterior door panel 1124ad preferably includes an integrally molded extension 1124cc which provides support for both coupling brackets 1124cd, 1124db.

As best shown in FIG. 42, the catch 1124ba of the door latch device 1124b includes a catch flange 1124bg which is mounted on a catch bracket 1124bh of the B-pillar base leg 1113a using two adjusting bolts 1124be. The catch flange 1124bg has one or two oblong adjusting holes for the adjusting bolts 1124be, and the catch bracket 1124bh has one or two oblong adjusting holes for the adjusting bolts 1124. The extension direction of the adjusting hole(s) in the catch flange 1124bg crosses the extension direction of the adjusting hole(s) in the catch bracket 1124bh; for instance, extension direction of the adjusting hole(s) in the catch flange 1124bg can be vertical and the extension direction of the adjusting hole(s) in the catch bracket 1124bh can be horizontal. The adjusting bolts 1124be pass through the all the adjusting holes and are secured with nuts (not shown), fixing the catch 1124ba to the catch bracket 1124bh. When the position of the catch 1124ba needs to be adjusted, the nut/adjusting bolts 1124be are loosened, and then the catch 1124ba is hand moved along either or both extension directions before retightening the nut/adjusting bolts 1124be. In this way, the position of the catch 1124ba can be adjusted with two degrees of freedom in different directions, which can not only compensate for any positional error between the catch 1124ba and the latch hook 1124bb in the production and assembly process, but also can adjust the seam of the door 1124. In the preferred embodiment, the door latch device 1124b further includes a pressing piece 1124*bf* sleeved on the adjusting bolts 1124*be* and located between the catch bracket 1124*bh* and the nut(s), acting like a pair of spring washers to improve the locking force of the nut(s) and prevent the nut(s) from loosening in the process of vibration.

Figure 43:
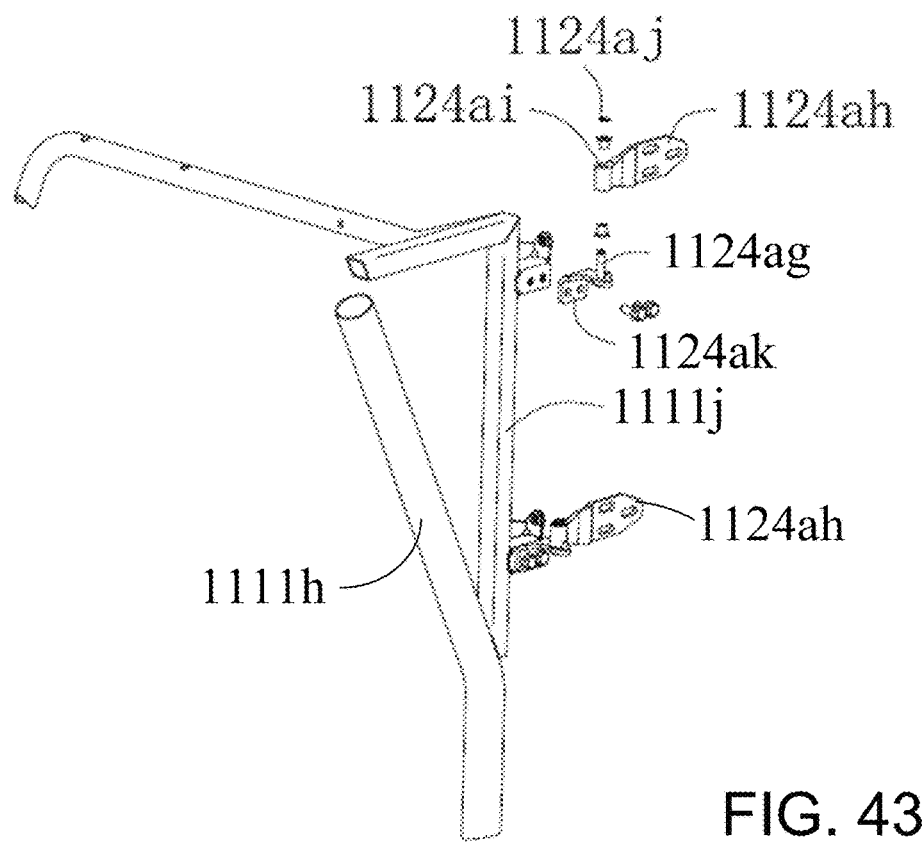
FIG. 43 is an exploded perspective view of hinge pieces installed on the L-tube of the front frame portion for hinging the front end of the driver's door of FIG. 40 onto the vehicle of FIG. 1.

FIG. 43 shows the construction of preferred hinges 1124*ah* for pivotally connecting the front side of the door 1124 to the L-tube 1111*j* of the front frame portion 1111. Each hinge 1124*ah* has a knuckle 1124*ai* mounted around a hinge pin 1124*ag*. The hinge pin 1124*ag* is provided on a hinge pin base 1124*ak*, which in turn is mounted to the L-tube 1111*j*. The knuckle 1124*ai* is held to the hinge pin 1124*ag* with a hinge pin clip 1124*aj* to prevent the hinge 1124*ah* from separating from the hinge pin base 1124*ak* in a vertical direction. When disassembling, it is only necessary to remove the two hinge pin clips 1124*aj* to realize the disassembly and assembly of the door 1124 to/from the vehicle 100, which improves the convenience of maintenance of the door 1124. In one embodiment, the hinge pin clip 1124*aj* has a bayonet, and the hinge pin clip 1124*aj* is clamped on the hinge pin 1124*ag* with the bayonet through the hinge pin 1124*ag*. In this way, the quick disassembly and assembly between the hinge pin clip 1124*aj* and the hinge pin 1124*ag* can be realized, and the convenience of use can be improved. The hinge pin clip 1124*aj* may be C-shaped.

Figure 44:
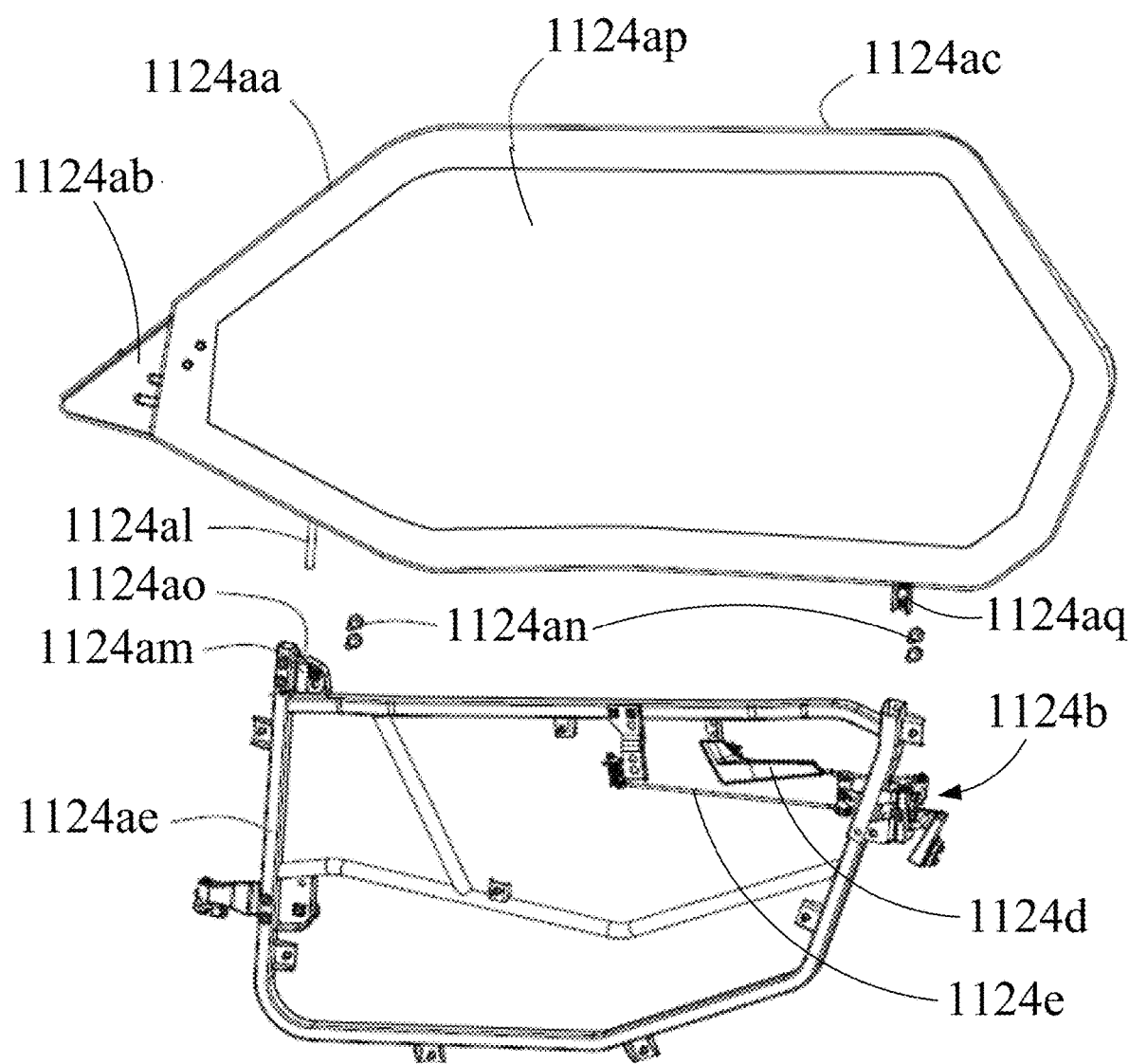
FIG. 44 is a side view, from outside the vehicle, of an optional driver side window for attachment to the door skeleton of FIGS. 40 and 41.

The preferred door 1124 optionally includes a removable window 1124*aa* shown in FIG. 44, which generally includes a rigid window skeleton 1124*ab* and a flexible skin package 1124*ac* which has a transparent or translucent pane 1124*ap*. The window skeleton 1124*ab* is preferably shaped to position into one of the clamping grooves 1123*ch* of the main ROPS tube 1123*cd*. The skin package 1124*ac* wraps the window skeleton 1124*ab* and is removably connected to the window skeleton 1124*ab*. The skin package 1124*ac* may have straps (not shown) formed of cloth, leather, plastic, etc. and be attached to the window skeleton 1124*ab* such as by snaps, buttons, zippers or hook and loop fabric. In this way, the production cost of the window 1124*aa* is effectively reduced. At the same time, if desired, the skin package 1124*ac* can also be fully or partially removed from the window skeleton 1124*ab*, such as by including a zipper (not shown) for all but one side of the pane 1124*ap* such that the pane 1124*ap* can be rolled up for free air flow through the skin package 1124*ac* during driving. In this way, the design is more flexible, and the applicability of the door 1124 is improved to meet the various needs of customers.

The window skeleton 1124*ab* is preferably removably attached to the door skeleton 1124*ae*, such as using a front connection post 1124*a*1 and a rear connection flange 1124*aq*. Both the connection post 1124*a*1 and the connection flange 1124*aq* are rigid parts of the window skeleton 1124*ab*, and the front-rear orientation could alternatively be switched. The connection post 1124*a*1 mates into a clamping post hole 1124*ao* of a clamping plate 1124*am* fixed on the door skeleton 1124*ae*. When it is desired to attach the window skeleton 1124*ab* to the door 1124, the user first positions window skeleton 1124*ab* by lowering the front connection post 1124*a*1 into the clamping post hole 1124*ao*. The user then attaches the rear connection flange 1124*aq* to the door skeleton 1124*ae* and tightens the clamping plate 1124*am* around the connection post 1124*a*1 by tightening four bolts 1124*an*. The connection between the front connection post 1124*a*1 and the clamping post hole 1124*ao* establishes verticality of the window skeleton 1124*ab* relative to the door 1124, and also supports and aligns the window 1124*aa* for easier connection of the connection flange 1124*aq* to the door skeleton 1124*ae*. The removable connection between the window 1124*aa* and the door 1124 is easily and quickly realized by the user by tightening of four bolts 1124*n*, with the window 1124*aa* being easily removed by loosening of the four bolts 1124*n*. Thus, the entire window 1124*aa* including the window skeleton 1124*ab* can be removed from the door 1124, or added back to the door 1124, whenever desired by the user, via a convenient connection which is simple for disassembly and assembly.

Figure 45:
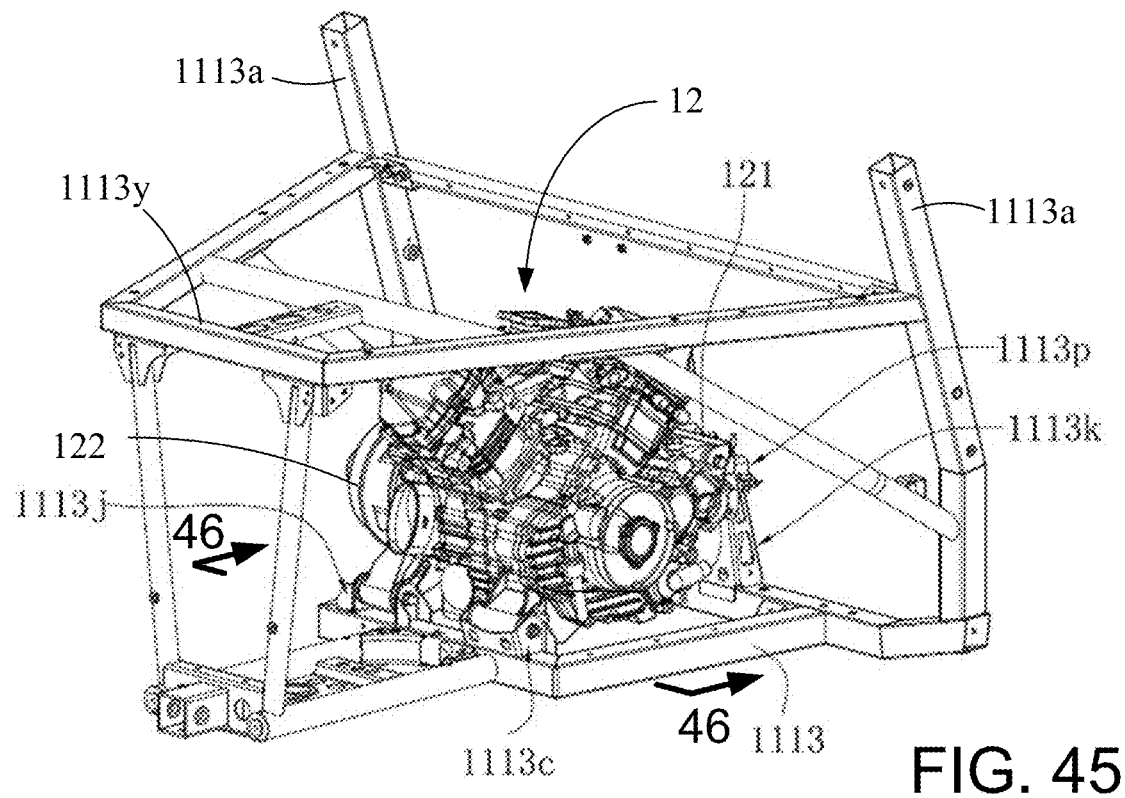
FIG. 45 is a rear right perspective view of connection between a prime mover assembly and rear frame portion of the vehicle of FIG. 1.
Figure 46:
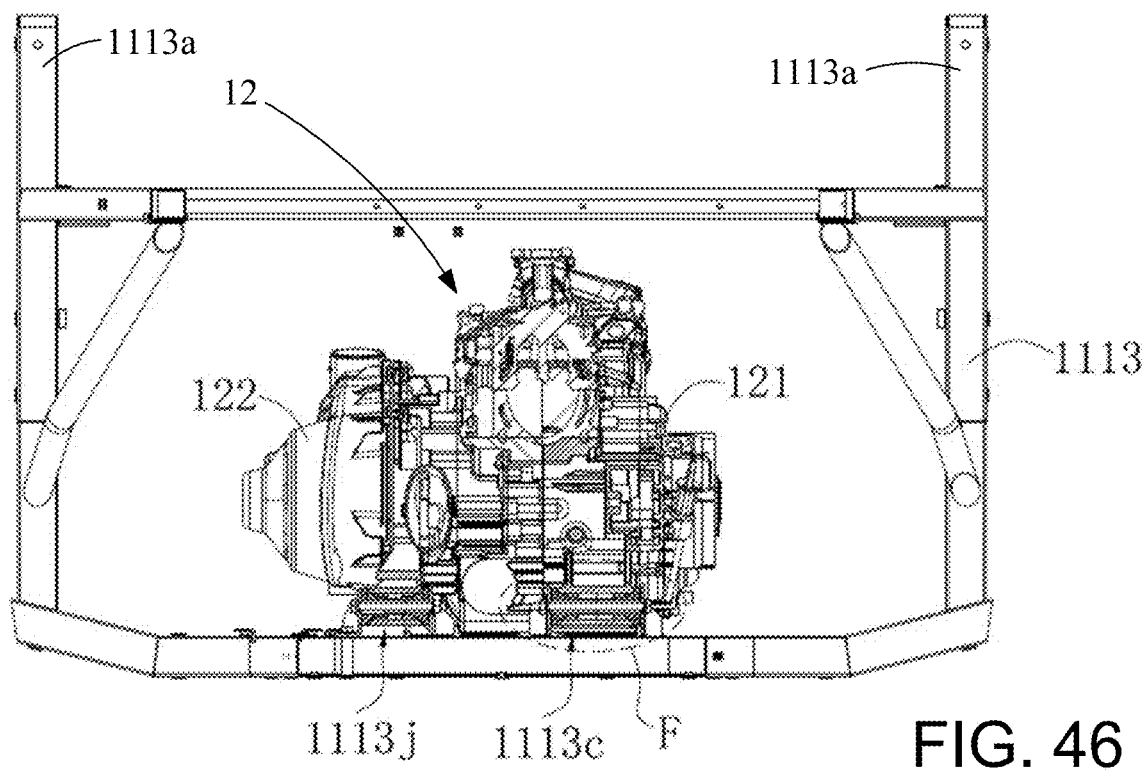
FIG. 46 is a rear view, in partial cross-section, of the prime mover assembly and rear frame portion, taken along cut-line 46-46 in FIG. 45.
Figure 48:
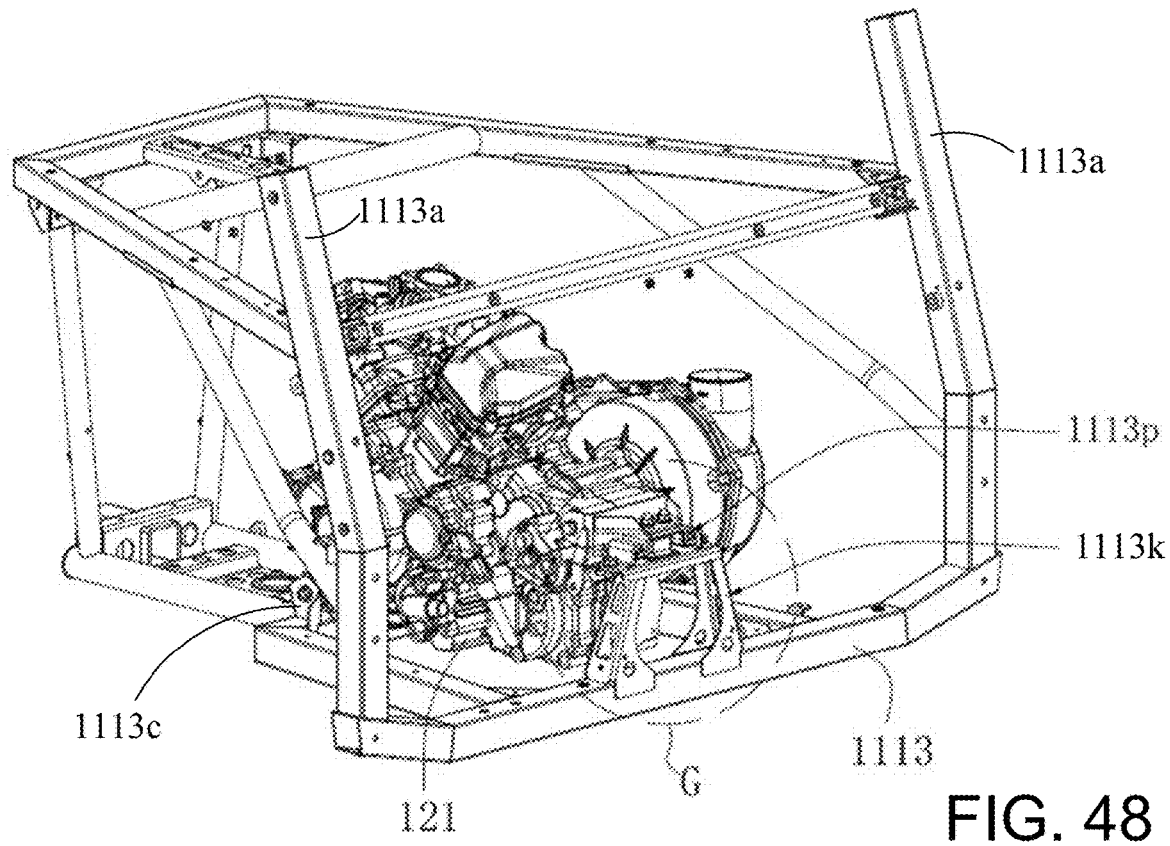
FIG. 48 is a front right perspective view of the prime mover assembly and rear frame portion of FIGS. 45 and 46.

As shown in FIGS. 45, 46 and 48, the off-road vehicle 100 includes a prime mover assembly 12 mounted on the frame 111, preferably on the rear frame portion 1113. The prime mover assembly 12 provides power for the movement of the off-road vehicle 100. The prime mover assembly 12 preferably includes an internal combustion engine 121 and a transmission 122. The engine 121 is mounted on the rear frame portion 1113 for outputting power. The transmission 122 is mounted on one side of engine 121 to change the speed and torque of engine 121. In the preferred embodiments shown in the drawings, the engine 121 is a two cylinder engine and the transmission 121 is a continuously variable transmission or CVT as known in the art, with the entire prime mover assembly 12 installed into the vehicle frame 111 as a unit. Alternative embodiments use only a single cylinder engine for some aspects of the invention.

The rear frame portion 1113 is provided with a rear right engine support bracket 1113*c*, a rear left engine support bracket 1113*j* and a front engine support bracket 1113*k* with a buffer assembly 1113*p*. The three engine support brackets 1113*c*, 1113*j*, 1113*k* are used to support and install the engine 121 so that the engine 121 is suspended from the rear frame portion 1113. The rear right engine support bracket 1113*c*, the rear left engine support bracket 1113*j* and the front engine support bracket 1113*k* are arranged in a triangle, which forms a three-point support to realize the stable installation of the engine 121. In an alternative embodiment, the front-rear orientation of the engine support brackets is reversed. In the preferred embodiment shown, the connection between the rear engine support brackets 1113*c*, 1113*j* and the engine 121 is not in the same horizontal plane as the connection between the front engine support bracket 1113*k* and the engine 121, with the front engine support bracket 1113*k* attaching in to the engine 121 at a higher elevation.

Figure 47:
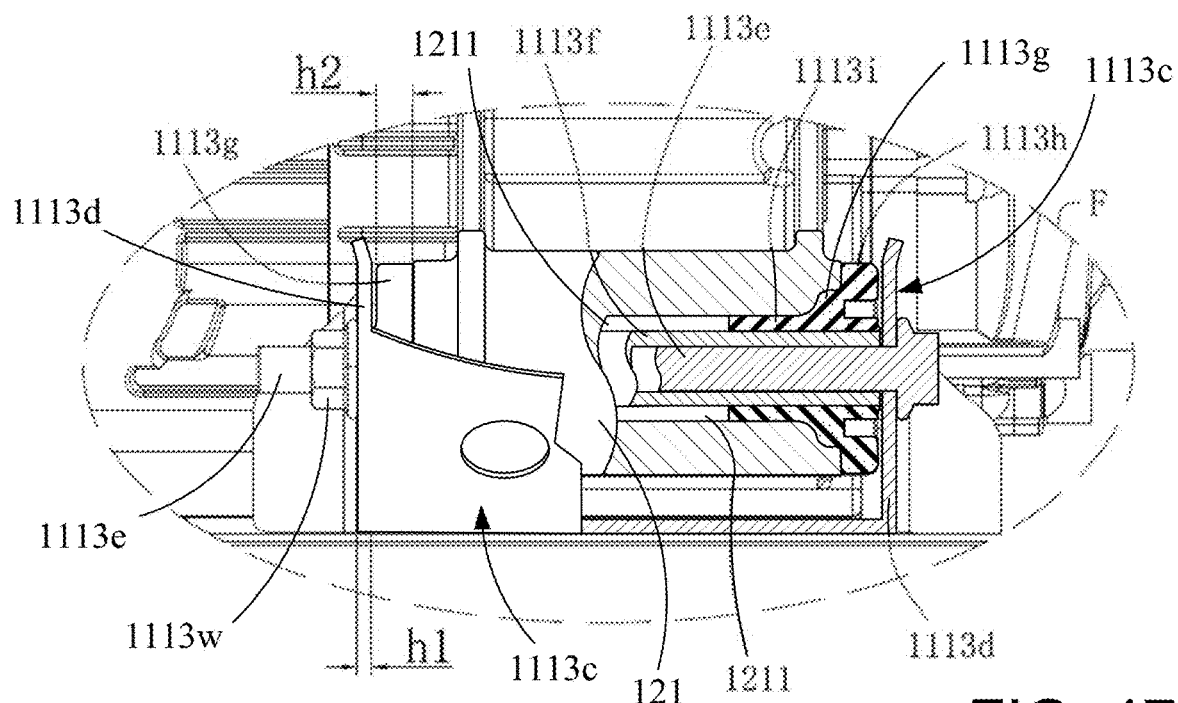
FIG. 47 is an enlarged view of part F in FIG. 46, in partial cross-section.

The connection between the rear right engine support bracket 1113*c* and the engine 121 is best shown in FIG. 47. The rear right engine support bracket 1113*c* includes two support base ears 1113*d* each with a transverse thickness h1 which are fixed on the frame 111 preferably by welding of the support bracket 1113*c* to the rear frame portion 1113. The connection between the engine 121 and the support bracket 1113*c* includes a bolt 1113*e*, a rigid sleeve 1113*f*, and two elastic sleeves 1113*g*. The engine 121 defines a rear right support hole 1211. The two elastic sleeves 1113*g* are respectively arranged at two ends of the support hole 1211, each with an extension section 1113*i* extending into the support hole 1211 and a horizontal buffer section 1113*h* located outside but adjacent to the support hole 1211. The diameter of the horizontal buffer section 1113*h* is greater than the diameter of the support hole 1211 so as to define a shoulder having a transverse thickness h2. The rigid sleeve 1113*f* is then inserted axially from either side so it extends through the elastic sleeves 1113*g*, defining a space for receiving the bolt 1113*e*. When the engine 121 is assembled to the rear frame portion 1113, the prime mover assembly 12 is lowered into position with the horizontal buffer sections 1113*h* of the elastic sleeves 1113*g* between the support base ears 1113*d*, and the bolt 1113*e* is axially inserted into the rigid sleeve 1113*f* and then tightened into position with a nut 1113*w*. Once tightened, the positions of the bolt 1113*e* and the rigid sleeve 1113*f* are fixed relative to the support bracket 1113*c*. The elastic sleeves 1113*g* are formed of a resilient elastic material of appropriate stiffness/softness for the vibration forces between the engine 121 and the rear frame portion 1113. The horizontal buffer sections 1113*h* serve as a horizontal buffer component between the engine 121 and the support base ears 1113*d*, avoiding hard contact between the engine 121 and the support bracket 1113*c*. The ratio of the thickness h2 of the horizontal buffer section 1113*h* to the thickness h1 of the support base ears 1113*d* is greater than or equal to 2. In other words, the thickness of each horizontal buffer section 1113*h* is at least twice the thickness of each support base ear 1113*d*. The extension sections 1113*i* serve as vertical and longitudinal buffer components between the engine 121 and the support base ears 1113*d*. The connection between the engine 121 and the support bracket 1113*c* thus buffers the movement of the engine 121, and improves the stability of the installation of the engine 121. The structure of the rear left engine support bracket 1113*j* is the same in principle as the structure of the rear right engine support bracket 1113*c*.

Figure 49:
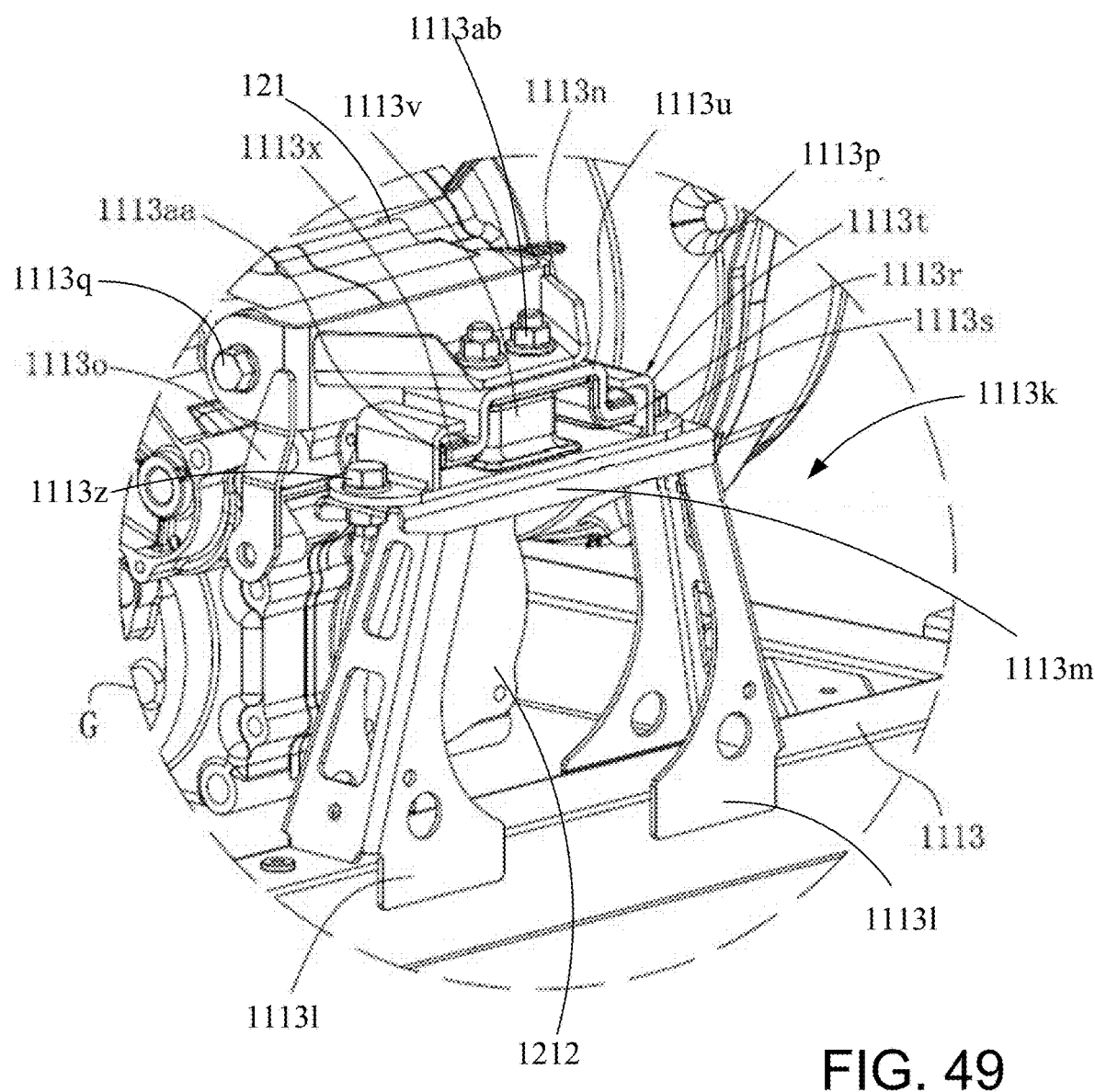
FIG. 49 is an enlarged view of part G in FIG. 48.

As shown in FIG. 48 and FIG. 49, the front engine support bracket 1113*k* includes a buffer assembly 1113*p* mounted atop two support base legs 1113*l* and a cross plate 1113*m*. The support base legs 1113*l* and the cross plate 1113*m* are rigidly fixed to the rear frame portion 1113 such as by welding, holding the buffer assembly 1113*p* at an elevated position. The support base legs 1113*l* are preferably separated to define a space between them for the front drive shaft (not shown) to connect to a front output shaft 1212 of the engine 121. Thus, the elevated position of the buffer assembly 1113*p* allows the front output shaft 1212 of the engine 121 and/or the front drive shaft to be positioned under the buffer assembly 1113*p*.

The buffer assembly 1113*p* includes a weight supporting bumper 1113*v* positioned underneath a pivoting mounting flange 1113*n* of the engine 121. The buffer assembly 1113*p* also includes a limit bracket 1113*u* which can move vertically and side to side to a limited degree within a limit space 1113*r* defined by two side limit plates 1113*t* and a bottom limit plate 1113*s*. The bottom of the buffer assembly 1113*p* is fixed relative to the support base legs 1113*l* such as by two bolts 1113*z* which secure the bottom limit plate 1113*s* to the cross plate 1113*m*. The top of the buffer assembly 1113*p* is fixed relative to the mounting flange 1113*n* of the engine 121 such as by two nuts 1113*ab* which secure the mounting flange 1113*n* to the limit bracket 1113*u*. The limit bracket 1113*u* includes horizontally extending limit sections 1113*x* on its ends, such that in the preferred embodiment the limit bracket 1113*u* is Ω-shaped. Each limit section 1113*x* is outfitted with a U-shaped anti-vibration bumper 1113*aa* in the limit space 1113*r*. The weight supporting bumper 1113*v* and the anti-vibration bumpers 1113*aa* are formed of a compressible resilient material, such as rubber or silicone, whereas the remaining components of the front engine support bracket 1113*k* are formed of a strong, rigid metal such as steel. When stationary, the weight supporting bumper 1113*v* supports all the front weight of the engine 121, without having the anti-vibration bumpers 1113*aa* contact either the side limit plates 1113*t* or the bottom limit plate 1113*s*. However, when the engine 121 is running and vibrating, and/or when the vehicle 100 is moving and contacting bumps in the trail/road, the engine 121 may move to a limited degree until the anti-vibration bumpers 1113*aa* contact the side limit plates 1113*t* or the bottom limit plate 1113*s* to restrict further movement. In this way, rigid contact between the limit bracket 1113*u* and either the side limit plates 1113*t* or the bottom limit plate 1113*s* can be avoided.

In the preferred embodiment, the engine mounting flange 1113*n* is not fixed relative to the engine 121, but instead is pivotally mounted relative to the engine 121 on a pivot pin bolt 1113*q*. The pivot pin bolt 1113*q* extends through a front engine support hole 1215 best shown in FIG. 50. The pivot pin bolt 1113*q* allows an additional degree of freedom to engine movement, particularly useful during installation of the engine 121 to the rear frame portion 1113 and/or during maintenance of the engine 121 when it is desired to pivot the engine 121 about the axis of the pivot pin bolt 1113*q* to gain additional access to engine components. A stop 1113*o* is fixed to the engine 121, and is used to limit the pivoting of the engine 121 about the axis of the pivot pin bolt 1113*q* and overturn, effectively improving the installation stability of the engine 121.

With the elevated position provided by the buffer assembly 1113*p* by the support base legs 1113*l*, the various bolts/nuts 1113*q*, 1113*z*, 1113*ab* which are used to secure the front of the prime mover assembly 12 to the rear frame portion 1113 are all at relatively high and more easily accessible positions while still allowing longitudinal access to the output shaft 1212 of the engine 121 for attachment of the front drive shaft (not shown). The front engine support bracket 1313*k* thus allows for easier assembly of the vehicle 100 and for easier maintenance of the prime mover assembly 12 than was possible in prior art off-road vehicles.

Figure 50:
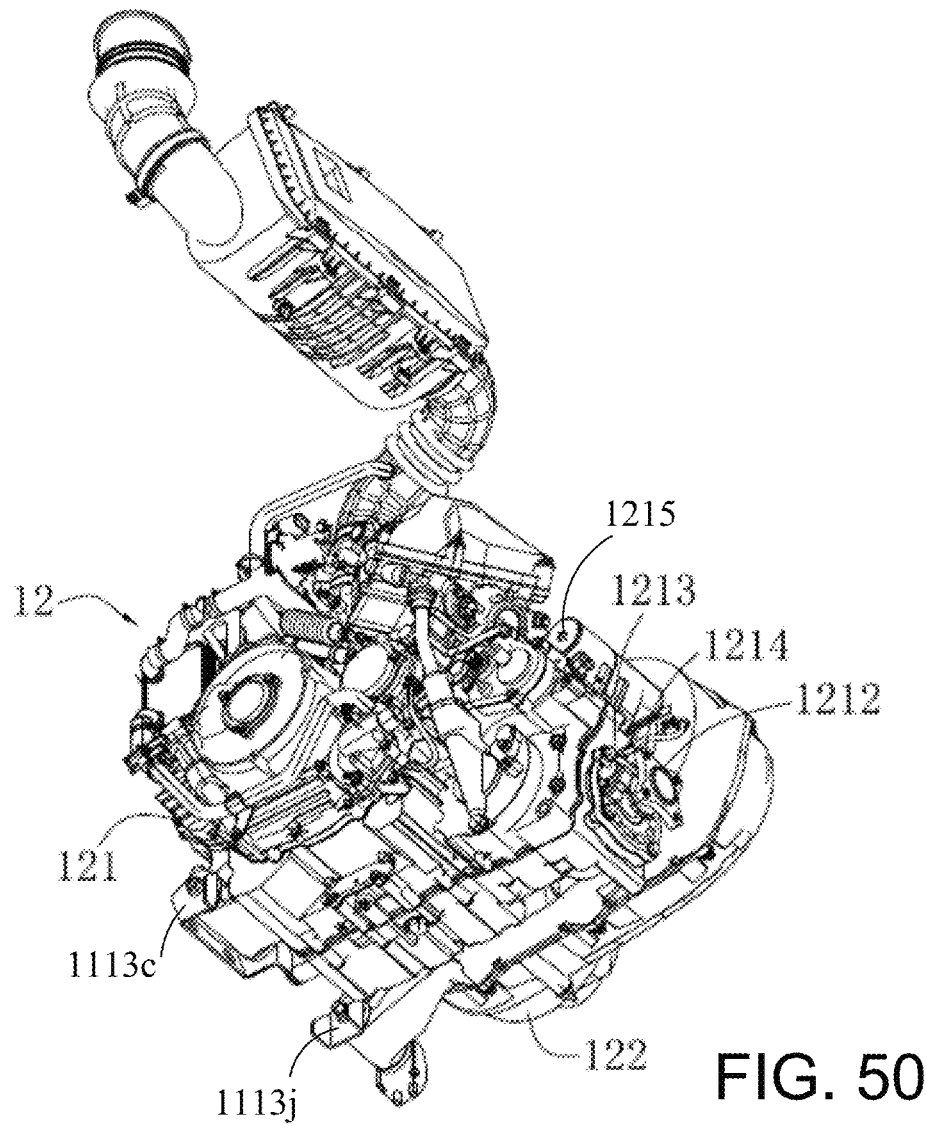
FIG. 50 is a bottom right perspective view of the prime mover assembly of FIGS. 45, 47 and 48.

FIG. 50 further shows the preferred prime mover assembly 12 for use with the off-road vehicle 100, with the transmission 122 on the left side of the engine 121. Alternative embodiments reverse this right-left orientation.

Figure 51:
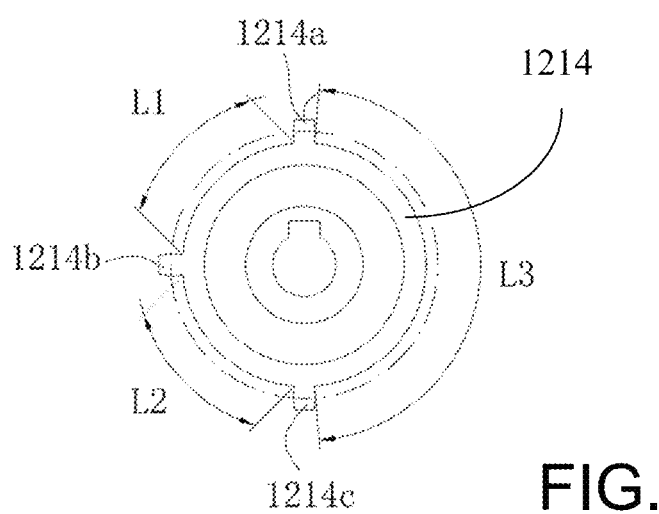
FIG. 51 is an end view of a gear used in the speed sensor of the prime mover assembly of FIG. 50.

As shown in FIG. 50, a speed sensor 1213 is arranged adjacent to the output shaft 1212 of the engine 121, with the speed sensor 1213 including a gear 1214 which is better shown in FIG. 51. During the rotation of the output shaft 1212, the speed sensor 1213 detects the rotational turns of the gear 1214 to calculate the speed of the off-road vehicle 100. In one embodiment, the vehicle speed sensor 1213 is mounted on the rear frame portion 1113 or the main body of the engine 121. The gear 1214 includes at least three teeth 1214*a*, 1214*b*, 1214*c*. It should be noted that the gear 1214 may alternatively include four teeth, five teeth, or more teeth.

As shown in FIG. 51, the distance between the first tooth 1214*a* and the second tooth 1214*b* is defined as L1, the distance between the second tooth 1214*b* and the third tooth 1214*c* is defined as L2, and the distance between the first tooth 1214*a* and the third tooth 1214*c* is defined as L3. L1 is equal to L2 and not equal to L3. Alternatively, L1 is equal to L3 and not equal to L2. By having different distances between the teeth 1214*a*, 1214*b*, 1214*c*, the signal trigger period acquired by speed sensor 1213 is an irregular period, and the real speed of off-road vehicle 100 is calculated based on this irregular period. In this way, when the engine 121 is idling, the irregular period is taken as the real speed calculation period of the off-road vehicle 100, which can avoid the situation that the engine 121 shakes and triggers the speed sensor 1213 by mistake, thus avoiding the phenomenon of the dashboard speed jump, and effectively improving the accuracy and reliability of the speed display.

Figure 52:
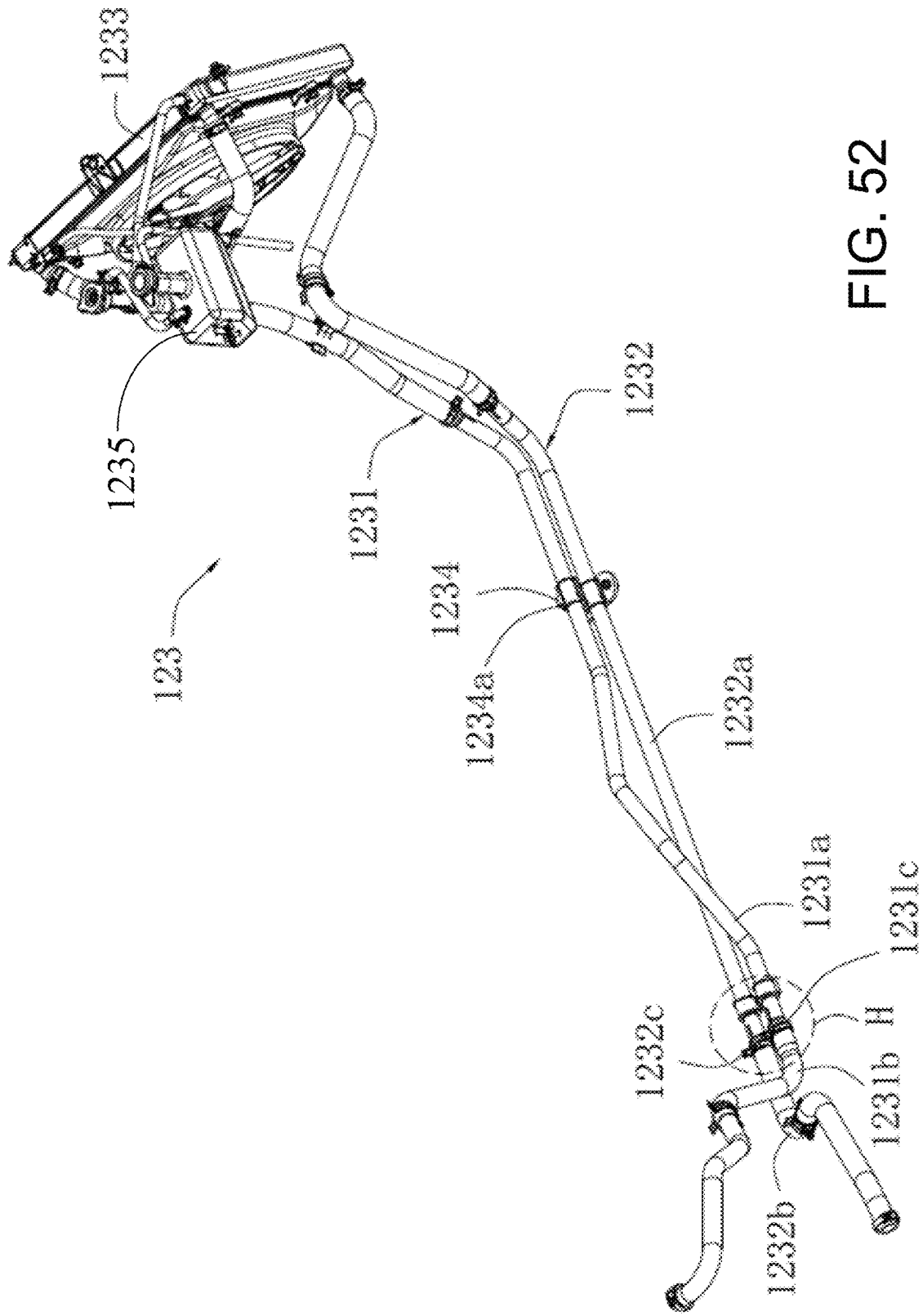
FIG. 52 is a right top perspective view of a preferred engine cooling system for the vehicle of FIG. 1.
Figure 53:
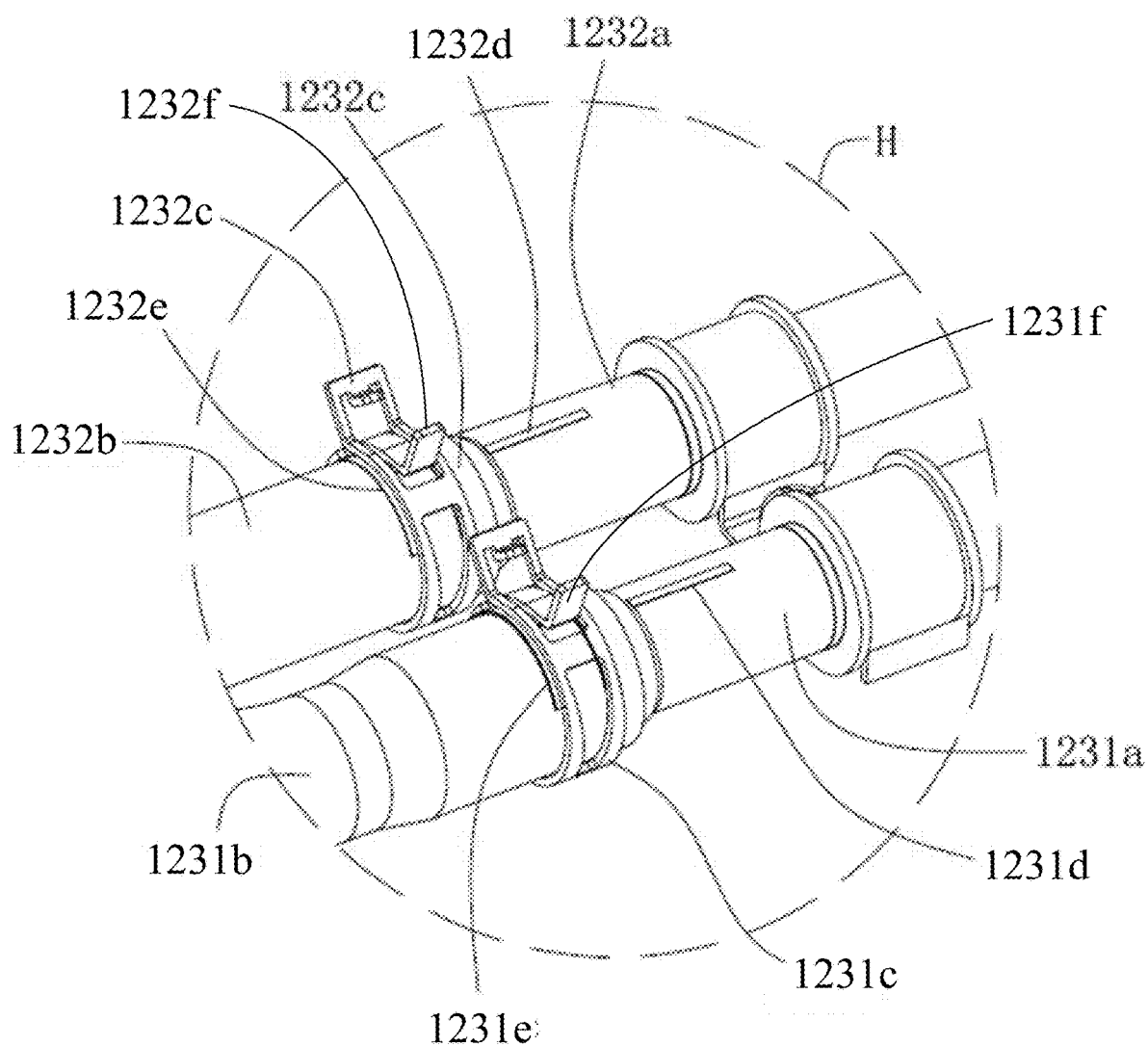
FIG. 53 is an enlarged view of part H in FIG. 52.
Figure 54:
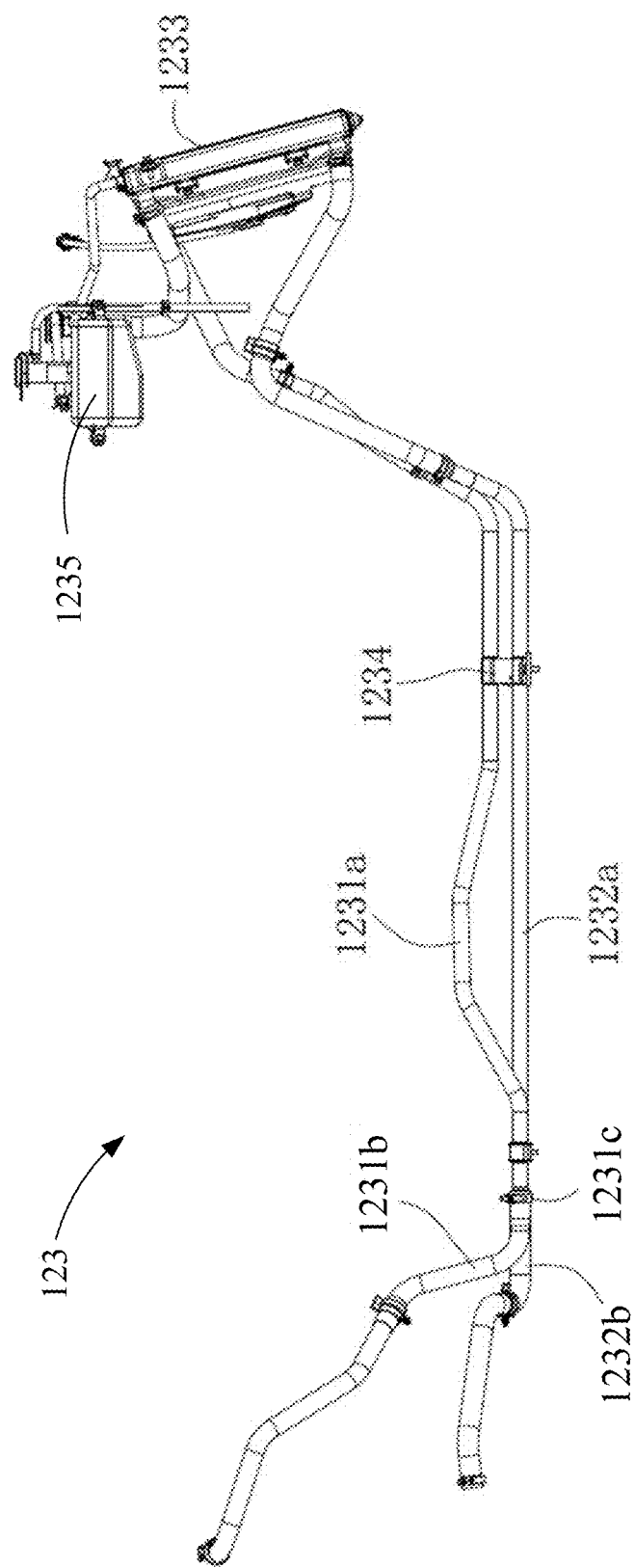
FIG. 54 is a right side view of the cooling system of FIG. 52.

FIGS. 52-54 show a cooling system 123 which is connected to the engine 121 to cool the internal combustion engine 121 of the vehicle 100. The cooling system 123 includes a coolant inlet pipe 1231, a coolant return pipe 1232, a coolant overflow tank 1235, and a radiator 1233.

Correspondingly, the engine 121 defines a coolant inlet (not shown) in fluid communication with the coolant inlet pipe 1231 and a coolant outlet (not shown) in fluid communication with the coolant return pipe 1232. The coolant overflow tank 1235 is mounted in the middle of the front frame portion 1111 to accommodate coolant and provide coolant for the delivery of the coolant return pipe 1232. The coolant may be water or a refrigerant such as anti-freeze. After heat exchange within radiator 1233, the coolant enters into engine 121 through coolant inlet pipe 1231 to cool the engine 121. Then, the coolant heated by the engine 121 enters the coolant return pipe 1232 and is transported to the radiator 1233 through the coolant return pipe 1232. The cooling system 123 further includes other components (not specifically called out) such as sensors, thermostats and actuators that work together to achieve heat dissipation/cooling of the engine 121. The cooling principle of the cooling system 123 is not further detailed here.

In the preferred embodiment, the radiator 1233 is located on the front frame portion 1111, and the coolant inlet pipe 1231 and the coolant return pipe 1232 extend in a front-rear direction of the off-road vehicle 100 back to the mounting location of the engine 121. The coolant inlet pipe 1231 and the coolant return pipe 1232 may be formed of aluminum, steel or rubber, or combinations thereof. Moreover, the coolant inlet pipe 1231 and the coolant return pipe 1232 may be split structures to facilitate the processing and manufacturing. In other embodiments, the coolant inlet pipe 1231 and the coolant return pipe 1232 may each be integrally manufactured.

Each pipe 1231, 1232 preferably includes multiple pipe segments, such as a front segment 1231a, 1232a firmly connected to a rear segment 1231b, 1232b using a fastener 1231c, 1232c best shown in FIG. 53. The fasteners 1231c, 1232c are sleeved at the connections between the front and rear pipe segments 1231a, 1232a, 1231b, 1232b.

In one embodiment, the front segments 1231a, 1232a are formed of rubber, and the rear segments 1231b, 1232b are formed of aluminum. Each rear pipe segment 1231b, 1232b extends into its corresponding front pipe segment 1231a, 1232a, and the rubber pipe is sealed with the aluminum pipe to avoid coolant leakage. In the preferred embodiment, the rear segments 1231b, 1232b each include at least two interconnected sections, and the axes of the two sections do not coincide. This helps to minimize twisting of each rear segment 1231b, 1232b, thus ensuring a sufficient safety distance between the rear segments 1231b, 1232b, i.e. avoiding contact and wear between the two pipes 1231, 1232. In one embodiment, the rear segment 1232b of the coolant return pipe 1232 includes an elbow pipe adjacent the fastener 1232c, and the rear segment 1231b of the coolant inlet pipe 1231 includes a straight pipe adjacent the fastener 1231c. In this way, the shape of the two pipe segments 1231b, 1232b makes a clear difference in order to facilitate material management. At the same time, the design of the elbow pipe can also give way to/traverse around other components on the frame 111 to make the frame 111 more compact as a whole.

The preferred embodiment orients the two fasteners 1231c, 1232c so as to avoid interference problems in installation between the fasteners 1231c, 1232c. Both fasteners 1231c, 1232c are preferably clamp structures with projections 1231f, 1232f. If the projections 1231f, 1232f of the two clamps 1231c, 1232c are arranged face-to-face, this will not only cause the distance between the adjacent coolant inlet pipes 1231 and the coolant return pipes 1232 to take up a large space, but also cause installation interference problems. The preferred embodiment helps to avoid such problems by adding longitudinal marks 1231d, 1232d on the front segments 1231a, 1232a, and by adding circumferential marks 1231e, 1232e on the rear segments 1231b, 1232b. During installation, the clamps 1231c, 1232c are longitudinally positioned to correspond with the circumferential marks 1231e, 1232e with the projections 1231f, 1232f lining up with the longitudinal marks 1231d, 1232d. It should be noted that the marks 1231d, 1232d, 1231e, 1232e may alternatively be both provided on the front segments 1231a, 1231a or both provided on the rear segments 1231b, 1232b. In this way, a staggered arrangement of the protruding portions 1231f, 1232f of the two clamps 1231c, 1232c can not only avoid installation interference, but also make the coolant inlet pipe 1231 and the coolant return pipe 1232 closer to each other to save space. The marks 1231d, 1232d, 1231e, 1232e can also be used to identify which pipe is the coolant inlet or return pipe, thus improving the installation effect. Furthermore, the longitudinal marks 1231d, 1232d, particularly if they extend on both the front segments 1231a, 1232a and both the rear segments 1231b, 1232b, can be used to quickly determine the assembly angle between the front segments 1231a, 1232a and the rear segments 1231b, 1232b to improve the assembly efficiency.

Each mark 1231d, 1232d, 1231e, 1232e may selected from the group consisting of color marks, groove marks, bulge marks, and combinations thereof as needed, with the most preferred embodiment using color marks. The marks 1231d, 1231e on the inlet pipe 1231 are a different color than the marks 1232d, 1232e on the return pipe 1232.

As shown in FIG. 52, the cooling system 123 also includes a plurality of attachment clips 1234. Each attachment clip 1234 includes openings 1234a for both the coolant inlet pipe 1231 and the coolant return pipe 1232 arranged at intervals. In the preferred embodiment, the openings 1234a of each attachment clip 1234 are oriented differently (such as one opening 1234a facing upwardly and one opening 1234a facing downwardly, or alternatively one opening 1234a facing to the left and one opening 1234a facing to the right), thus limiting the coolant inlet pipe 1231 and the coolant return pipe 1232 in different directions to prevent rotation of the coolant inlet pipe 1231 and the coolant return pipe 1232, thereby avoiding interference and friction between coolant inlet pipe 1231, coolant return pipe 1232 and surrounding components. In addition, as the coolant inlet pipe 1231 and the coolant return pipe 1232 need to extend the majority of the vehicle length, the coolant inlet pipe 1231 and the coolant return pipe 1232 will be relatively long. Therefore, a plurality of attachment clips 1234 are generally clamped at intervals along the length.

The off road vehicle 100 includes a fuel supply system 124 connected to the engine 121 to provide fuel for the internal combustion engine 121, which is shown in FIGS. 55 to 62. The fuel supply system 124 includes a fuel tank 1241 with a filler neck 1242. A floater 1243 (shown schematically in FIGS. 59 and 62) may be located in the fuel tank 1241 for detecting the amount of fuel in the fuel tank 1241.

Figure 56:
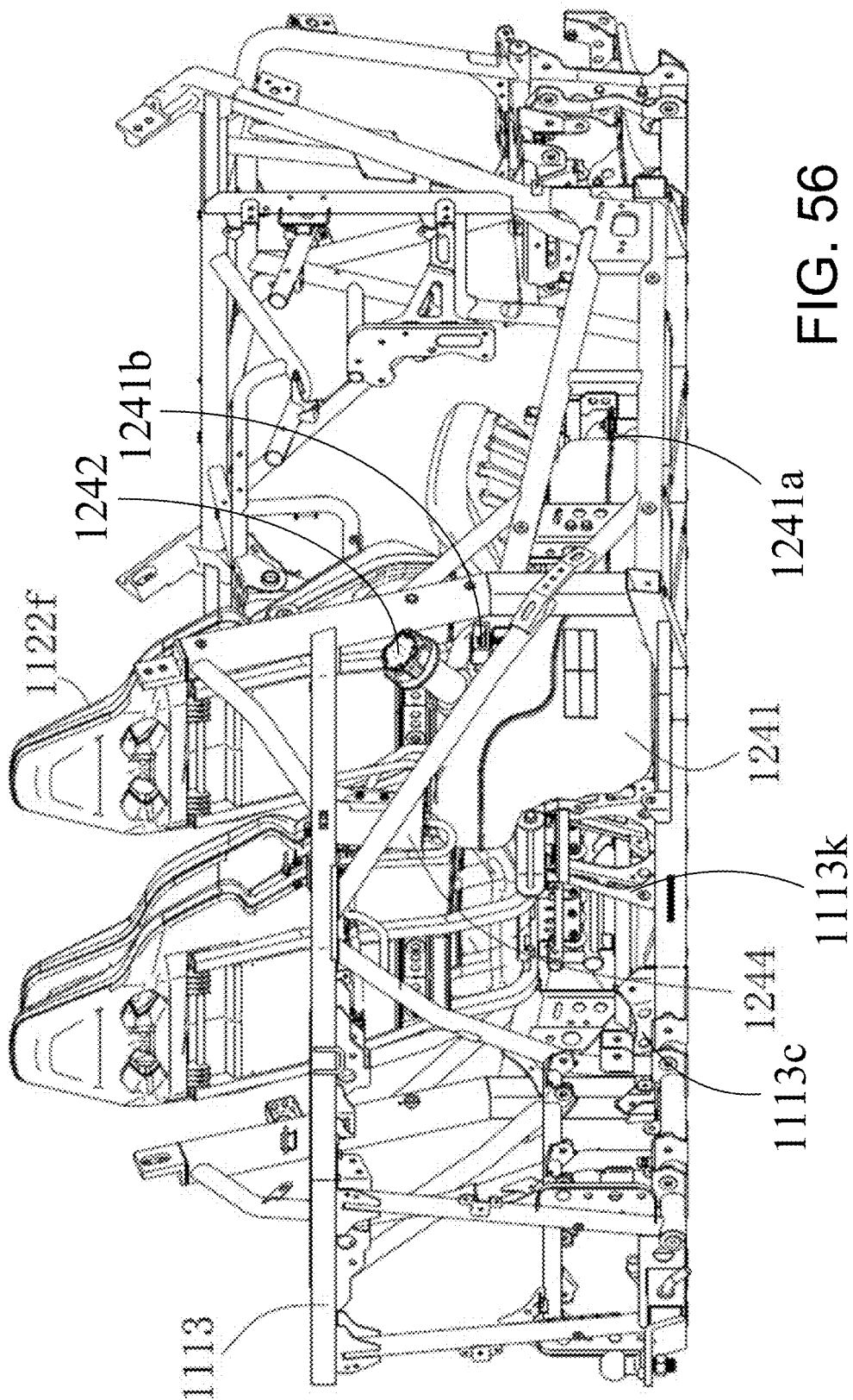
FIG. 56 is a right rear perspective view of the fuel supply system, frame and seats of FIG. 55, also showing multiple different potential positions of the driver's seat back.

The fuel supply system 124 may also include a carbon recirculation canister 1244 shown in FIG. 56, which is used to absorb or store volatile fuel vapor from the fuel tank 1241. When the off-road vehicle 100 is started, the absorbed fuel vapor is re-entered into the intake manifold 1411 of the engine 121 and burned to achieve fuel economy and environmental protection. The carbon recirculation canister 1244 is preferably located vertically above fuel tank 1241. The relatively high position of the carbon recirculation canister 1244 helps to keep liquid fuel from flowing from the fuel tank 1241 into the carbon recirculation canister 1244, and also helps to keep water from entering the carbon recirculation canister 1244 and affecting the normal operation of the engine 121. In the preferred embodiment, the carbon recirculation canister 1244 is mounted on the rear frame portion 1113 and is located on the inner side of the rear side plate 1123bc (shown in FIGS. 19-21). In this way, the carbon recirculation canister 1244 can have a relatively clean working environment which prolongs the service life of the carbon recirculation canister 1244. At the same time, the repair and replacement of carbon recirculation canister 1244 can also be realized by removing one of the rear side plate 1123bc.

Figure 55:
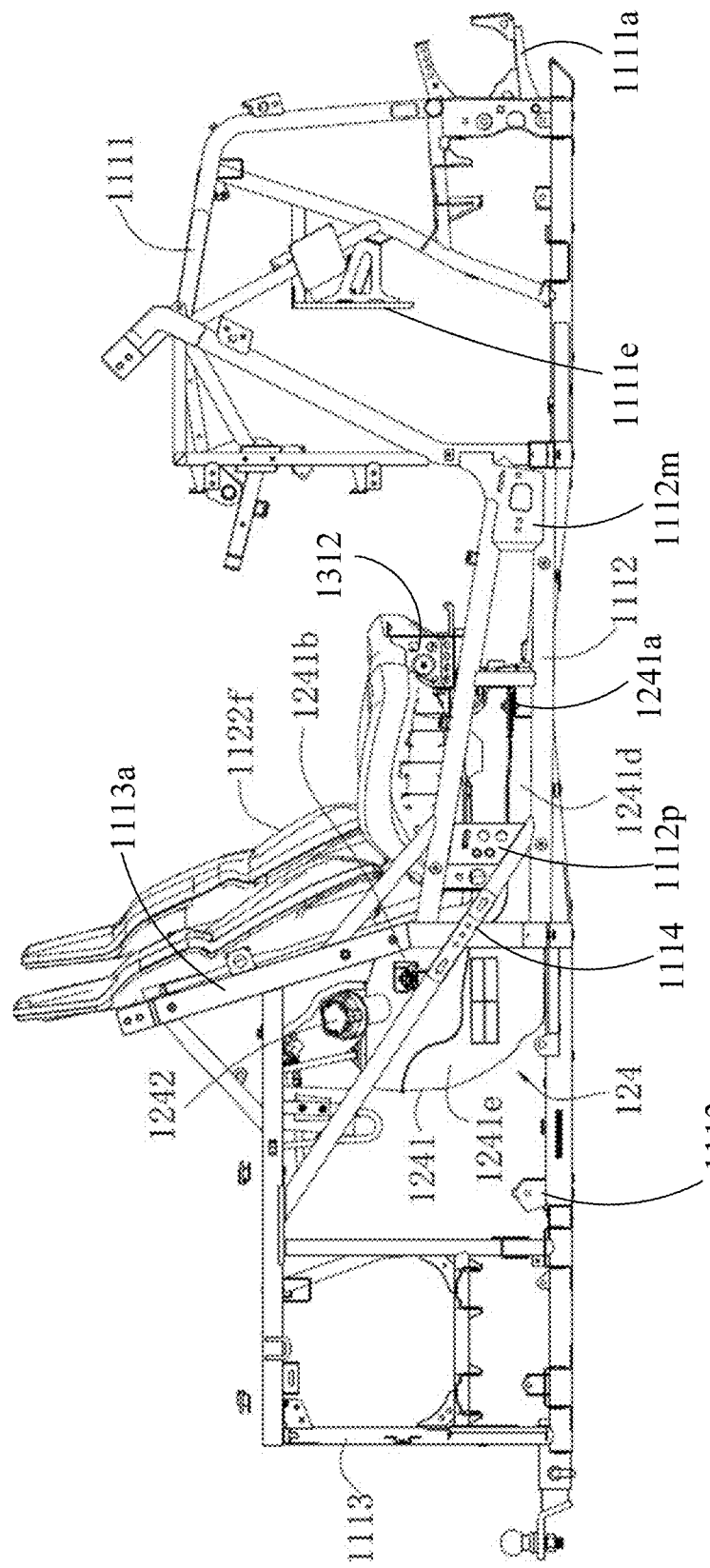
FIG. 55 is a right side view of showing a preferred fuel supply system relative to the frame and seats of the vehicle of FIG. 1.

The fuel tank 1241 is preferably positioned in part under the seat 1122f and in part behind the seat 1122f, on the same side of the vehicle 100 as the engine 121, which in the preferred embodiment is on the passenger's side. As shown by the comparison of FIGS. 55 and 56, the rear extent of the fuel tank 1241 is preferably slightly further rearward than the front engine support bracket 1113k. This positioning leads to a short distance for the fuel lines. The fuel tank 1241 when full of fuel is a relatively heavy component on the vehicle, and this positioning also leads to a low center of gravity of the vehicle 100 which is well longitudinally and transversely centered (particularly when the fuel tank transversely offsets the weight of the battery pack 192 as further described with reference to FIGS. 109-114).

While positioning of the fuel tank 1241 can be achieved in many ways, the connection between the fuel tank 1241 and frame 111 preferably uses at least three connection points not on the same horizontal plane. Such a multipoint/different elevation connection makes installation of the tank 1241 stable and secure. In the preferred embodiment, the front end of the fuel tank 1241 defines two orientation holes 1241a, with each orientation hole 1241a being connected to the frame 111 by bolts, screws, or the like thus providing two of the connection points. A side face of the rear end of the fuel tank 1241 is provided with an attachment bracket 1241b. One end of the attachment bracket 1241b is welded or threaded to the frame 111, and the other end is connected to the fuel tank 1241 by screw or other components as a third connection point. In this way, the fuel tank 1241 is secured by a three-point positioning method, so as to keep the fuel tank 1241 from shaking relative to the frame 111. The orientation holes 1241a are preferably oblong or waist-shaped; which portion of each orientation hole 1241a is used determines the exact connection point between fuel tank 1241 and frame 111. In other words, the oblong or waist-shape orientation holes 1241 allow the position of the tank 1241 relative to the frame 111 to be adjusted to compensate for installation error between tank 1241 and frame 111. The connection between the attachment bracket 1241b and the fuel tank 1241 can also be adjustable to allow for multidirectional tank adjustment to meet more accurate installation. In other embodiments, there may be more connection points between the fuel tank 1241 and the frame 111, such as four, five or more.

Figure 57:
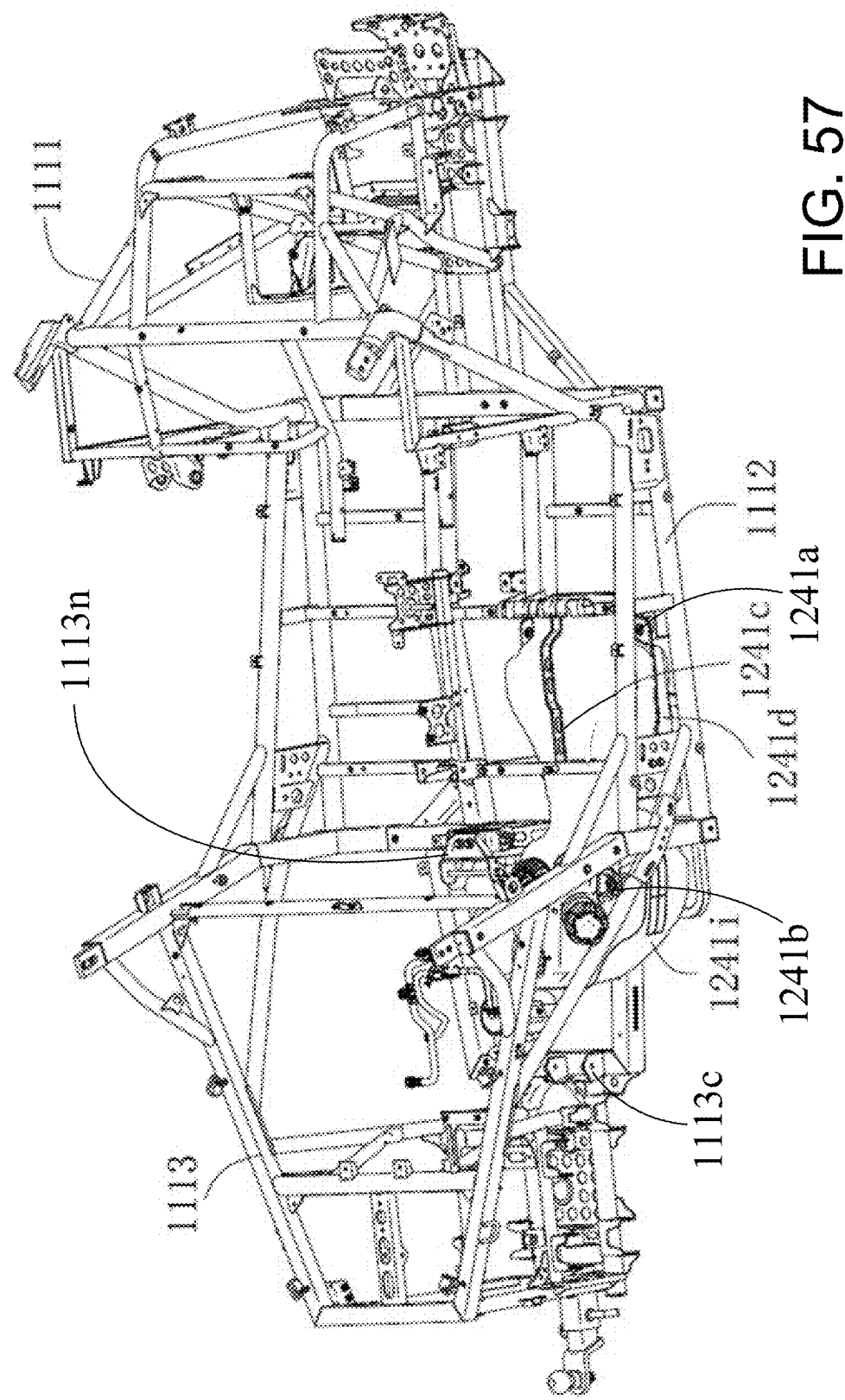
FIG. 57 is a top right perspective view of the fuel supply system and frame of FIGS. 55 and 56.

As shown in FIG. 57, the surface of the fuel tank 1241 is also provided with a pressure rod 1241c (also shown in FIG. 64), which is positioned vertically above the fuel tank 1241 and is fixed on the rear frame portion 1113 and against the fuel tank 1241 to press the fuel tank 1241 tight on the rear frame portion 1113. In this way, the fuel tank 1241 is further limited from different locations in combination with three-point positioning to improve the reliability and stability of the fuel tank 1241 installation and to avoid tank shaking.

Figure 58:
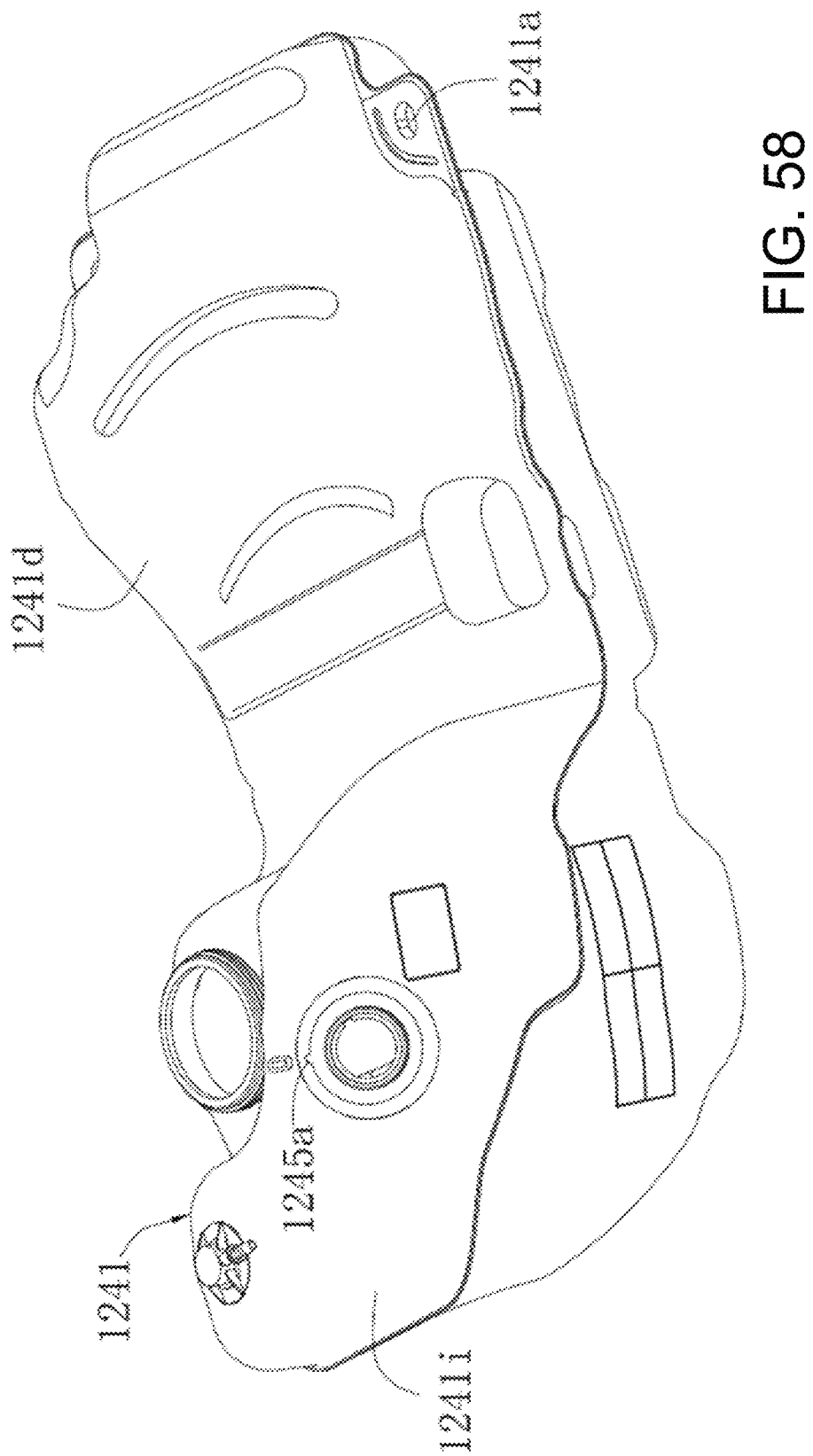
FIG. 58 is a top right perspective view of the fuel tank used in the fuel supply system of FIGS. 55-57.

As shown in FIGS. 55, 57 and 58, the fuel tank 1241 includes a lower tank portion 1241d and an upper tank portion 1241i collectively defining an L-shaped tank. The L-shape increases the volume of the fuel tank 1241 while also making full use of the vertical and horizontal space of the frame 111, effectively saving the space in the interior of the frame 111 and making the structure more compact. The upper tank portion 1241i is located vertically above the lower tank portion 1241d, and the filler neck 1242 connects to the upper tank portion 1241i. The fuel line to the engine 121 is connected to the lower tank portion 1241d. The two orientation holes 1241a are preferably located on the lower tank portion 1241d. The attachment bracket 1241b may be welded to either the lower tank portion 1241d or the upper tank portion 1241i. At least part of the lower tank portion 1241d is vertically below the seat 1122f, and the upper tank portion 1241i is behind the seat 1122f. In this way, the L-shape of the fuel tank 1241 matches the shape of the seat 1122f, making full use of the area under and behind the seat 1122f, which effectively increases the volume of the fuel tank 1241 while keeping the vehicle 100 compact.

Figure 59:
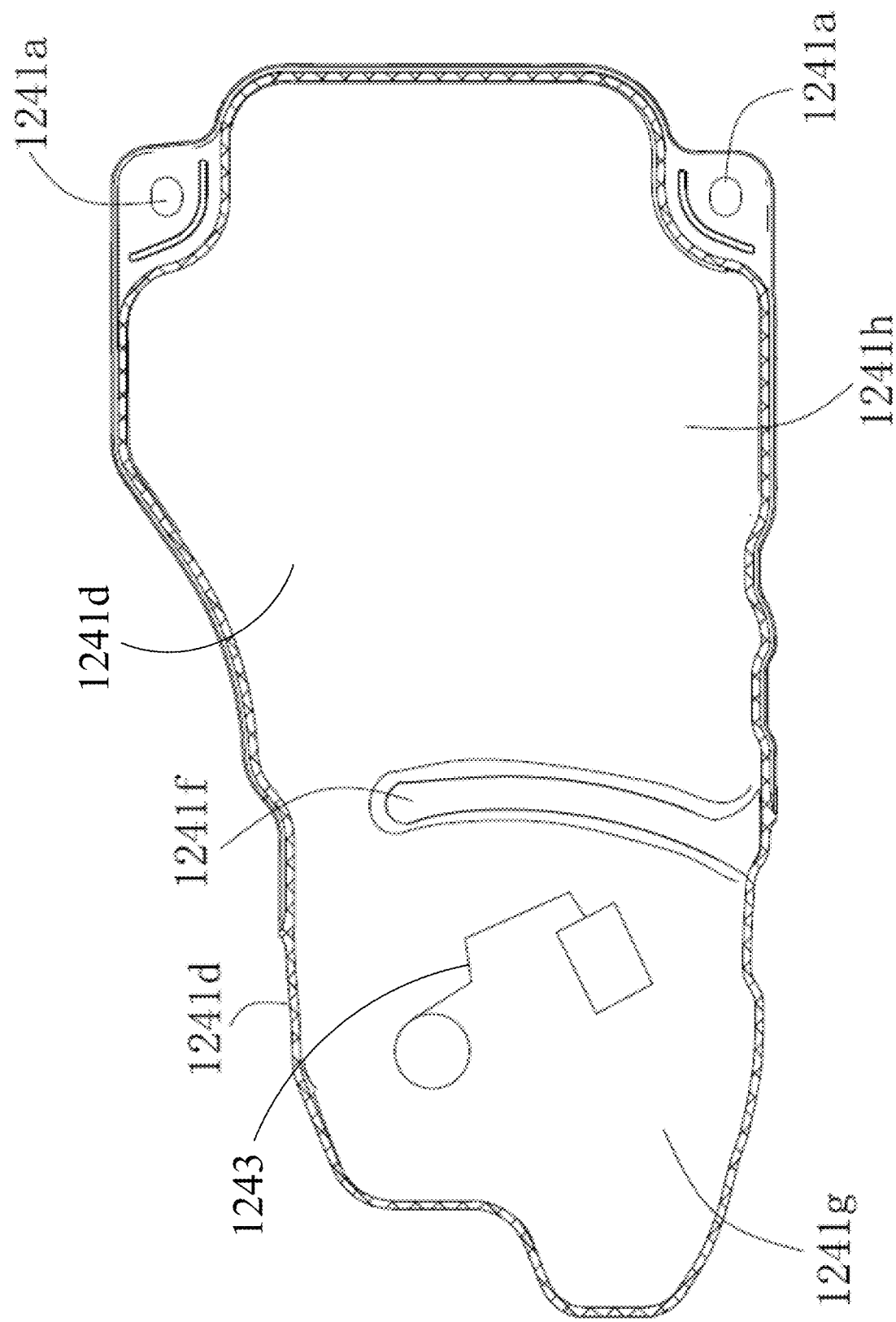
FIG. 59 is a cross-sectional plan view of the fuel tank of FIG. 58.

As shown in FIG. 59, the bottom of the lower tank portion 1241d is provided with one or more ribs 1241f. The rib 1241f separates the bottom of the lower tank portion 1241d into a rearward area 1241g and a forward area 1241h internally connected to each other. The fuel line to the engine 121 may be connected to the lower tank portion 1241d internally in either the rearward area 1241g or the forward area 1241h. The rib 1241f blocks fuel at the bottom of the lower tank portion 1241d, effectively ensuring that there will always be fuel in the area where the engine 121 draws fuel during cornering, downhill, bumps and other conditions, thus continuously supplying the engine 121 and improving the stability of the power output for the engine 121. At the same time, the rib 1241f effectively improves the structural strength of the fuel tank 1241.

Figure 60:
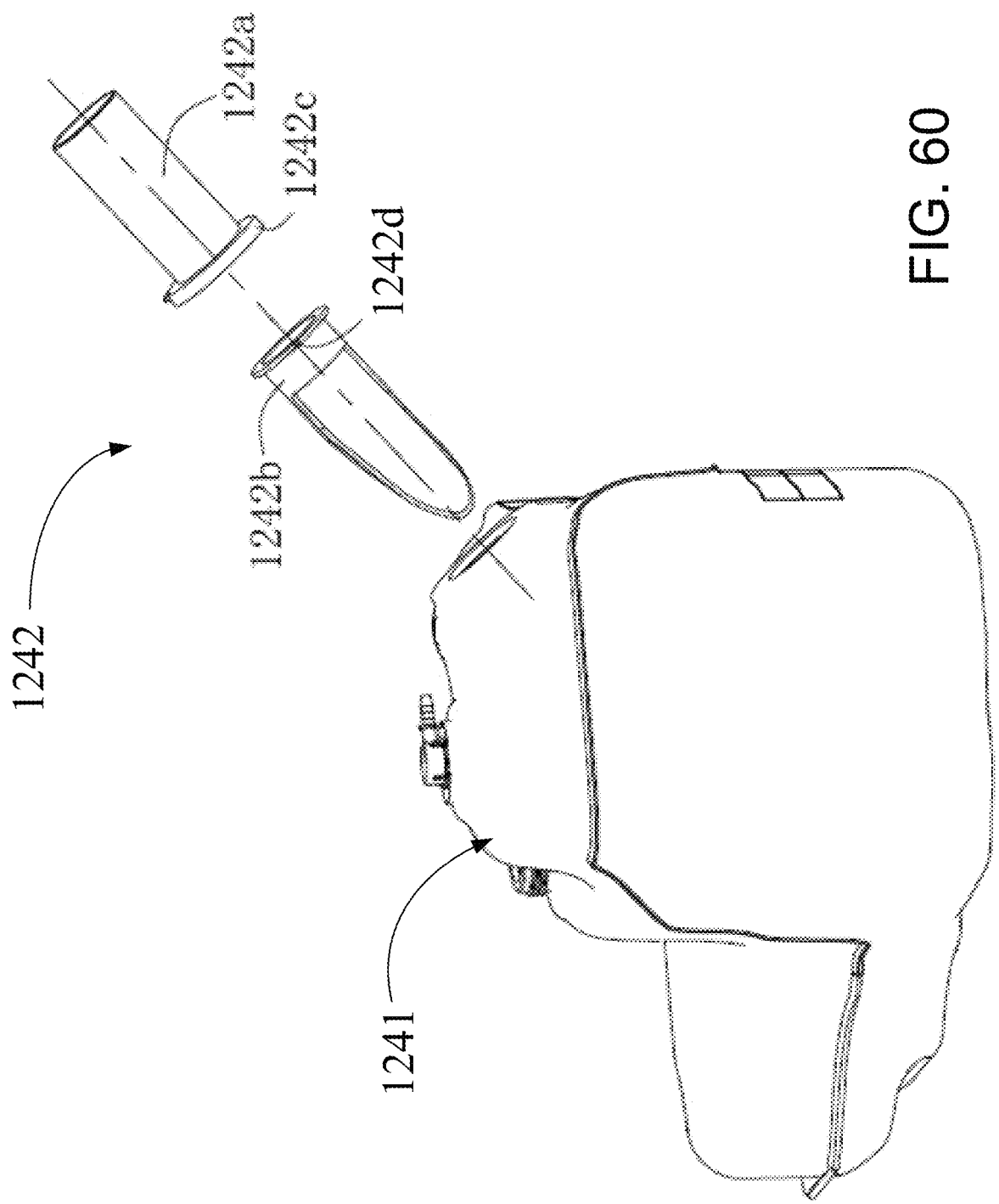
FIG. 60 is an exploded rear view of the fuel tank of FIGS. 57 and 58.
Figure 61:
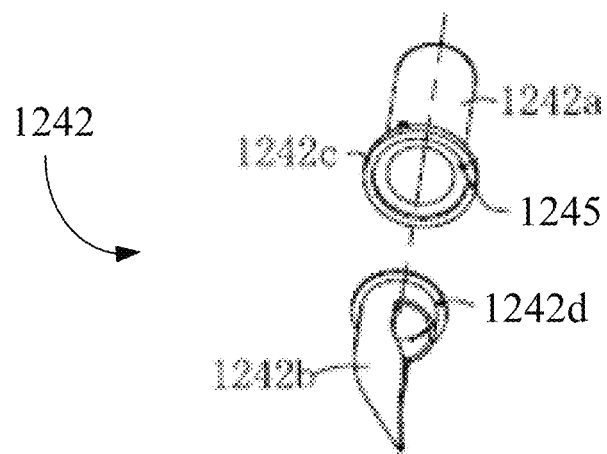
FIG. 61 is a left side exploded view of filler neck used in the fuel tank of FIGS. 57-60.
Figure 62:
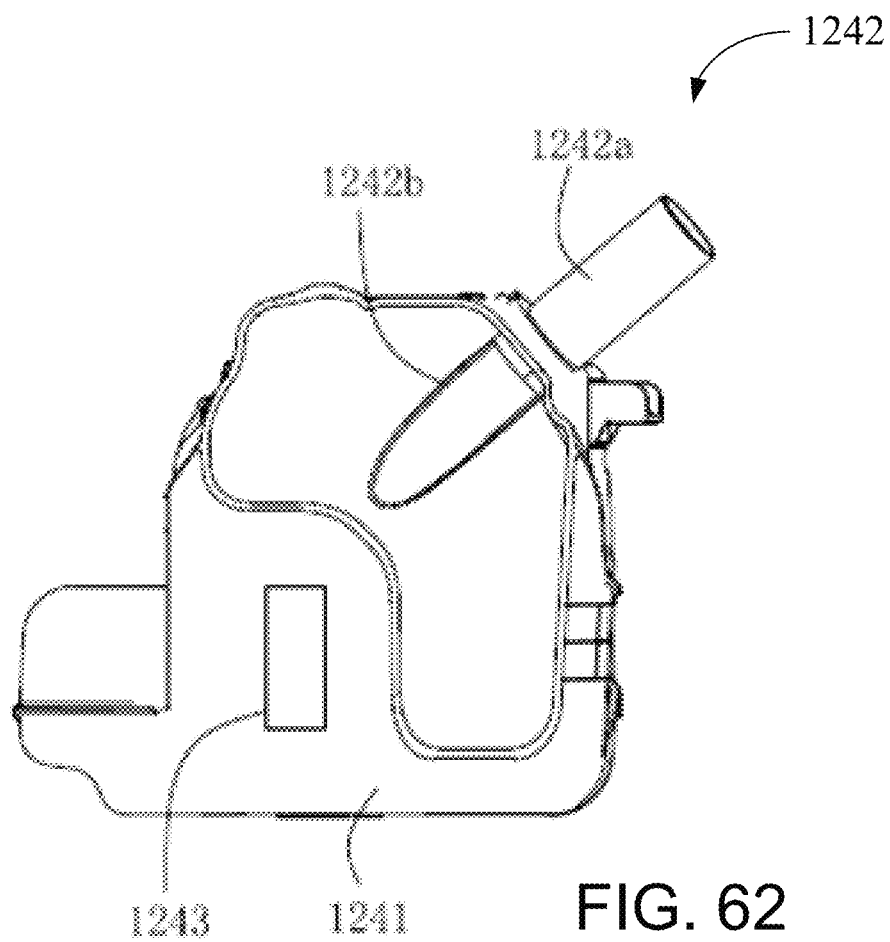
FIG. 62 is cross-sectional rear view of the fuel tank of FIGS. 57-61.

As shown in FIGS. 60-62, the filler neck 1242 includes at least an upper filler tube 1242a and a lower filler tube 1242b, with at least part of the upper filler tube 1242a outside the fuel tank 1241 serving as a fuel filling orifice. For instance, the fuel filling orifice of the filler neck 1242 is preferably located as shown in FIG. 55, accessible from outside the vehicle 100 above the reinforcement structure 1114 and behind the B-pillar base leg 1113a. The lower filler tube 1242b is connected to the upper filler tube 1242a and is at least partially located inside the fuel tank 1241. The lower end of the lower filler tube 1242b serves as a fuel inlet directing fuel away from the floater 1243. In this way, when filling with fuel, the fuel can avoid impacting the floater 1243, which helps avoid damaging the floater 1243 and maintains the accuracy of the quantitative indication on the fuel gauge on the dashboard.

In the preferred embodiment, the lower filler tube 1242b is an elbow and the bending direction of the elbow deviates from the floater 1243 to keep the fuel outlet of the elbow away from the floater 1243 or offset with the floater 1243. The lower filler tube 1242b may be a curved pipe, L-shaped pipe or special-shaped pipe. The upper filler tube 1242a and the lower filler tube 1242b are interconnected. The upper filler tube 1242a is preferably welded or otherwise rigidly joined to the fuel tank 1241 so that the filler neck 1242 is integrally secured to the fuel tank 1241.

The upper filler tube 1242a and lower filler tube 1242b are preferably connected by an interference fit, but may alternatively be connected by welding or by a threaded connection. The upper filler tube 1242a and/or the lower filler tube 1242b or both are preferably connected to the fuel tank 1241 by welding. As shown in FIG. 61, a gasket or seal 1245 is provided between the lower filler tube 1242b and the upper filler tube 1242a. When the upper filler tube 1242a and the lower filler tube 1242b are connected, the gasket 1245 ensures the reliability of the connection between the upper filler tube 1242a and the lower filler tube 1242b. For instance, the gasket 1245 may be positioned within a shoulder 1242c of the upper filler tube 1242a, sealing against a shoulder 1242d of the lower filler tube 1242b. The interference fit between the inside of the shoulder 1242c of the upper filler tube 1242a against the outside of the shoulder 1242d of the lower filler tube 1242b also maintains the position of the upper filler tube 1242 and the lower filler tube 1242b relative to each other and relative to the fuel tank 1241. If desired, the upper filler tube 1242a and the lower filler tube 1242b may include a keyed connection (such as a bump mating into a similarly sized/shaped indentation, shown at 1245a on FIG. 58), including a keyed connection to the fuel tank 1241, to establish and ensure the circumferential orientation of the lower filler tube 1242b relative to the upper filler tube 1242a and/or fuel tank 1242.

Figure 63:
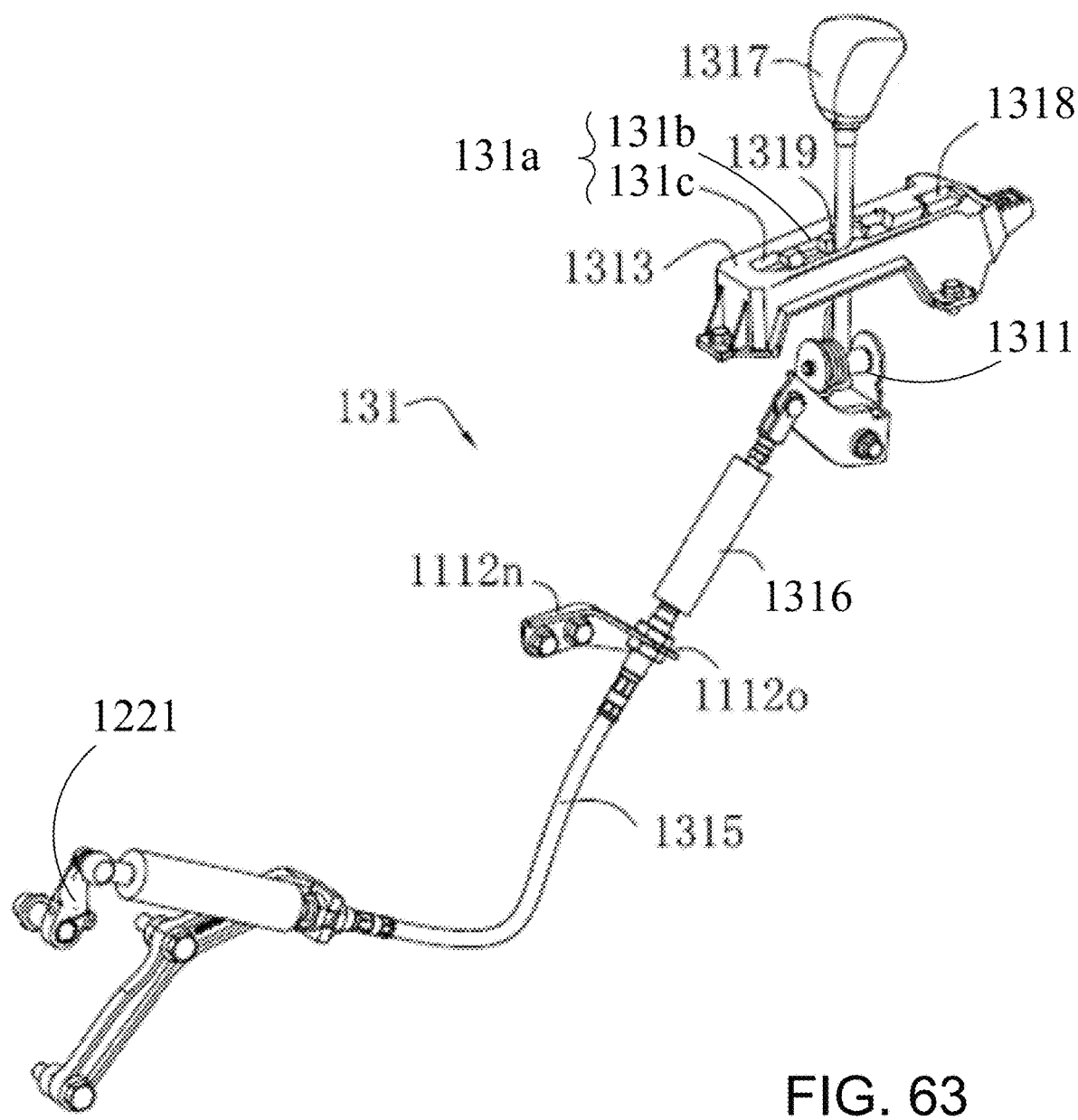
FIG. 63 is a right side perspective view of a preferred gear selection mechanism used in the vehicle of FIG. 1.
Figure 64:
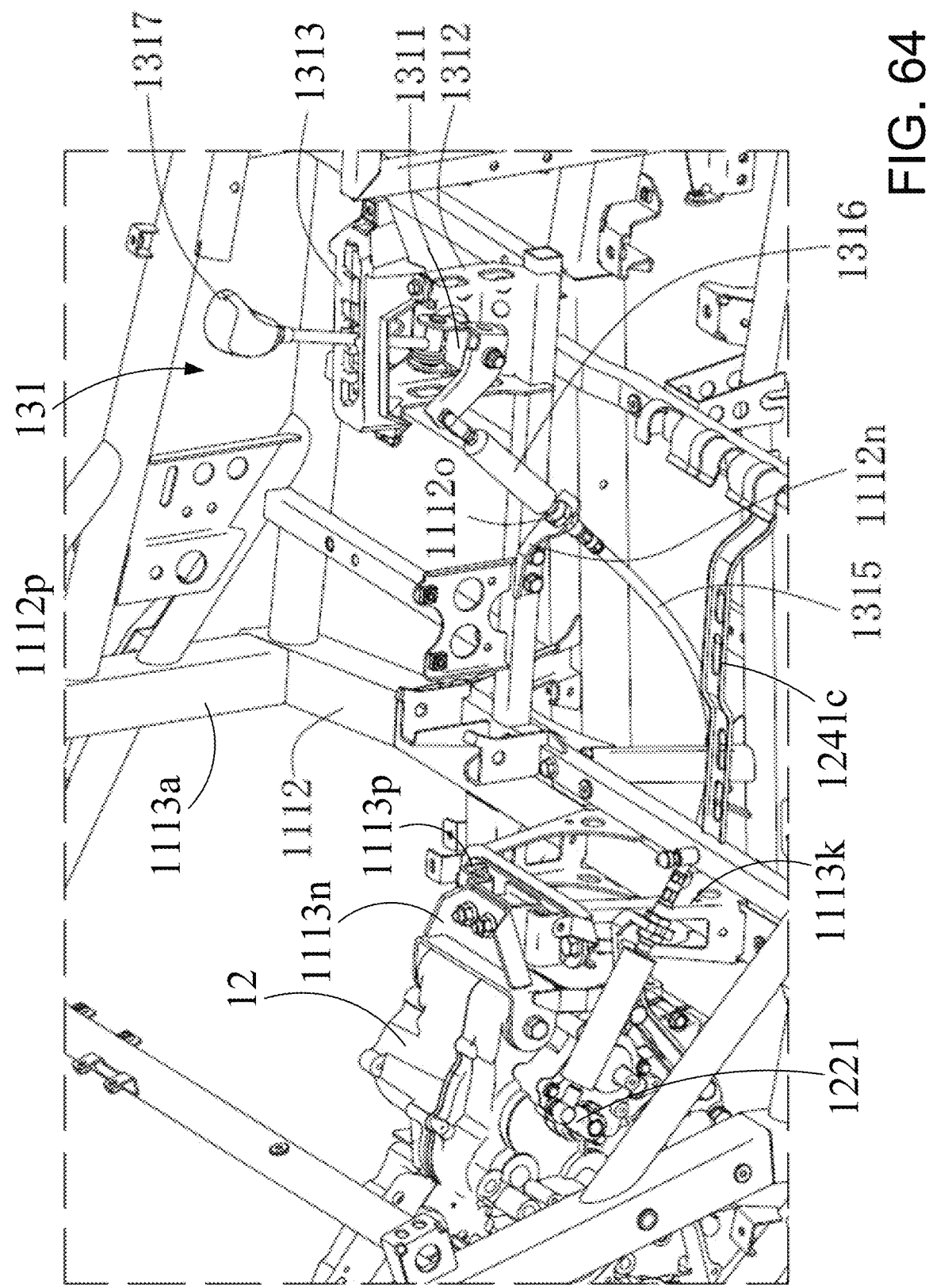
FIG. 64 is a right side perspective view of the gear selection mechanism of FIG. 63 mounted relative to a portion of the frame of FIGS. 2 and 3.
Figure 65:
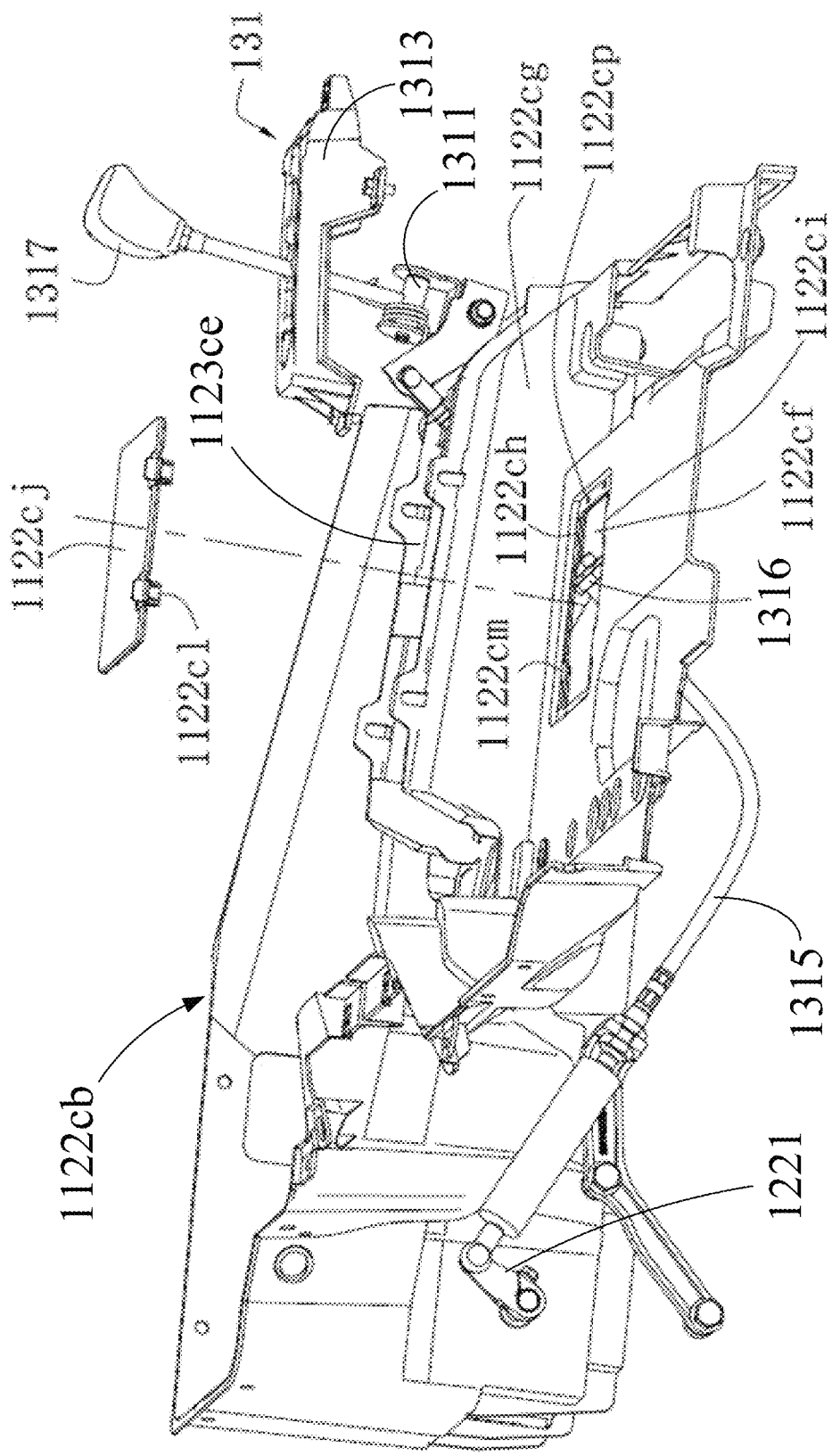
FIG. 65 is an exploded right side perspective view of relative position relationship between the gear selection mechanism of FIGS. 63 and 64 and the underseat portion of the bottom plate of FIGS. 27 and 28.

The off-road vehicle 100 is controlled via a vehicle manipulation system 13 called out in FIG. 1, which includes a gear selection mechanism 131 shown in FIGS. 63-65. One end of the gear selection mechanism 131 includes a shift lever 1317 extending inside the cabin 1121 for the driver to operate and shift. The other end of the gear selection mechanism 131 includes a rocker arm 1221 of the transmission 122. The shift lever 1317 pivots relative to a shifter base 1311 which is used to mount the shift lever 1317 from the middle frame portion 1112. The shifter base 1311 is mounted so as locate the shift lever 1317 along the centerline of the vehicle 100, on the side of the driver's seat 1122f to facilitate the driver's switching of gears. A shift cable 1315 extends from the shifter base 1311 to the transmission 122, and is used to move the rocker arm 1221 based upon movement of the shift lever 1317. The shift cable 1315 preferably extends just outside the front engine support bracket 1113k as shown in FIG. 64, leaving the space for the front drive shaft (not shown) unimpeded.

The gear selection mechanism 131 includes at least a reverse gear 1319 and at least one forward gear 131a, and more preferably includes a park gear 1318, a reverse gear 1319, a low forward gear 131b and a high forward gear 131c. The reverse gear 1319 is arranged in front of the forward gear(s) 131a. This rearward positioning of the forward gear(s) 131a, together with the position at which the shifter base 1311 is mounted, helps to avoid collision between the shift lever 1317 and the driver during normal driving of off-road vehicle 100. In particular, the rearward positioning of the forward gear(s) 131a helps to avoid the driver's knee and/or leg from inadvertently bumping the shift lever 1317, which might otherwise cause the position of the shift lever 1317 to change and affect driving. In some embodiments, the forward gear(s) 131a is arranged at the backrest 1122fb of the seats 1122f, i.e., transversely in line with the where the seat cushion 1122fa and the seat backrest 1122fb come together. With this far rearward position of the forward gear(s) 131a, contact between the shift lever 1317 and the driver's body can be further reduced during driving, thereby avoiding any unintended change in the position of the shift lever 1317 and affecting driving. In the most preferred embodiment, the park gear 1318 is furthest forward, with the reverse gear 1319 immediately behind the parking gear 1318 and located between forward gear(s) 131a and the parking gear 1318. The forward gear(s) 131a most preferably include a low gear 131b and a high gear 131c, with the high gear 131c being rearward of the low gear 131b. In this way, gear shift and switch are clear, and shifting is more convenient and fast.

As shown in FIG. 64, the shifter base 1311 is mounted on a shifter connection bracket 1312 of the frame 111, with the shifter connection bracket 1312 also called out in FIGS. 2, 3, 9 and 55. The shifter connection bracket 1312 may be mounted on the middle frame portion 1112 by welding or screw connection. The shifter connection bracket 1312 is preferably also for mounting a shifter shield 1313, which can be considered part of the interior trim 1122. The shifter shield 1313 keeps dirt and debris off the shifter base 1311. The shifter shield 1313 preferably includes markings designating gears, such as "P", "R", "L" and "H" from front to back. It should be noted that the shifter connection bracket 1312 is directly mounted on the frame 111 and the shifter base 1311 of the gear shift lever 1317 is directly connected to the shifter connection bracket 1312, thus omitting components of existing systems such as a separate intermediate shifter base housing, which is not only simple in construction but also reduces costs by at least 30 percent. At the same time, since the shifter connection bracket 1312 and the gear shift lever 1317 are independent components, the shifter connection bracket 1312 may be fixed on the frame 111 in advance during manufacture/installation. In this way, when installing the gear shift lever 1317, the shifter base 1311 of the gear shift lever 1317 is directly mounted on the shifter connection bracket 1312. No additional sheet metal parts or supports are required. The connection is convenient, the structure is simple and the cost is low.

The shift cable 1315 preferably includes a shift cable adjuster 1316, preferably located at the forward end of the shift cable 1315 and adjacent the shifter base 1311. The shift cable adjuster 1316 allows adjustment of the tightness of the shift cable 1315 to compensate for the installation error of the gear shift lever 1317 and any loosening of the shift cable 1315 due to wear. For instance, the shift cable 1315 may include an internal wire within an external sheath, and the shift cable adjuster 1316 may include a threaded connection which can be rotationally tightened to shorten the length of the internal wire relative to the length of the external sheath. The preferred shift cable adjuster 1316 is mounted relative to the frame 111 with an adjuster support 1112n bolted to the middle frame portion 1112 as best shown in FIG. 64. As alternatives to a bolted connection, the adjuster support 1112n could be another type of removable connection such as a snap connection or the like. One end of the adjuster support 1112d is bolted to the frame 111, and the other end has a bayonet 1112o wherein the adjuster 1316 is inserted, thus realizing the installation of the adjuster 1316. In this way, the shift cable 1315 and the shift cable adjuster 1316 are fixed on the frame 111 at a desired location which can be selected and adjusted with high versatility.

Figure 66:
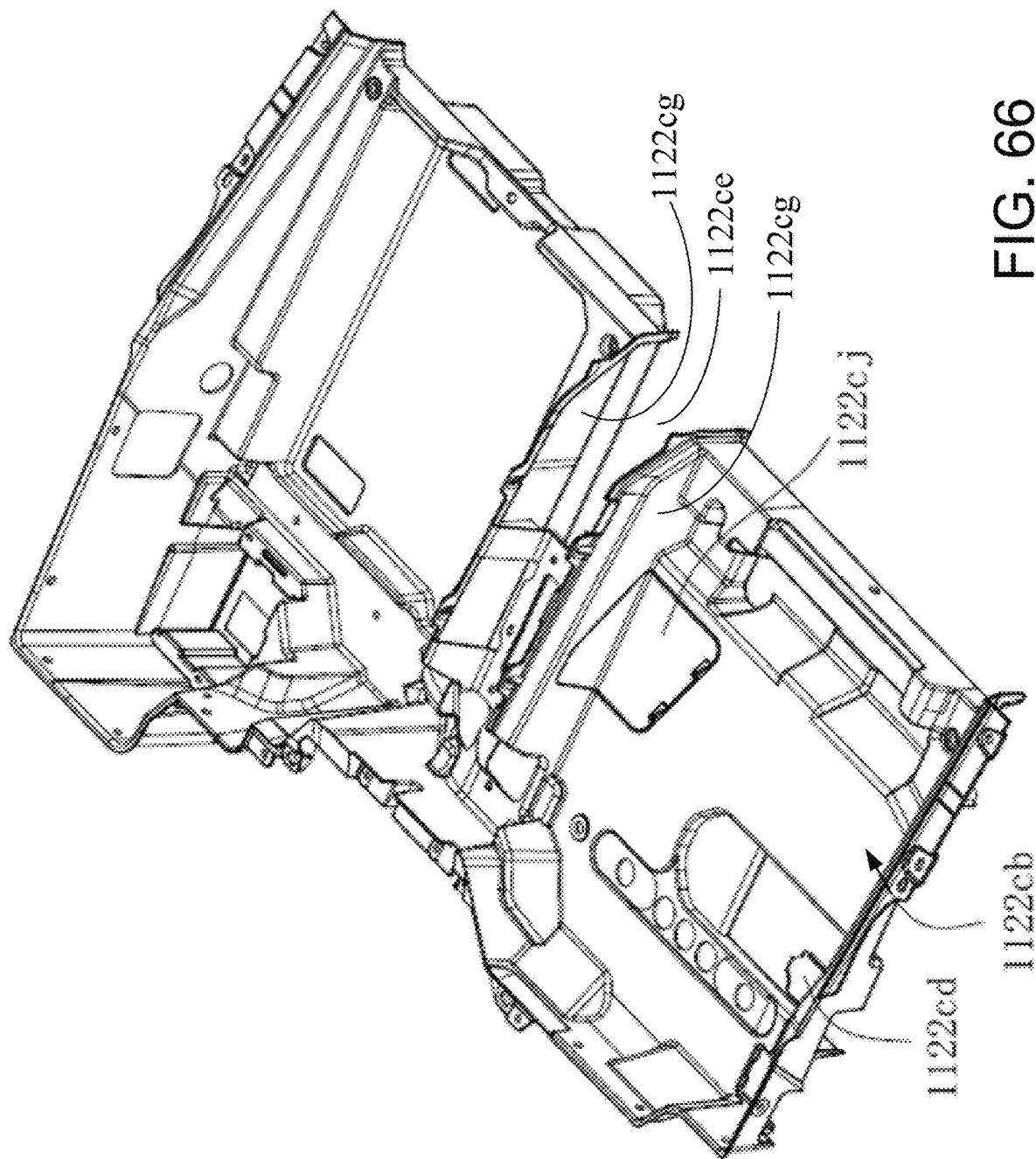
FIG. 66 is a front right top perspective view of the bottom plate underseat portion of FIGS. 27, 28 and 65.
Figure 67:
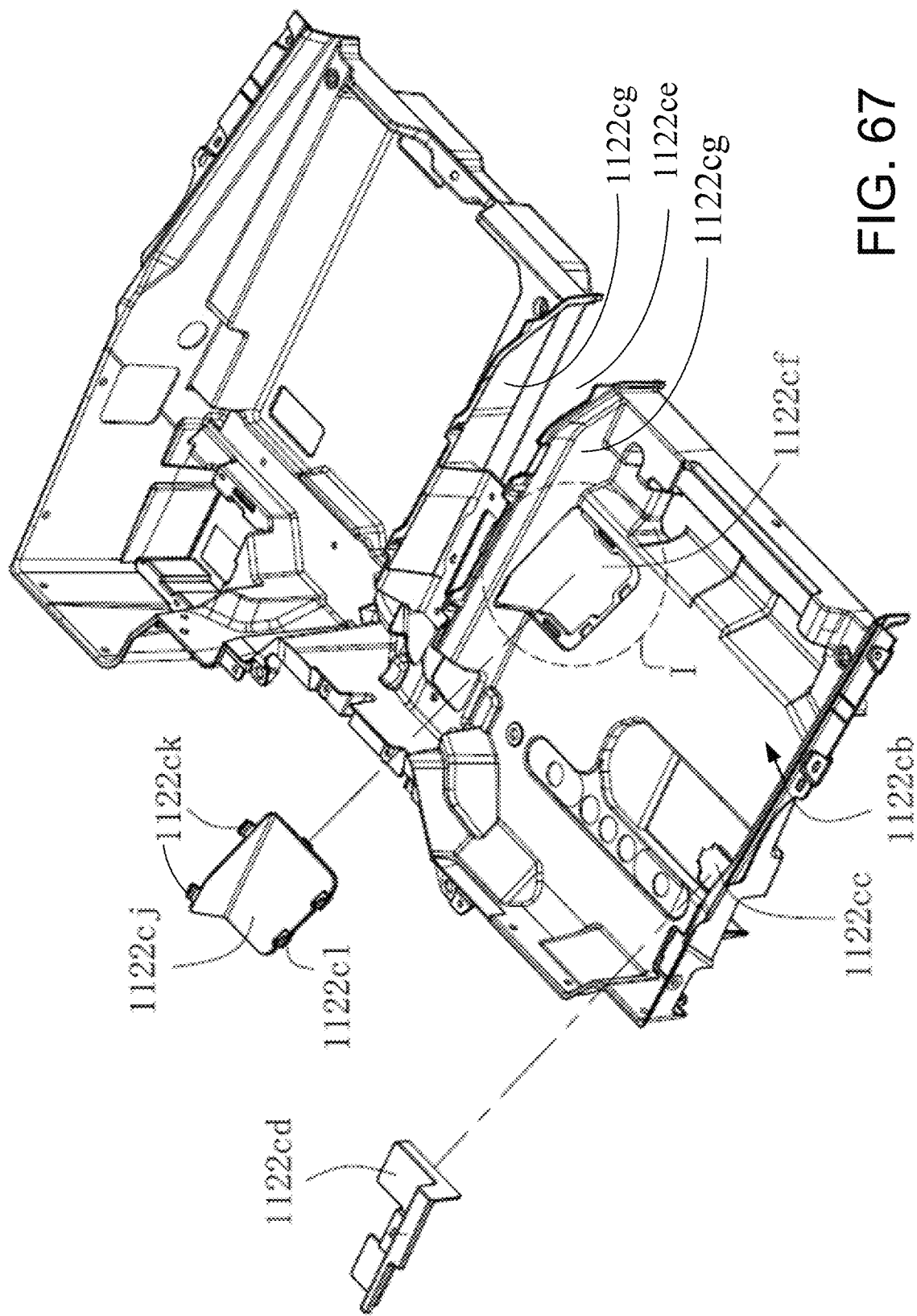
FIG. 67 is an exploded front right top perspective view of the bottom plate underseat portion of FIGS. 27, 28, 65 and 66.
Figure 68:
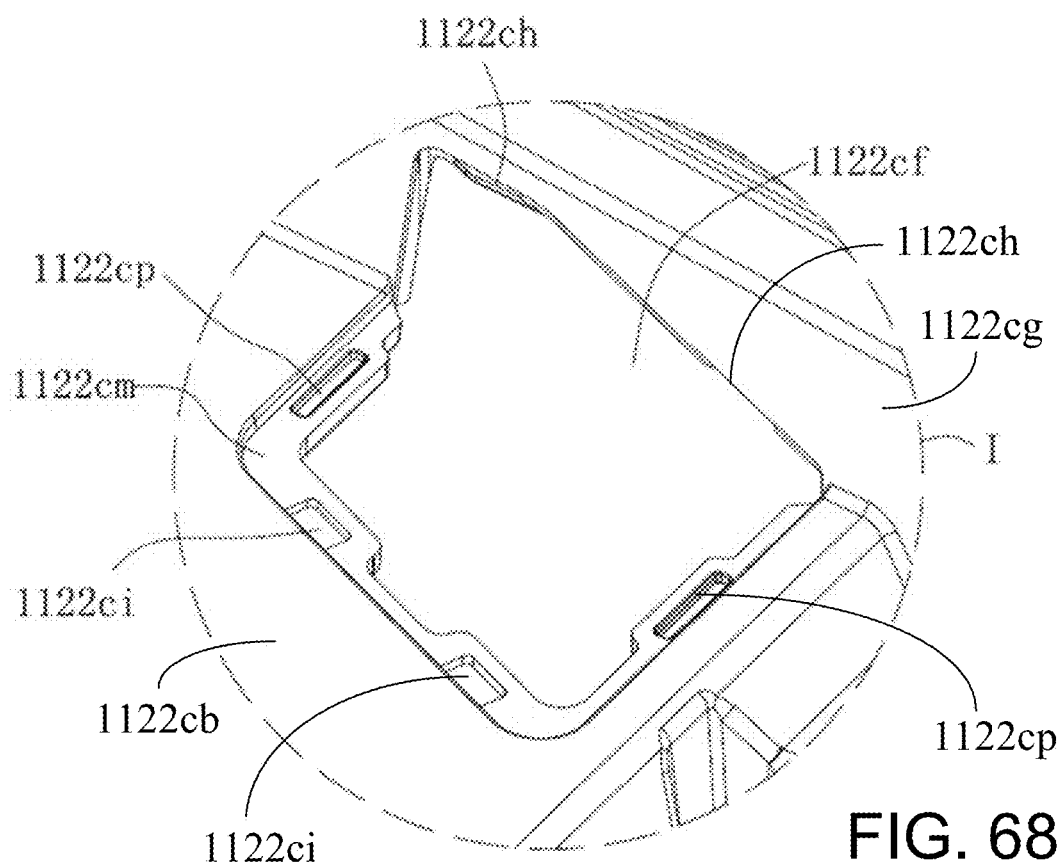
FIG. 68 is an enlarged view of part I in FIG. 67.
Figure 69:
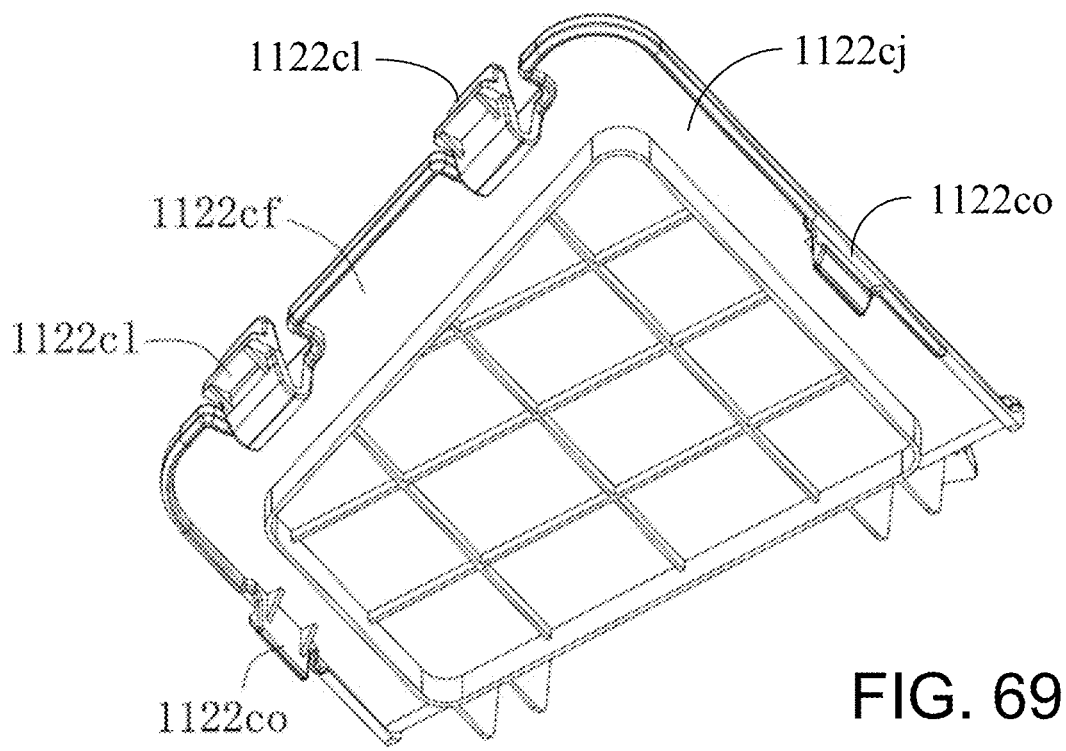
FIG. 69 is a bottom side perspective view of the adjuster cover plate used in the bottom plate underseat portion of FIGS. 27, 28 and 65-67.
Figure 70:
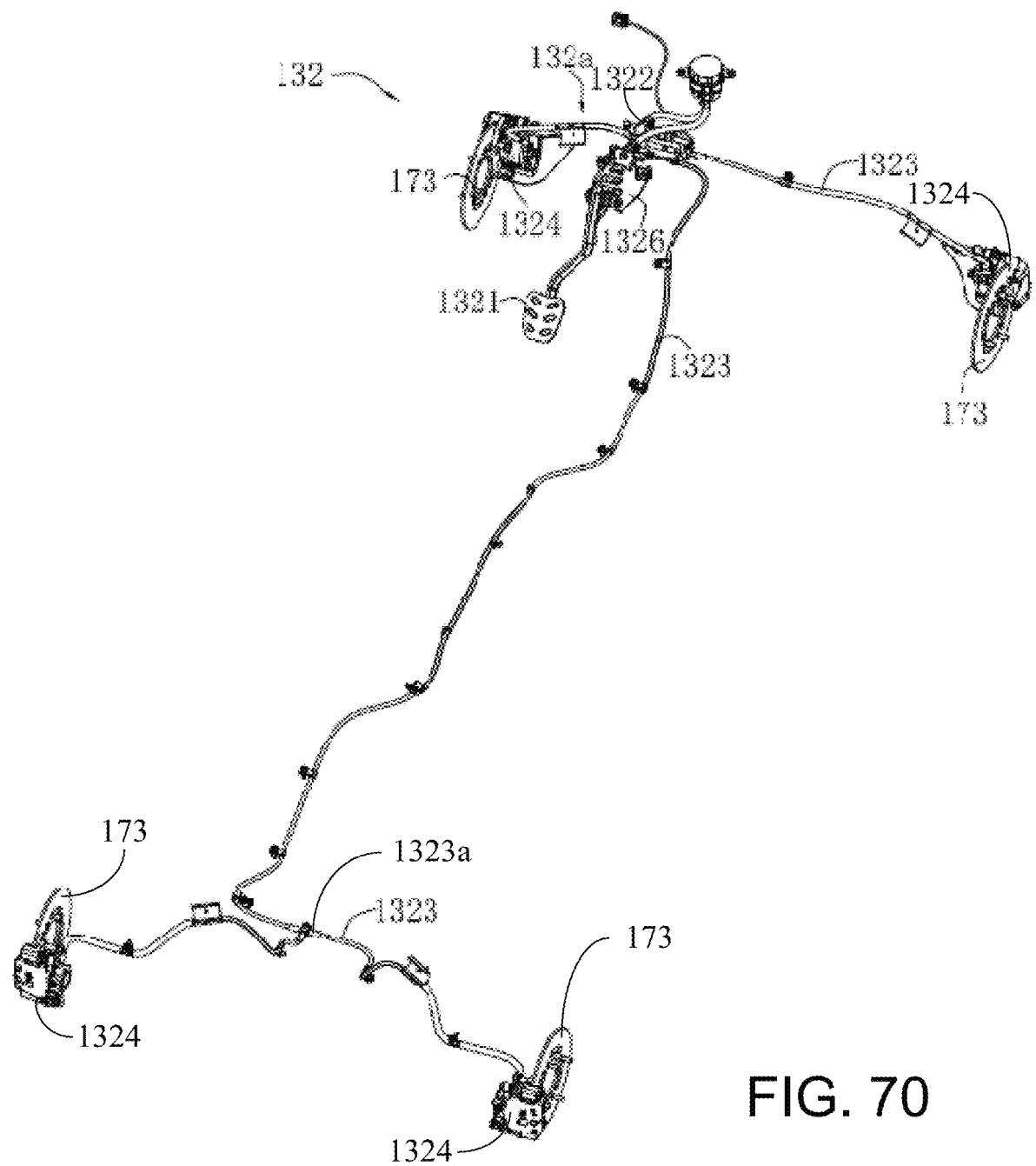
FIG. 70 is a rear top perspective view of a pedal-operated braking portion of a preferred braking system used in the vehicle of FIG. 1.

The underseat portion 1122cb of the bottom plate 1122c of the interior trim package 1122, shown in FIG. 28 as well as FIGS. 65-67, preferably defines at least two openings associated with the vehicle manipulation system 13, including a shifter mounting recess 1122ce and a shift cable adjuster access port 1122cf. At least part of the shifter connection bracket 1312 is located at the shifter mounting recess 1122ce. The shifter shield 1313 is arranged at the shifter mounting recess 1122ce. In an alternative embodiment, the shifter shield 1313 is connected to and an integral part of the bottom plate 1122c, making the structure more compact and aesthetically appealing.

The shift cable adjuster access port 1122cf corresponds to the position of the shift cable adjuster 1316. Maintenance personnel can repair and adjust the shift cable adjuster 1316 through the shift cable adjuster access port 1122*cf*. In this way, fast overhaul and adjustment of shift cable adjuster 1316 can be realized, thereby avoiding dismantling a large number of components. Use of the shift cable adjuster access port 1122*cf* is not limited to the overhaul of the shift cable adjuster 1316, but also to maintenance or replacement of all components located in this area.

The preferred underseat portion 1122*cb* includes two generally vertical, longitudinally and upwardly extending central walls 1122*cg* which define the shifter mounting recess 1122*ce*. In one preferred embodiment shown in FIG. 65, the bottom face of the underseat portion 1122*cb* of the bottom plate 1122*c* defines the entire shift cable adjust access port 1122*cf* to be planar and generally horizontal. In another preferred embodiment shown in FIG. 66-69, the side face of one of the central walls 1122*cg* and the bottom face of the underseat portion 1122*cb* of the bottom plate 1122*c* collectively define the shift cable adjuster access port 1122*cf* to have an L-shape. When not open for access, the shift cable adjuster access port 1122*cf* is blocked by an adjuster cover plate 1122*cj* so that the bottom plate 1122*c* is continuous in daily use of the vehicle 100.

The adjuster cover plate 1122*cj* is connected to the underseat portion 1122*cb* of the bottom plate 1122*c* by a removable structure to facilitate the disassembly and assembly, such as a bayonet structure or a threaded structure. More preferably, the adjuster cover plate 1122*cj* snaps into the underseat portion 1122*cb* using an interface snap connection best shown in FIGS. 67-69. The adjuster cover plate 1122*cj* preferably includes six tabs: two plug tabs 1122*ck* which mate into corresponding recesses 1122*ch* on the central wall 1122*cg*, two guide tabs 1122*co* which mate into corresponding guide slots 1122*cp* on the bottom of the underseat portion 1122*cb*, and two snap-fit tabs 1122*cl* which snap into corresponding snap openings 1122*ci* on the bottom of the underseat portion 1122*cb*. To install the adjuster cover plate 1122*cj* into the underseat portion 1122*cb*, the user hooks the plug tabs 1122*ck* underneath the recesses 1122*ch*, and then pivots the adjuster cover plate 1122*cj* downwardly until the snap-fits tabs 1122*cl* snap into the snap openings 1122*ci*. The guide tabs 1122*co* then hold the adjuster cover plate 1122*cf* in the front-rear direction. To remove the adjuster cover plate 1122*cj* from the underseat portion 1122*cb*, the user bends the snap-fit tabs 1122*cl* inwardly either by hand or with a tool such as a screwdriver, and then pulls upwardly to upwardly pivot the adjuster cover plate 1122*cj* outwardly from the shift cable adjuster access port 1122*cf*, before unhooking the plug tabs 1122*ck*. The preferred underseat portion 1122*cb* includes a recessed sink 1122*cm* which encircles the shift cable adjuster access port 1122*cf*, defines all the openings 1122*ch*, 1122*cp*, 1122*ci* and supports the adjuster cover plate 1122*cj* while closed. The elevation of the recessed sink 1122*cm* is such that the surface of the adjuster cover plate 1122*cj* while closed is substantially flush with that of the bottom plate 1122*c*, thus improving the integrity and aesthetics of the underseat portion 1122*cb*. It should be noted that the positions and numbers of the various tabs 1122*ck*, 1122*cl*, 1122*co* and openings 1122*ch*, 1122*cp*, 1122*ci* can be changed or swapped, without affecting the removable, guided, snap-in connection between the adjuster cover plate 1122*cj* and the underseat portion 1122*cb*.

The vehicle manipulation system 13 includes a braking system 132, various aspects of which are detailed in FIGS. 70-77. The preferred braking system 132 is mounted on the frame 111 and includes brake discs 173 for each of the front wheels 17 and the rear wheels 18. The braking system 132 includes a pedal-operated braking portion 132*a* shown in FIG. 70 and a hand-operated braking portion 132*b* shown in FIG. 75. The pedal-operated braking portion 132*a* is located inside the cabin 1121 and is used for the driver's foot to brake the front and rear wheels. The hand-operated braking portion 132*b* is substantially on the side of the seat 1122*f* for the driver and is adjacent to the shift lever 1317 for braking by the driver's hand.

The pedal-operated braking portion 132*a* includes a brake seat 1326, a brake pedal 1321, a brake pump 1322, brake line 1323, and a brake caliper 1324 for each brake disc 173. The brake pedal 1321 is pivotably mounted on the brake seat 1326. The brake pump 1322 is mounted on the frame 111 and connected to the brake pedal 1321. The brake line 1323 fluidly connects the brake pump 1322 to the brake calipers 1324. Pushing of the brake pedal 1321 controls the output of the brake pump 1322 to increase brake fluid pressure provided to each brake caliper 1324 through the corresponding brake line 1323. The brake calipers 1324 brake the brake discs 173 of the wheels, thus braking the front wheels 17 and/or the rear wheels 18.

Figure 71:
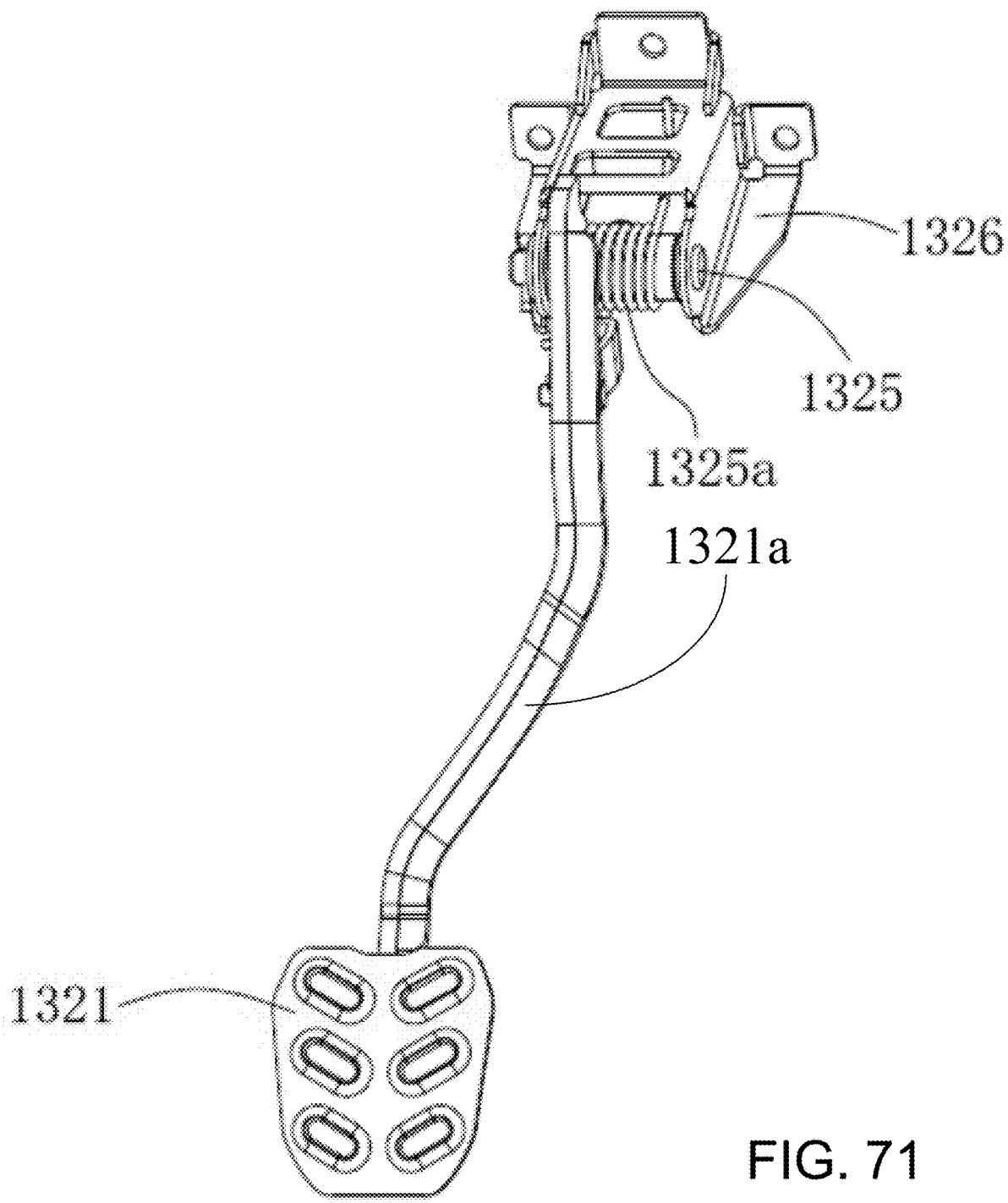
FIG. 71 is a rear perspective view of the brake pedal and pedal seat of the braking system of FIG. 70.

In the preferred embodiment, the brake seat 1326 is mounted on the pedal mounting seat 1111*e* shown in FIGS. 2-5, 9 and 55. As shown in FIG. 71, the brake pedal 1321 has a pedal support shaft 1321*a* pivotably mounted on a pedal pivot pin 1325 passing through the brake seat 1326. The connection between the pedal support shaft 1321*a* and the brake seat 1326 preferably allows adjustment of the orientation of the pedal support shaft 1321*a*, so movement clearance of the brake pedal 1321 can be increased or reduced (particularly as brake pads in the calipers 1324 wear) and the braking accuracy can be improved. A brake pedal torsion spring 1325*a* is provided on the pedal pivot pin 1325. One end of the brake pedal torsion spring 1325*a* is fixed on the brake seat 1326 and the other end of the brake pedal torsion spring 1325*a* is fixed on the pedal support shaft 1321*a* to reset the brake pedal 1321 and provide damping feedback for pushing of the brake pedal 1321.

The brake pump 1322 has several load ports (not shown), with at least one brake line 1323 connected to each load port. The brake pump 1322 controls the pressure output from each load port. The pressure is transported to the corresponding brake caliper 1324 through the brake line 1323 to drive the brake caliper 1324 to brake the corresponding discs 173 and wheels 17, 18. In one embodiment, the brake pump 1322 has a first load port connected to a left-front wheel brake line, a second load port connected to a right-front wheel brake line and a third load port connected to a rear wheel line which is in turn distributed to right and left rear calipers 1324 through a distribution box 1323*a*. The distribution box 1323*a* is mounted on the frame 111 by removable means such as bolting, snap-on connections, or the like, making it is simple to install, easy to repair and able to be adapted to different frame types, improving product versatility.

Figure 72:
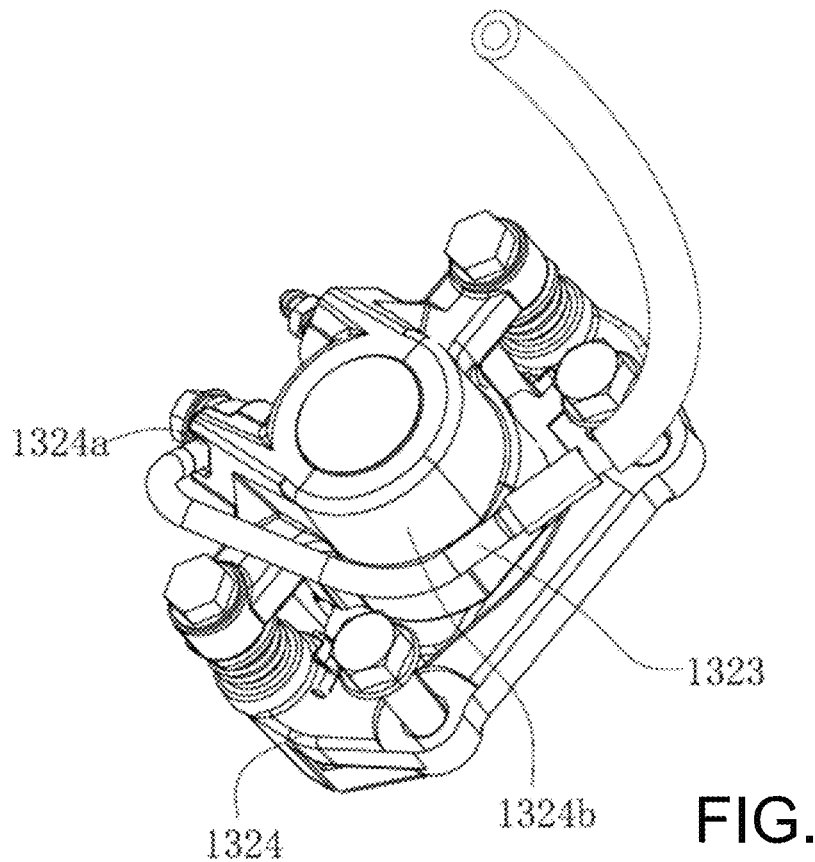
FIG. 72 is a top perspective view of one of the brake calipers of the braking system of FIG. 70.
Figure 73:
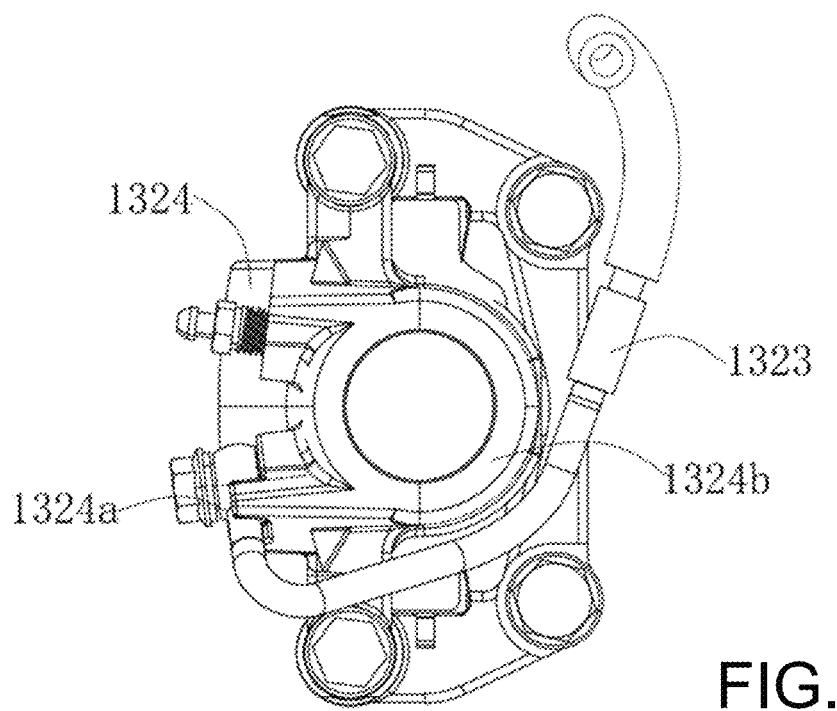
FIG. 73 is an end view of the brake caliper of FIG. 72.
Figure 74:
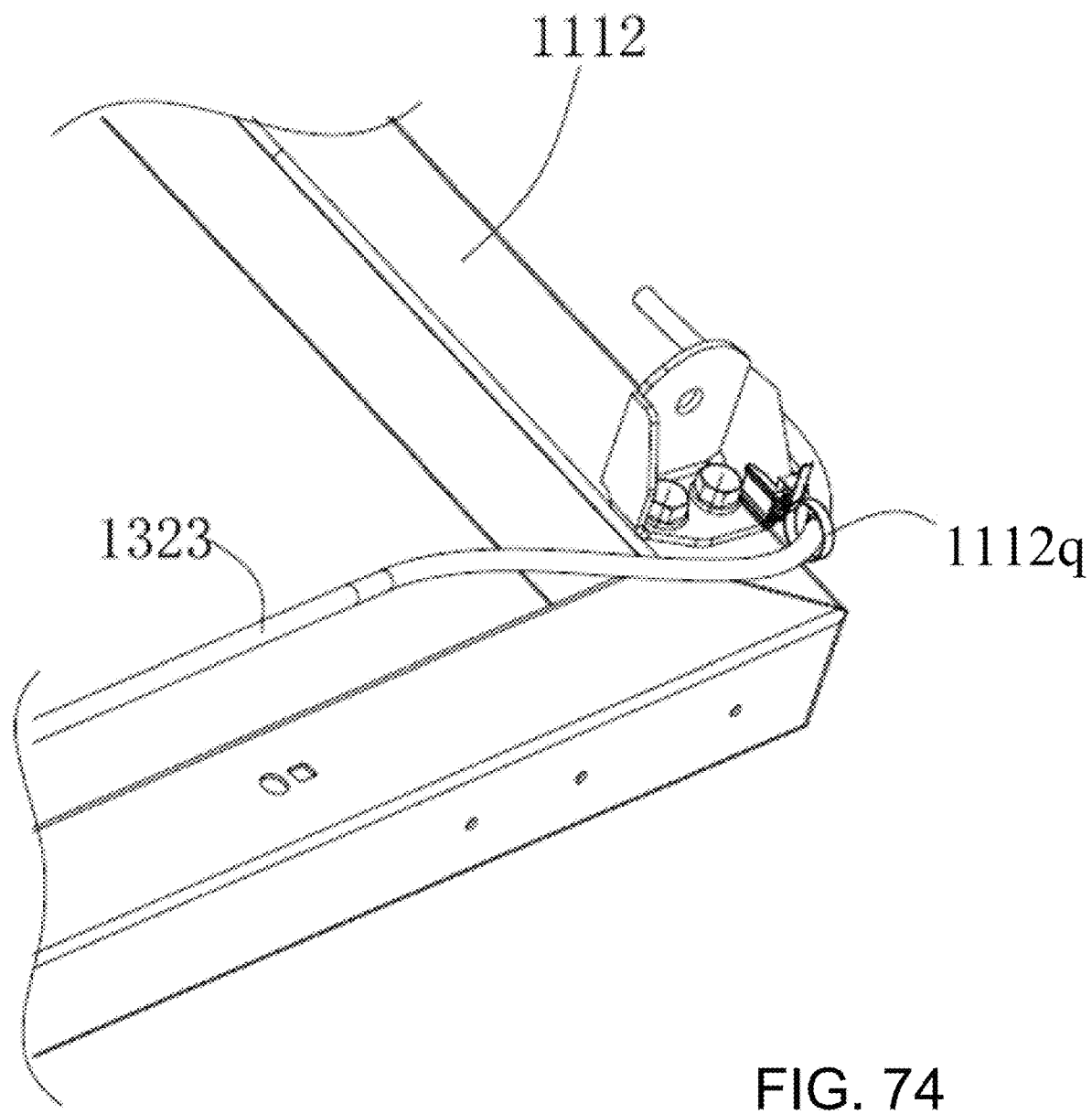
FIG. 74 is a perspective view of a preferred mounting of a brake line relative to a portion of the frame of the vehicle of FIG. 1.

FIGS. 72 and 73 show a preferred brake caliper 1324. The side of the brake caliper 1324 away from the brake disc 173 includes a hydraulic pressure input port 1324*a* and a caliper cylinder 1324*b*. The brake line 1323 is arranged along the circumference of the caliper cylinder 1324*b* and is connected to the hydraulic pressure input port 1324*a*. Thus, the brake line 1323 is protected by the caliper cylinder 1324*b*, so that the routing of the brake line 1323 can be hidden, avoiding collision with hard objects such as gravel and injuring the brake line 1323 during travel of the off-road vehicle 100, thus improving the safety performance. At the same time and as shown in FIG. 74, during the routing of the brake line 1323, several line holders 1112*q* are arranged on the frame 111 and arranged at intervals along a front-rear direction of the frame 111.| The brake lines 1323 are restricted by the brake line holders 1112q. In other words, the brake line 1323 is guided by the brake line holders 1112q to keep the brake line 1323 from shaking and avoid interference between the brake line 1323 and sharp metal edges on the frame 111, thereby improving the safety and longevity of the brake line 1323.

Figure 75:
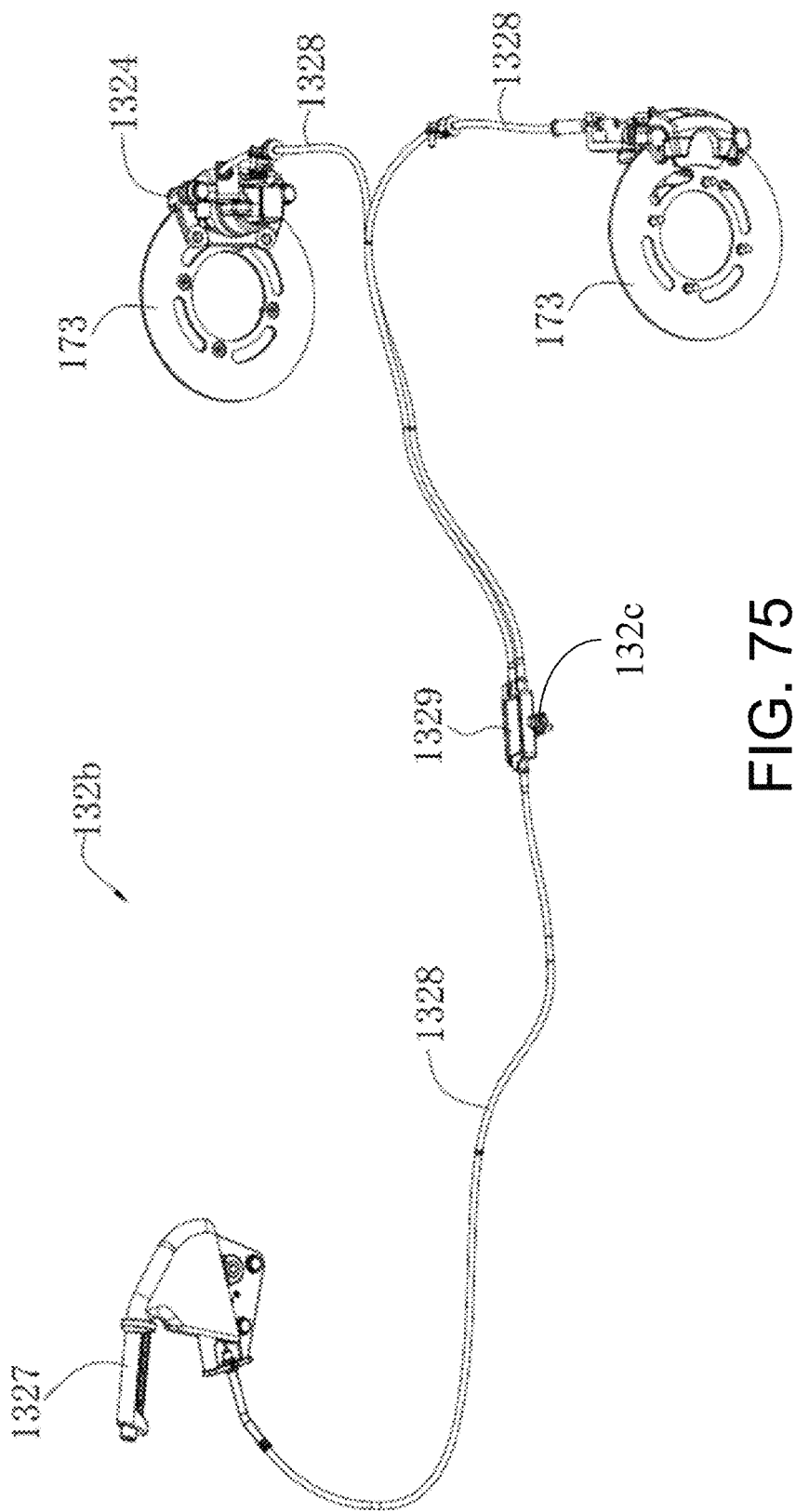
FIG. 75 is a top right perspective view of a hand-operated braking portion of a preferred braking system used in the vehicle of FIG. 1.
Figure 76:
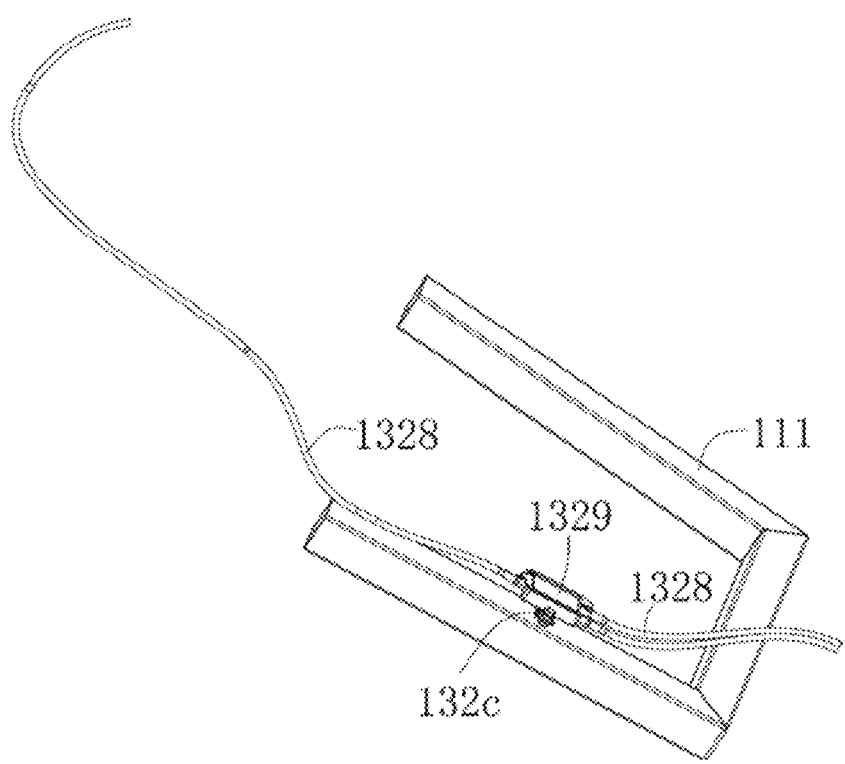
FIG. 76 is perspective view of the distribution box of FIG. 75 mounted on a frame portion.
Figure 77:
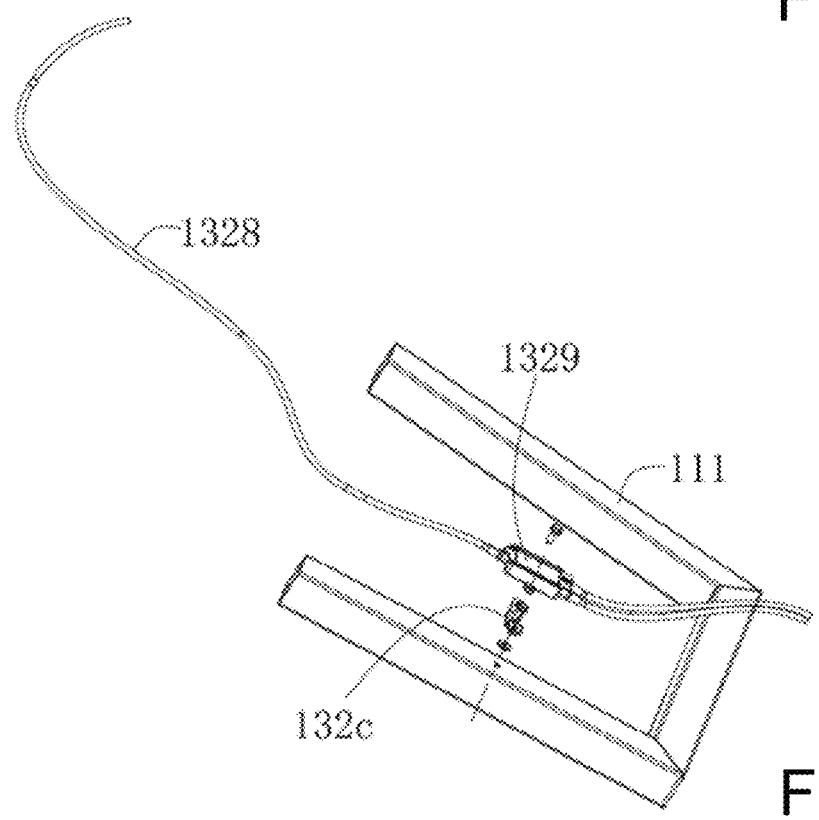
FIG. 77 is an exploded view of FIG. 76.

As shown in FIGS. 75 to 77, the hand-operated braking portion 132b includes a parking brake handle 1327, a parking brake line 1328, and a parking brake junction box 1329. The parking brake handle 1327 is pivotally mounted inside the cabin 1121 and used for driver operation. The brake line 1328 transmits the hand brake force of the brake handle 1327 to the brake caliper 1324 to control the brake caliper 1324 to brake the brake disc 173. The parking brake junction box 1329 is removably mounted on the frame 111 to separate the hand brake force into at least two brake lines corresponding to different wheels, preferably a right-rear wheel 181 and left-rear wheel 182. The parking brake junction box 1329 is removably mounted on the frame 111, which allows installation in different configurations, improving product adaptability and reducing costs of installation and maintenance. The hand-operated braking portion 132b includes a junction box mounting seat 132c. The junction box mounting seat 132c is removably mounted on the frame 111 by means of bolts and/or snaps. The parking brake junction box 1329 is mounted on the junction box mounting seat 132c to achieve a removable connection between the parking brake junction box 1329 and the frame 111.

Figure 78:
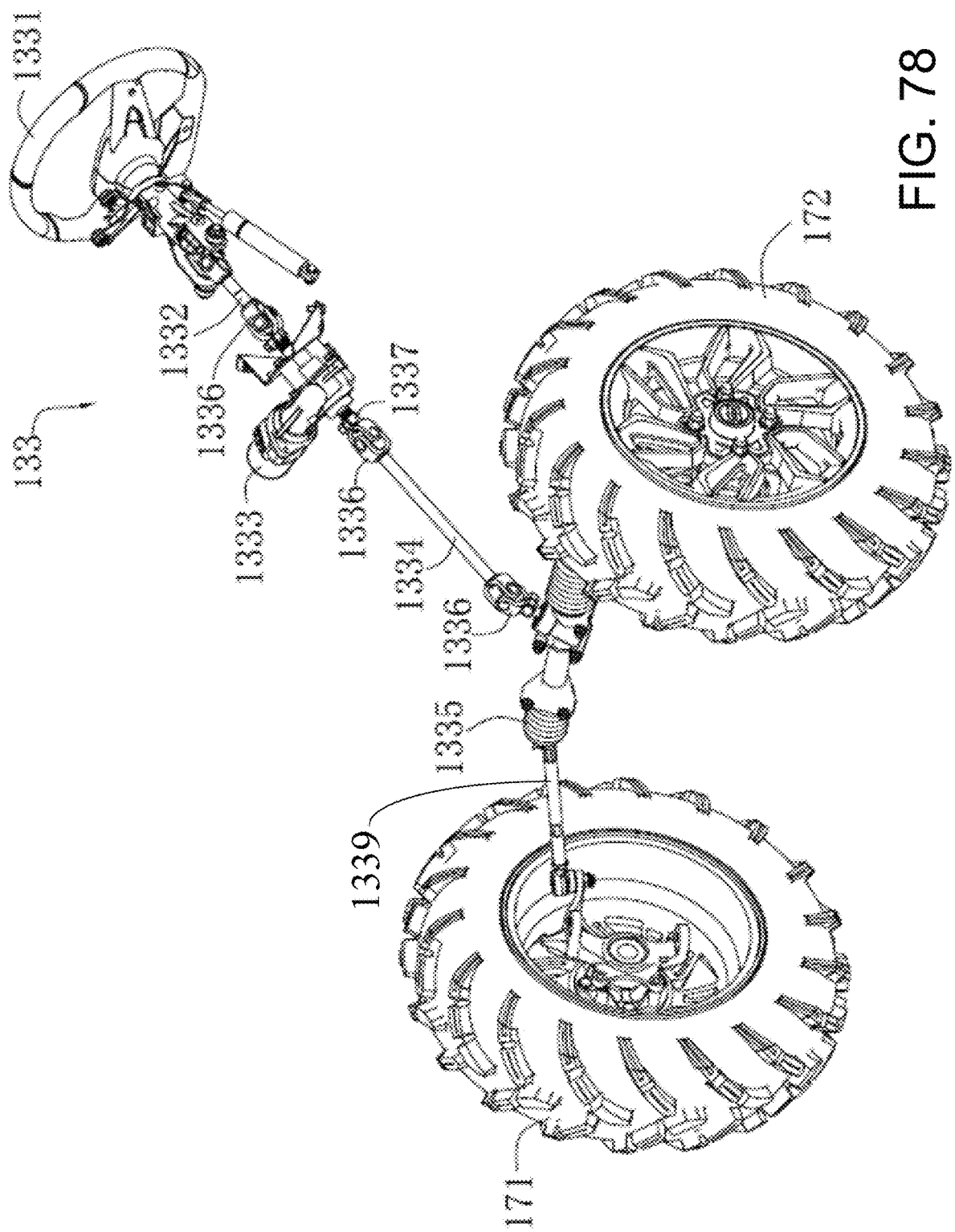
FIG. 78 is a front left perspective view of a steering mechanism used in the vehicle of FIG. 1.
Figure 79:
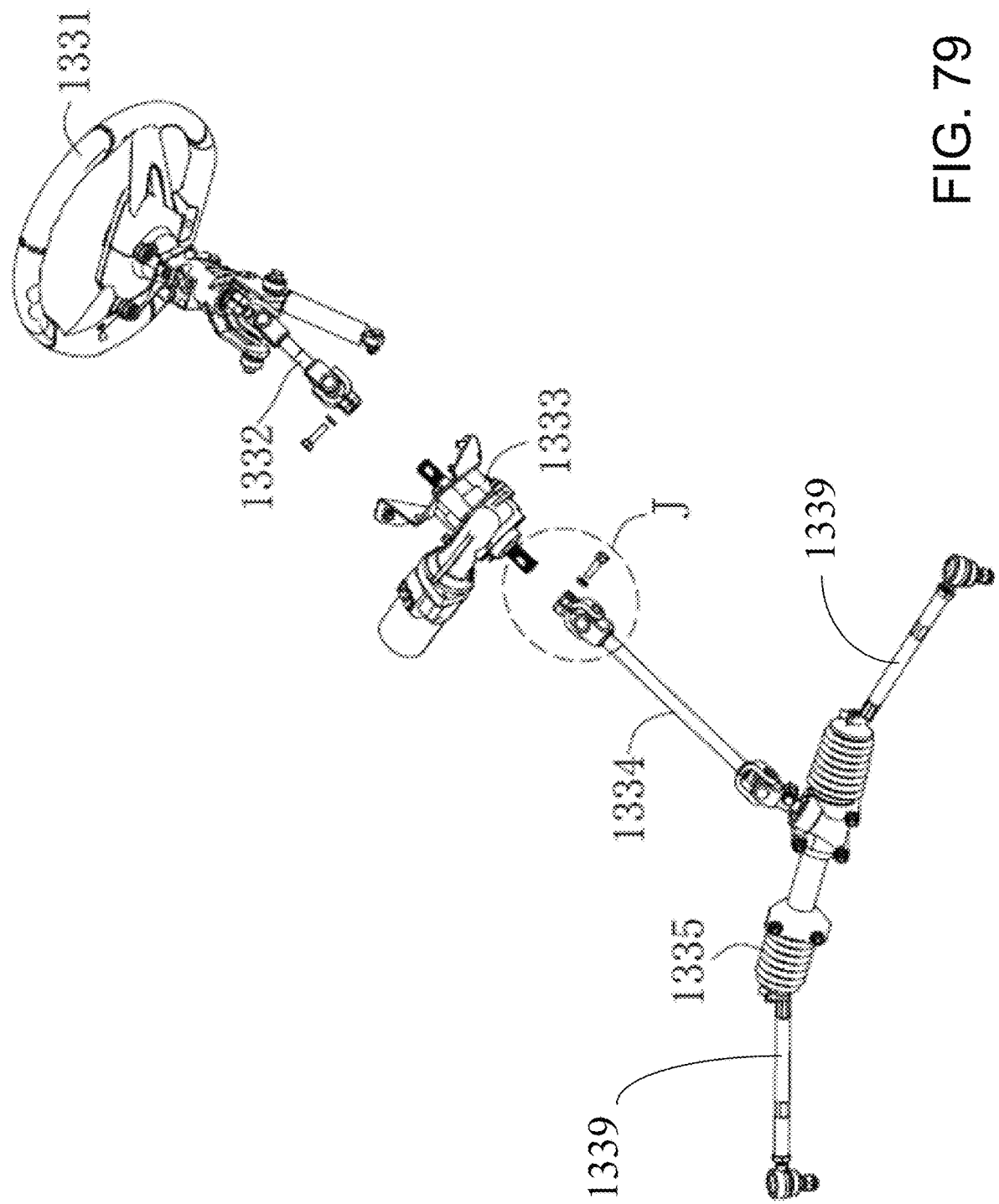
FIG. 79 is an exploded view of the steering mechanism of FIG. 78.
Figure 80:
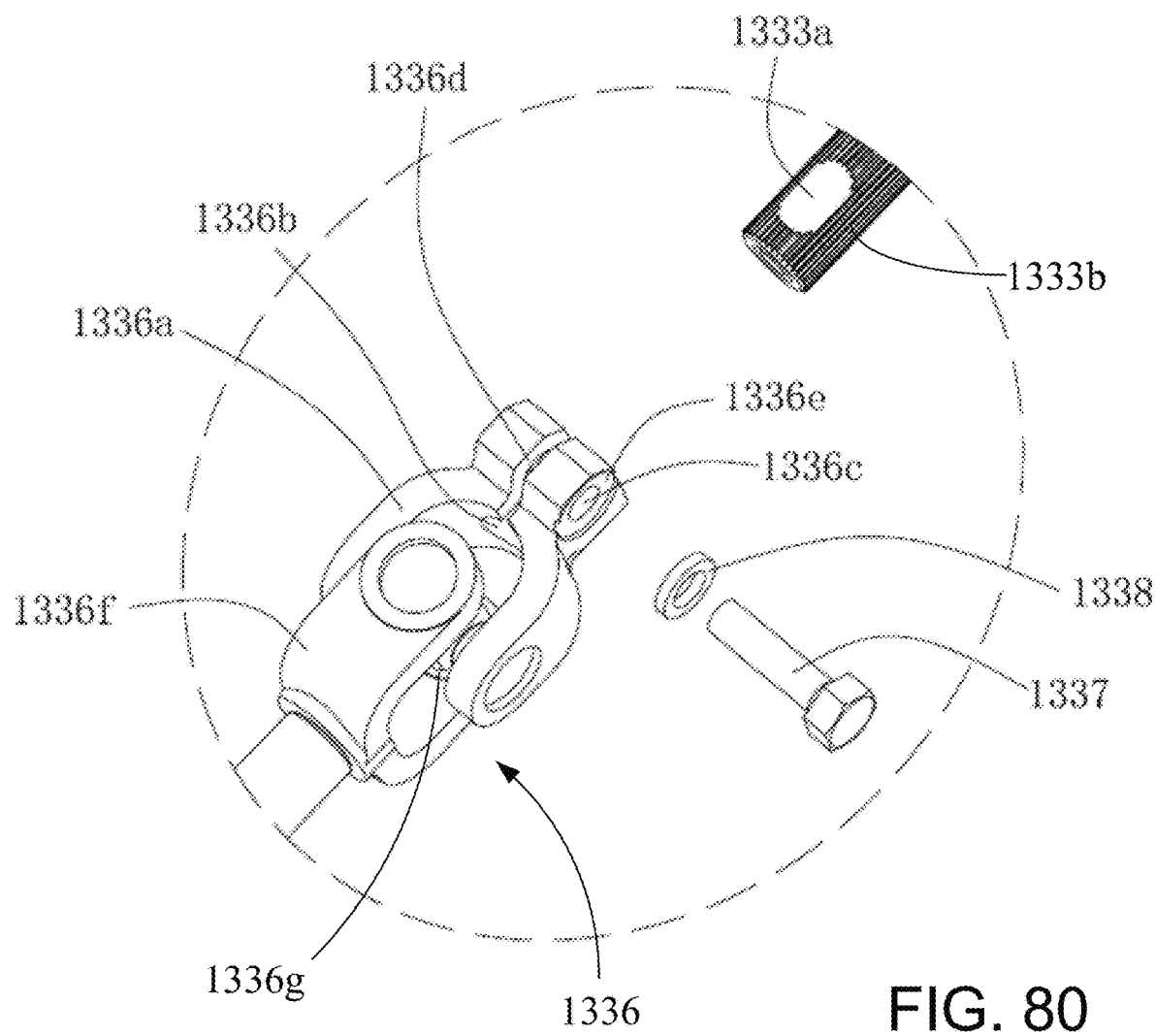
FIG. 80 is an enlarged view of part J in FIG. 79.

The vehicle manipulation system 13 includes a steering mechanism 133, various aspects of which are detailed in FIGS. 78-80. The steering mechanism 133 includes a steering wheel 1331, an upper steering shaft 1332, an electric power steering assist motor 1333, a lower steering shaft 1334, and a steering gear 1335. The steering wheel 1331 is located inside the cabin 1121 for the driver to operate and control the direction of the front wheels 17. The electric power steering assist motor 1333 is mounted on the front frame portion 1111 and has both input and output ends. The upper steering shaft 1332 runs from the steering wheel 1331 to the input end of the electric power steering assist motor 1333, connected to both by universal joints 1336. The steering gear 1335, which preferably is a rack and pinion type steering gear as known in the art, is mounted on the frame 111 and is connected to the front wheels 17 by tie rods 1339. The lower steering shaft 1334 runs from the output end of the electric power steering assist motor 1333 to the steering gear 1335, connected to both by universal joints 1336. Turning of the steering wheel 1331 rotates the upper steering shaft 1332, and with power increased by the electric power steering assist motor 1333 drives the lower steering shaft 1334 to rotate. The lower steering shaft 1334 drives the steering gear 1335, pushing tie rods 1339 to control the orientation of the front wheels 171, 172 to realize the steering control of the off-road vehicle 100.

FIGS. 79 and 80 show a preferred connection through one of the universal joints 1336. The connection allows length adjustment of the steering column to eliminate assembly errors caused by inadequate assembly accuracy of the electric power steering assist motor 1333 and/or the steering gear 1335, thereby minimizing steering clearance and positioning errors and slop, thereby improving control accuracy. At the same time, the preferred connection avoids spline sleeve connections currently used for length adjustment tolerance in other vehicles and the associated manufacturing costs of such spline sleeve connections.

Specifically, the universal joint 1336 includes a first yoke 1336a pivotably attached through a double-pivot cross 1336g to a second yoke 1336f, and the second yoke 1336f can be easily and cheaply welded to the corresponding upper steering shaft 1332 or lower steering shaft 1334. A groove 1333a is provided on the outer wall of the input and/or output ends 1333b of the steering wheel 1331, the electric power steering assist motor 1333 and/or the steering gear 1335, extending along the axis of the input/output end 1333b. The first yoke 1336a has a split configuration defining a yoke hole 1336b which receives the input or output end 1333b, tightened in place by a yoke fastener 1337. The first yoke 1336a also defines a locking hole 1336c and a yoke gap 1336d. The axis of the locking hole 1336c is substantially perpendicular to the axis of the yoke hole 1336b. The yoke fastener 1337 goes through the locking hole 1336c and is capable of changing the size of the yoke gap 1336d, so that the first yoke 1336a is tightened and locked at a selected longitudinal position on the input or output end 1333b.

As shown in FIG. 80, the yoke fastener 1337 is provided with a yoke fastener gasket 1338, which may be a compressible washer or a spring washer. The first yoke 1336a also has a gasket recess 1336e on the side having a locking hole 1336c. The yoke fastener gasket 1338 is mounted in the gasket recess 1336e to improve the stability of the connection between the yoke fastener 1336 and the first yoke 1336a.

The yoke fastener 1337 may be an externally threaded bolt, in which case the locking hole 1336c is provided with an internal thread. Alternatively, the yoke fastener 1337 may be a combination of bolt and nut, or other structures.

FIGS. 81-84 show the preferred prime mover assembly 12 for the off-road vehicle 100, having the engine 121 toward the passenger side and the transmission 122 toward the driver side. The driver side/passenger side orientation of the prime mover assembly 12 can be reversed in alternative embodiments. The prime mover assembly 12 further includes an intake and exhaust system 14 shown in part in FIG. 81 and in part in FIGS. 82-84. The intake and exhaust system 14 is connected to the prime mover assembly 12 for conveying or discharging gases for combustion or cooling in the prime mover assembly 12. In the preferred embodiment of FIGS. 81-84, the intake and exhaust system 14 includes a combustion gas handling system 141 and a cooling gas handling system 142. The combustion gas handling system 141 is connected to the engine 121 for supplying air for internal combustion within the engine 121 and for timely removal of exhaust gases from fuel combustion. The cooling gas handling system 142 is connected to the transmission 122 for conveying air primarily for cooling of the transmission 122, but the cooling gas handling system 142 may secondarily cool the engine 121 and/or parts of the combustion gas handling system 141.

Figure 81:
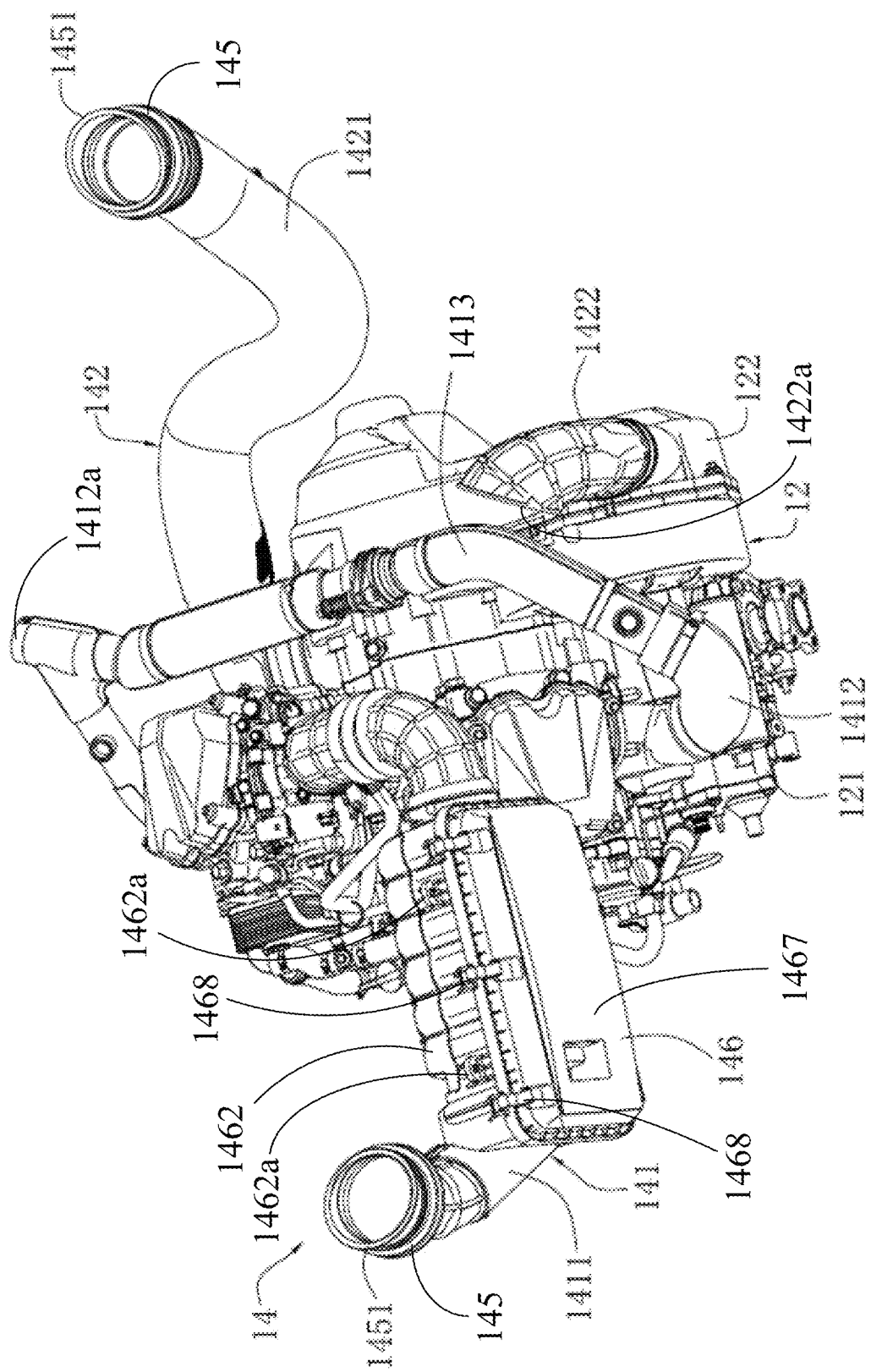
FIG. 81 is mostly top, slightly front perspective view of the prime mover assembly of FIGS. 45, 47, 48 and 50 together with the intake and outlet manifolds.

Referring to FIG. 81, the combustion gas handling system 141 includes a combustion intake manifold 1411 and a combustion exhaust manifold 1412. A combustion air intake cavity 1126 in fluid communication with the external atmosphere air is provided on the side of the vehicle cover 112, such as on the passenger side and shown in FIG. 21. The combustion intake manifold 1411 directs air from the combustion air intake cavity 1126, starting at an intake inlet adapter pipe 145 through an air filter 146 and downwardly into the engine 121, which in this case is a two cylinder engine. The combustion exhaust manifold 1412 directs exhaust gas coming out of the two cylinders of engine 121 to a combustion exhaust outlet 1412a toward the rear end of the vehicle cover 112 to facilitate exhaust gas removal after fuel combustion.

The cooling gas handling system 142 includes a cooling air intake manifold 1421 and a cooling air outlet manifold 1422. A cooling air intake cavity 1125 in fluid communication with the external atmosphere air is provided on the side of the vehicle cover 112, such as on the driver side and shown in FIGS. 1, 19 and 20. The cooling air intake manifold 1421 directs air from the cooling air intake cavity 1125 downwardly into a rear inlet 1222 of the transmission 122 for cooling of the transmission 122. The cooling air outlet manifold 1422 directs air coming out of the front of the transmission 122.

Figure 82:
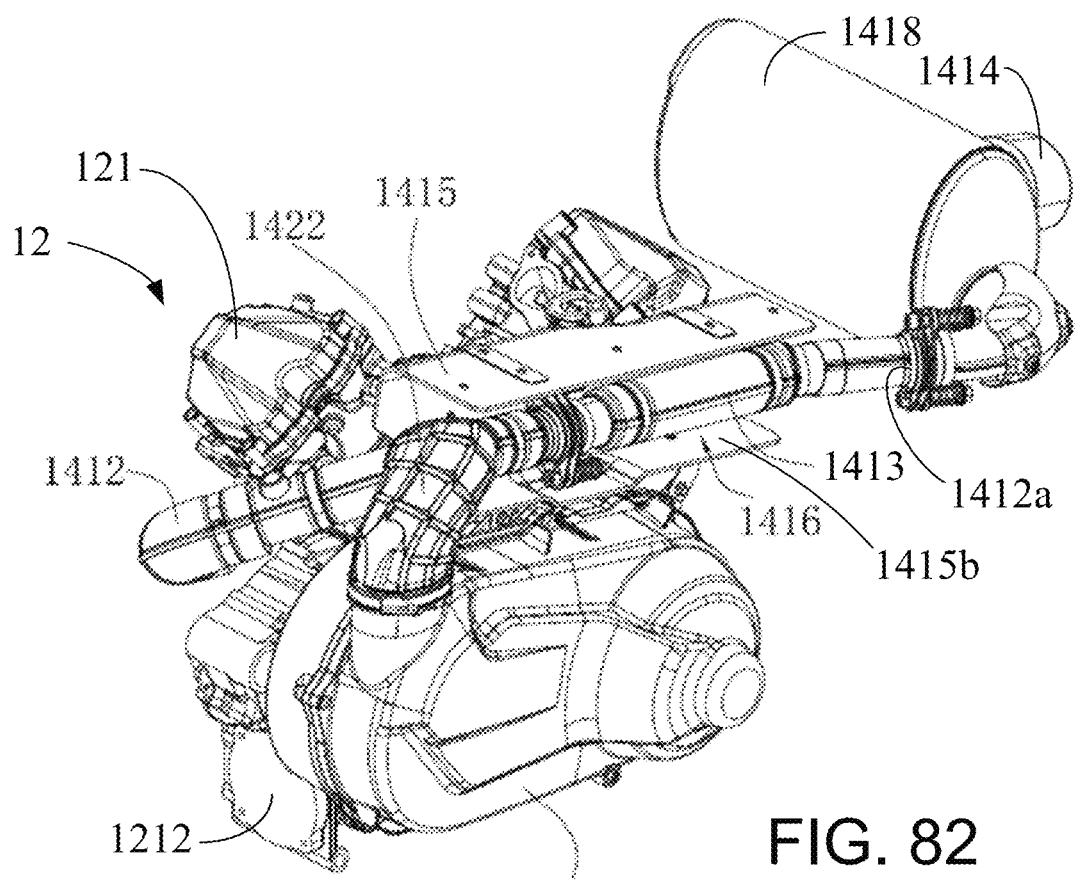
FIG. 82 is a front left perspective view of the prime mover assembly of FIG. 81, without showing the inlet manifolds but additionally showing the muffler and tailpipe.
Figure 83:
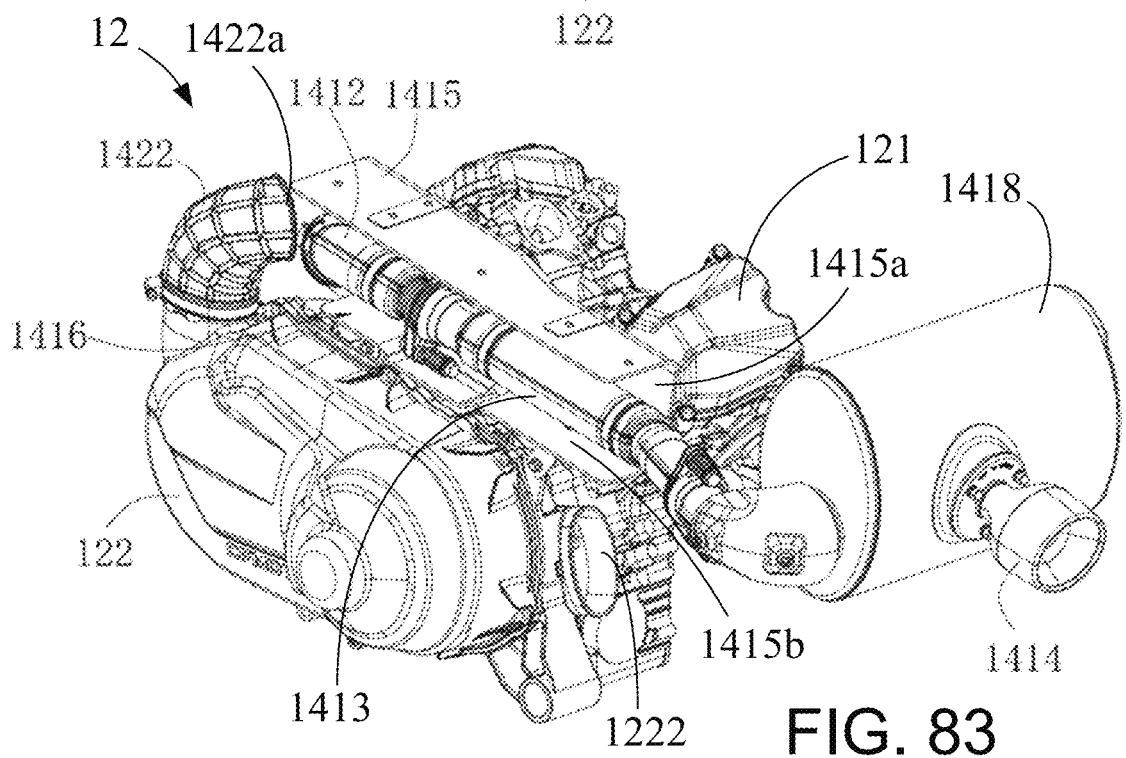
FIG. 83 is a rear left perspective view of the prime mover assembly of FIG. 82.

More particularly as shown in FIGS. 82 and 83, the position of the outlet 1422a of the cooling air outlet manifold 1422 is longitudinally aligned with and in front of the central portion of the combustion exhaust manifold 1412. Air exits the cooling air outlet manifold 1422 at a running temperature within the range of about 100-150° C., while the exhaust gas temperature in the combustion exhaust manifold 1412 can exceed 300° C. The position of the outlet 1422a of the cooling air outlet manifold 1422 is aligned with that of the combustion exhaust manifold 1412 so that the air discharged from the cooling air outlet manifold 1422 onto the combustion exhaust manifold 1412 can dissipate heat, increase the cooling efficiency of the combustion exhaust manifold 1412 and reduce heat damage.

As shown in FIGS. 82 and 83, an air guide plate 1415 is preferably positioned above the combustion exhaust manifold 1412, running along the longitudinal extension direction of the central portion of the combustion exhaust manifold 1412. The air guide plate 1415 defines a guided airway 1416 in the extension direction and around the circumference of the combustion exhaust manifold 1412. If desired, the air guide plate 1415 may include side and bottom portions 1415a, 1415b which extend along the sides or under the combustion exhaust manifold 1412, further helping to define the guided airway 1416. The outlet 1422a of the cooling air outlet manifold 1422 is aligned with the guided airway 1416. The guided airway 1416 effectively improves the air flow speed at the combustion exhaust manifold 1412 and accelerates the heat dissipation and cooling efficiency for cooling the combustion exhaust manifold 1412.

Figure 84:
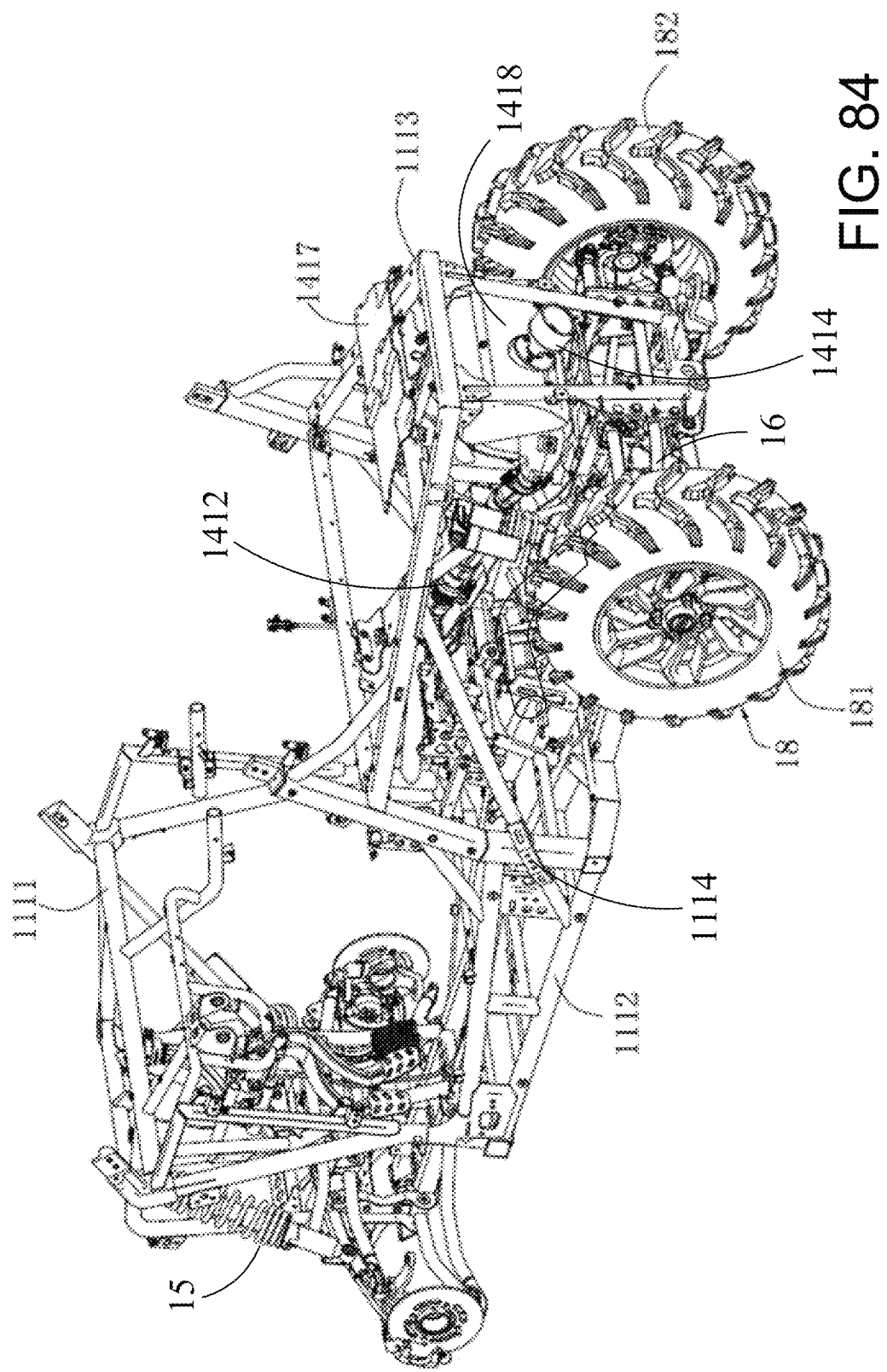
FIG. 84 is a rear left perspective view of the prime mover assembly of FIGS. 82 and 83 relative to a frame, front and rear suspensions and rear wheels of an offroad vehicle.
Figure 85:
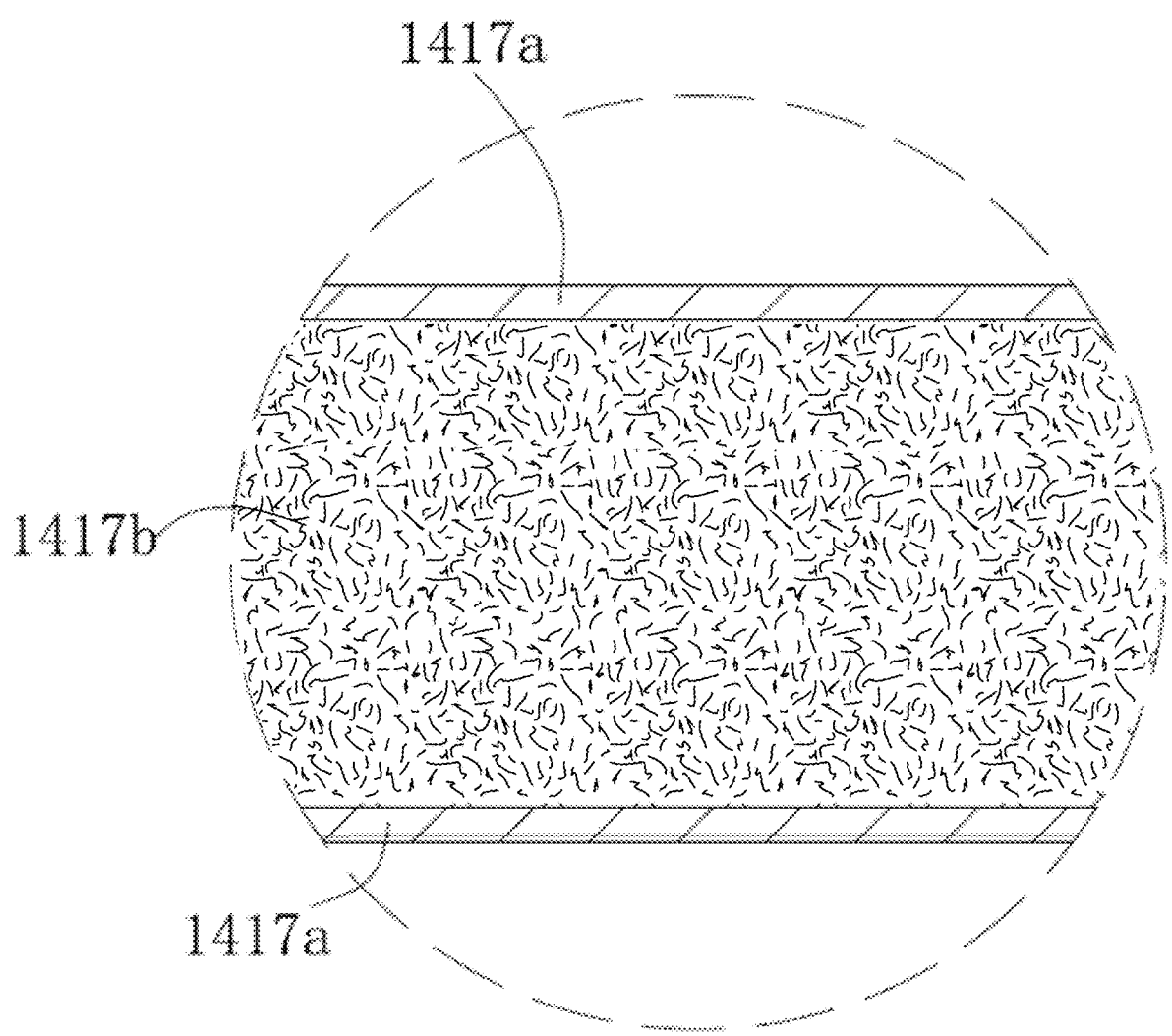
FIG. 85 is a cross sectional view of the insulation plate of FIG. 84.

As shown in FIG. 84, an insulation plate 1417 is also provided vertically above the combustion exhaust manifold 1412 and/or muffler 1418 to prevent the upward transfer of heat from the combustion exhaust manifold 1412 and/or muffler 1418. As shown in FIG. 85, the insulation plate 1417 preferably includes at least a ceramic fiber layer 1417b and at least two aluminum layers 1417a laid on the surfaces of both sides of ceramic fiber layer 1417b. The ceramic fiber layer 1417b and the aluminum layers 1417a may be connected by compression molding or other means such as adhesives. In this way, the insulation plate 1417 is well insulated and combines the heat reflection of the aluminum layers 1417b to reduce upward and/or outward heat transfer from the combustion exhaust manifold 1412 and/or muffler 1418. The outer surface of the aluminum layer 1417a may be embossed or otherwise treated to facilitate thermal infrared diffuse reflection and improve the thermal radiation capacity of the insulation plate 1417.

As shown in FIGS. 19-21, the combustion air intake cavity 1126 and the cooling air intake cavity 1125 are positioned on the sides of the vehicle cover 112. The intake cavities 1125 and 1126 are arranged relatively high in the off-road vehicle 100. The high placement of the intake cavities 1125, 1126 helps keep water and mud splashes from entering the intake cavities 1125, 1126, better supplying air supply to the engine 121 and transmission 122, and avoiding damage which could be caused by water inflow into the engine 121.

As the preferred example, the combustion air intake cavity 1126 is arranged on the right side of the vehicle cover 112 and adjacent to the rear end of the vehicle cover 112, while the cooling air intake cavity 1125 is arranged on the left side of the vehicle cover 112 and adjacent to the rear end of the vehicle cover 112. The height of the combustion air intake cavity 1126 is the same as that of the cooling air intake cavity 1125. Longitudinally, the combustion air intake cavity 1126 and the cooling air intake cavity 1125 are located between the cabin 1121 and the rear wheels 18. This preferred arrangement enables the engine 121 and the transmission 122 to intake air separately, making full use of the space of the vehicle cover 112 and improving the compactness of the layout. The structure of the combustion air intake cavity 1126 and the cooling air intake cavity 1125 may be the same or different as required, with the preferred embodiment having each as a mirror image of the other.

After the fuel combustion in the engine 121, the temperature of the exhaust gas can exceed 300° C., and the temperature of the combustion exhaust manifold 1412 near the air outlet of the engine 121 can also approach or exceed 300° C. In order to further reduce the effects of the heat radiated by the combustion exhaust manifold 1412 on the vehicle cover 112 and the electrical components, a heat shield 1413 is provided on the outer wall of the combustion exhaust manifold 1412. The heat shield 1413 is secured to the combustion exhaust manifold 1412 by fasteners, such as clamps or other components.

Figure 86:
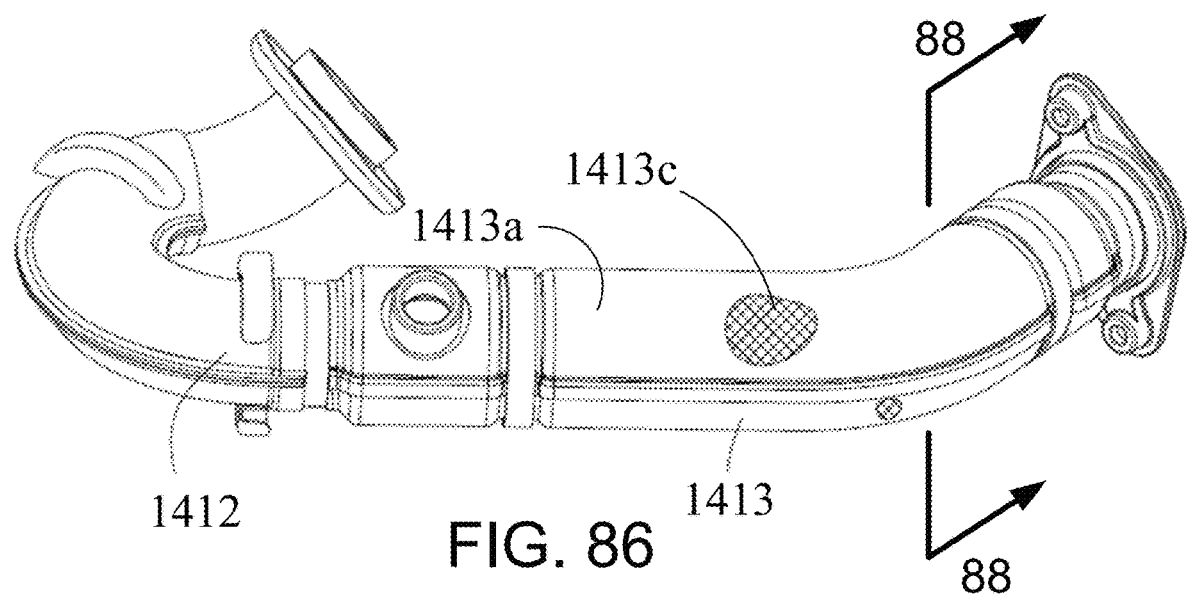
FIG. 86 is a side perspective view showing a front portion of the combustion exhaust manifold of FIGS. 81-84.
Figure 87:
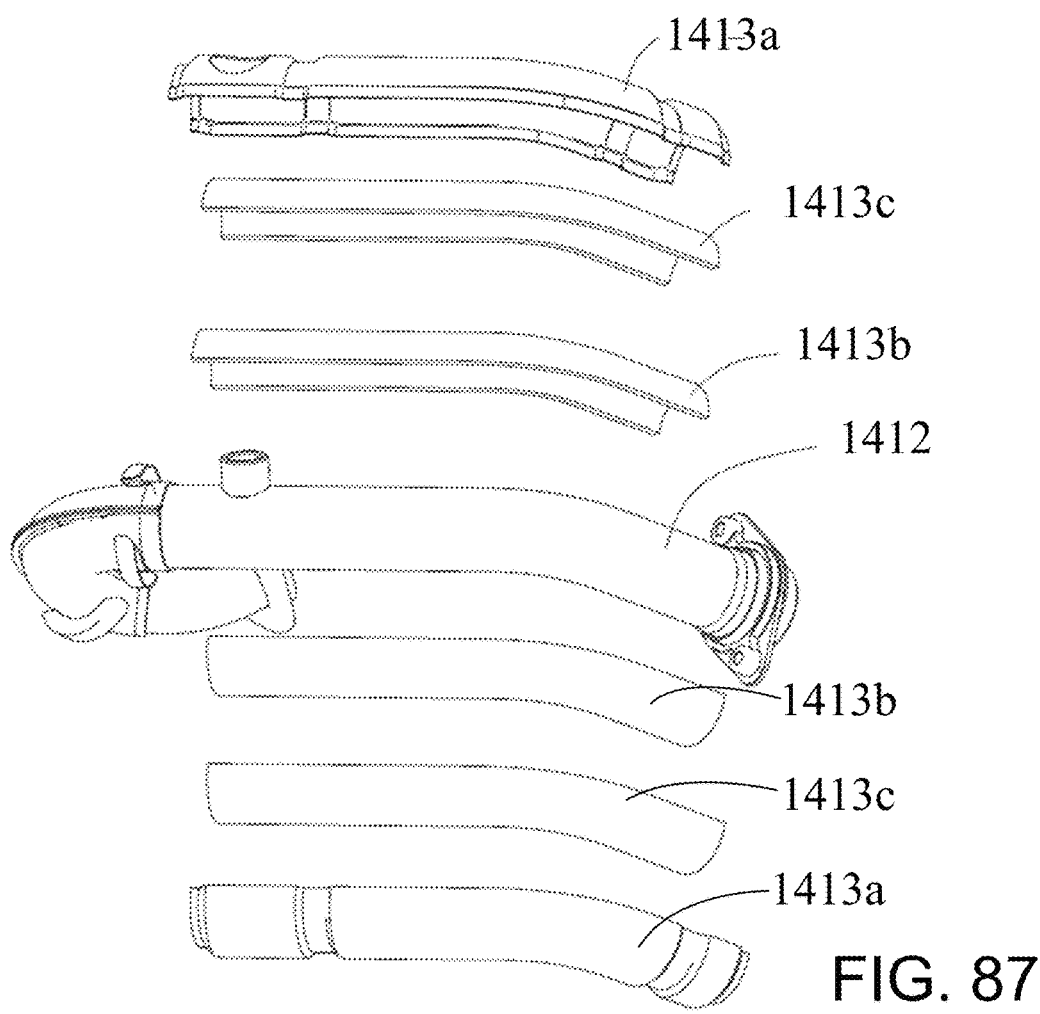
FIG. 87 is an exploded view of the combustion exhaust manifold portion of FIG. 86.
Figure 88:
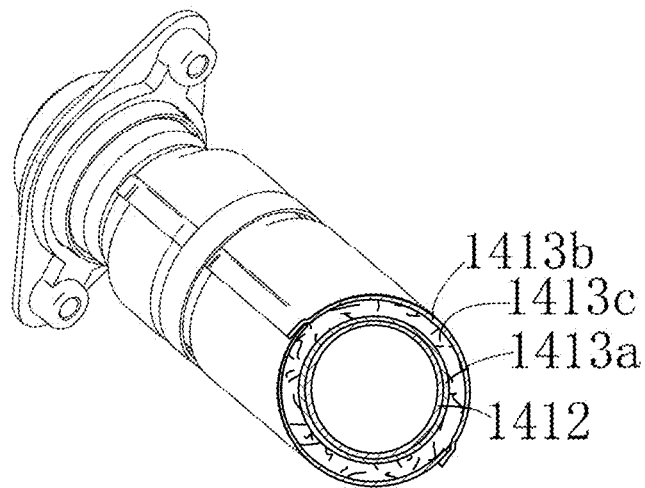
FIG. 88 is a cross-sectional view of the combustion exhaust manifold portion, taken along cut lines 88-88 in FIG. 86.
Figure 89:
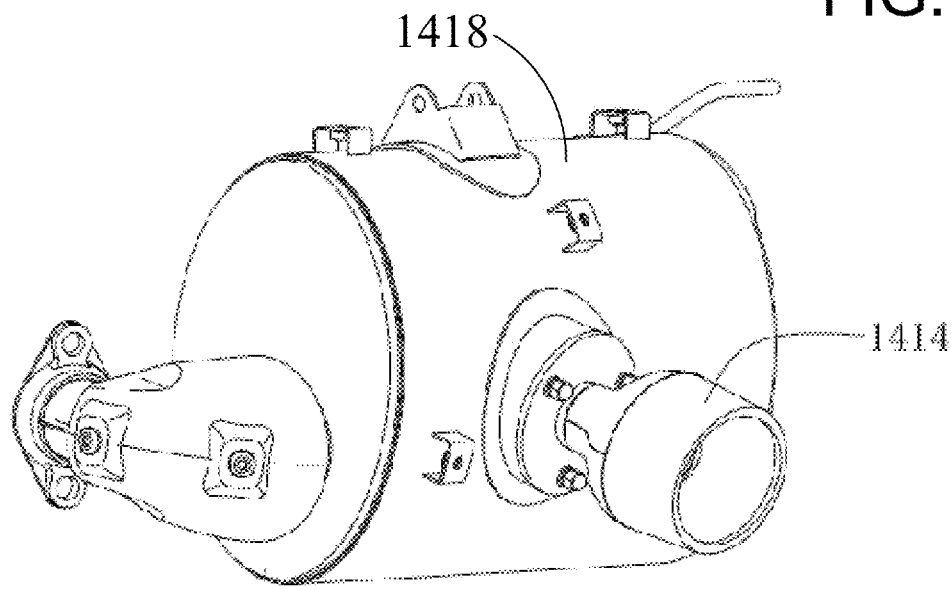
FIG. 89 is a rear perspective view of the muffler and tailpipe of FIGS. 82-84.

As best shown in FIGS. 86-88, the preferred heat shield 1413 includes an inner sleeve body 1413a sleeved on the combustion exhaust manifold 1412, an outer sleeve body 1413b sleeved on the inner sleeve body 1413a, and an intermediate insulation layer 1413c filled between the inner sleeve body 1413a and the outer sleeve body 1413b. The three layer structure of the heat shield 1413 reduces the heat radiated by the combustion exhaust manifold 1412. The inner sleeve body 1413a and/or the outer sleeve body 1413b may be formed of rubber or ceramic fiber. The intermediate insulation layer 1413c may be formed of cotton or ceramic fiber.

Figure 90:
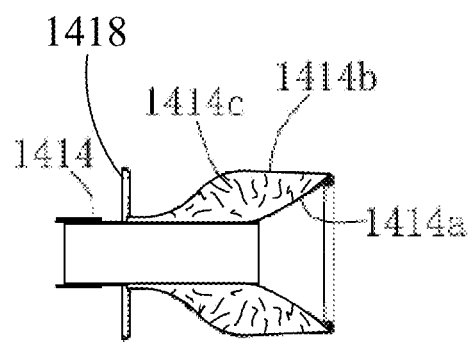
FIG. 90 is cross-sectional view of the tailpipe and rear edge of the muffler of FIG. 89.

The preferred combustion exhaust manifold 1412 terminates in a muffler 1418 with a tailpipe 1414. The preferred tailpipe 1414 is constructed as shown in FIG. 90 to provide a heat insulation effect which reduces the influence of the combustion exhaust gas on the vehicle cover 112 and electrical components. Namely, the preferred tailpipe 1414 includes an inner tailpipe cover 1414a, an outer tailpipe cover 1414b, and at least one tailpipe insulation layer 1414c. The outer tailpipe cover 1414b covers the inner tailpipe cover 1414a, and both the inner tailpipe cover 414a and the outer tailpipe cover 1414b are connected to the muffler 1418 by welding, threaded connections, or the like. The tailpipe insulation layer 1414c is filled between the outer tailpipe cover 1414b and the inner tailpipe cover 1414a to further improve the insulation effect and avoid the influence of radiated heat on the vehicle cover 112 and electrical components. The outer tailpipe cover 1414b may be formed by flanging the inner tailpipe cover 1414a, or the inner tailpipe cover 1414a may be formed by flanging the outer tailpipe cover 1414b. In this way, not only is processing convenient but the structure is also simple. The tailpipe 1414 is a rigid tube with both the inner tailpipe cover 1414a and the outer tailpipe cover 1414b formed of metal, and the tailpipe insulation layer 1414c may be either formed of insulation cotton or ceramic fiber.

Figure 91:
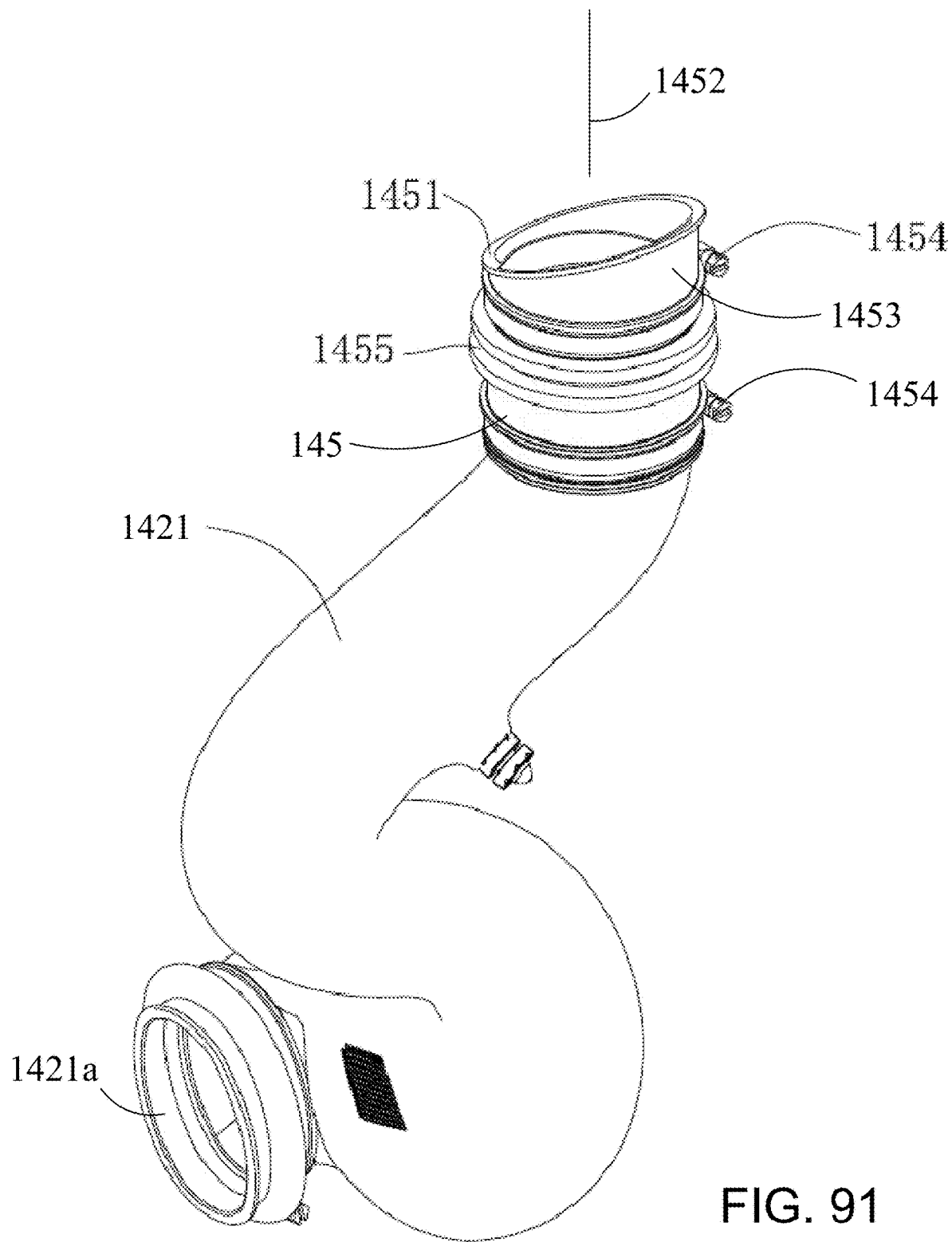
FIG. 91 is a front right perspective view of the cooling air intake manifold and intake adapter pipe of FIG. 81.
Figure 92:
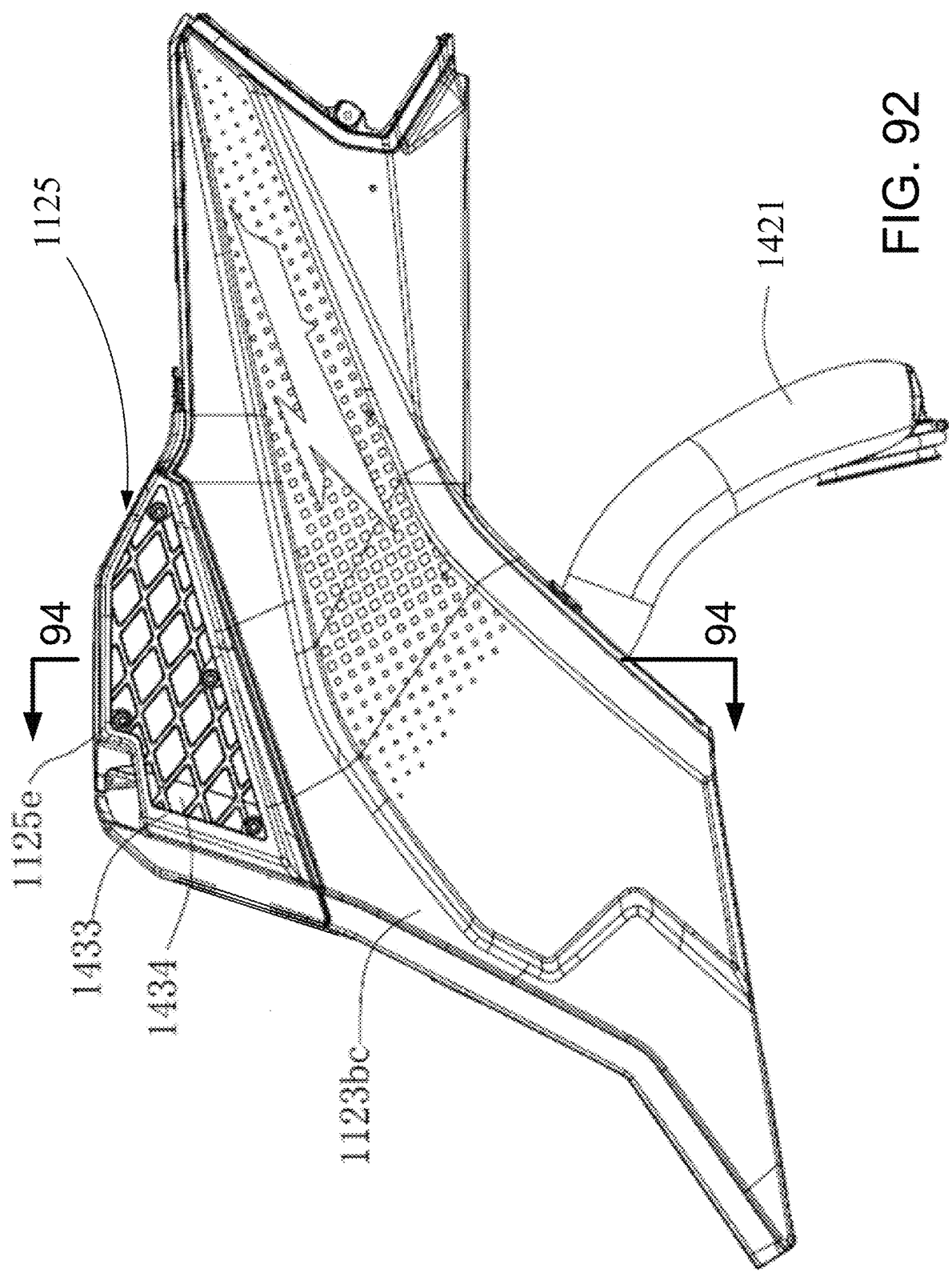
FIG. 92 is a side perspective view of the cooling air intake manifold of FIGS. 81 and 91 relative to the rear side plate and cooling air intake cavity of FIGS. 1, 19 and 20.
Figure 93:
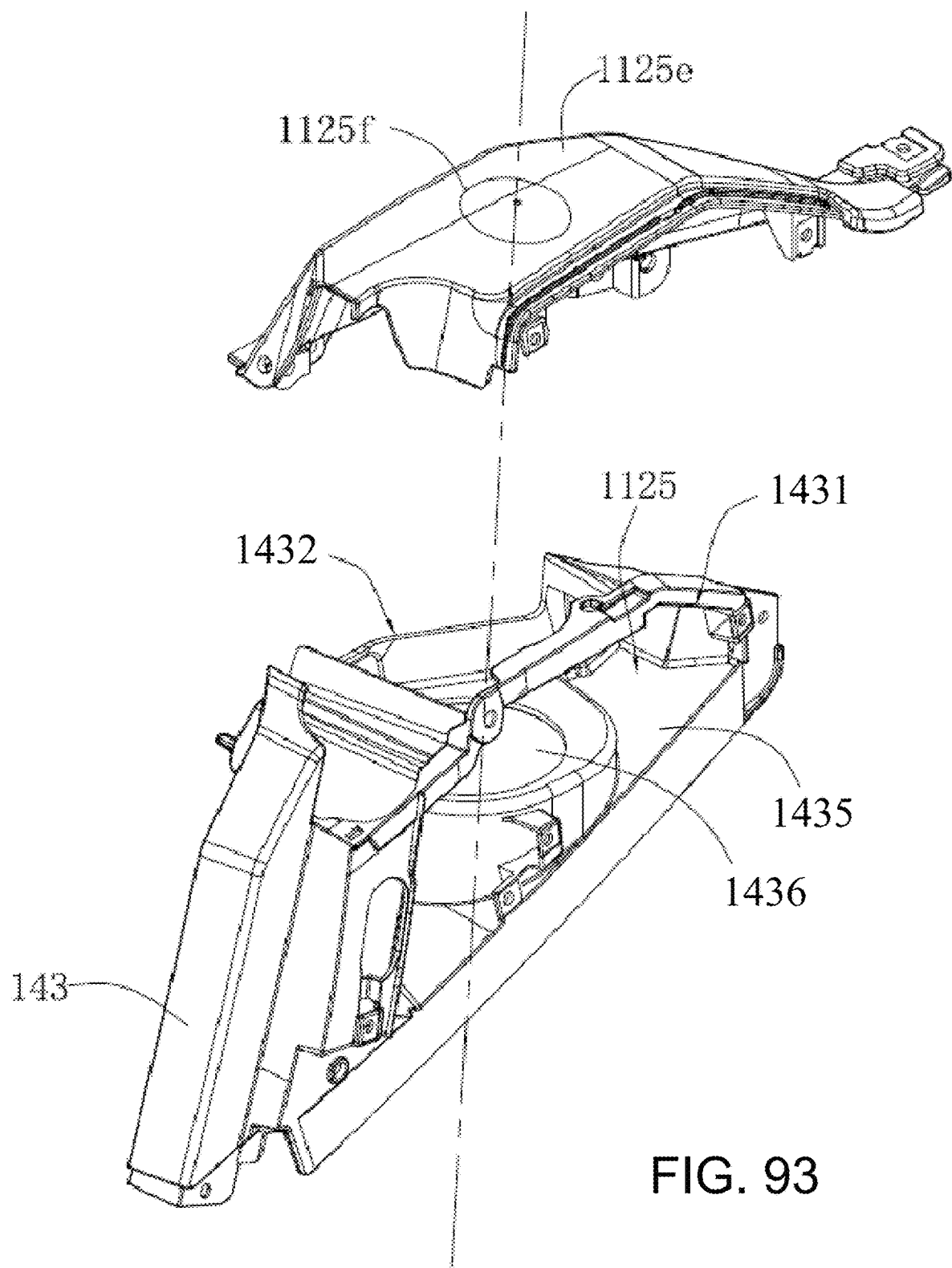
FIG. 93 is an exploded front top perspective view of the intake seat and cooling air intake cavity of FIG. 92.
Figure 94:
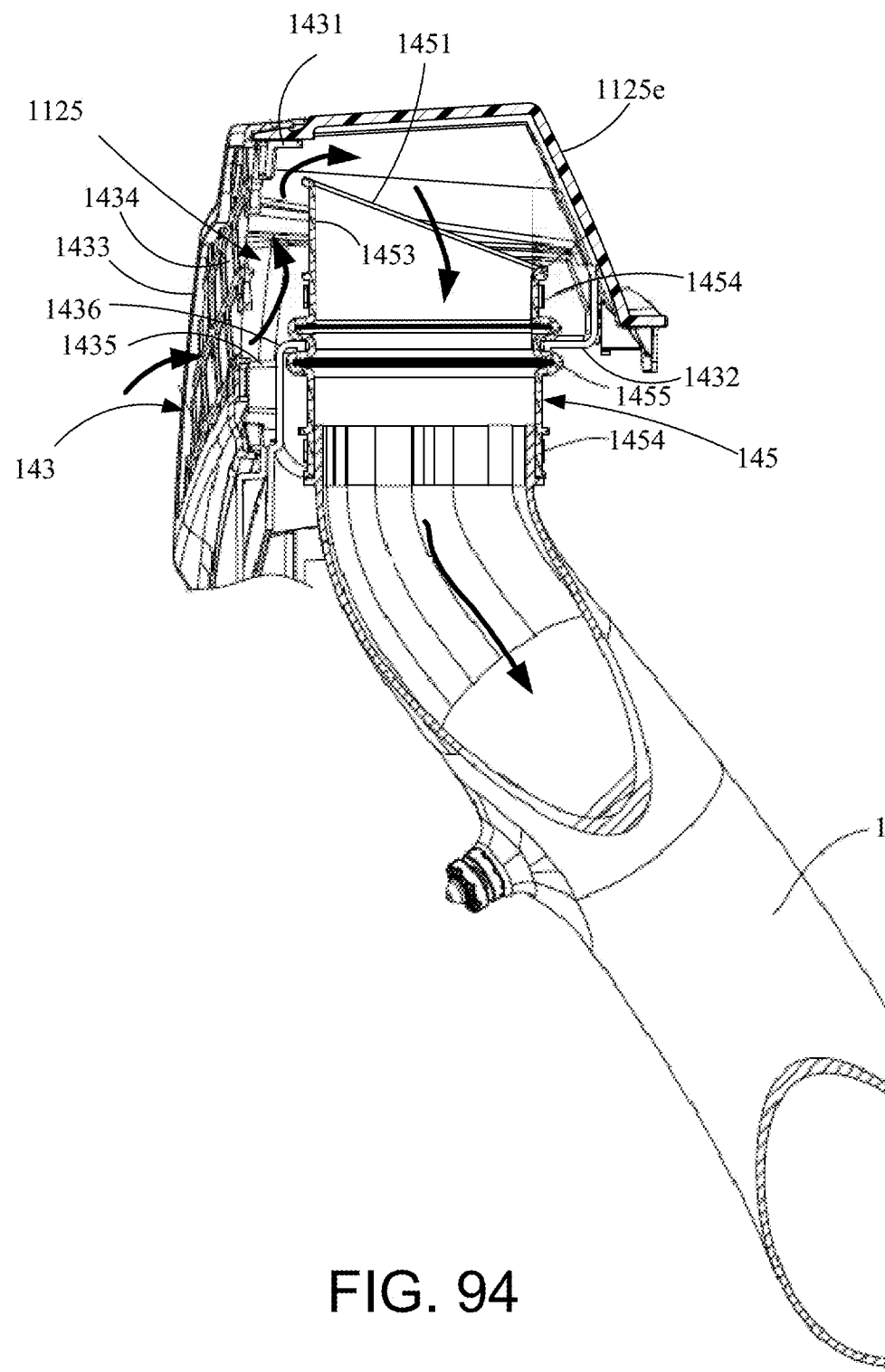
FIG. 94 is a cross-sectional view of the cooling air intake manifold, rear side plate and cooling air intake cavity taken along cut lines 94-94 in FIG. 92.
Figure 95:
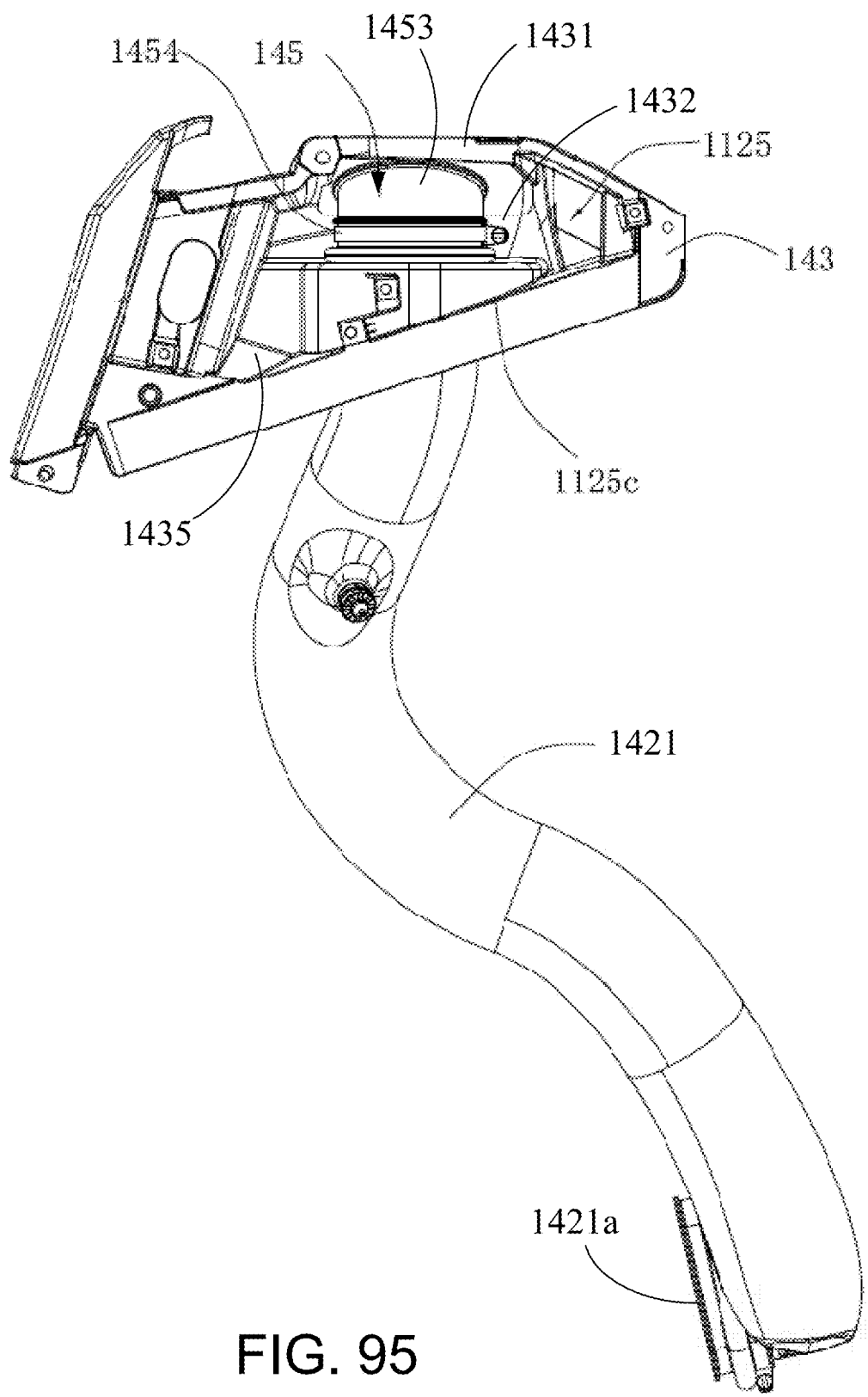
FIG. 95 is a side view of the intake seat, cooling air intake manifold and intake adapter pipe of FIGS. 91-94.
Figure 96:
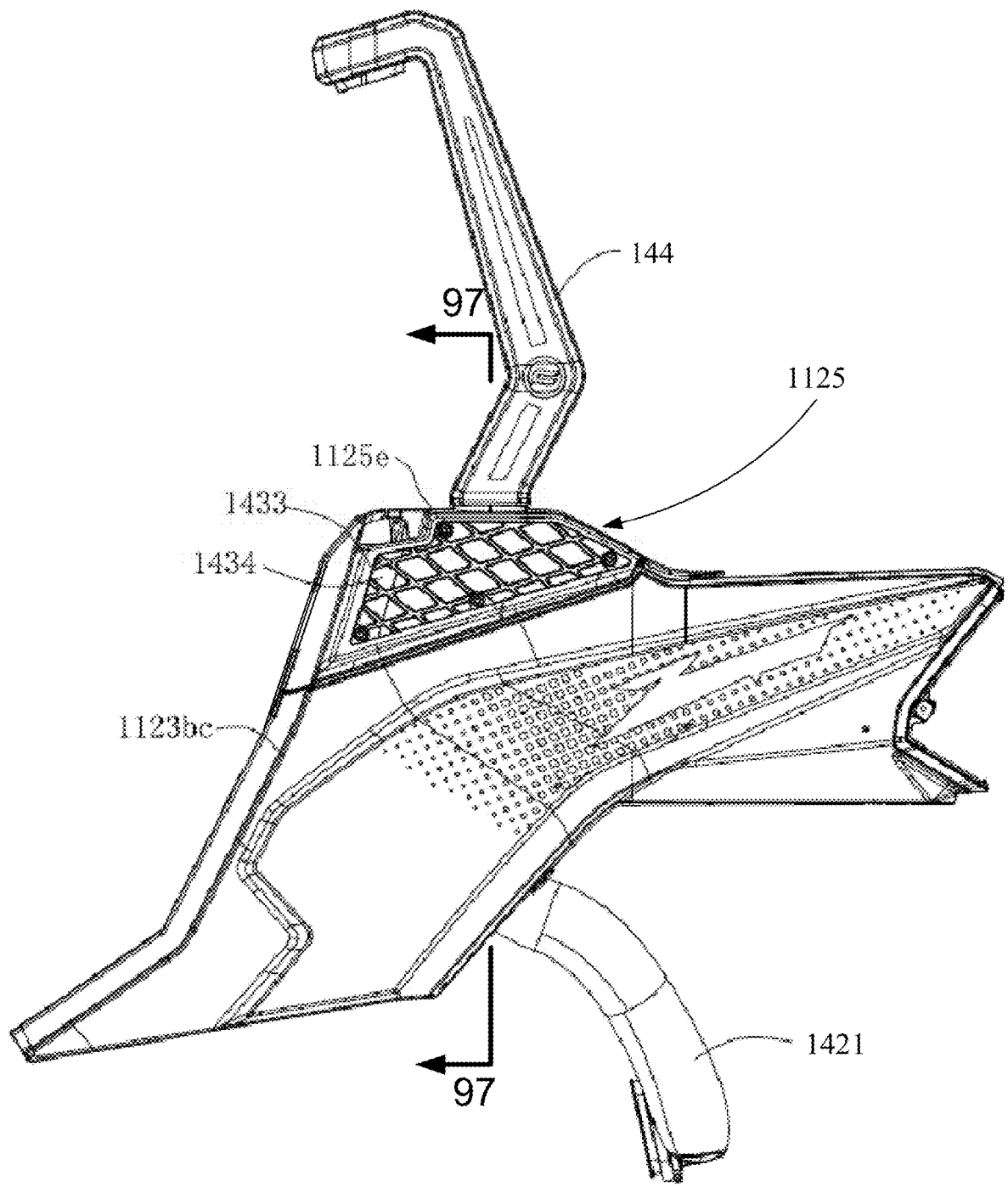
FIG. 96 is a side perspective view similar to FIG. 92, but also showing an after-market snorkel attached into the cooling air intake cavity.
Figure 97:
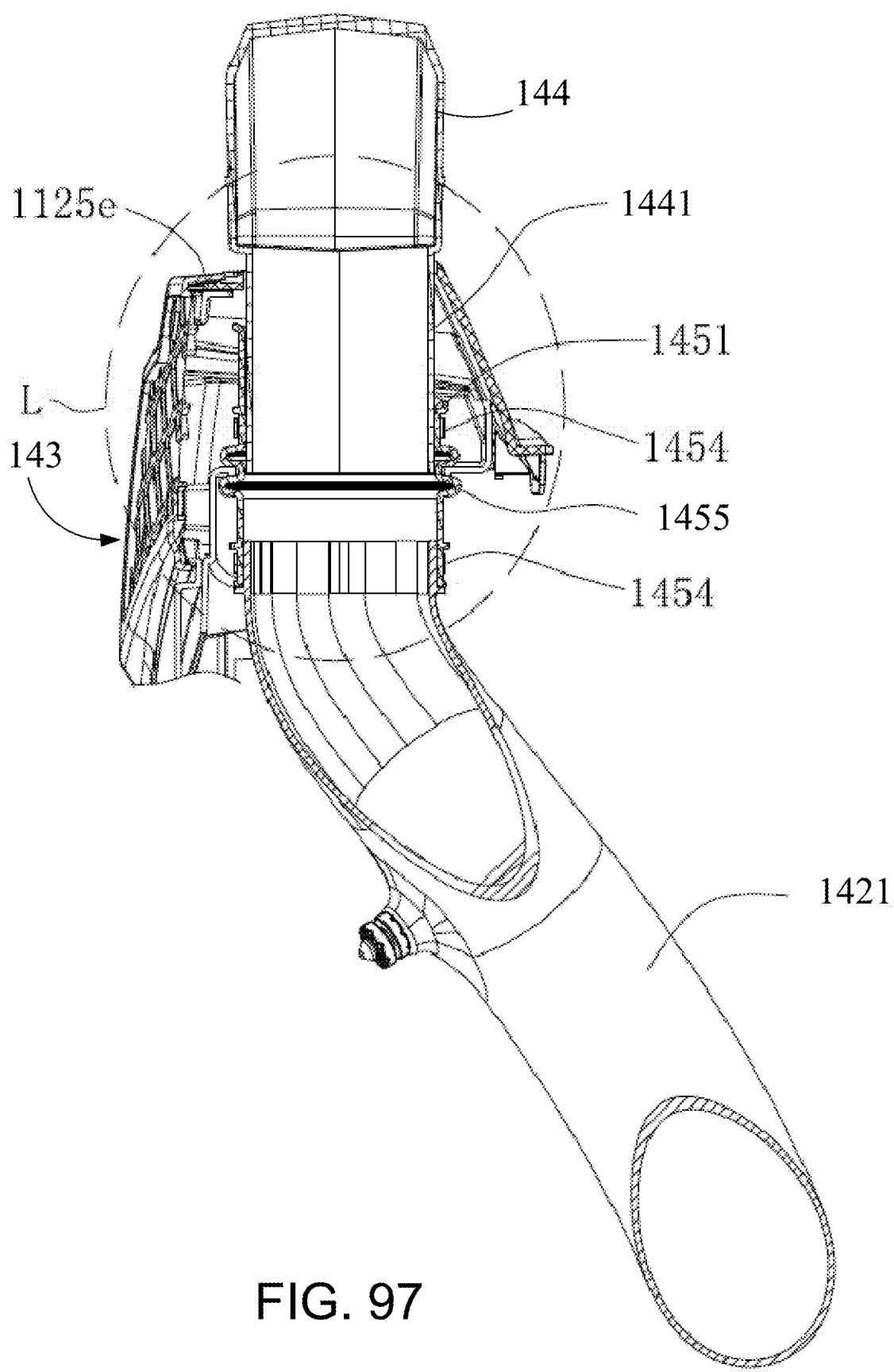
FIG. 97 is a cross-sectional view, taken along cut lines 97-97 in FIG. 96.
Figure 98:
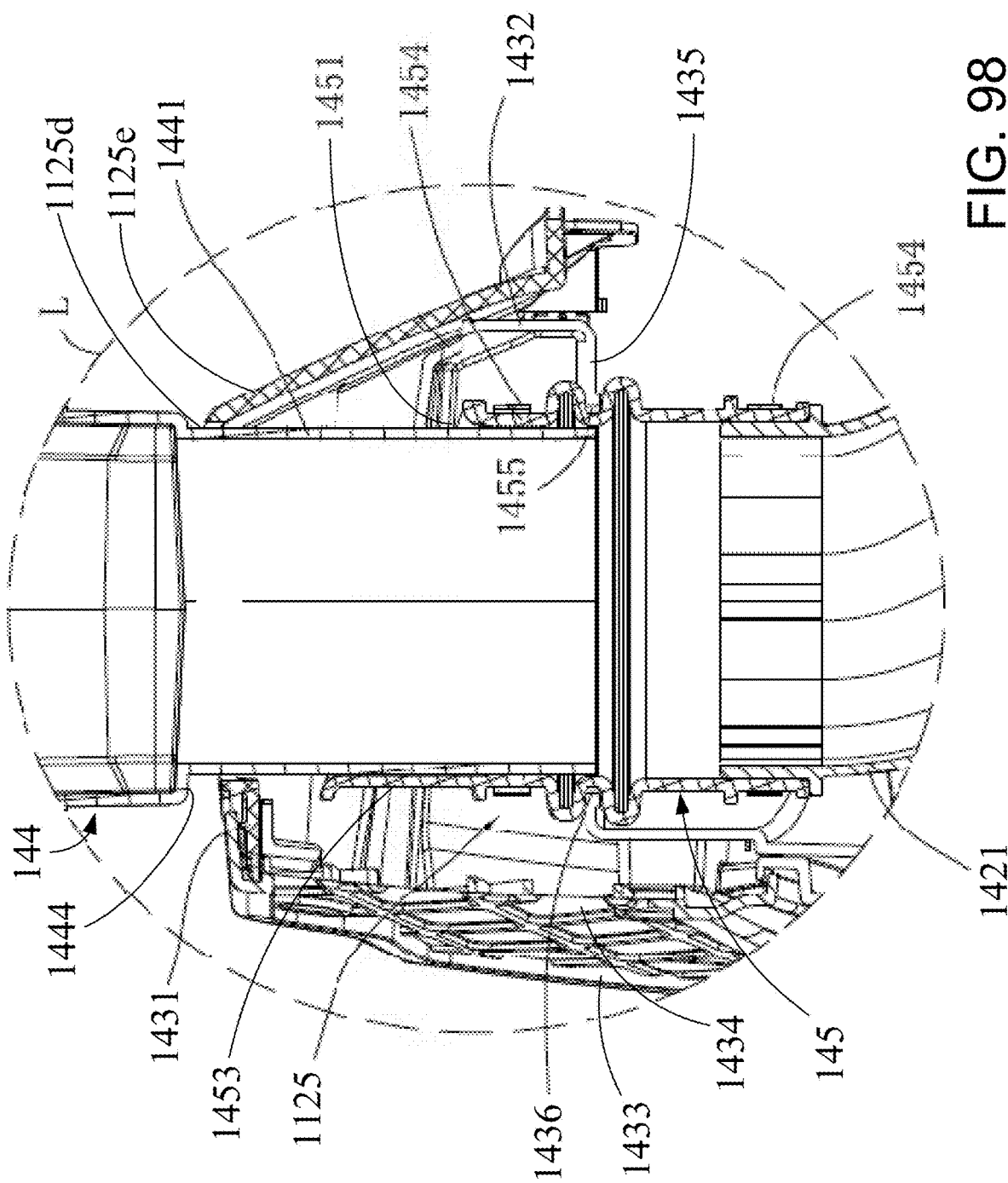
FIG. 98 is an enlarged view of part L in FIG. 97.

FIG. 91 shows a preferred cooling air intake manifold 1421. The cooling air intake manifold 1421 extends downwardly from the intake inlet adapter pipe 145 to an air inlet 1222 (shown in FIG. 83) on the rear side of the transmission 122, and the air outlet 1421a of the cooling air intake manifold 1421 is directed forwardly on the vehicle 100. The intake inlet adapter pipe 145 of the cooling air intake manifold 1421 defines a central axis 1452 which is generally vertical such that the airflow through the intake inlet adapter pipe 145 is vertically downward. Instead of being transverse to the central axis 1452, a heightened outer wall section 1453 is defined such that the intake inlet 1451 is angled or sloped relative to the central axis 1452. The intake inlet adapter pipe 145 preferably includes upper and lower hose clamps 1454 and an intermediate sealing groove 1455, all preferably positioned below the intake inlet 1451 and the heightened outer wall section 1453. The cooling air intake manifold 1421 and the intake inlet adapter pipe 145 can be formed of metal or, because they handle relatively cool atmospheric air, one or both of the cooling air intake manifold 1421 and the intake inlet adapter pipe 145 can alternatively be molded of a polymer. For instance, the intake manifold 1421, and particularly the intake inlet adapter pipe 145, may be formed or rubber, silicone, or the like. In an alternative embodiment, the intake inlet adapter pipe 145 is integrally formed with the cooling air intake manifold 1421, omitting the lower hose clamp 1454. In the preferred embodiment and as shown in FIG. 81, the combustion intake manifold 1411 on the opposite side of the vehicle 100 preferably has an intake inlet adapter pipe 145 with a heightened outer wall section 1453 oriented 180° around the central axis 1452, so the heightened outer wall section 1453 is again facing the outside of the vehicle 100. In an alternative embodiment, the combustion intake manifold 1411 is integrally formed with its intake inlet adapter pipe 145. However, forming the intake inlet adapter pipe 145 as a separate part from either the combustion intake manifold 1411 or the cooling air intake manifold 1421 simplifies manufacture of the intake manifolds 1411, 1421.

FIGS. 92-95 show the structure which defines the preferred cooling air intake cavity 1125 on the driver side of the vehicle 100. The preferred combustion air intake cavity 1126 on the passenger side of the vehicle 100 has a mirror image structure. Each includes an intake seat 143 mounted on the rear frame portion 1113 at a high elevation just behind the B-pillar base leg 1113a, higher than the rear side plate 1123bc of the vehicle cover 112, so as to be located between the cabin 1121 and the rear wheels 181, 182. The intake seat 143 provides a vertically extending window 1431 for an air intake grill plate 1433 having a plurality of air intake throughholes 1434, as well as a mounting base 1432 for an intake cavity cover 1125e, both above an intake seat floor 1435. It should be noted that the intake seat 143 is a separate component than the rear side plate 1123bc. The processing of the vehicle cover 112 can be simplified, as it is no longer necessary to define any air intake cavity 1125, 1126 on the side of the vehicle cover 112. At the same time, the intake seat 143 as an integral part has a very good sealing property to both the intake cavity cover 1125e and the intake inlet adapter pipe 145, so that substantial airflow can only enter the air intake cavity 1125, 1126 through the vertically extending window 1431 of the intake seat 143. In this way, the debris- and water-removing efficiency of air is effectively improved. Secondly, the intake seat 143 may be formed of a different material than the rear side plate 1123bc of the vehicle cover 112. As a result, design flexibility is improved. The intake seat 143 needs to withstand the suction force of the associated intake manifold 1411, 1421, and the material for the intake seat 143 can be selected according to strength requirements, thus improving the reliability of the intake seat 143. For instance, the intake seat 143 may be formed by stamping and bending steel sheet material.

The floor 1435 of the intake seat 143 defines a manifold installation hole 1436. The axis of the installation hole 1436 is substantially vertical, matching the central axis 1452 defined by the intake inlet adapter pipe 145. The intake inlet adapter pipe 145 is mounted on the floor 1435 of the intake seat 143 with the sealing groove 1455 received in the installation hole 1436, such that the intake inlet 1451 protrudes from the installation hole 1436 into the interior of the air intake cavity 1125, 1126 above the intake seat floor 1435. The edge of the installation hole 1436 is received in the sealing groove 1455 so that the intake inlet adapter pipe 145 is sealed to the intake seat 143. Air enters the air intake cavity 1125, 1126 through the vertically extending window 1431 and flows as shown by arrows in FIG. 94, upwardly under the intake cavity cover 1125e and over then heightened outer wall section 1453 before travelling downwardly in the intake inlet adapter pipe 145 and downwardly in the associated intake manifold 1411, 1421.

The air intake grill plate 1433 covers the vertically extending window 1431 but has a plurality of air intake throughholes 1434. The air intake grill plate 1433 removes leaves and other air-carried debris from the air flow into the air intake cavity 1125, 1126. The inner side of the air intake grill plate 1433 or the inside of the throughholes 1434 may be provided with one or more filter layers (not shown) to further filter incoming air, thereby extending the service life of the engine 121 and/or transmission 122. The connection between the air intake grill plate 1433 and the intake seat 143 can use removable structures such as bolts, screws or snaps to facilitate the removal of the air intake grill plate 1433 and the cleaning and maintenance of the interior of the air intake cavity 1125, 1126.

The intake seat floor 1435 is preferably convex or slanted. When the off-road vehicle 100 is running (or when the vehicle 100 is in a storm or being washed), water, mud, precipitation or other impurities may enter the air intake cavity 1125, 1126 through the air intake grill plate 1433. The heightened outer wall section 1453 has a blocking effect, and the intake seat floor 1435 directs the water, mud, etc. away from the intake inlet 1451 of the intake inlet adapter pipe 145. The water, mud, etc. can then exit the air intake cavity 1125, 1126 through a gap (not shown) between the intake seat 143 and the vehicle cover 112. In this way, the preferred design achieves double blocking of water and other impurities at the intake inlet 1451 of the intake inlet adapter pipe 145, which effectively reduces the probability of damage to the engine 121 or transmission 122, which reduces the failure rate of the prime mover assembly 12 and improves the safety of the off-road vehicle 100.

The vehicle 100 optionally includes one or two intake snorkels 144, shown in FIGS. 96-100, for elevating the intake position of one or both intake manifolds 1411, 1421. Each intake snorkel 144 can be sold as an after-market accessory, particularly to vehicle owners who expect to often use their vehicles 100 in deep mud, or wading through ponds, rivers or other water, etc., thereby achieving an even higher air intake position for the off-road vehicle 100.

The preferred intake snorkel 144 is easy to use and install. The intake cavity cover 1125e defines a wall-breaking area 1125*f* shown in FIG. 93. The bearing capacity of wall-breaking area 1125*f* is less than that of other areas of the intake cavity cover 1125*e*. The intake cavity cover 1125*e* is preferably a plastic part, molded with a groove of reduced wall thickness which defines the wall-breaking area 1125*f*. The intake cavity cover 1125*e* with the wall-breaking area 1125*f* is simple in construction, convenient in processing and lower in manufacturing cost. When it is desired to install an intake snorkel 144, simple tools such as hammer can be used to destroy the wall-breaking area 1125*f* to form a through-hole 1125*d* in the intake cavity cover 1125*e*. In an alternative embodiment, instead of a wall-breaking area 1125*f*, the intake cavity cover 1125*e* may include a circular hinged portion (not shown), so the intake snorkel 144 can be added or removed at any time as desired by the vehicle owner. For instance, hinges similar to the quick assembly hinges 1122*e* described relative to FIGS. 23-25 could be used. As another alternative, the intake cavity cover 1125*e* could include a circular portion (not shown) attached using plug tabs and snap-fit tabs similar to the plug tabs 1122*ck* and snap-fit tabs 1122*cl* of the adjuster cover plate 1122*cj* described relative to FIGS. 67-69. In all embodiments, installation of the intake snorkel 144 by pushing it straight down into the intake cavity cover 1125*e* into the intake inlet adapter pipe 145 is easy to align, connect and then seal by tightening of the top hose clamp 1454, and professional maintenance personnel are not required to retrofit the intake snorkel 144 to the vehicle 100.

Once installed, a bottom pipe section 1441 of the intake snorkel 144 extends through the through-hole 1125*d* and into the air intake cavity 1125, 1126 and connects to the intake inlet adapter pipe 145 of the associated intake manifold 1411, 1421. The intake inlet adapter pipe 145 may have a flared top end of greater diameter to assist in receiving the bottom pipe section 1441 of the intake snorkel 144. The intake snorkel 144 preferably has a positioning step 1444, signaling to the user that the bottom pipe section 1441 of the snorkel 144 has been fully lowered into the intake inlet adapter pipe 145 when the positioning step 1444 abuts the top surface of the intake cavity cover 1125*e*. The positioning step 1444 accordingly helps avoid excessive insertion of the bottom pipe section 1441 into the air intake cavity 1125, 1126 or the intake inlet adapter pipe 145. Tightening of the upper hose clamp 1454 around the bottom pipe section 1441 helps achieve a stable connection and improves the sealing performance. In other embodiments, the intake manifold 1411, 1421 and the intake snorkel 144 (and the intake inlet adapter pipe 145 if present as a separate part) may alternatively be connected by threading, with a snap fit or the like.

The intake snorkel 144 includes a top pipe section 1442 which defines an air inlet 1446. The central axis of the top pipe section 1442 is preferably at an angle C1 relative to vertical, with the air inlet 1446 on the underside of the top pipe section 1442, helping shield the air inlet 1446 from gravitationally falling water. The angle C1 defined between the central axis of the top pipe section 1442 and vertical is preferably in the range between 40° and 140°, and more preferably in the range between 60° and 140°, and most preferably in the range between 80° and 110°.

Figure 100:
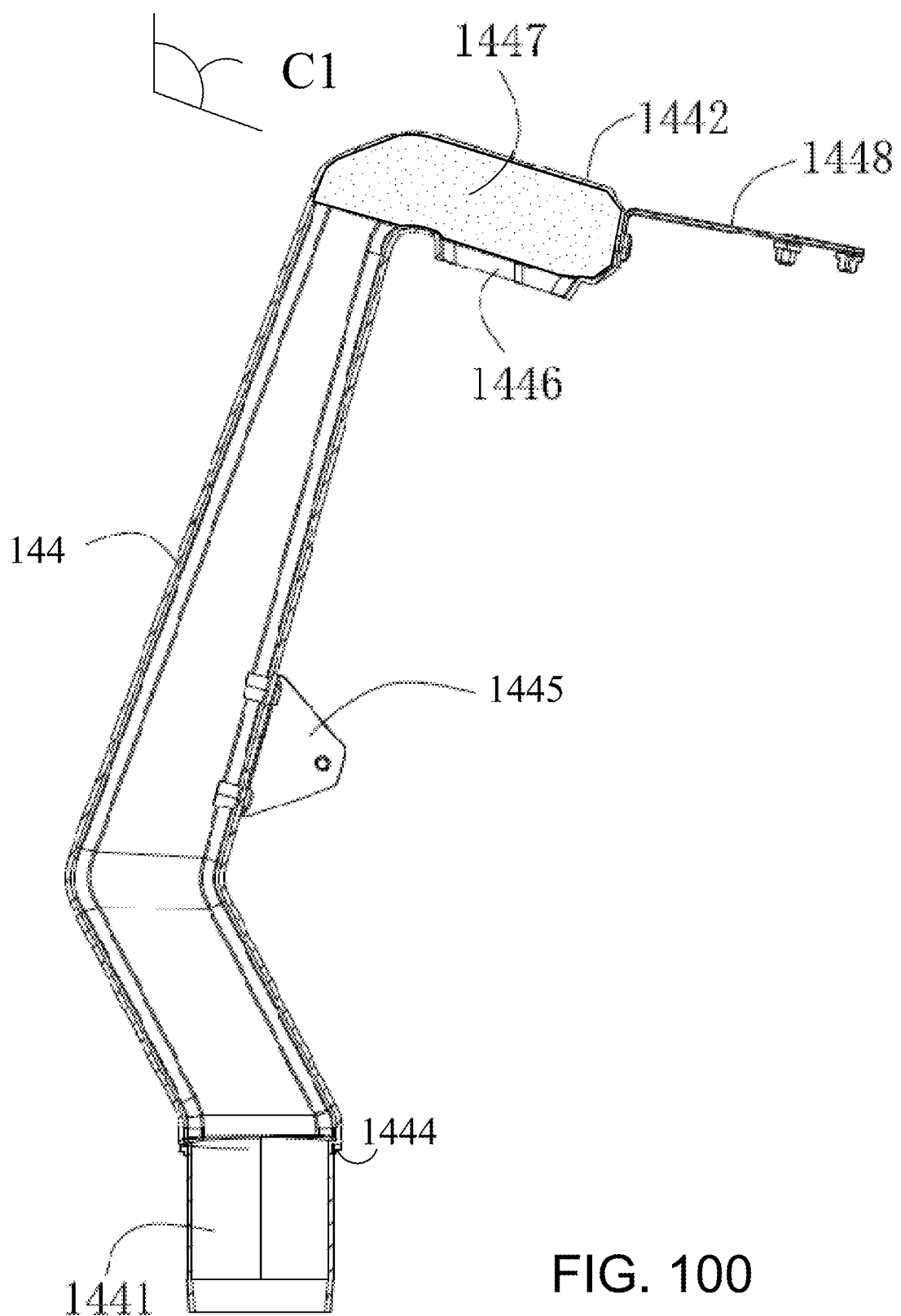
FIG. 100 is a cross-sectional view of the intake snorkel, taken along cut lines 100-100 in FIG. 99.

In the preferred embodiment as shown in FIG. 100, the air inlet 1446 is provided with a filter 1447 for filtering air entering into the intake snorkel 144. By having the angle C1 of the axis of the top pipe section 1442 exceed 90° relative to vertical, any water captured by the filter 1447 will tend to gravitationally drip out of the air inlet 1446 rather than down the intake snorkel 144. Overall, the shape of the intake snorkel 144 may be similar to the shape of the rear end of the main longitudinally-extending ROPS tube 1123*cd*, so as to improve the coordination and integrity between the intake snorkel 144 and the vehicle cover 112.

Figure 99:
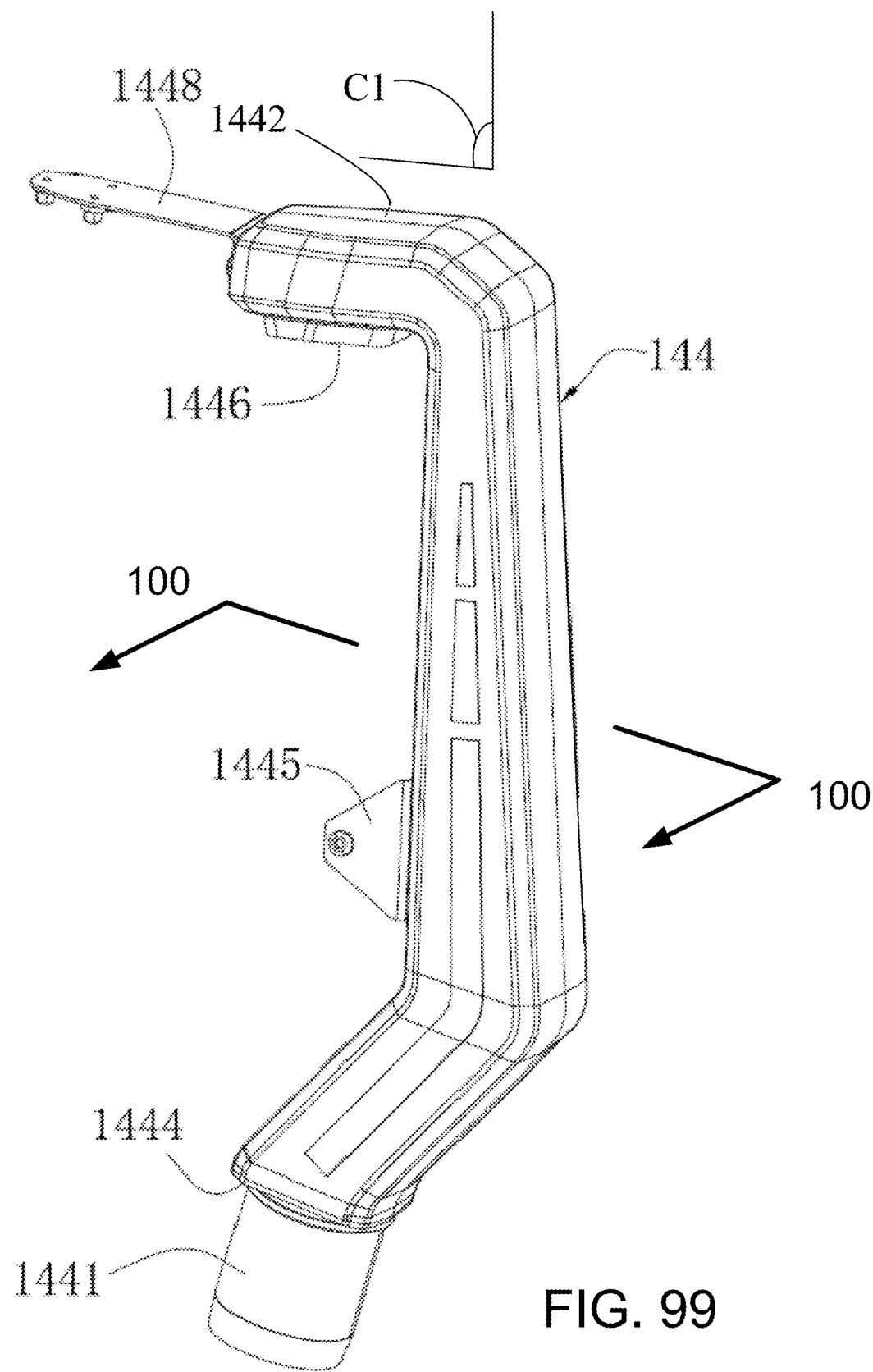
FIG. 99 is a perspective view of the intake snorkel of FIGS. 96-98.

The intake snorkel 144 optionally includes a snorkel mounting flange 1445 shown in FIGS. 99 and 100. When the intake snorkel 144 is positioned in place, the snorkel mounting flange 1445 is connected to the vehicle 100 such as at the main longitudinally-extending ROPS tube 1123*cd*. The snorkel mounting flange 1445 provides support for the intake snorkel 144 to avoid failure of the connection between the intake snorkel 144 and the intake inlet adapter pipe 145/intake manifold 1411, 1421 due to vibration or external acceleration forces of the off-road vehicle 100. The connection between the snorkel mounting flange 1445 and the main ROPS tube 1123*cd* can be connected by a detachable structure such as bolts, buckles, snaps, clips or hoops.

As further shown in FIGS. 99 and 100, the intake snorkel 144 also optionally includes a top end fixation plate 1448. The top end fixation plate 1448 can be used to further connect intake snorkel 144 to a high location on the vehicle cover 112. In the embodiment shown in FIGS. 99 and 100, the top end fixation plate 1448 is removably connected to the top pipe section 1442, and the position between the top end fixation plate 1448 and the intake snorkel 144 can be adjusted. Adjustability of the connection position between the intake snorkel 144 and the top end fixation plate 1448 improves the installation flexibility of the intake snorkel 144. The top end fixation plate 1448 and the top pipe section 1442 may be removably connected through bolts, buckles, snaps, clips, hoops or other structures.

Figure 101:
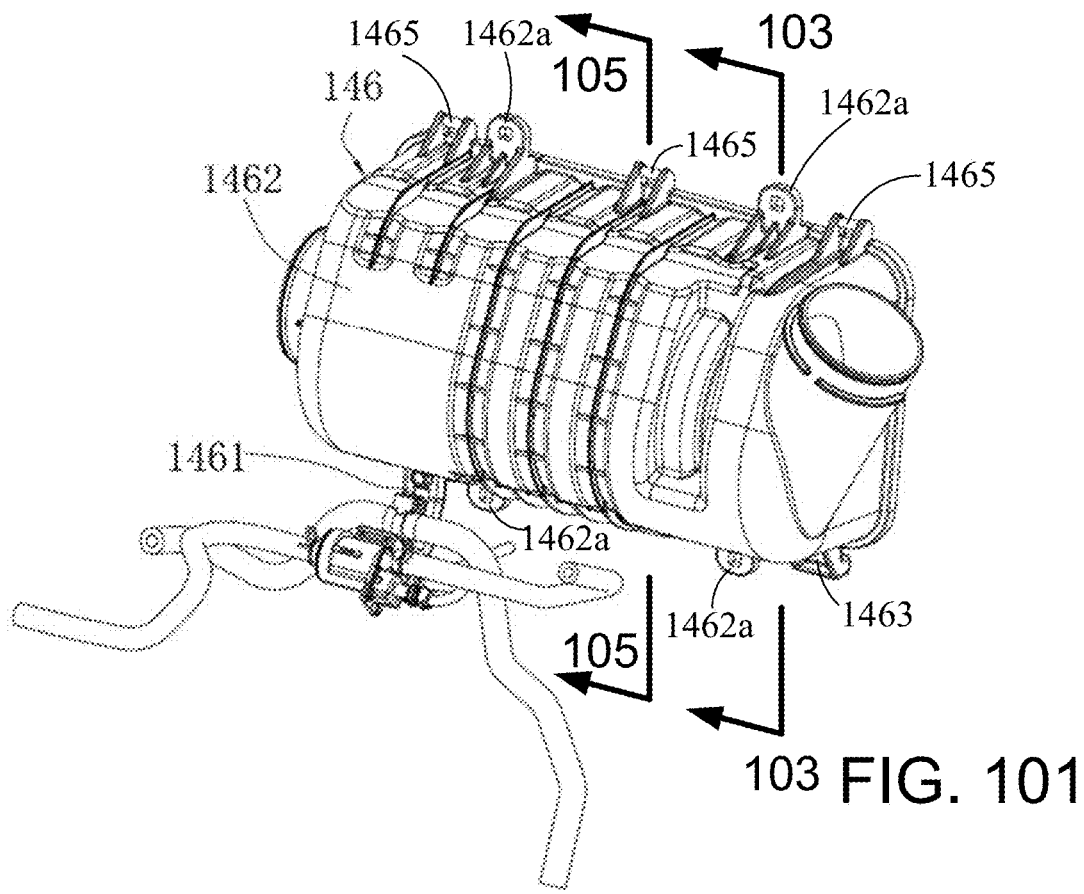
FIG. 101 is a rear right perspective view of the air filter of FIG. 81.

The combustion gas handling system 141 further includes an air filter 146 shown in FIGS. 81 and 101-105. The air filter 146 is mounted on the combustion intake manifold 1411 and fixed on the frame 111 or the vehicle cover 112. The air filter 146 is used to filter the air entering the combustion intake manifold 1411, so that the air entering the engine 121 meets cleanliness requirements. The air filter 146 primarily consists of a replaceable air filter element 1466 (best shown in FIGS. 104 and 105) within an air filter housing 1462. The air filter housing 1462 also preferably includes a wire rack 1461 as shown in FIG. 101 for fixing of brake line, electrical harness(es), carbon recirculation canister pipeline, and the like, so as to avoid openings on the frame 111 and adding other supports, thus reducing the cost and weight of the vehicle.

The filter element 1466 of the air filter 146 needs to be cleaned or replaced regularly during the life of the vehicle 100, and the position of the air filter 146 should be convenient for replacing the filter element 1466. The position of the air filter 146 should minimize the likelihood that dust or sediment will be brought into the prime mover assembly 12 during the replacement process, which could otherwise affect the service life of the prime mover assembly 12. The air filter housing 1462 preferably includes one or more housing attachment flanges 1462*a*, best seen in FIGS. 81 and 101, for securely mounting the air filter 146 such as with bolts (not shown). In the preferred embodiment, the position of the air filter 146 is just behind the rear baffle 1122*d* of the interior trim package 1122, in front of the rear trunk 1123*ba*, and just inside the passenger side B-pillar base leg 1113*a*. This preferred position of the air filter 146 allows the filter element 1466 to be replaced quickly and conveniently, and prevents pollution of the engine 121 during the air filter replacement process.

As known in the air filter art, the air filter 146 includes structure to facilitate replacement of the air filter element 1466. Namely, the air filter 146 includes an air filter housing cover 1467, removably received on the air filter housing 1462 and secured to the air filter housing 1462 with one or more spring clips 1468 best shown in FIG. 81. The air filter housing cover 1467 includes lower hooks 1467*a* (called out in FIG. 104) which mate into hook slots 1463 (best shown in FIG. 101) on the bottom side of the air filter housing 1462. The spring clips 1468 mate into spring clip openings 1465 (best shown in FIG. 101) on the top side of the air filter housing 1462. When tightened into position using the spring clips 1468, the air filter housing cover 1467 may compress a gasket or compressible O-ring type seal into a corresponding peripheral groove 1464 on the air filter housing 1462, sealing the air filter housing cover 1467 in an air-tight manner to the air filter housing 1462. When the user wants to replace the air filter element 1466, the user may release the spring clips 1468 by hand and without any tools, and then pivot the air filter housing cover 1467 downwardly to get access to the interior of the air filter housing 1462 and to the air filter element 1466.

As best shown in FIGS. 20 and 106, the rear baffle 1122*d* of the interior trim 1122 is provided with an air filter access port 1121*b* having a removable air filter access port cover 1127*e*, and the air filter 146 is accessible through the filter element access port 1121*b* after removal of the air filter access port cover 1127*e*. In the preferred embodiment, the air filter access port cover 1127*e* is attached to the rear baffle 1122*d* using plug tabs 1127*f* and snap-fit tabs 1127*g* similar to the plug tabs 1122*ck* and snap-fit tabs 1122*cl* of the adjuster cover plate 1122*cj* described relative to FIGS. 67-69. Alternatively, the air filter access port cover 1127*e* could be hinged to the rear baffle 1122*d* similar to the quick assembly hinges 1122*e* described relative to FIGS. 23-25. The air filter access port cover 1127*e* is generally planar, oriented at an angle which matches that of the passenger's seat back 1122*fb*. The air filter housing cover 1467 is generally planar, oriented so as to be parallel to and immediately behind the air filter access port cover 1127*e*. The location of the air filter 146 is arranged at the filter element access port 1121*b* by arranging the position of the engine 121 and the direction of the combustion intake manifold 1411. Maintenance of the air filter 146 and replacement of the filter element 1466 can be realized through the filter element access port 1121*b*. The cabin 1121 is mainly used as a space for drivers, passengers and their personals, which is usually the cleanest area in the vehicle 100 compared with other areas. In other words, the location of the air filter 146 and the air filter access port 1121*b* are specially chosen so as to reduce the probability of bringing dust or sediment into the interior of the air filter 146 and/or into the interior of the combustion intake manifold 1411 during maintenance and filter element replacement. In addition, even if the seal of air filter housing 1462 should fail such that air is being drawn in at the air filter housing 1462 rather than at the combustion air intake cavity 1126 and/or at snorkel air inlet 1446, the air being drawn in will still be substantially protected from debris, water and mud due to the position selected for the air filter 146.

The filter element access port 1121*b* is arranged on the rear baffle 1122*d*, and the seat 1122*f* is either quickly removable or has a seatback 1122*fb* which can be quickly moved. The filter element access port 1121*b* is directly behind the seatback 1122*fb*. The spring clips 1468 can be unfastened and the air filter housing cover 1467 can be downwardly pivoted through the filter element access port 1121*b*. Accordingly, filter element replacement and/or air filter maintenance can be achieved without any tools and with minimal removal of the vehicle cover 112.

The replacement of the filter element 1466 (and/or maintenance and repair of air filter 146) can be completed by the following steps: firstly, moving the seat 1122*f* and/or seatback 1122*fb* to access the rear baffle 1122*d* at the filter element access port 1121*b*; secondly, finger pressing the snap-fit tab(s) 1127*g* forcibly to separate the air filter access port cover 1127*e* from the rear baffle 1122*d*, and pivoting and/or moving the air filter access port cover 1127*e*; thirdly, unfastening the spring clip(s) 1468 to release the locking force, and pivoting and/or moving the air filter housing cover 1467; fourthly, taking the filter element 1466 out from the housing 1462, and installing the new or cleaned filter element 1466 into the housing 1462; and fifthly, re-installing the air filter housing cover 1467 and the air filter access port cover 1127*e*. The entire replacement of the filter element 1466 can be accomplished by the user easily and without tools, replacing the filter element 1466 from within the cabin 1121.

Figure 108:
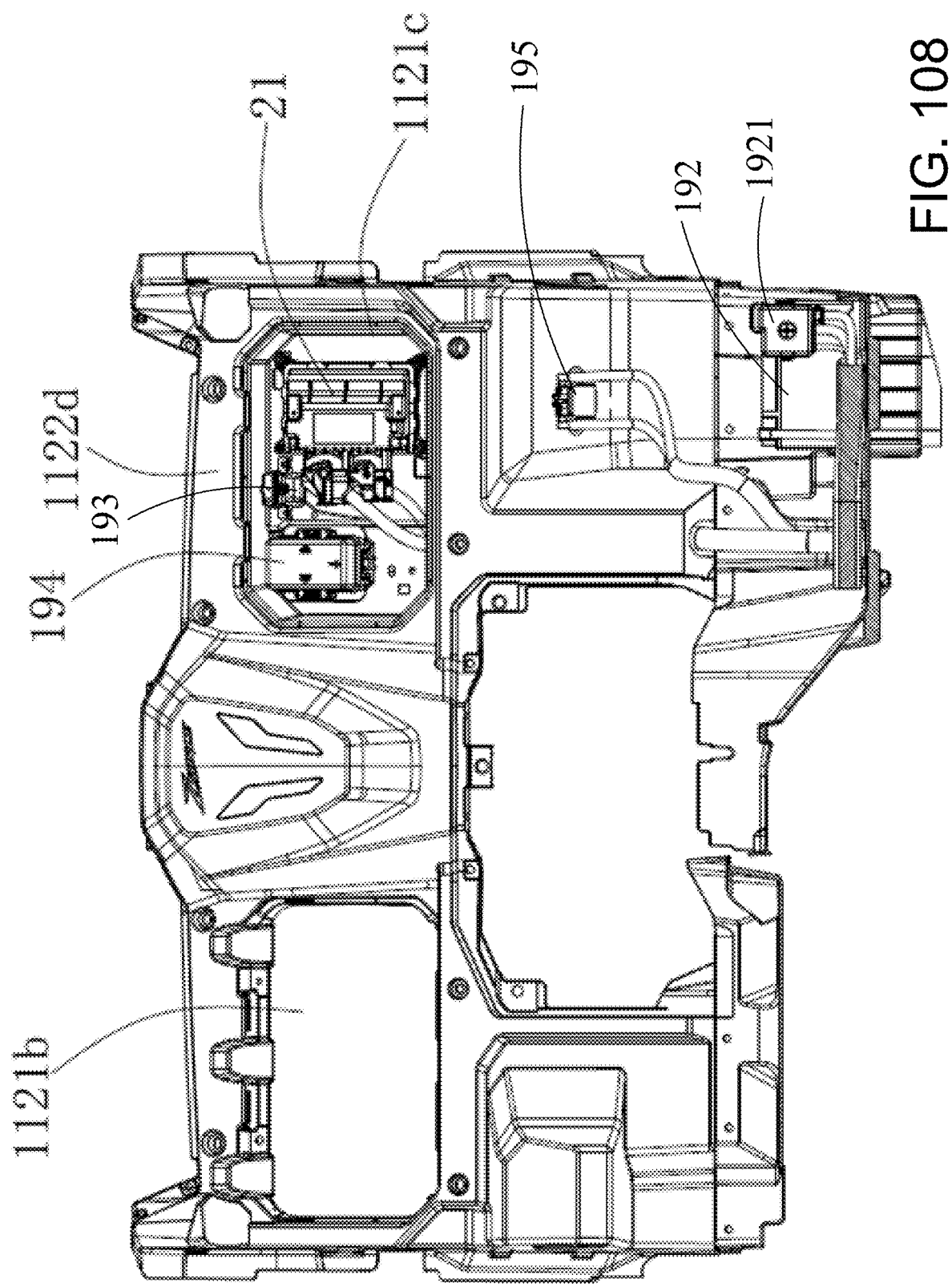
FIG. 108 is a front view of the rear baffle of FIGS. 19, 20, 101, 102 and 106, with the air filter access port cover and the ECU access port cover removed, and further showing several components of the electrical system.

The vehicle 100 includes an electronic control unit 21, or "ECU" as known in the art. As further shown in FIGS. 20, 106 and 108, an ECU access port 1121*c* is defined in the rear baffle 1122*d* on the driver's side, covered with an ECU access port cover 1121*d*. The ECU 21 can be accessed through ECU access port 1121*c*. In the preferred embodiment, the ECU access port cover 1121*d* has a similar size, shape and attachment structure as the air filter access port cover 1127*e*, but is slightly thinner. Alternatively, the ECU access port cover could be identical to the air filter access port cover, thereby reducing the number of unique parts in the vehicle 100 and reducing required inventory. Each of the ECU access port cover 1121*d* and the air filter access port cover 1127*e* are generally rectangular, and each are relatively large, having an area which is at least 10% of the area of the rear baffle 1122*d*. For instance, the ratio of the area of ECU access port 1121*c* to the area of rear baffle 1122*d* can be greater than or equal to 0.2. In other embodiments, the ECU access port cover 1121*d* can have a different size or shape than the air filter access port cover 1127*e*, and/or a different structure for attaching the ECU access port cover 1121*d* to the rear baffle 1122*d*. When the ECU 21 needs to be modified, overhauled or replaced, there is no need to disassemble other large components, and maintenance is very convenient. When the ECU access port 1121*c* does not need to be opened, it is covered first by the ECU access port cover 1121*d* and then by the driver's seat 1122*f* for concealment, so as to ensure the integrity and tidiness of cabin 1121.

FIG. 109 shows a layout of a preferred electrical system 19 for the vehicle 100. The electrical system 19 includes a battery pack 192, a diagnostic interface 193, a fuse box 194, a starting relay 195, a rectifier voltage regulator 196, an on-board T-BOX 197, a lighting system 198, a dashboard instrumentation array 200, a cabin warning indicator buzzer 1122*bd* (described with reference to FIG. 26) or alternatively other type of warning indicator, a horn 202, a plurality of switches 203, an electrical connector unit 204, and wiring for all these electrical components and other electrical components such as the winch 1111*ag*. The electrical system 19 also includes a generator (not separately shown), which can be part of the prime mover assembly 12. The generator is driven by the engine 121 and is capable of generating electricity. The generator serves as the main power supply for the vehicle 100. When the engine 121 is running and the generator works normally, it supplies power to the electrical equipment of the whole vehicle 100 and charges the battery pack 192.

Figure 110:
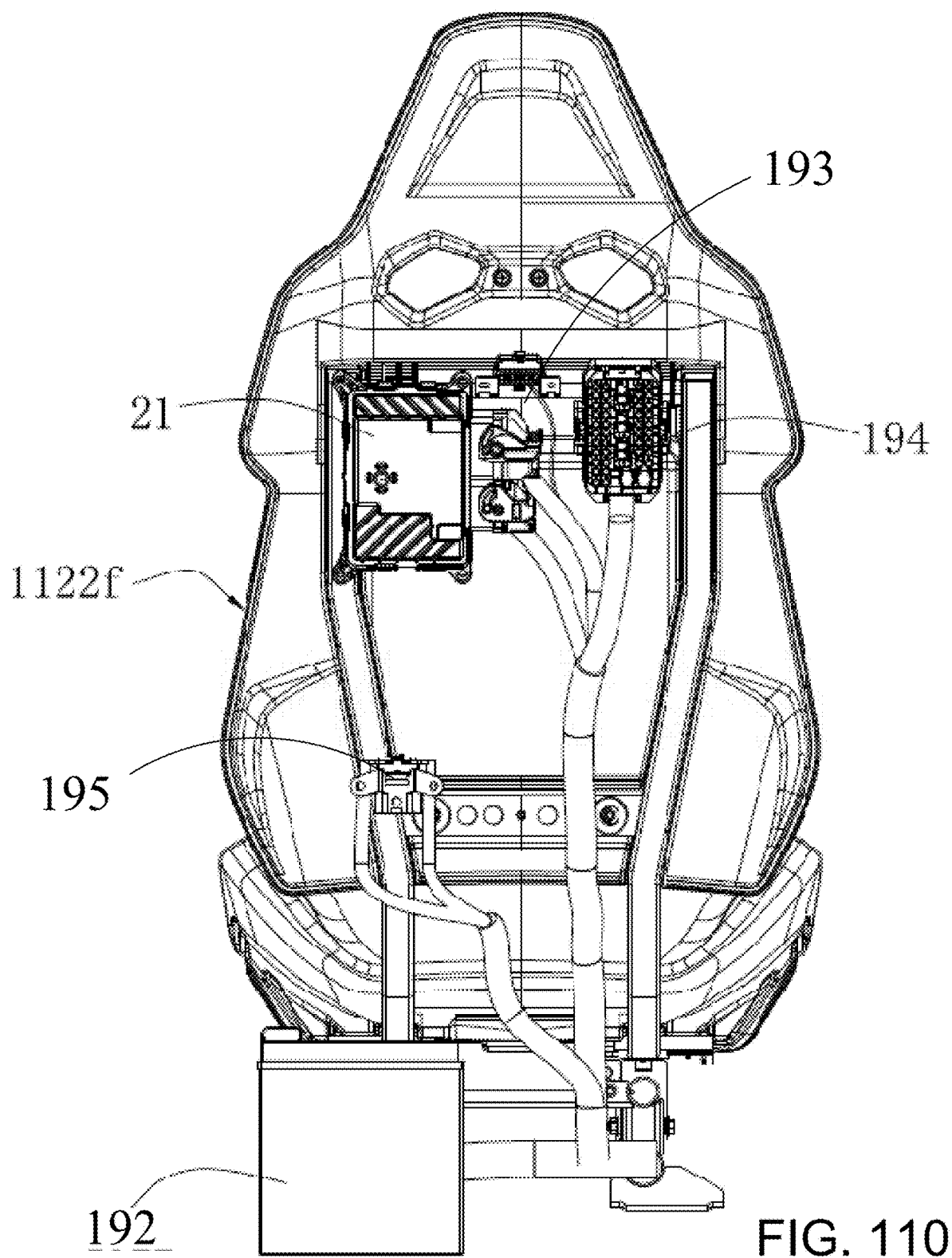
FIG. 110 is a rear elevational view showing the relative position relationship between the several components of the electrical system and the driver's seat.
Figure 111:
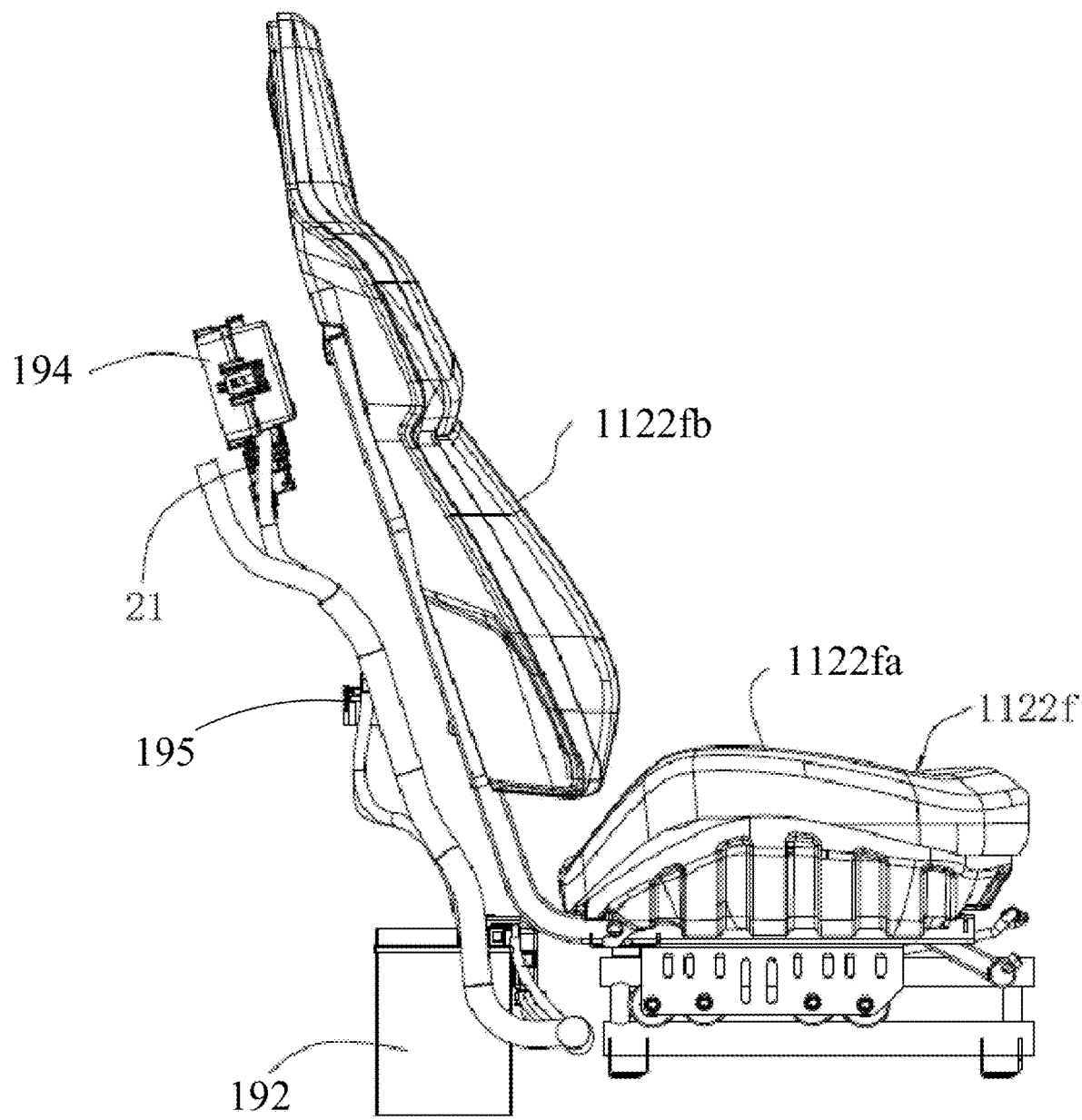
FIG. 111 is a right side view of the components of the electrical system and driver's seat of FIG. 110.
Figure 112:
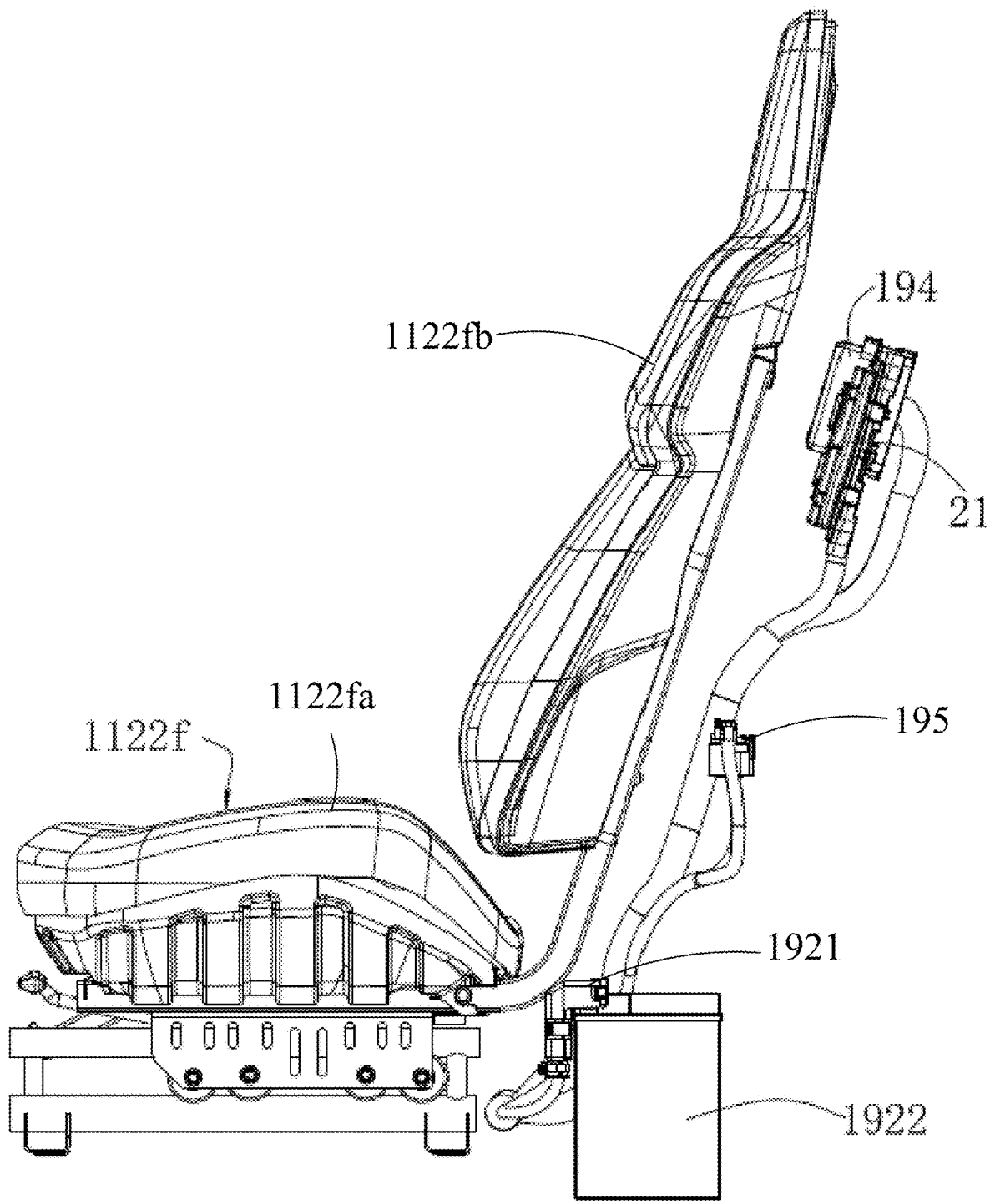
FIG. 112 is a left side view of the components of the electrical system and driver's seat of FIG. 110.

FIG. 110-112 show the preferred vertical and side-to-side layout of the ECU 21, the battery pack 192, the diagnostic interface 193, the fuse box 194, and the starting relay 195 relative to the driver's seat 1122f. The battery pack 192 stores electricity, and supplies that stored electricity when the engine 121 is not running. The battery pack 192 is mounted on the middle frame portion 1112 adjacent to the rear frame portion 1113, underneath the driver's seatback 1122fb and lower than a top surface of the driver's seat cushion 1122fa. When the battery pack 192 needs to be accessed such as for repair or replacement, it is only necessary to remove seat 1122f, which is convenient for maintenance and replacement. The battery pack 192 is a relatively heavy component, and a low location for the battery pack 192 lowers the center of gravity of the off-road vehicle 100. At the same time, the battery pack 192 is adjacent to the rear frame portion 1113, which can make the center of gravity of the off-road vehicle 100 be further backward and improve the driving stability of the vehicle. Alternatively, the battery 1922 could be mounted on the front frame portion 1111 or the rear frame portion 1113.

Figure 107:
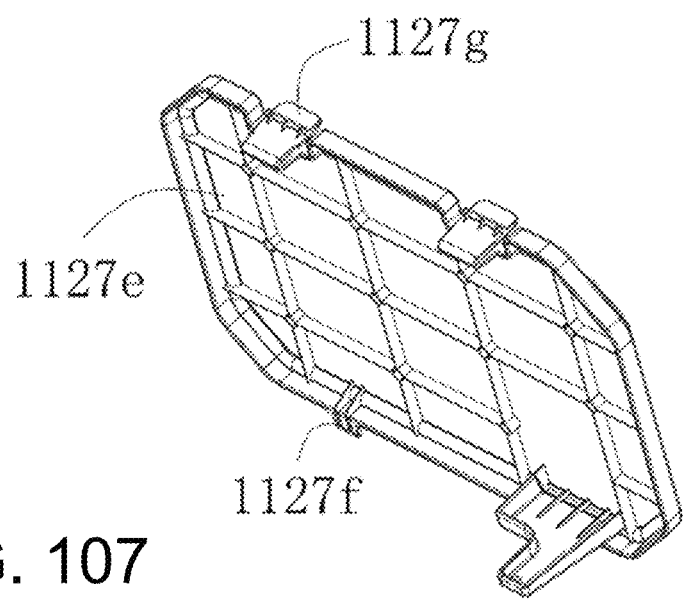
FIG. 107 is rear top perspective view of the air filter access port cover of FIG. 106.

The diagnostic interface 193, also referred to as On Board Diagnostics or an OBD port, is used to connect external vehicle detectors to detect the components and systems of off-road vehicle 100 through vehicle detectors, including ensuring that the vehicle's emissions during its service life do not exceed the requirements of regulations. The fuse box 194 is integrated with fuses for protecting the safety of various electrical components. In the preferred embodiment, the diagnostic interface 193 and the fuse box 194 are mounted on the rear frame portion 1113, adjacent to the ECU 21 and accessible at the ECU access port 1121c. During repair or maintenance of any of the ECU 21, the diagnostic interface 193 or the fuse box 194, it is only necessary to remove the driver's seat 1122f, which is convenient for maintenance and replacement. The starting relay 195 mainly controls the current of the high-voltage line by controlling the current of the low-voltage line and acts as a current switch. The starting relay 195 is located behind the seat 1122f, immediately above the battery pack 192 and below the ECU access port 1121c. The starting relay 195 is too low to be accessed below the ECU access port 1121c, but is preferably positioned in front of the rear baffle 1122d as shown in FIG. 107 so as to be accessible from within the cabin 1121 after removal of the driver's seat 1122f and/or movement of the driver's seatback 1122fb.

Figure 113:
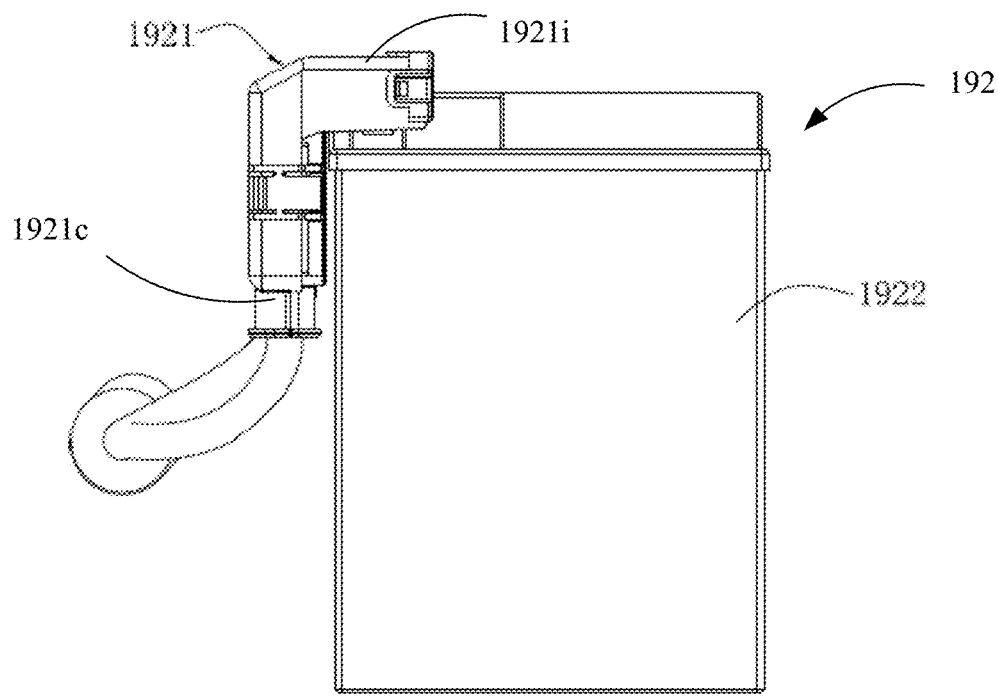
FIG. 113 is a right side view of the battery pack of FIGS. 108-112.
Figure 114:
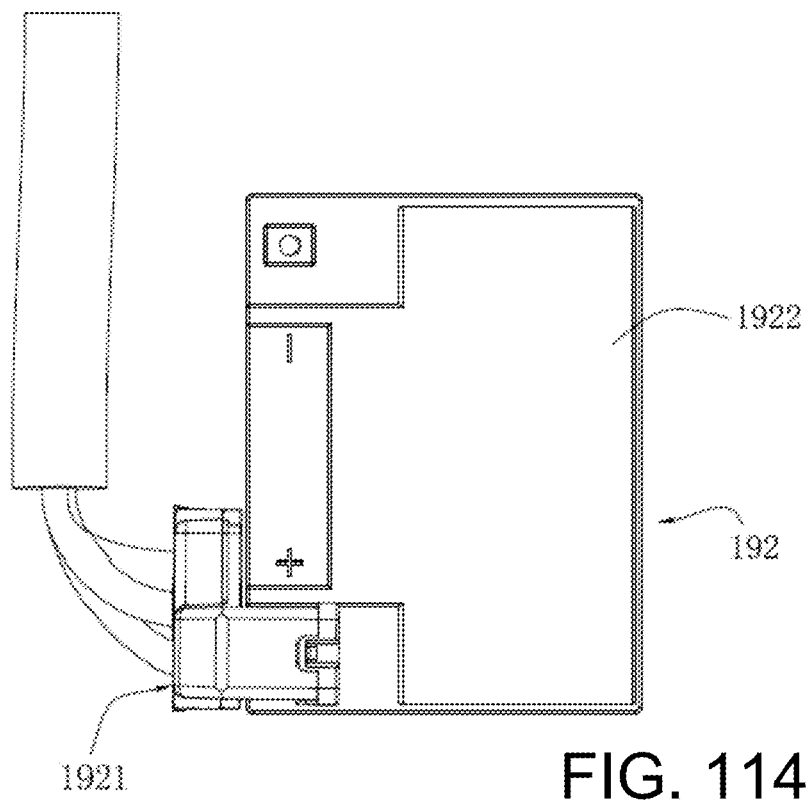
FIG. 114 is a top plan view of the battery pack of FIGS. 108-113
Figure 115:
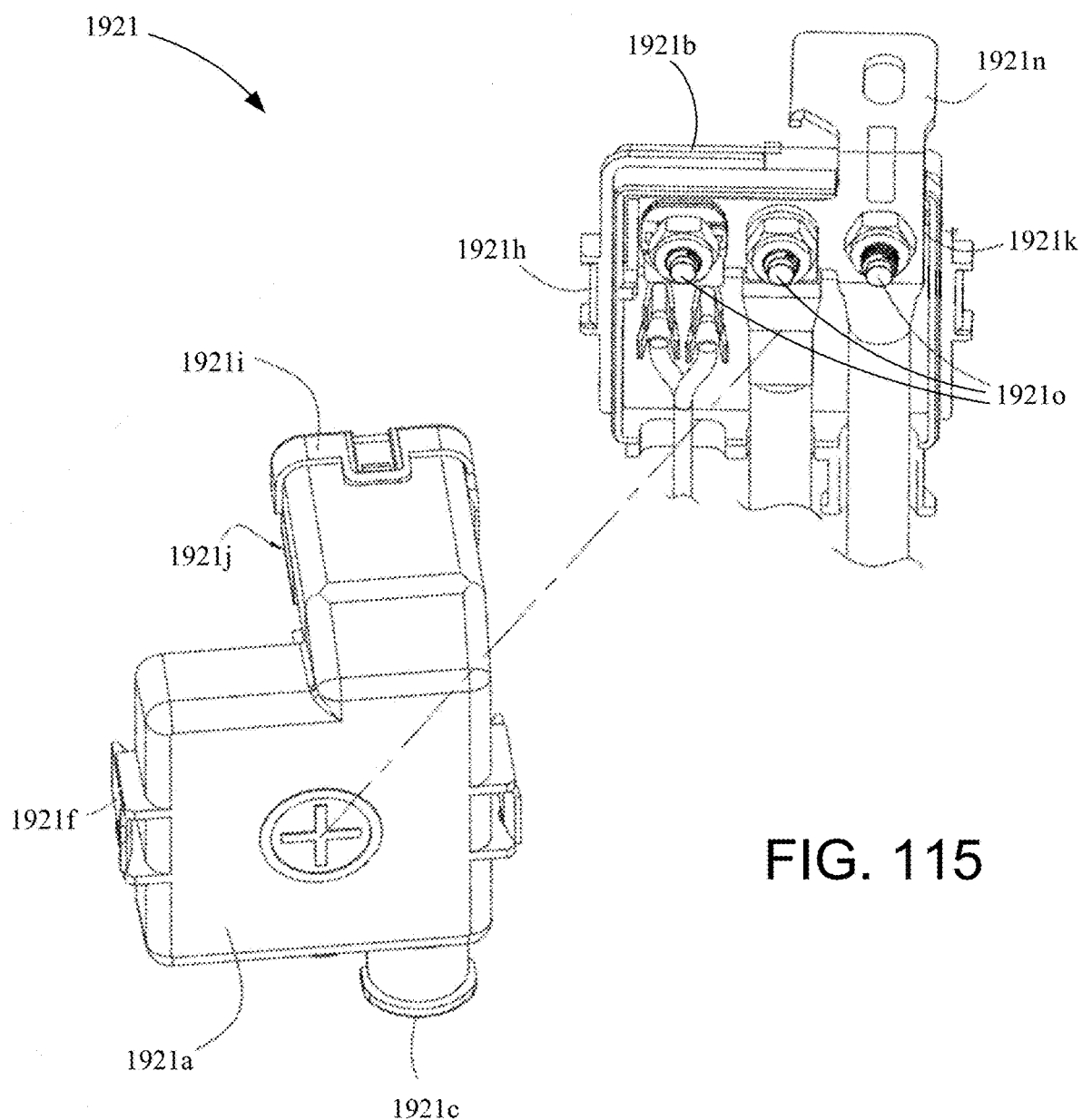
FIG. 115 is an exploded perspective view of the battery pack distribution box of FIGS. 113 and 114.

Various features of the battery pack 192 are further shown in FIGS. 113-115. The battery pack 192 includes a battery junction box 1921 and a battery 1922. The battery junction box 1921 is connected to the positive electrode of the battery 1922 to provide a plurality of connection terminals, so as to facilitate the connection of external electrical components. Alternatively, the battery junction box could be connected to the negative electrode of the battery 1922, but the preferred embodiment grounds the frame 111 of the vehicle 100 at the negative battery electrode, so placement of the battery junction box 1921 at the positive electrode is more convenient.

As shown in FIG. 115, the battery junction box 1921 includes a box body enclosure 1921a which removably connects to a box body base 1921b, a conductive member 1921k, and a plurality of terminals 1921o. The preferred embodiment shown provides three terminals 1921o, but other embodiments include more than three terminals. The conductive member 1921k includes a battery terminal end 1921n which extends out of the box body enclosure 1921a and is electrically connected to the positive electrode of the battery 1922. The plurality of terminals 1921o are spaced in the box body 1921a and electrically connected to the conductive member 1921k. Each electrical component that needs to be directly connected to the battery 1922 can extend its harness into the box body 1921a and electrically connect to one of the terminals 1921o in a reliable and orderly connection. For instance, the starting motor power harness and the brake power harness may be directly connected to the terminals 1921o, with other electrical components connecting through a general vehicle power harness. Each terminal 1921o may include a threaded stud and a nut to easily make a detachable connection as shown and known in the art.

The box body 1921a preferably defines at least one harness protector 1921c, but alternatively can provide a harness protector for each of the terminals 1921o. The harness protector 1921c shields the harness therein from inadvertent electrical contact, and can further attach to a sheath of the enclosed harness to provide strain relief for the harness.

In the preferred embodiment, the conductive member 1921k is bent, such that the battery junction box 1921 can be located on the side of the battery 1922 as shown in FIG. 113 even if the positive terminal is on top of the battery 1922, thereby reducing the space occupied by the battery junction box 1921. The bend angle defined by the conductive member 1921k is preferably in the range from 60° to 90°.

The box body enclosure 1921a and base 1921b are formed of a dielectric material, such as by injection molding of a polymer. The conductive member 1921k and the plurality of terminals 1921o are electrically conductive, such as formed out of steel. The box body enclosure 1921a preferable includes two elastic tabs 1921f which snap into two snap recesses 1921h on the box body base 1921b. When it is desired to gain access to the terminals 1921o, the box body enclosure 1921a can be removed from the box body base 1921 by bending one or both of the elastic tabs 1921f outwardly either by hand or with a screwdriver, which is very convenient for disassembly and assembly. The connection between the box body enclosure 1921a and the box body base 1921b may alternatively use a different type of detachable structure, such as mating threads.

The preferred box body enclosure 1921a includes a battery terminal coverage portion 1921i which extends past the box body base 1921b. The battery terminal coverage portion 1921i is capable of shielding the connection between the conductive member 1921k and the positive electrode of the battery 1922, so as to protect this place and improve the safety of use. The battery terminal coverage portion 1921i preferably defines a groove 1921j which mates with the battery terminal end 1921n of the conductive member 1921k, so that the conductive member 1921k can be shielded in multiple directions, further improving the connection between the box body enclosure 1921a and the box body base 1921b and further improving safety of use.

Figure 116:
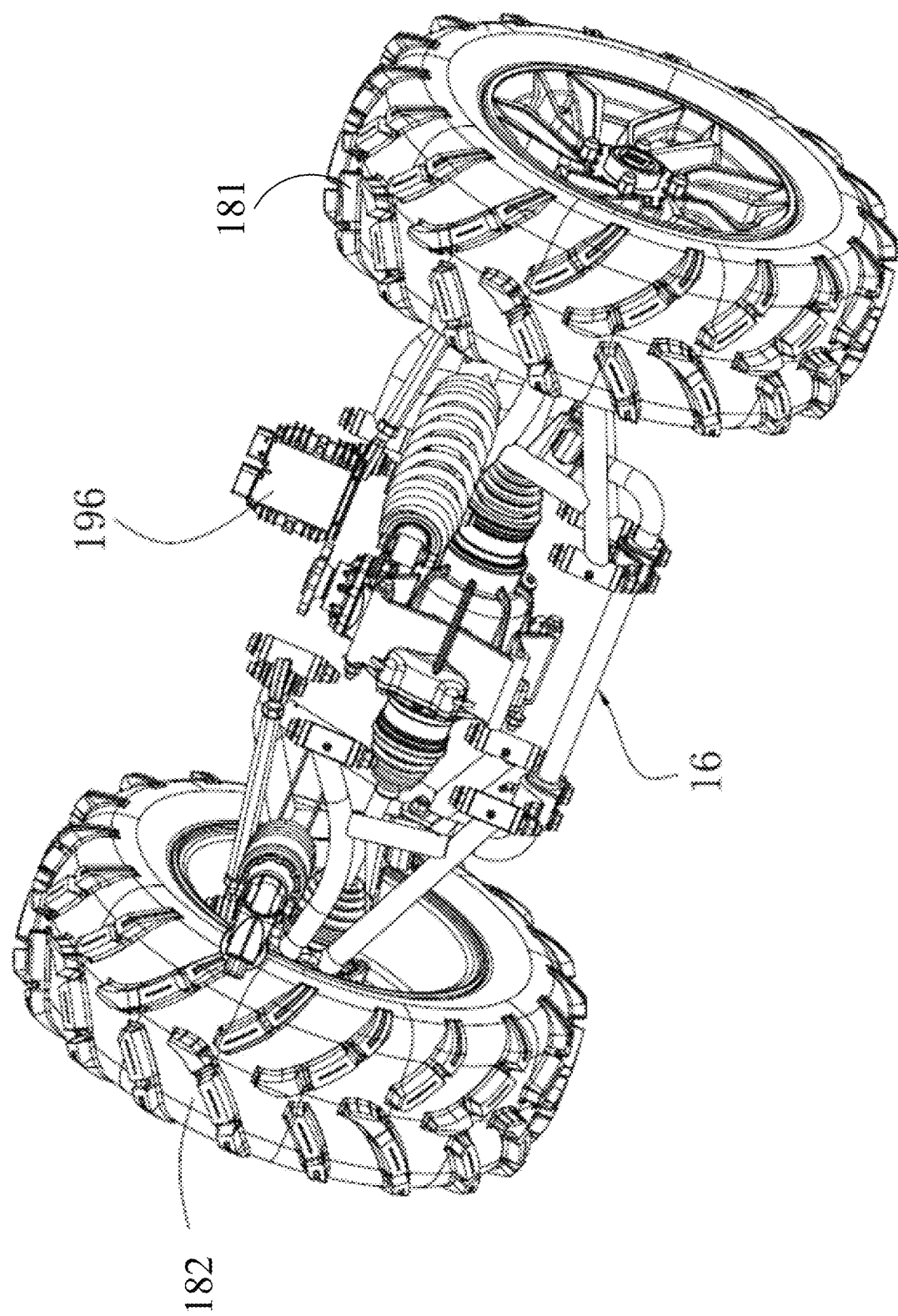
FIG. 116 is a top perspective view showing the relative position relationship between the variable voltage rectifier of FIG. 109 and the rear wheels and rear suspension of the vehicle of FIG. 1.
Figure 117:
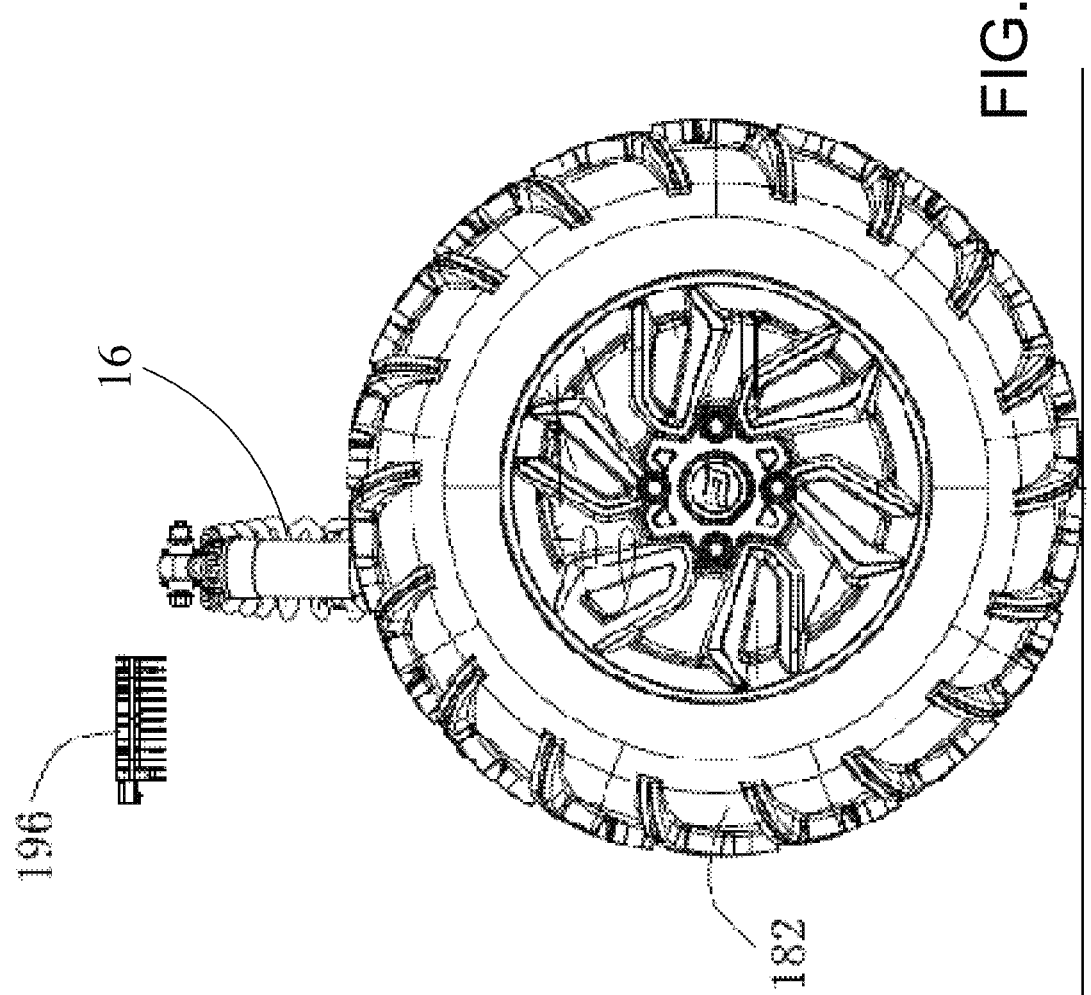
FIG. 117 is a left side view of the variable voltage rectifier, rear suspension and rear wheels of FIG. 116.

The function of the variable voltage rectifier 196 is to keep the output voltage of the generator constant. FIGS. 116 and 117 show the preferred position of the variable voltage rectifier 196 relative to the rear wheels 181, 182 and the rear suspension 16. The variable voltage rectifier 196 is arranged adjacent to the engine 121 (such as above and slightly behind the center of the engine 121) and in front of the right-rear wheel 181. At this location, it is convenient to connect the generator with the variable voltage rectifier 196.

Figure 118:
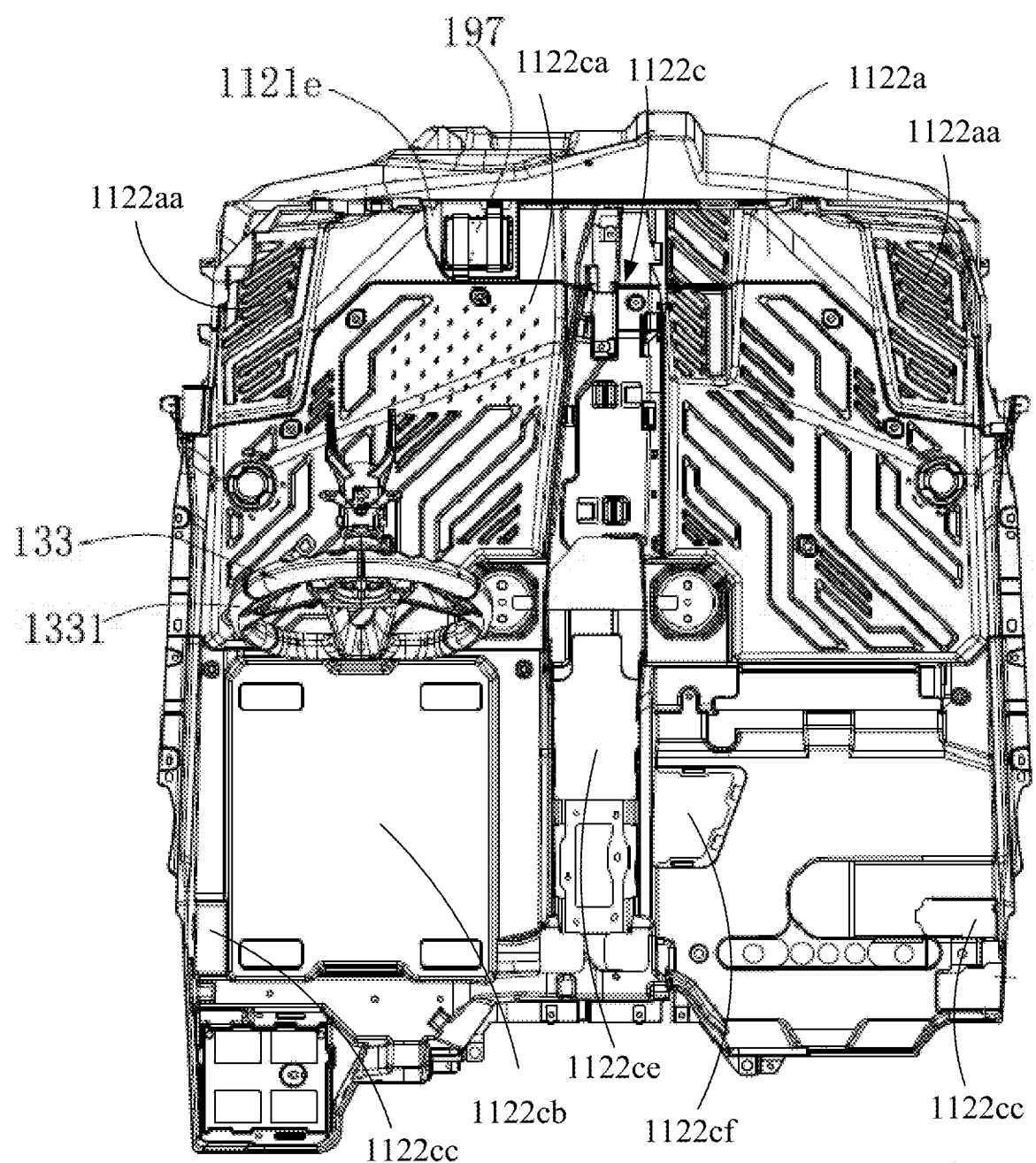
FIG. 118 is a top plan view showing the vehicle-mounted T-BOX of FIG. 109 relative to the interior trim front baffle of FIG. 26 and interior trim bottom plate of FIGS. 27-29.

The on-board T-BOX 197 is a Telematics Box which acts as a wireless gateway and performs functions such as remote wireless communication, GPS satellite positioning, acceleration sensing and CAN communication. The on-board T-BOX 197 provides remote communication interfaces for off-road vehicle 100, such as driving data acquisition, driving track recording, vehicle fault monitoring, remote vehicle query and control (opening and locking, air conditioning control, window control, engine torque limit, engine start and stop), driving behavior analysis, wireless hotspot sharing and other services. The position of the on-board T-BOX 197 is shown in FIG. 118 relative to the bottom plate 1122*c* of the interior trim and relative to the steering wheel 1331 of the steering mechanism 133. The on-board T-BOX 197 is arranged inside the cabin 1121, which has good anti-theft and dust-proof effect. The bottom plate 1122*c* and/or the front baffle 1122*a* preferably defines a T-BOX mounting port 1121*e*. The on-board T-BOX 197 is mounted in the T-BOX mounting port 1121*e* with the signal receiving surface of the on-board T-BOX 197 exposed through the T-BOX mounting port 1121*e*. In this way, the signal receiving surface of the on-board T-BOX 197 is not blocked, which is conducive to signal transmission.

The lighting system 198 provides lighting both inside and outside the vehicle 100 and therefore includes various interior and exterior lights on the off-road vehicle 100, including headlights 1981, taillights 1982 and cabin lights 1983 shown in FIG. 109. The lighting system 198 will also typically include further lights that are not called out, such as additional turn signal lamps, running lights, fog lamps, canopy lamps, and the like. The headlights 1981 are mounted on the front frame portion 1111 for lighting in front of the vehicle 100 and/or output of turn signals. The taillights 1982 are mounted on the rear frame portion 1113, preferably as part of the tail-lamp panel 1123*bd* shown in FIG. 21. The cabin lights 1983, with their elevation also shown in FIG. 21, are preferably located between the upper dashboard panel 1122*ba* and the lower dashboard panel 1122*bc*, connected such as by means of clip connection, screw connection, welding connection, or the like. The lighting system 198 is mainly used to ensure the safety of vehicle driving at night and serve as a reminder of vehicle position.

Figure 119:
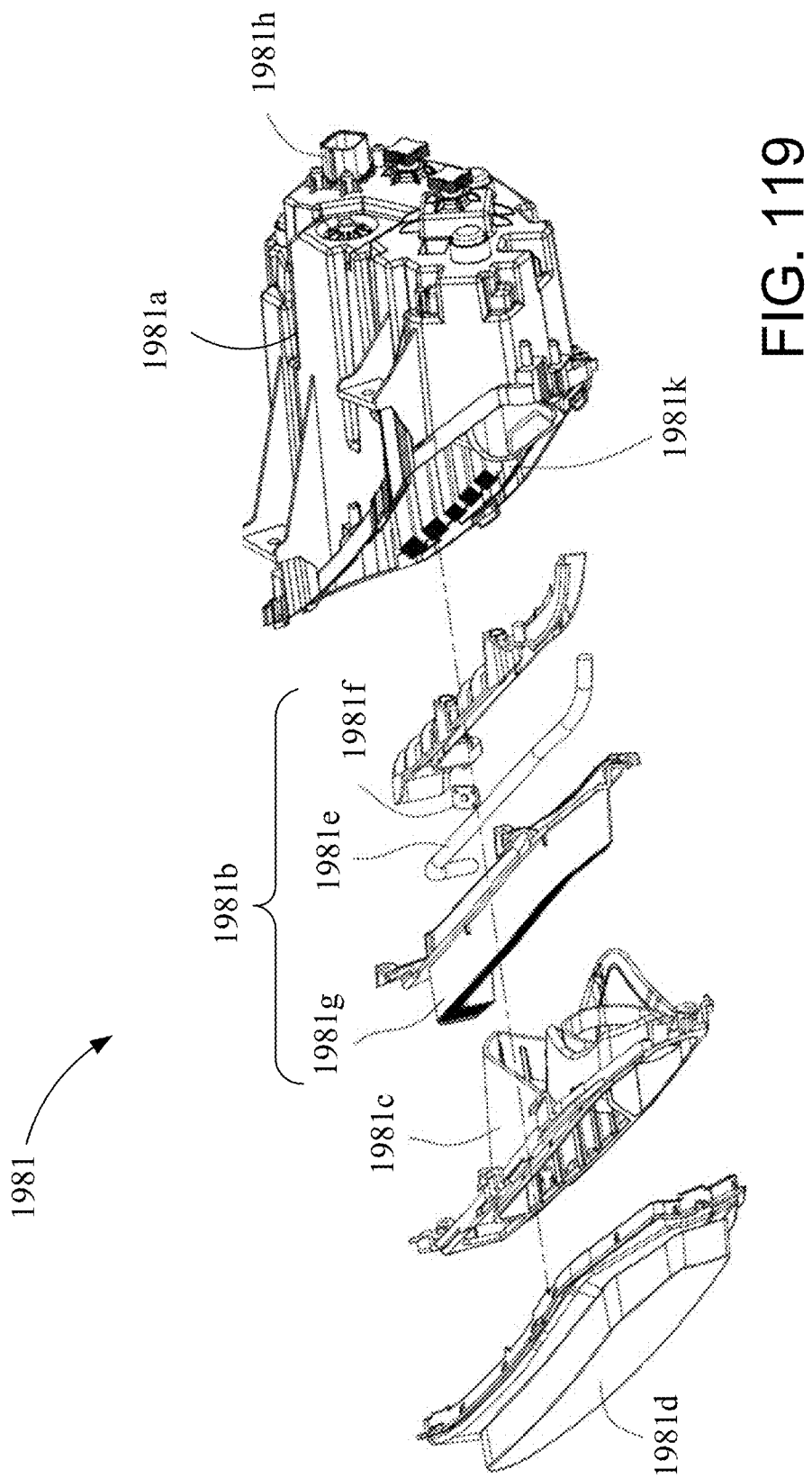
FIG. 119 is an exploded perspective view of the driver's side headlight of FIG. 109.

The preferred headlight 1981 is further detailed in FIGS. 119-122. As shown in FIG. 119, the headlight 1981 includes a headlight housing 1981*a* which holds a turn signal assembly 1981*b* and a lamp holder bracket 1981*c* behind a lens 1981*d*. The turn signal assembly 1981*b* preferably includes an LED (light emitting diode) strand 1981*e* held between a back turn signal bracket 1981*f* and a front turn signal bracket 1981*g*. The headlight housing 1981*a* is molded from opaque plastic and defines a connector port 1981*h* for connection of a harness with electrical power and signal wires. The lens 1981*d* is transparent to help focus and transmit the light of the bulbs, and is sealed at a front end of the headlight housing 1981*a* to protect the interior components.

Figure 120:
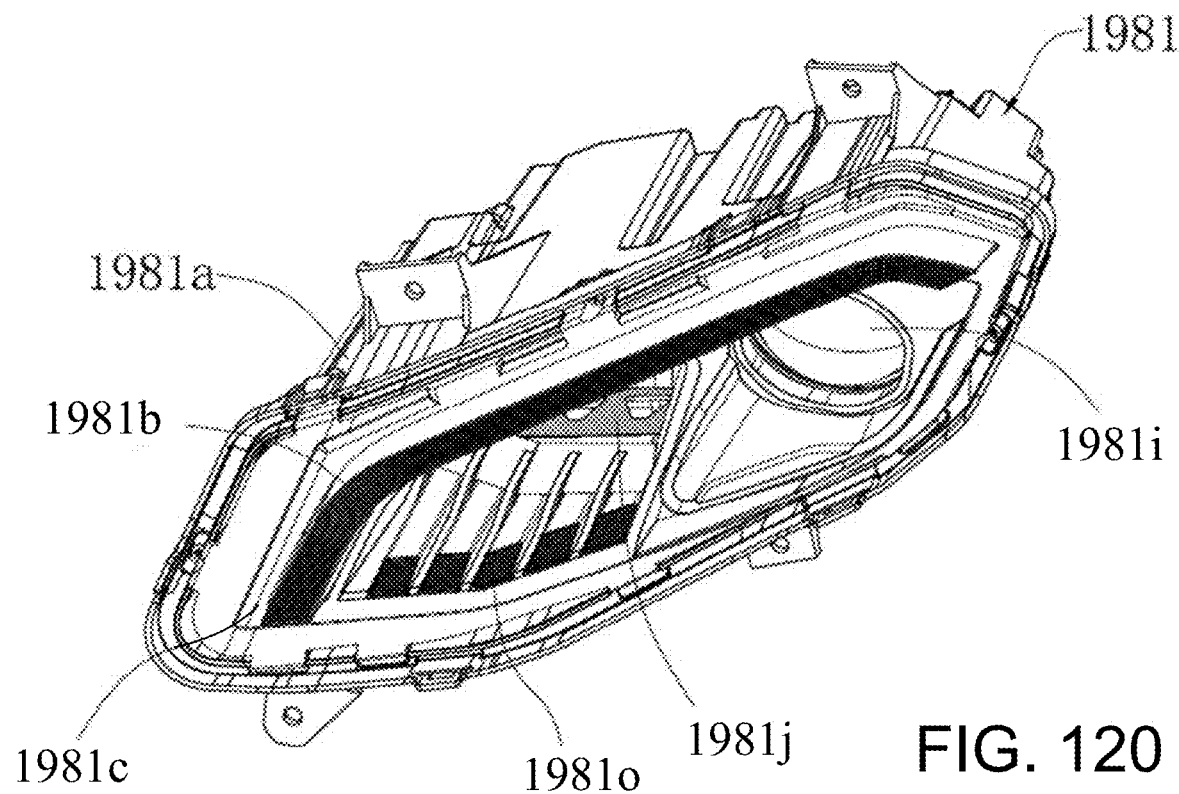

FIG. 120 shows the assembled headlight 1981 but with the lens 1981*d* and lamps removed. The lamp holder bracket 1981*c* includes a low beam socket 1981*i* and a high beam socket 1981*j*. The lamp holder bracket 1981*c* can include a reflective surface which helps direct light forwardly from bulbs in the low beam socket 1981*i* and a high beam socket 1981*j* and through the lens 1981*d*. The turn signal assembly 1981*b* arches over the sockets 1981*i*, 1981*j* of the low beam and high beam bulbs.

Figure 121:
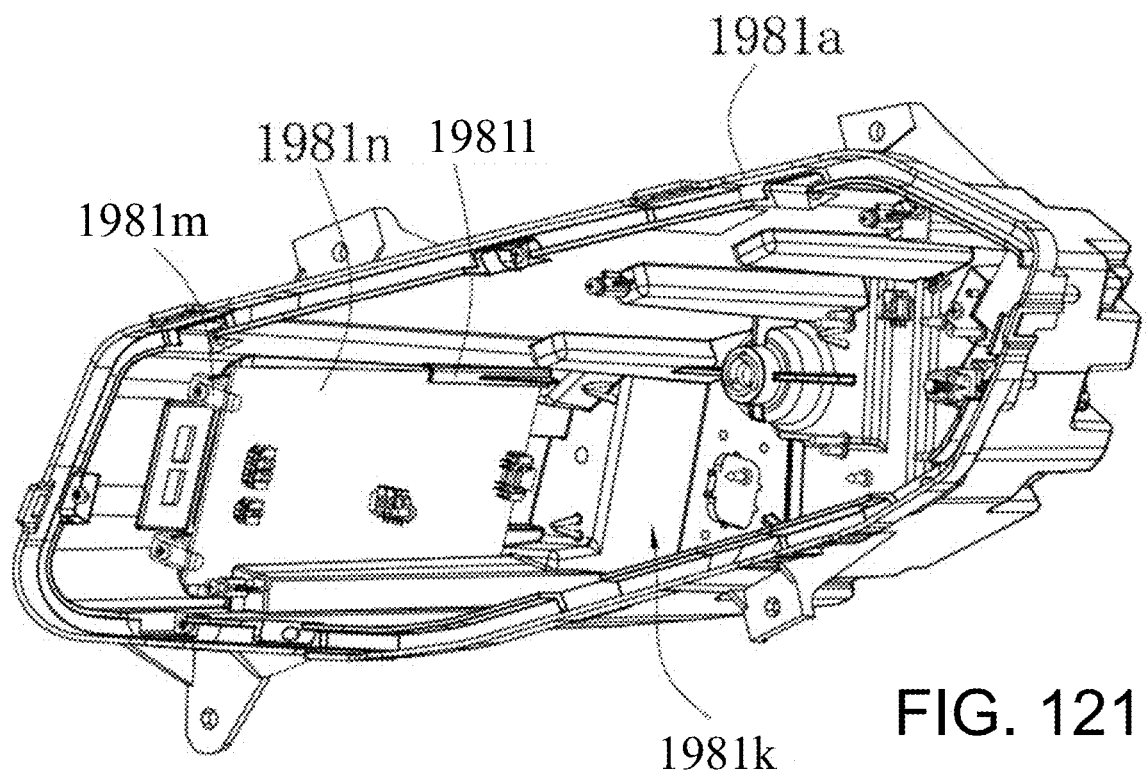
Figure 122:
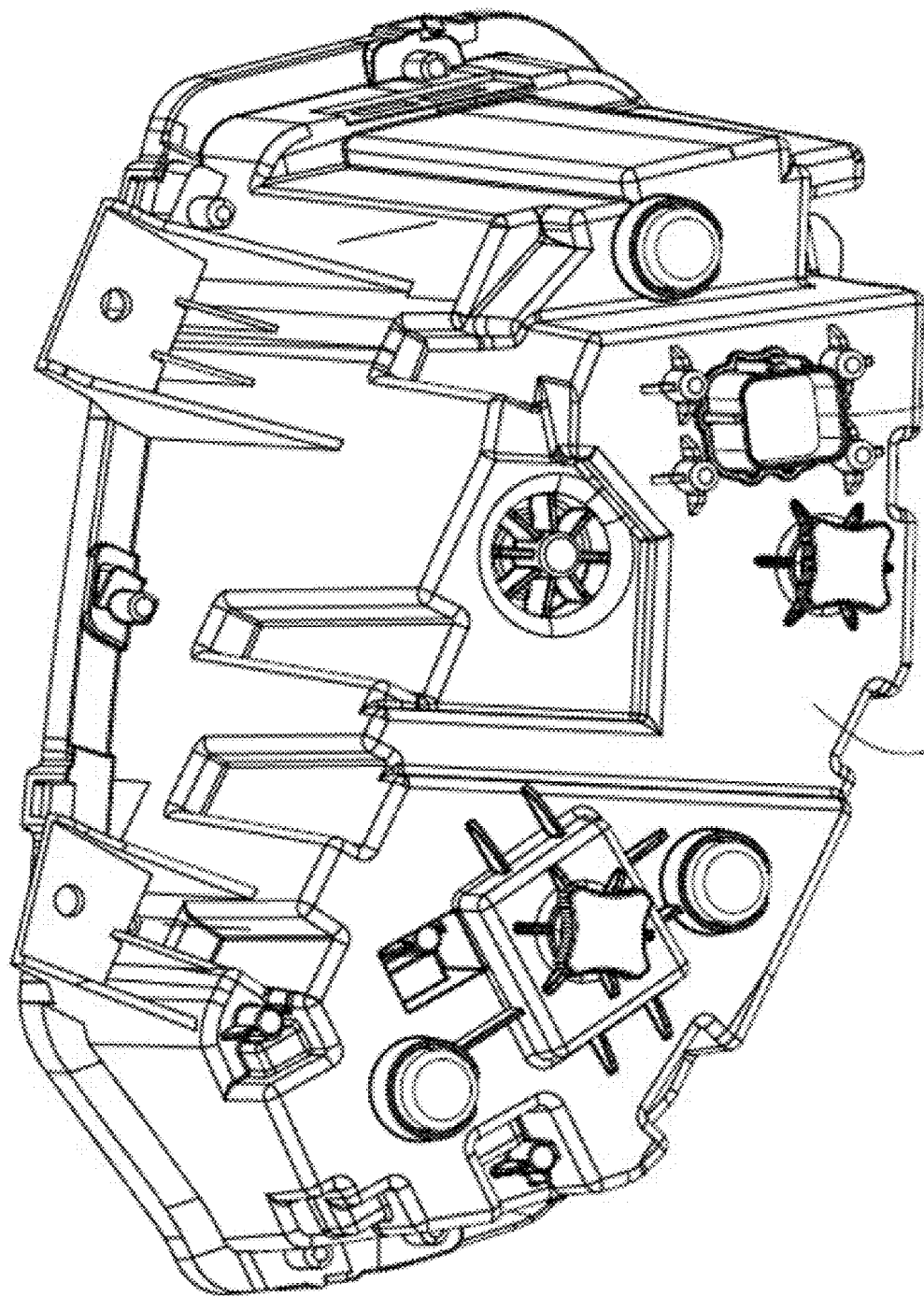

As shown in FIG. 121, the headlight housing 1981*a* defines an interior space 1981*k* which not only holds the turn signal assembly 1981*b* and the lamp holder bracket 1981*c*, but further includes a flute 1981*l* and two limit brackets 1981*m* for holding a circuit board 1981*n*. The low beam socket 1981*i* includes electrical lines (not separately shown) electrically connected to the circuit board 1981*n* so as to be capable of starting and powering the low beam bulb (not shown) according to signals. The high beam socket 1981*j* similarly includes electrical lines (not separately shown) electrically connected to the circuit board 1981*n* so as to be capable of starting and powering the high beam bulb (not shown) according to signals. The turn signal assembly 1981*b* similarly includes electrical lines (not separately shown) electrically connected to the circuit board 1981*n* so as to be capable of powering the LED strand 1981*e* according to turn signals.

During assembly, one end of the circuit board 1981*n* is inserted into the flute 1981*l*, and the other end of the circuit board 1981*n* is secured by the limit brackets 1981*m*, which effectively reduces the space for arranging the circuit board 1981*n*, provides enough space for other components, makes the structure of the headlight 1981 more compact. In the preferred embodiment, the limit brackets 1981*m* are removably mounted on the headlight housing 1981*a* by threads or clips.

The preferred LED strand 1981*e* is capable of emitting one of white light and yellow light according to signals. When being used as a turn signal indicator, the LED strand 1981*e* can blink yellow light. When not being used as a turn signal indicator and either the low beam or the high beam is on, the LED strand 1981*e* can emit a constant white light, thus increasing the luminous area of the headlight 1981, improving the lighting output. If desired, when not being used as a turn signal indicator, the LED strand 1981*e* can further emit a constant white light in a daytime driving mode even when the low beam and the high beam are both off, increasing vehicle recognition and safety performance.

In the preferred embodiment, the lamp holder bracket 1981*c* further includes a daytime running light 1981*o*, automatically switched on when the engine 121 is running. The intended use of the daytime running light 1981*o* is not to help the driver see the road, trail or surroundings, but rather to indicate to others that the off-road vehicle 100 is running and to help others see the off-road vehicle 100. In the preferred embodiment, the daytime running light 1981*o* can emit one of either white light and yellow light according to signals like the LED strand 1981*e*, emitting a different color when either the low beam or the high beam are on than when both the low beam and the high beam are off.

The dashboard instrumentation array 200 shown in FIG. 109 is mainly used to display the working conditions of relevant devices when the engine 121 and the off-road vehicle 100 are running. The dashboard instrumentation array 200 includes various electrically powered meter displays, such as an ammeter, a charging indicator or voltmeter, an oil pressure gauge, a thermometer, a fuel gauge, a vehicle speedometer and odometer, an engine tachometer, and the like.

The preferred vehicle 100 includes a horn 202 for emitting an audible alert sound to pedestrians or other drivers. The horn 202 is operable by a control switch accessible to the driver in the cabin 1121, such as by a button (not shown) on the steering wheel 1331. The horn 202 is mounted in the middle front of the vehicle 100, as shown in FIG. 109, or adjacent the coolant overflow tank 1235 (shown in FIGS. 52 and 54) or more preferably in front of the radiator 1233. Mounting the horn 202 in this central forward position makes the sound source direction of the horn 202 more uniform.

The plurality of switches 203 may include a mode switch 2031, an air conditioning switch (not called out), a temperature adjustment switch (not called out), and the like. The mode switch 2031, the air conditioning switch, and the temperature adjustment switch may be generally mounted on the dashboard panel 1122b (shown in FIG. 21) for the convenience of the driver and front passenger. The mode switch 2031, the air conditioner switch, the temperature adjustment switch, and the like are electrically/signally connected to the ECU 21 by wiring harnesses 2042, so as to control a series of functions of the off-road vehicle 100, such as the switching of the two-wheeled drive and the four-wheeled drive, the turning on of the air conditioner, and the adjustment of the air conditioner temperature, and the like.

Figure 123:
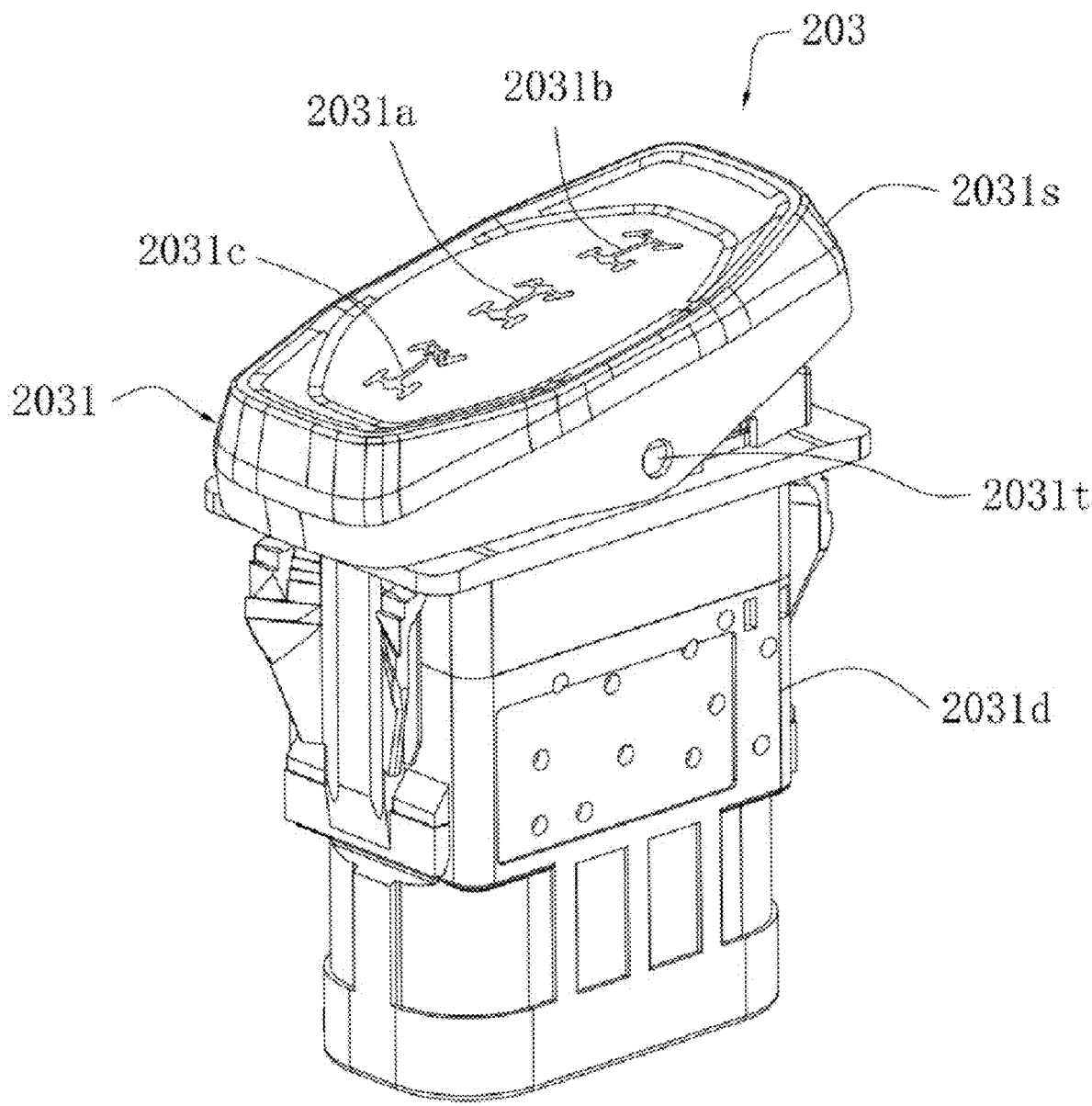
Figure 124:
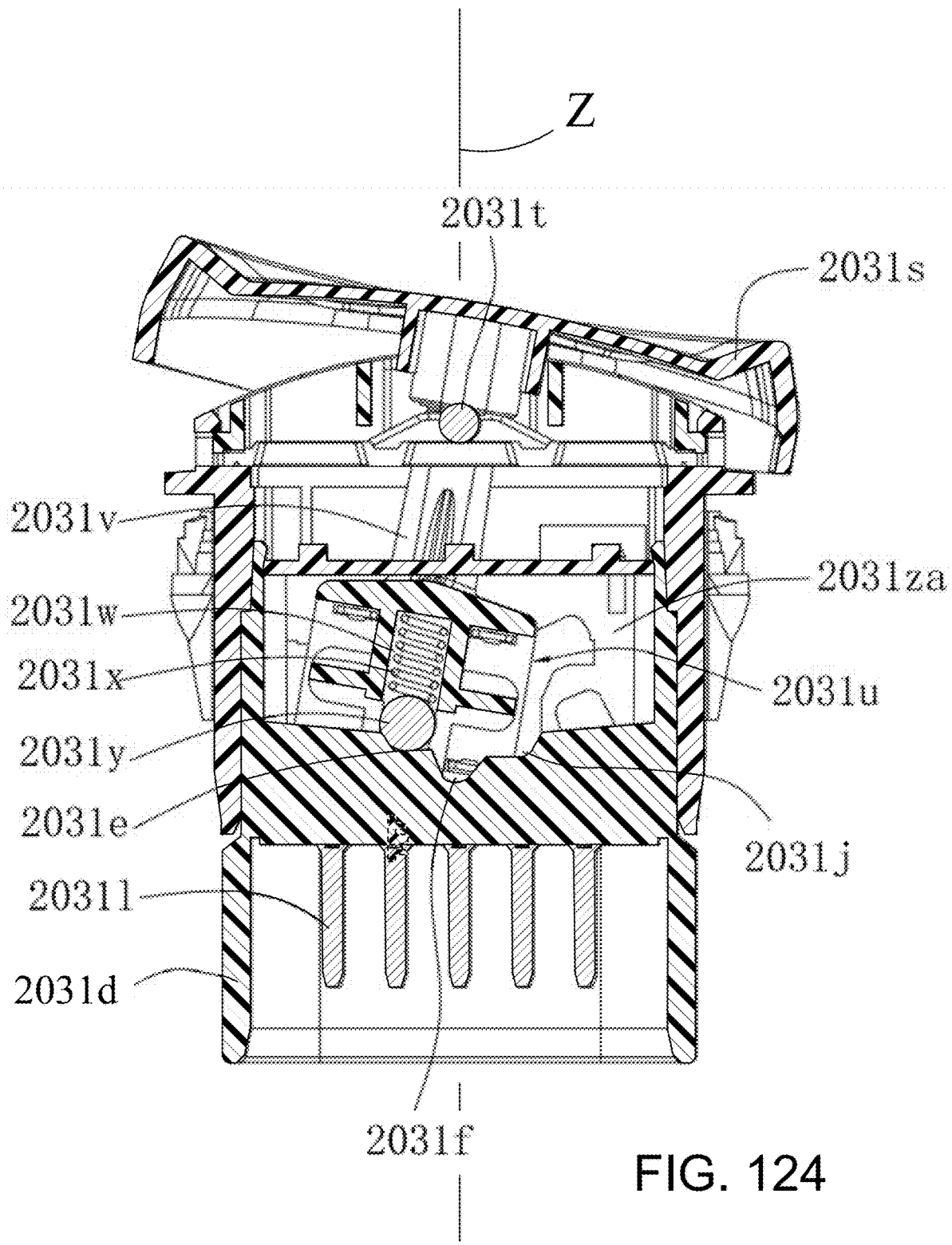

As better shown in FIGS. 123 and 124, the preferred mode switch 2031 includes images and positions for a four-wheeled drive gear 2031a, a two-wheeled drive gear 2031b, and a front-wheeled drive lock gear 2031c. The image and position for the four-wheeled drive gear 2031a is preferably located between the images and positions for the two-wheeled drive gear 2031b and the front-wheeled drive lock gear 2031c. The setting for the two-wheeled drive gear 2031b enables two-wheeled drive operation of the off-road vehicle 100. The setting for the four-wheeled drive gear 2031b enables four-wheeled drive operation of the off-road vehicle 100. The setting for the front-wheeled drive lock gear 2031c enables front differential locking of the off-road vehicle 100. The mode switch 2031 includes a housing 2031d, a pushing plate 2031s, a switch shaft 2031v, and a gear lever assembly 2031u. The housing 2031d includes a cavity 2031za, a first gear slot 2031e, a second gear slot 2031f, and a third gear slot 2031j. The first gear slot 2031e, the second gear slot 2031f, and the third gear slot 2031j are all located in the cavity 2031za. The second gear slot 2031f is located between the first gear slot 2031e and the third gear slot 2031j. The pushing plate 2031s is rotatably connected to the housing 2031d by a switch pivot 2031t. One end of the gear lever shaft 2031v is connected to the pressing plate 2031s, and the other end of the gear lever shaft 2031v swings the gear lever assembly 2031u based on angular movement of the pressing plate 2031s, switching a plunger ball 2031y between the first gear slot 2031e, the second gear slot 2031f, and the third gear slot 2031j.

The gear lever assembly 2031u defines a plunger cavity 2031w which houses a spring 2031x and at least part of the plunger ball 2031y. The spring 2031x biases the plunger ball 2031y downwardly, pushing the ball 2031y into the first gear slot 2031e, the second gear slot 2031f, or the third gear slot 2031j.

Figure 125:
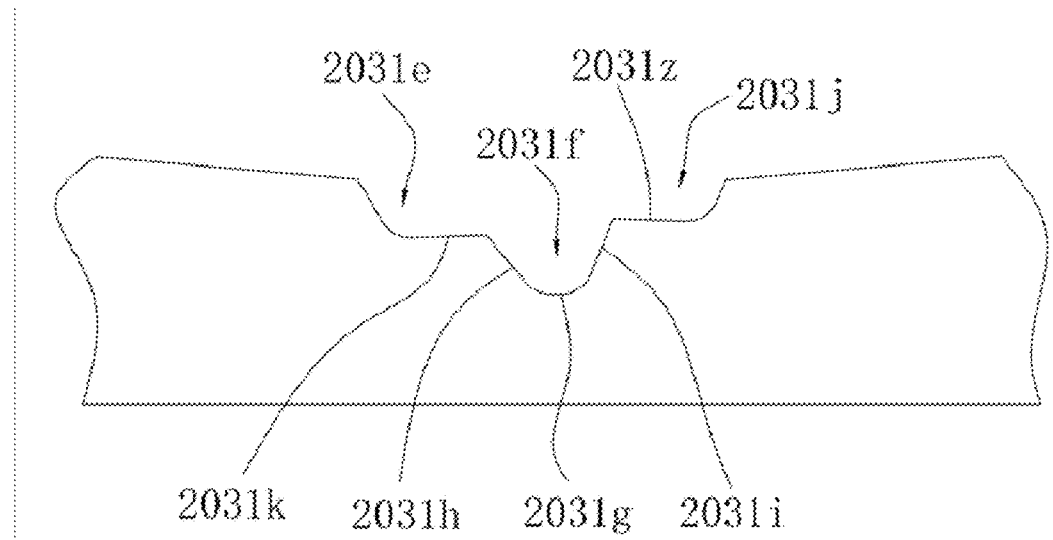
Figure 126:
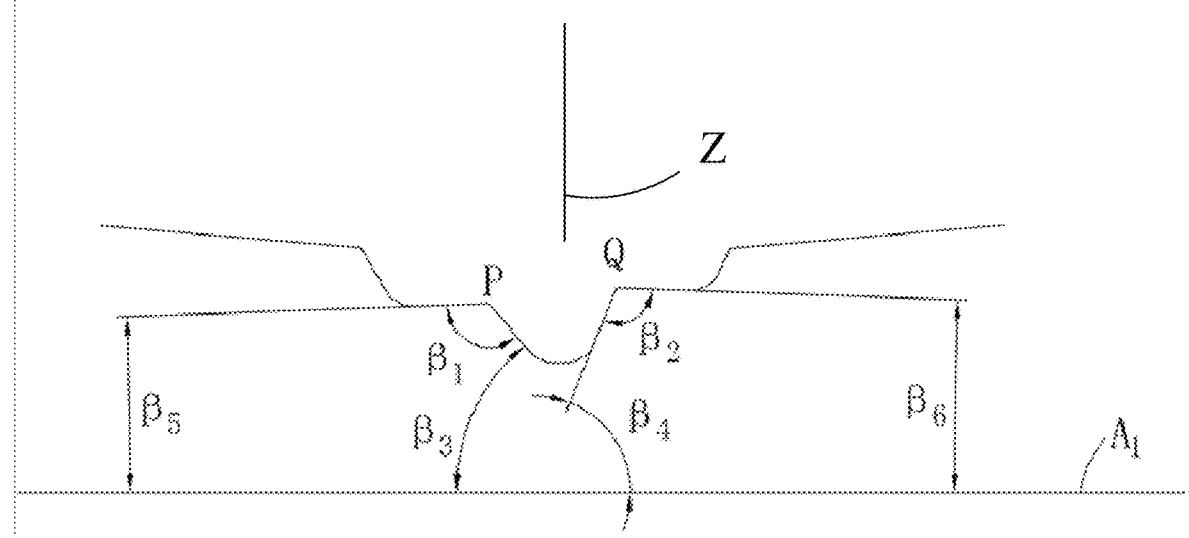

As better shown in FIGS. 125 and 126, the first gear slot 2031e, the second gear slot 2031f, and the third gear slot 2031j are each at least partially arc-shaped, and sequentially connected. More particularly for the most preferred embodiment, the second gear slot 2031f includes an arc-shaped bottom section 2031g between a first sloping straight section 2031h and a second sloping straight section 2031i. The first gear slot 2031e includes a flat straight section 2031k, and the third gear slot 2031j includes a flat straight section 2031z. The flat straight section 2031k of the first gear slot 2031e intersects with the first sloping straight section 2031h, creating a first intersection point P and a first angle β1. The flat straight section 2031z of the third gear slot 2031j intersects with the second sloping straight section 2031i, creating a second intersection point Q and a second angle β2. Angles β1 and 2 are preferably different. For instance, the first angle β1 is preferably in the range from 120° to 140°, and the second angle β2 is preferably in the range from 100° to 125°, with the difference between β1 and β2 preferably in the range from 5° to 30°. That is to say, the slope of the second gear slot 2031f near the third gear slot 2031j is preferably larger than the slope of the second gear slot 2031f near the first gear slot 2031e. The transition between the first gear slot 2031e and the second gear slot 2031f is smoother than the transition between the second gear slot 2031f and the third gear slot 2031j. In this way, when switching, the damping of switching lever 2031v from the second gear slot 2031f to the third gear slot 2031j is larger than the damping of switching lever 2031v from the first gear slot 2031e to the second gear slot 2031f. That is to say, the force values required for switching between switch positions are different. The force value required becomes larger when switching from four-wheeled drive to front-wheeled drive lock, helping to avoid unintended direct switching from two-wheeled drive gear to front-wheeled drive lock, improving safety.

In the most preferred embodiment, the position of the second intersection point Q is relatively higher than the position of the first intersection point P along the axis Z direction of the cavity 2031za. In this way, the spring plunger stroke from the second gear slot 2031f to the third gear slot 2031j is increased, so damping is increased from four-wheeled drive to the front-wheeled drive lock, thereby helping to avoid over-shifting during the switching process.

Further, the first sloping straight section 2031h is at a third angle β3 measured relative to a base plane A1, and the second sloping straight section 2031i is at a fourth angle β4 measured relative to the base plane A1. The difference between the fourth angle β4 and the third angle β3 is preferably in the range from 5° to 30°. The third angle β3 is preferably in the range from 45° to 60°. The fourth angle β4 is preferably in the range from 55° to 75°. Therefore, the slope of the second sloping straight section 2031i with respect to the plane A1 is larger than the slope of the first sloping straight section 2031h with respect to the plane A1. Therefore, the force value required for the plunger ball 2031y to switch from the second gear slot 2031f to the third gear slot 2031j is increased.

In the most preferred embodiment, the flat straight section 2031k is at a fifth angle β5 with respect to the base plane A1, and the flat straight section 2031z is at a sixth angle β6 with respect to the base plane. The value of the fifth angle β5 is preferably the same as the value of the sixth angle β6. In this way, the operating force value of switching from two-wheeled drive to four-wheeled drive may be basically equal to the operating force value of switching from front-drive lock to four-wheeled drive, thereby improving the consistency of operation.

As best shown in FIG. 124, the switch 2031 preferably has a plurality of output contacts 2031l accessible on a bottom side of the housing 2031d. The bottom side of the housing 2031d mates with a butt connection socket 2031n shown in FIG. 128 to electrically connect the output contacts 2031l through the harness 2042 to the ECU 21. The butt connection socket 2031n preferably includes a connection cover 2031m which surrounds a portion of the housing 2031d and additionally protects the output contacts 2031l. The butt connection socket 2031n is preferably provided with a sealing member 2031q formed of a soft, deformable material such as rubber or silicone, which can alternatively be provided on the housing 2031d. After the housing 2031d is plugged into the butt connection socket 2031n, the sealing member 2031q (shown in its uncompressed state in dashed lines) seals the gap between the butt connection socket 2031n and the housing 2031d, so that the output contacts 2031l are in a sealed state, avoiding the possibility of short-circuiting due to water and the like. At the same time, during the plugging act, the connection cover 2031m plays a guiding role, which is beneficial to the connection of the butt connection socket 2031n and the switch 2031, and assembly is more convenient.

Figure 127:
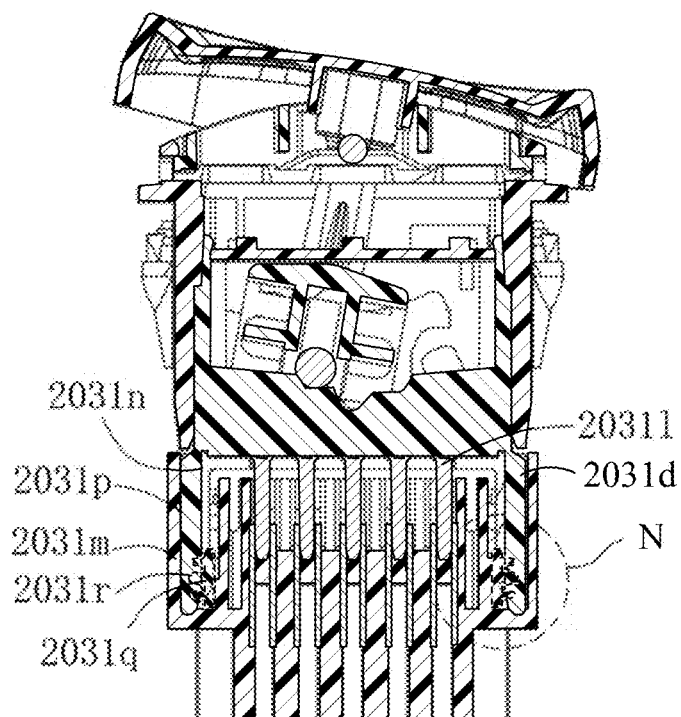
Figure 128:
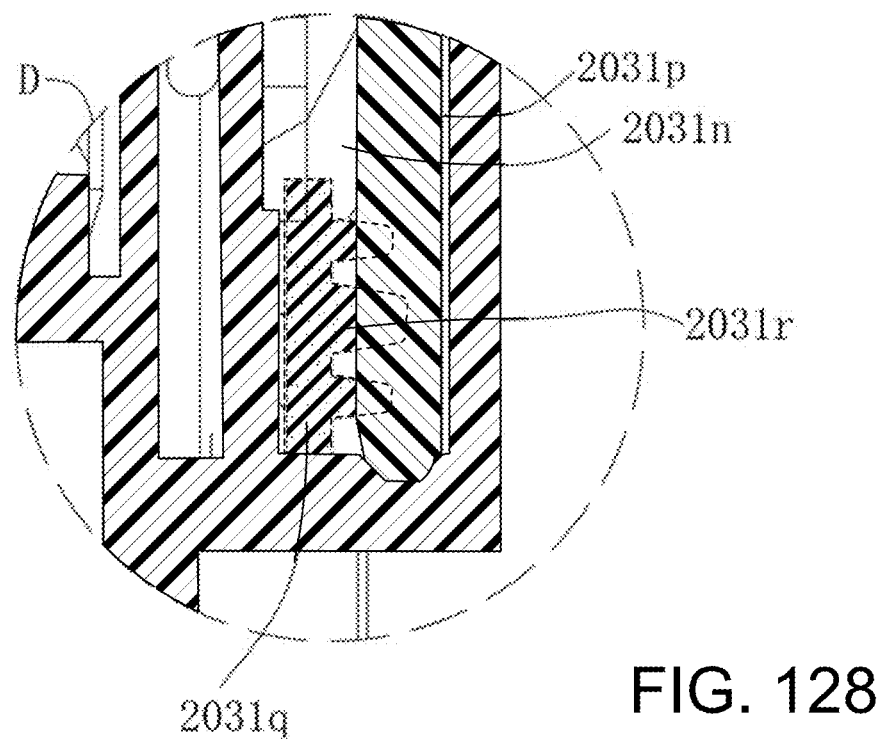

In the preferred embodiment shown in FIGS. 127 and 128, the sealing member 2031q is disposed within a slot 2031p at a bottom of the connection cover 2031m. The sealing is not only realized by the seal 2031q, but also by covering the butt connection socket 2031n by the connecting cover 2031m, thereby increasing the sealing path and improving the sealing effect. The sealing member 2031q may include one or a plurality of annular sealing protrusions 2031r extending outwardly. The plurality of sealing protrusions 2031r are preferably provided at intervals along the axial direction of the slot 2031p. In other embodiments, the sealing member 2031q may alternatively be directly inwardly from the connection cover 2031m, or may alternatively be directed inwardly or outwardly on the switch housing 2031d.

Referring back to FIG. 109, the electrical system 19 includes the electrical terminal assembly 204. The electrical terminal assembly 204 is electrically connected to the battery 1922 such as through the wiring harness 2042 at a location spaced away from the battery 1922 such as on a different frame portion. For instance, with the battery 1922 mounted on the middle frame portion 1112, the electrical terminal assembly 204 may be mounted on the front frame portion 1111. The purpose of the electrical terminal assembly 204 is to provide a convenient location for electrical connections to supply electricity to aftermarket accessories added to the off-road vehicle 100. By providing such a convenient connection location, electrical aftermarket accessories can be added and wired without any splicing or other damage to the original wiring of the off-road vehicle 100.

Figure 129:
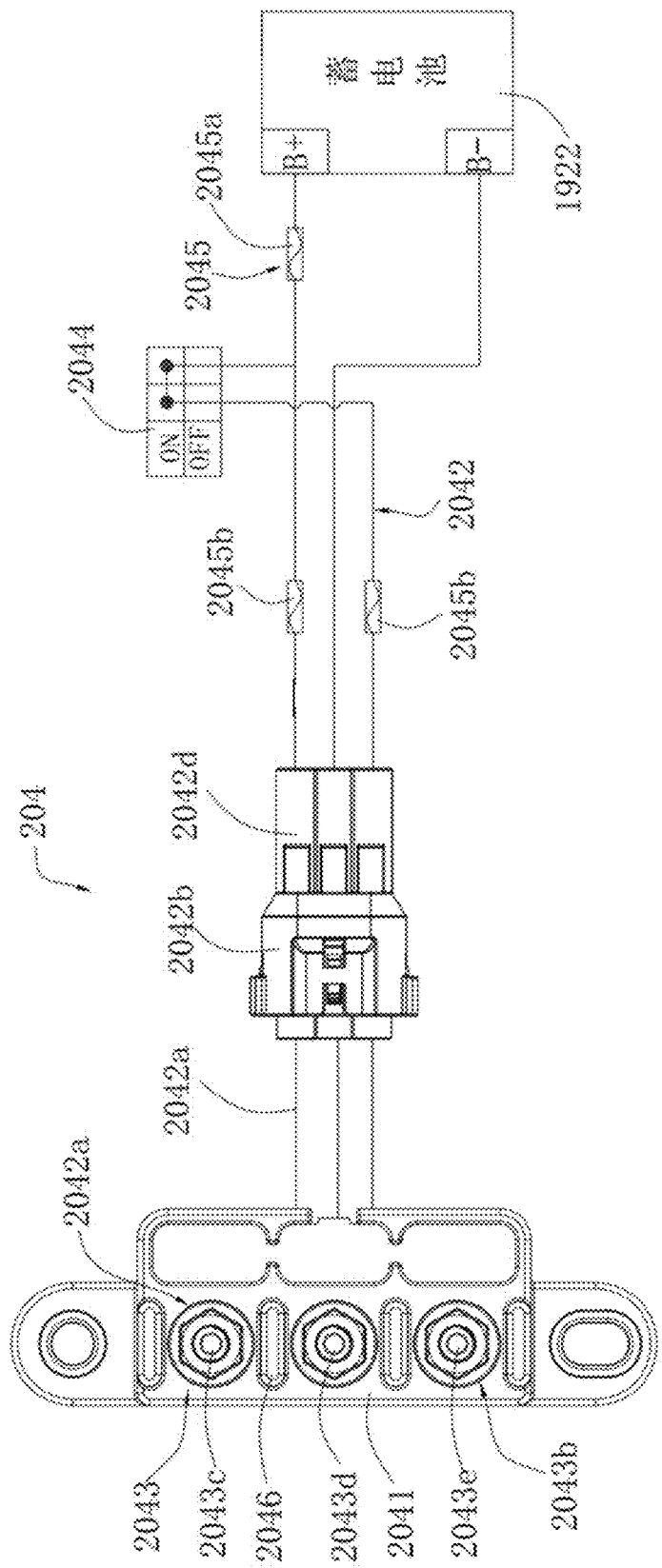
Figure 130:
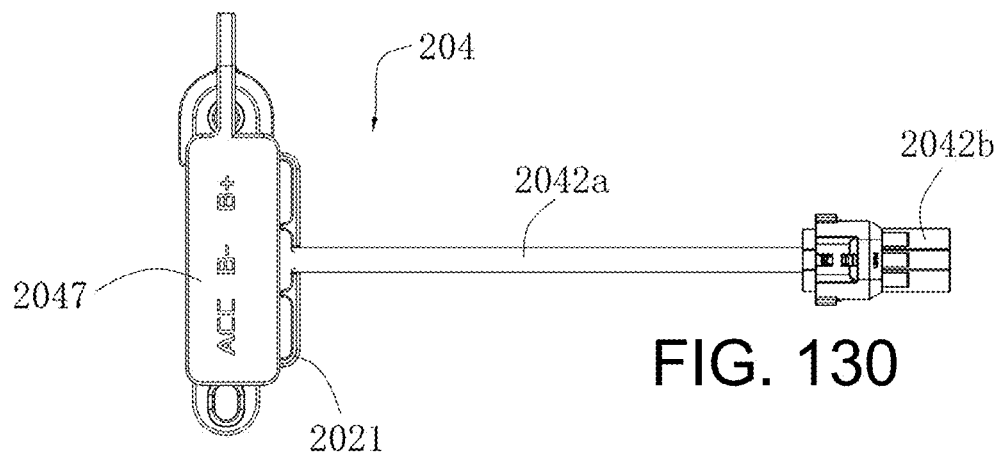
Figure 131:
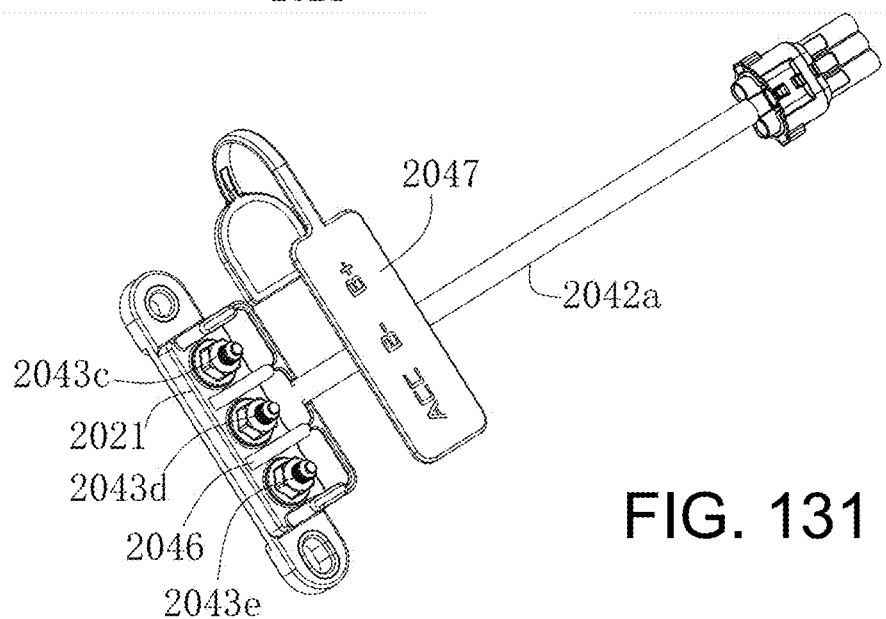

The preferred electrical terminal assembly 204 is better shown in FIGS. 129-131. The electrical terminal assembly 204 preferably includes a terminal block 2021 with a cover 2047, and a harness 2042a. The electrical terminal assembly 204 is connected to the battery 1922 through the wiring harness 2042, which includes a power relay 2044. The opening/closing of the power relay 2044 corresponds to the starting/key position of the off-road vehicle 100. That is to say, the power relay 2044 is turned on when the off-road vehicle 100 is started or powered on, and the power relay 2044 is turned off when the off-road vehicle 100 is turned off. The terminal block 2041 includes a battery positive (B+) terminal 2043c, a battery negative (B−) terminal 2043d, and an accessory (ACC) terminal 2043e. The B+ terminal 2043c and B− terminal 2043d have direct electrical connections to corresponding terminals of the battery 1922 through the wiring harnesses 2042a and 2042. The connection of the ACC terminal 2043e to the positive terminal of the battery 1922 runs through the power relay 2044. The ACC terminal 2043e conducts with the positive electrode of the battery 1922 when the power relay 2044 is turned on, and the ACC terminal 2043e is disconnected from the positive electrode of the battery 1922 when the power relay 2044 is turned off. In this way, if one or more aftermarket accessories need continuous electricity power supply, the accessories can be connected to the B+ and B− terminals 2043c, 2043d that are not controlled by the power relay 2044. If the electricity supply of one or more aftermarket accessories needs to be controlled by the starting/key position of the off-road vehicle 100, such accessories can be connected to the ACC and B− terminals 2043d, 2043e so their power is controlled by the power relay 2044. If desired, in addition to aftermarket electrical accessories, the terminal assembly 204 can also be used to supply electricity to original equipment components, such as headlights, taillights, etc.

FIG. 132 shows an alternative embodiment which further includes a second ACC terminal 2043f. Of course, the numbers of each of the B+, B− and ACC terminals may be one, two, three, four or other, respectively. The connection between the terminal block 2041, the power relay 2044 and the battery 1922 may be a combination of the above two embodiments, or one of the above two embodiments or others according to actual needs, and this is not limited.

As shown in FIG. 129, the wiring harness 2042 preferably includes one or more fuse boxes 2045 for protecting the battery 1992, so as to avoid the problem of feeding the battery 1922. In the most preferred embodiment, the fuse boxes 2045 include a main fuse 2045a and a plurality of sub-fuses 2045b. The main fuse 2045a is close to the positive electrode of the battery 1922. One of the sub-fuses 2045b is on the connection between the terminal block 2041 and the positive electrode of battery 1922. The other sub-fuse 2045b is on the connection between the terminal block 2041 and the power relay 2044. In the embodiment shown in FIG. 129, the main fuse 2045a and the sub-fuses 2045b are both on the harness 2042, with the main fuse 2045a and one of the sub-fuses 2045b provided in series, so as to achieve dual protection and further to avoid the feeding problem of the battery 1922. Alternatively, the sub-fuses 2045b may be provided in the harness 2042a of the electrical terminal assembly 204. As another alternative, only one sub-fuse may be provided, either in harness 2042 or harness 2042a.

The cover 2047 is used to protect the wiring terminals 2043, thereby avoiding the short circuit phenomenon of the wiring terminals 2043 caused by falling metal objects. The terminal block 2021 also preferably includes barrier plates 2046 between adjacent terminals 2043. Two adjacent wiring terminals 2043 are thus isolated by one barrier plate 2046 to avoid interference and/or shorting between the two adjacent wiring terminals 2043. Here, the barrier plates 2046 and the housing of the terminal block 2021 may be integrated.

As shown in FIG. 129, the end of the wiring harness 2042a of the electrical terminal assembly 204 is preferably provided with a wiring male plug 2042b. The end of the wiring harness 2042 is preferably provided with a wiring female plug 2042d. The wiring male plug 2042b may be plugged or unplugged with the wiring female plug 2042d, so that the electrical connection between the terminal block 2021 and the battery 1922 can be easily realized or separated. During connection of the aftermarket accessory to the terminals 2043c, 2043d, 2043e of the electrical terminal assembly 204, the user can unplug the plugs 2042b, 2042d, so neither of the terminals 2043c, 2043e are hot and any shorting or sparking possibility is eliminated. In this way, the terminal block 2021 and the wiring harness 2042 on the battery 1922 may be integrated, and the wiring can be very simple and convenient.

Various technical features of the above embodiments can be combined with each other or only used in part. In order to simplify the description, all possible combinations of the technical features in the above embodiments have not been described. However, as long as there is no contradiction between the combinations of these technical features, they should be considered to be within the scope of the description.

The above-mentioned embodiments only represent several embodiments of the present invention, and the descriptions thereof are specific and detailed, but should not be construed as a limitation on the scope of the invention patent. Those of ordinary skill in the art can make several modifications and improvements without departing from the concept of the present invention, which all belong to the protection scope of the present invention. Therefore, the protection scope of the patent of the present invention should be only limited as specified in the appended claims.

What is claimed is:

1. An off-road vehicle comprising:
   a frame comprising a front frame portion, a rear frame portion, and a middle frame portion between the front frame portion and the rear frame portion;
   a vehicle cover defining a cabin, the vehicle cover comprising a front baffle arranged between the front frame portion and the middle frame portion, a bottom plate arranged on the middle frame portion, a dashboard panel arranged at a top of the front baffle, a rear baffle arranged between the middle frame portion and the rear frame portion, and rear side plates arranged on sides of the rear frame portion;
   one or more seats within the cabin, the seat(s) being removably arranged on the middle frame portion and above the bottom plate;
   a rear trunk mounted on the rear frame portion;
   a prime mover assembly mounted on the rear frame portion, the prime mover assembly having at least one air inlet;
   an intake manifold in fluid communication between an intake seat and the air inlet of the prime mover assembly, the intake seat being located behind the cabin and above one of the rear side plates;
   an air filter comprising a filter element to filter air that enters into the prime mover assembly through the intake manifold; and
   an electrical control unit at least partially supported by the frame, wherein the rear baffle further defines an electronic control unit access port behind the seat(s) allowing access to the electronic control unit from within the cabin;
   wherein an air filter access port is defined on the rear baffle allowing access to the filter element from within the cabin, with the air filter access port positioned behind the seat(s) between the rear trunk and the seat(s).

2. The off-road vehicle of claim 1, wherein the rear baffle comprises a removable air filter access port cover, and wherein the air filter comprises an air filter housing with a removable air filter housing cover, wherein the air filter housing cover extends parallel to the air filter access port cover, and wherein both the air filter access port cover and the air filter housing cover can be removed without tools.

3. The off-road vehicle of claim 1, wherein the off-road vehicle further comprises a dashboard access port defined in the dashboard panel or in the front baffle, the dashboard access port being closed by a dashboard access cover which is removable from within the cabin, wherein the dashboard access cover includes a transparent or translucent window.

4. The off-road vehicle of claim 1, wherein the off-road vehicle further comprises a gear selection mechanism having a gear shift lever which extends into the cabin for the driver to operate to control a shift cable, the shift cable having a shift cable adjuster, wherein the bottom plate defines a shift cable adjuster access port with the shift cable adjuster being accessible through the shift cable adjuster access port.

5. The off-road vehicle of claim 4, further comprising an adjuster cover plate covering the shift cable adjuster access port, the adjuster cover plate being secured to the bottom plate and being removable from within the cabin without tools, wherein the adjuster cover plate is L-shaped with a portion extending generally vertically and a portion extending generally horizontally.

6. The off-road vehicle of claim 1, wherein the frame further comprises at least one side bumper with an end penetrating into the vehicle cover from outside to inside of the off-road vehicle and mounted on a corresponding connection plate arranged on the middle frame portion, and wherein the bottom plate defines a bumper access port therein with the connection between the end of the side bumper and the connection plate being accessible through the bumper access port.

7. The off-road vehicle of claim 1, wherein the vehicle cover defines a front access port with one or more components mounted on the front frame portion being accessible through the front access port.

8. The off-road vehicle of claim 1, wherein the vehicle cover further comprises an air intake grille removably connected to the front frame portion and covering a front end of the front frame portion, wherein a ratio of a width of the air intake grille to a width of the off-road vehicle is in the range between 0.4 and 0.8.

9. The off-road vehicle of claim 1, wherein the intake seat has an intake seat floor defining a manifold installation hole, with a top portion of the intake manifold received in the manifold installation hole so as to position a heightened outer wall portion which blocks air from entering the intake manifold at a location above the intake seat floor.

10. The off-road vehicle of claim 9, wherein the intake manifold comprises an intake inlet adapter pipe, with the heightened outer wall portion being part of the inlet adapter pipe, the intake inlet adapter pipe further comprising a sealing groove received in the manifold installation hole.

11. The off-road vehicle of claim 1, wherein the air filter filters air used for combustion in an internal combustion engine of the prime mover assembly, wherein the prime mover assembly further comprises a transmission with a cooling air inlet, the off-road vehicle further comprising a cooling air intake manifold in fluid communication between a cooling air intake seat and the cooling air inlet, the cooling air intake seat being located behind the cabin and above the other of the rear side plates, on an opposite side of the off-road vehicle from the intake seat used for combustion air.

12. The off-road vehicle of claim 1, further comprising an intake snorkel extending upwardly from the intake seat and connected to the intake manifold.

13. The off-road vehicle of claim 12, wherein the intake seat supports an intake cavity cover, the intake cavity cover having a wall breaking area of reduced strength, wherein the intake snorkel extends through the intake cavity cover after breaking and removal of the wall breaking area.

14. The off-road vehicle of claim 12, wherein the intake snorkel comprises a top pipe section defining a top pipe section central axis, wherein an angle defined between the top pipe section central axis and vertical is in the range between 40° and 140°.

15. The off-road vehicle of claim 14, wherein the top pipe section defines an intake hole exposed along an underside of the top pipe section, wherein the intake snorkel further comprises a filter at the intake hole to filter air entering into the top pipe section, and wherein the angle defined between the top pipe section central axis and vertical exceeds 90° such that water captured by the filter can drip out of the intake hole.

16. An off-road vehicle comprising:
a frame comprising a front frame portion, a rear frame portion, and a middle frame portion between the front frame portion and the rear frame portion;
a vehicle cover defining a cabin, the vehicle cover comprising a front baffle arranged between the front frame portion and the middle frame portion, a bottom plate arranged on the middle frame portion, a dashboard panel arranged at a top of the front baffle, a rear baffle arranged between the middle frame portion and the rear frame portion, and rear side plates arranged on sides of the rear frame portion;
one or more seats within the cabin, the seat(s) being removably arranged on the middle frame portion and above the bottom plate;
a rear trunk mounted on the rear frame portion;
a prime mover assembly mounted on the frame, the prime mover assembly having at least one air inlet;
an electrical control unit at least partially supported by the frame, wherein the rear baffle further defines an electronic control unit access port behind the seat(s) allowing access to the electronic control unit from within the cabin;
an air filter comprising a filter element to filter air that enters into the prime mover assembly, wherein an air filter access port is defined on the rear baffle allowing access to the filter element from within the cabin, with the air filter access port positioned behind the seat(s) between the rear trunk and the seat(s);
a gear selection mechanism having a gear shift lever which extends into the cabin for die driver to operate to control a shift cable running to the prime mover assembly, the shift cable having a shift cable adjuster, wherein the bottom plate defines a shift cable adjuster access port with the shift cable adjuster being accessible through the shift cable adjuster access port; and
an adjuster cover plate covering the shift cable adjuster access port, the adjuster cover plate being secured to the bottom plate and being removable from within the cabin without tools.

17. An off-mad vehicle comprising:
a frame comprising a front frame portion, a rear frame portion, and a middle frame portion between the front frame portion and the rear frame portion;
a vehicle cover defining a cabin, the vehicle cover comprising a front baffle arranged between the front frame portion and the middle frame portion, a bottom plate arranged on the middle frame portion, a dashboard panel arranged at a top of the front baffle, a rear baffle arranged between the middle frame portion and the rear frame portion, and rear side plates arranged on sides of the rear frame portion;
one or more seats within the cabin, the seat(s) being removably arranged on the middle frame portion and above the bottom plate;
a rear trunk mounted on the rear frame portion;
a prime mover assembly mounted on the frame, the prime mover assembly having at least one air inlet;
an electrical control unit at least partially supported by the frame, wherein the rear baffle further defines an electronic control unit access port behind the seat(s) allowing access to the electronic control unit from within the cabin;
an air filter comprising a filter element to filter air that enters into the prime mover assembly, wherein an air filter access port is defined on the rear baffle allowing access to the filter element from within the cabin, with the air filter access port positioned behind the seat(s) between the rear trunk and the seat(s); and
at least one side bumper with an end penetrating into the vehicle cover from outside to inside of the off-road vehicle and mounted on a corresponding connection plate arranged on the middle frame portion:
wherein the bottom plate defines a bumper access port therein with the connection between the end of the side bumper and the connection plate being accessible through the bumper access port.

* * * * *